(12) United States Patent
Baek et al.

(10) Patent No.: US 10,156,978 B2
(45) Date of Patent: Dec. 18, 2018

(54) TERMINAL AND OPERATING METHOD THEREOF

(71) Applicant: LG ELECTRONICS INC., Seoul (KR)

(72) Inventors: Bumhyeon Baek, Seoul (KR); Kyungdong Choi, Seoul (KR); Jieun Kim, Seoul (KR); Hyukjae Jang, Seoul (KR); Keumsung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/850,786

(22) Filed: Sep. 10, 2015

(65) Prior Publication Data
US 2016/0291831 A1    Oct. 6, 2016

(30) Foreign Application Priority Data

Mar. 31, 2015  (KR) .................. 10-2015-0045473
May 14, 2015   (KR) .................. 10-2015-0067511

(51) Int. Cl.

| G06F 3/041  | (2006.01) |
|---|---|
| G06F 3/0488 | (2013.01) |
| G06F 3/0481 | (2013.01) |
| G06F 3/0482 | (2013.01) |
| G06F 3/0484 | (2013.01) |
| G06F 3/16   | (2006.01) |
| G06F 9/451  | (2018.01) |
| G06F 9/44   | (2018.01) |

(52) U.S. Cl.
CPC .......... *G06F 3/0488* (2013.01); *G06F 3/0412* (2013.01); *G06F 3/0482* (2013.01); *G06F 3/04817* (2013.01); *G06F 3/04842* (2013.01); *G06F 3/04847* (2013.01); *G06F 3/04883* (2013.01); *G06F 3/167* (2013.01); *G06F 9/4443* (2013.01); *G06F 9/451* (2018.02); *G06F 2203/04808* (2013.01)

(58) Field of Classification Search
CPC ...... G06F 3/048; G06F 9/4443; G06F 3/0486; G06F 3/04886; G06F 3/04883; G06F 3/04817; G06F 3/04842; G06F 17/30277; G06F 3/0488; G06F 3/0412; G06F 3/0482; G06F 3/04847; G06F 3/167
See application file for complete search history.

(56) References Cited

U.S. PATENT DOCUMENTS

| 2013/0024796 A1* | 1/2013 | Seo .................. G06F 3/04883 715/769 |
|---|---|---|
| 2013/0275411 A1* | 10/2013 | Kim ................. G06F 17/30277 707/722 |

(Continued)

FOREIGN PATENT DOCUMENTS

| EP | 2 549 369 A2 | 1/2013 |
|---|---|---|
| EP | 2 775 409 A2 | 9/2014 |

*Primary Examiner* — Robert Michaud
(74) *Attorney, Agent, or Firm* — Birch, Stewart, Kolasch & Birch, LLP

(57) ABSTRACT

A method of controlling a terminal, and which includes obtaining a rubbing touch input rubbing a partial area of a touch screen of the terminal; executing an intelligent agent providing a function or operation of the terminal based on the received rubbing touch input; and performing a function corresponding to an object displayed in the partial area based on the executed intelligent agent.

20 Claims, 116 Drawing Sheets

(56) References Cited

U.S. PATENT DOCUMENTS

| | | | |
|---|---|---|---|
| 2014/0096049 A1* | 4/2014 | Vonshak | G06F 3/048 |
| | | | 715/769 |
| 2014/0253474 A1 | 9/2014 | Park et al. | |
| 2014/0258182 A1 | 9/2014 | Joung et al. | |
| 2014/0258866 A1* | 9/2014 | Jin | G06F 3/0482 |
| | | | 715/719 |
| 2016/0154555 A1* | 6/2016 | Perrin | G06F 3/04883 |
| | | | 715/765 |

* cited by examiner

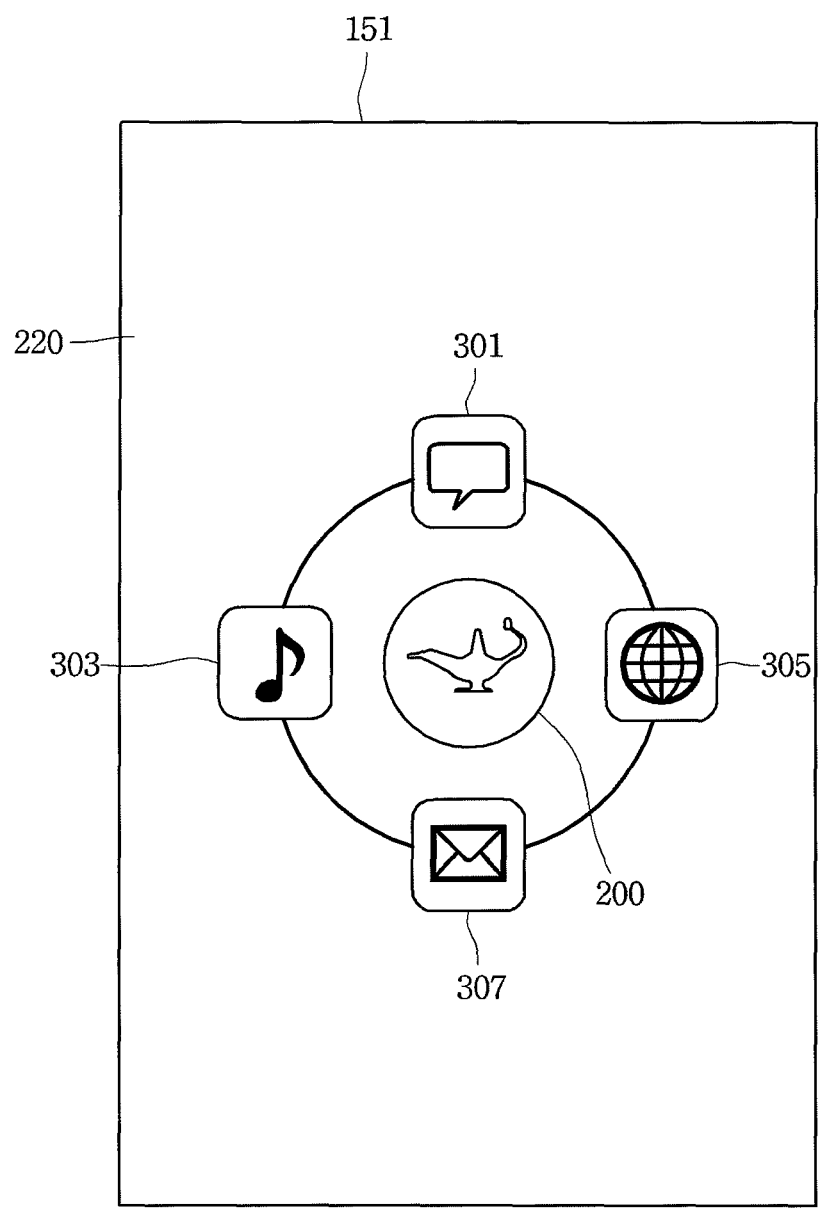

SEOUL

| 06/03 TUE | 06/04 WED | 06/05 TUE |
|---|---|---|
| 15℃/ 24℃ | 16℃/ 22℃ | 13℃/ 19℃ |
| 06/06 FRI | 06/07 SAT | 06/08 SUN |
| 16℃/ 22℃ | 19℃/ 25℃ | 17℃/ 26℃ |

FIG. 64A

151    223    370

SEARCH | Lottery number |

In a U.S. Court, Iraqis Accuse Blackwater of Killings in 2007

Iran Secretly Sending Drones and Supplies Into Iraq, U.S Officials say

Use ofDrones for Killings Risks a War Without End, Panel Concludes in Report

Major Ruling Shields Privacy of Cellphones

Gifts of $300 to Homeless Are Reduced to a Lunch

World Cup          Schedule    Full Coverage »

At World Cup Two Unknowns...

FIG. 96

TERMINAL AND OPERATING METHOD THEREOF

CROSS-REFERENCE TO RELATED APPLICATIONS

The present application claims priority under 35 U.S.C. § 119 and 35 U.S.C. § 365 to Korean Patent Application Nos. 10-2015-0045473 filed on Mar. 31, 2015 and 10-2015-0067511 filed on May 14, 2015, which are hereby incorporated by reference in their entirety.

BACKGROUND OF THE INVENTION

Field of the Invention

The present disclosure relates to a terminal and an operating method thereof, and particularly, to a terminal including an intelligent agent for providing various functions to the user.

Discussion of the Background

Terminals can be divided into mobile/portable terminals and stationary terminals. Again, the terminals can be divided into handheld terminals and vehicle mounted terminals. As functions of a terminal are diversified, such a terminal is implemented as a multimedia player having multi-functions, for example, capturing pictures and videos, playing music or video files, playing games, and receiving broadcasts.

Moreover, a touch input on a touch screen equipped in a terminal is used as an input method and additionally, a voice input method for recognizing the user's voice and a motion input method for recognizing the user's movement are used. As the voice recognition technique for recognizing the user's natural language develops, application software using natural language processing for answering the user's question and performing an operation according to the user's instruction is provided to a terminal.

Accordingly, the user commands or questions their terminal using their natural voice to obtain desired information and allows the terminal to perform a desired operation. However, since natural language processing of such a terminal does not satisfy the user due to an insufficient recognition rate, the user actually does not use the service often. Further, a terminal's voice recognition rate varies according to the user providing a voice command. In addition, the operations and functions of a terminal operating through a terminal's voice input method are limited.

SUMMARY OF THE INVENTION

Accordingly, one object of the present invention is to address the above-noted and other problems of the related art.

Another object of the present invention is to properly execute user intended functions the user through an intelligent agent in a terminal.

Still another object of the present invention is to provide an intelligent agent for obtaining the user input through various input methods and providing the terminal's functions and operations corresponding to the obtained user input.

To achieve these and other advantages and in accordance with the purpose of the present invention, as embodied and broadly described herein, the present invention provides in one aspect a method of controlling a terminal, and which includes obtaining a rubbing touch input rubbing a partial area of a touch screen of the terminal; executing an intelligent agent providing a function or operation of the terminal based on the received rubbing touch input; and performing a function corresponding to an object displayed in the partial area based on the executed intelligent agent.

In another aspect, the present invention provides a terminal including a touch screen; and a controller configured to obtain a rubbing touch input rubbing a partial area of a touch screen of the terminal as a first user input, execute an intelligent agent providing a function or operation of the terminal based on the received rubbing touch input, and perform a function corresponding to an object displayed in the partial area based on the executed intelligent agent.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 14A is a view illustrating a simple screen display according to an embodiment of the present invention.

FIG. 39 is a view illustrating a weather information display screen according to an embodiment of the present invention.

FIG. 64A is a view illustrating a keyword auto input according to an embodiment of the present invention.

FIG. 96 is a view illustrating a message input screen according to an embodiment of the present invention.

DETAILED DESCRIPTION OF THE EMBODIMENTS

Figure 1:
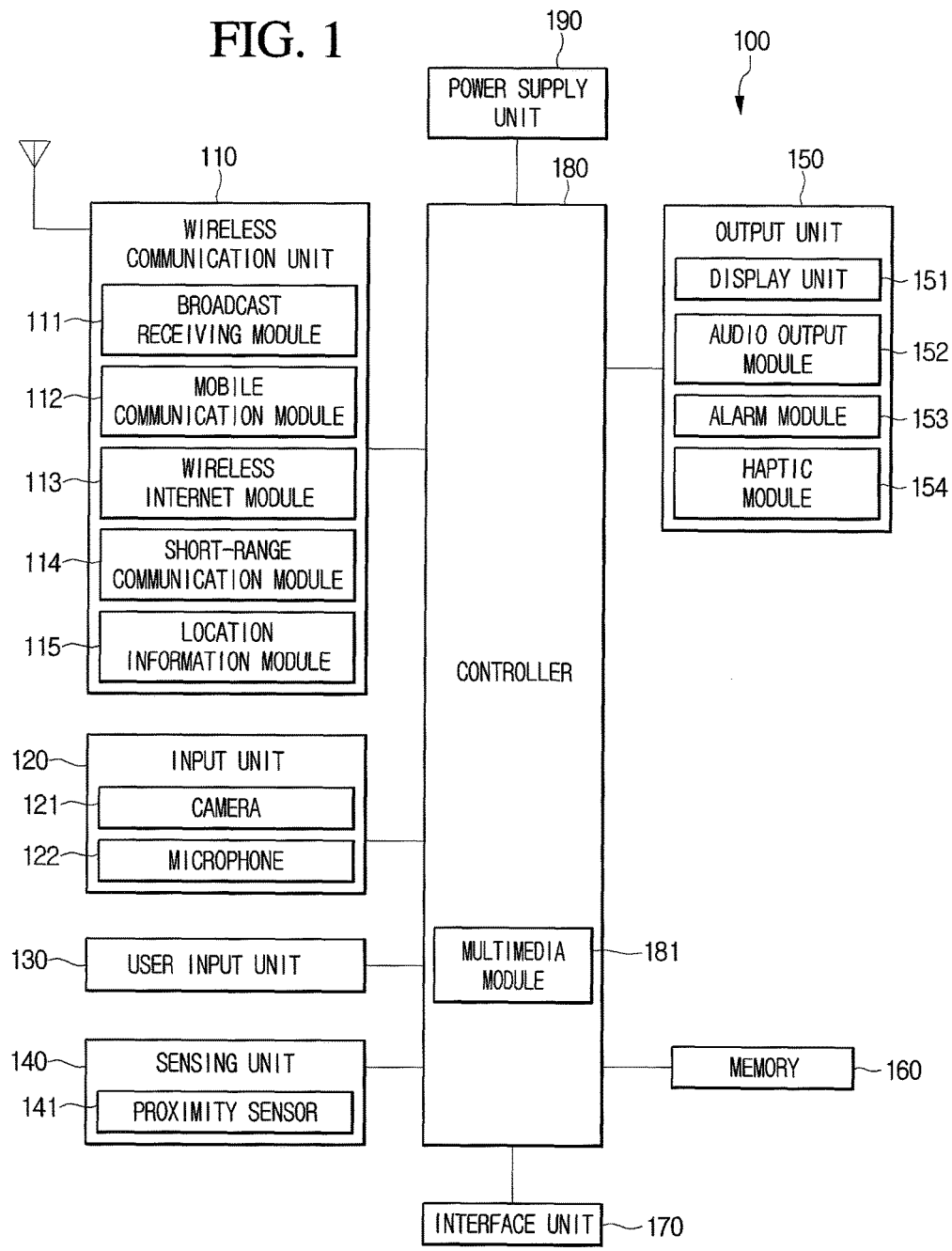
FIG. 1 is a block diagram of a terminal according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and, do not have distinctive meanings or roles by themselves. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

The terms "first" and "second" are used herein to describe various components but these components should not be limited by these terms. These terms are used only to distinguish one component from other components. In this disclosure below, when one part (or element, device, etc.) is referred to as being "connected" to another part (or element, device, etc.), it should be understood that the former can be "directly connected" to the latter, or "connected" to the latter via an intervening part (or element, device, etc.). In contrast, when an element is referred to as being "directly connected" or "directly coupled" to another element, there are no intervening elements present.

A terminal described in this specification includes smart phones, laptop computers, digital broadcast terminals, personal digital assistants (PDA), portable multimedia players (PMPs), navigations, slate PCs, tablet PCs, ultrabooks, and wearable devices (for example, smartwatches, smart glasses, and head mounted displays (HMDs)). However, the configuration is applicable to stationary terminals such as digital TVs, desktop computers, and digital signage.

FIG. 1 is a block diagram of a terminal 100 according to an embodiment of the present invention. As shown, the terminal 100 includes a wireless communication unit 110, an Audio/Video (A/V) input unit 120, a user input unit 130, a sensing unit 140, an output unit 150, a memory 160, an interface unit 170, a controller 180, and a power supply unit 190. A terminal having more or less components may however be implemented.

The wireless communication unit 110 includes at least one module allowing wireless communication between the terminal 100 and a wireless communication system, between the terminal 100 and another terminal 100, between the terminal 100 and another device, or between the terminal 100 and an external server. Additionally, the wireless communication unit 110 includes at least one module connecting the terminal 100 to at least one network.

As shown, the wireless communication unit 110 includes at least one of a broadcast reception module 111, a mobile communication module 112, a wireless internet module 113, a short range communication module 114, and a location information module 115. The broadcast reception module 111 can receive a broadcast signal and/or broadcast related information from an external broadcast management server through a broadcast channel.

The broadcast channel includes a satellite channel and a terrestrial channel. The broadcast management server may refer to a server for generating and transmitting broadcast signals and/or broadcast related information or a server for receiving pre-generated broadcast signals and/or broadcast related information and transmitting them to a terminal. The broadcast signals includes TV broadcast signals, radio broadcast signals, and data broadcast signals and also includes broadcast signals in a combination format thereof.

The broadcast related information refers to information relating to broadcast channels, broadcast programs, or broadcast service providers. The broadcast related information may be provided through a mobile communication network. In such a case, the broadcast related information can be received by the mobile communication module 112. The broadcast related information may exist in various forms. For example, the various forms include Electronic Program Guide (EPG) of Digital Multimedia Broadcasting (DMB) or Electronic Service Guide (ESG) of Digital Video Broadcast-Handheld (DVB-H).

The broadcast reception module 111 can receive digital broadcast signals by using digital broadcast systems such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). The broadcast reception module 111 can also be configured to suitable for another broadcast system in addition to the digital broadcast system. Broadcast signals and/or broadcast related information received through the broadcast reception module 111 can be stored in the memory 160.

The mobile communication module 112 transmits/receives wireless signals to/from at least one of a base station, an external terminal, and a server on a mobile communication network. The wireless signal includes various types of data according to a voice call signal, a video call signal, or text/multimedia message transmission. The wireless internet module 113 refers to a module for wireless internet access and may be built in or external to the terminal 100. Wireless internet techniques include Wireless LAN (WLAN) (for example, Wi-Fi), Wireless broadband (Wibro), World Interoperability for Microwave Access (Wimax), and High Speed Downlink Packet Access (HSDPA).

The short range communication module 114 refers to a module for short range communication. Short range communication techniques include Bluetooth, Radio Frequency Identification (RFID), infrared Data Association (IrDA), Ultra Wideband (UWB), ZigBee, and Near Field Communication (NFC). The location information module 115 is a module for obtaining the location (or the current location) of a terminal and its representative examples include a global positioning system (GPS) module or a Wi-Fi module. For example, the terminal can obtain its position by using a signal transmitted from a GPS satellite through the GPS module.

As another example, the terminal can obtain its position based on information of a wireless access point (AP) transmitting/receiving a wireless signal to/from the Wi-Fi module, through the Wi-Fi module. If necessary, the position information module 115 can perform a function of another module in the wireless communication unit 110 in order to obtain data on the location of the terminal substitutionally or additionally. The location information module 115 is a module for obtaining the position (or the current position) of the terminal and is not limited to a module directly calculating and obtaining the position of the terminal.

Referring to FIG. 1, the A/V input unit 120 is used for an audio signal or video signal input and includes a camera 121 and a microphone 122. The camera 121 processes image frames such as a still image or a video obtained by an image sensor in a video call mode or a capturing mode. The processed image frame can be displayed on a display unit 151. An image frame processed by the camera 121 can be stored in the memory 160 or can be transmitted to the outside through the wireless communication unit 110. The camera 121 may be provided more than two according to a usage environment.

The microphone 122 receives external sound signals through a microphone in a call mode, a recording mode, and a voice recognition mode, and processes the received external sound signals into electrical voice data. In the case of a call mode, the processed voice data may be converted into a transmittable form and output to a mobile communication base station through the mobile communication module 112. Various noise canceling algorithms for removing noise occurring during the reception of external sound signals may be implemented in the microphone 122.

The user input unit 130 (for example, a touch key and a mechanical key)) is for receiving information from the user.

The sensing unit 140 includes at least one sensor for sensing at least one of information in a terminal, environmental information around a terminal, and user information. For example, the sensing unit 140 includes at least one of a proximity sensor 141, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a terminal disclosed in this specification may combines information sensed by at least two or more sensors among such sensors and may then utilize it.

The output unit 150 is used to generate a visual, auditory, or haptic output and includes at least one of a display unit 151, an audio output unit 152, an alarm unit 153, and a haptic module 154. The display unit 151 may be formed with a mutual layer structure with a touch sensor or formed integrally, so that a touch screen may be implemented. Such a touch screen may serve as the user input unit 120 providing an input interface between the terminal 100 and the user and an output interface between the terminal 100 and the user at the same time.

The display unit 151 can display (output) information processed in the terminal 100. For example, when the terminal 100 is in a call mode, it displays the user interface (UI) or a graphic user interface (GUI) relating to a call. When the terminal 100 is in a video call mode or a capture mode, it displays a captured or/and received image, UI, or GUI. The display unit 151 includes at least one of a liquid crystal display (LCD), a thin film transistor-liquid crystal display (TFT LCD), an organic light-emitting diode (OLED), a flexible display, and a 3D display.

Some displays can be configured with a transparent type or an optical transmission type through which the outside is seen. This is called a transparent display and its representative example includes a Transparent OLED (TOLED). A rear structure of the display unit 151 may be configured with an optical transmission type structure. Through such a structure, the user may see an object disposed at the rear of a terminal body through an area that the display unit 151 of the terminal body occupies.

The display unit 151 may be provided more than two according to an implementation form of the terminal 100. For example, a plurality of display units may be separately or integrally disposed on one surface or may be disposed on different surfaces in the terminal 100. When the display unit 151 and a sensor (hereinafter referred to as a touch sensor) for detecting a touch operation form a mutual layer structure (hereinafter referred to as a touch screen), the display unit 151 may be used as an input device in addition to an output device. The touch sensor, for example, may have a form of a touch film, a touch sheet, and a touch pad.

The touch sensor may be configured to convert a pressure applied to a specific portion of the display unit 151 or changes in capacitance occurring at a specific portion into electrical input signals. The touch sensor may be configured to detect a pressure and a capacitance during touch in addition to a touched position and area. When there is a touch input on the touch sensor, signal(s) corresponding thereto is/are sent to a touch controller. The touch controller processes the signal(s) and then transmits corresponding data to the controller 180. Therefore, the controller 180 can recognize which area of the display unit 151 is touched.

Additionally, the controller 180 can determine the type of the user's touch input based on an area, a pressure, and a capacitance during touch. Accordingly, the controller 180 can distinguish a finger touch, a nail touch, a finger joint touch, and a multi touch using a plurality of fingers from each other. Further, the controller 180 can recognize a touch input that the user rubs a specific portion of the display unit 151. Herein, a rubbing touch input corresponds to a touch input rotating a specific portion of the display unit 151 in one direction and corresponds to a touch input touching a specific portion of the display unit 151 in one direction and then touching it in the opposite direction of the one direction continuously.

For example, when a predetermined size of touch is recognized continuously within a predetermined area range of a specific portion of the display unit 151, the controller 180 can recognize the recognized touch as a rubbing touch. This will be described with reference to FIGS. 2A to 3B. In particular, FIGS. 2A and 2B are conceptual diagrams illustrating a rubbing touch according to an embodiment of the present invention.

Figure 2A:
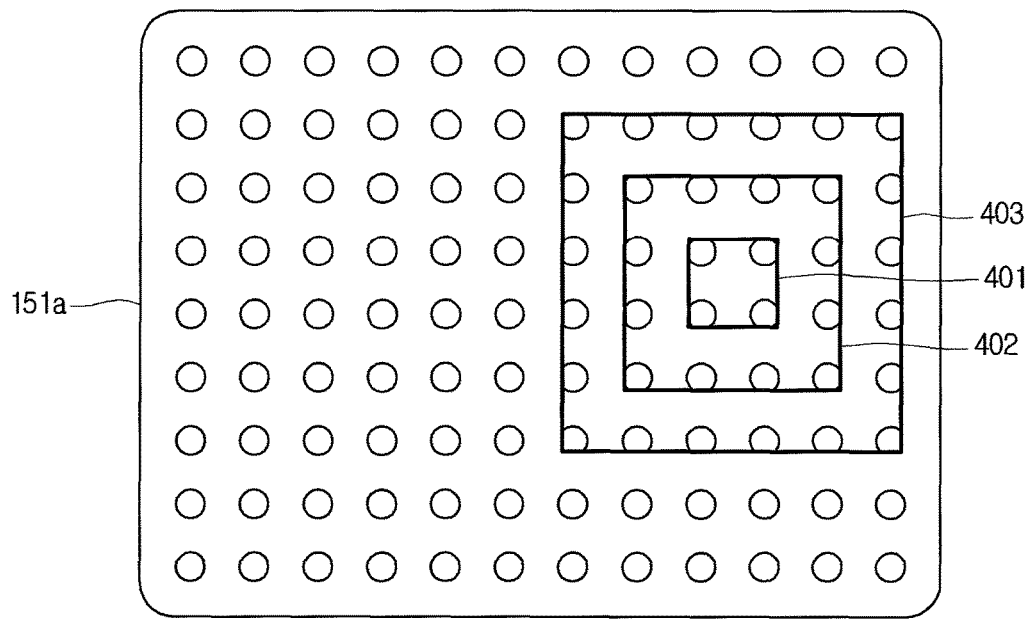
FIGS. 2A and 2B are conceptual diagrams illustrating a rubbing touch according to an embodiment of the present invention.
Figure 2B:
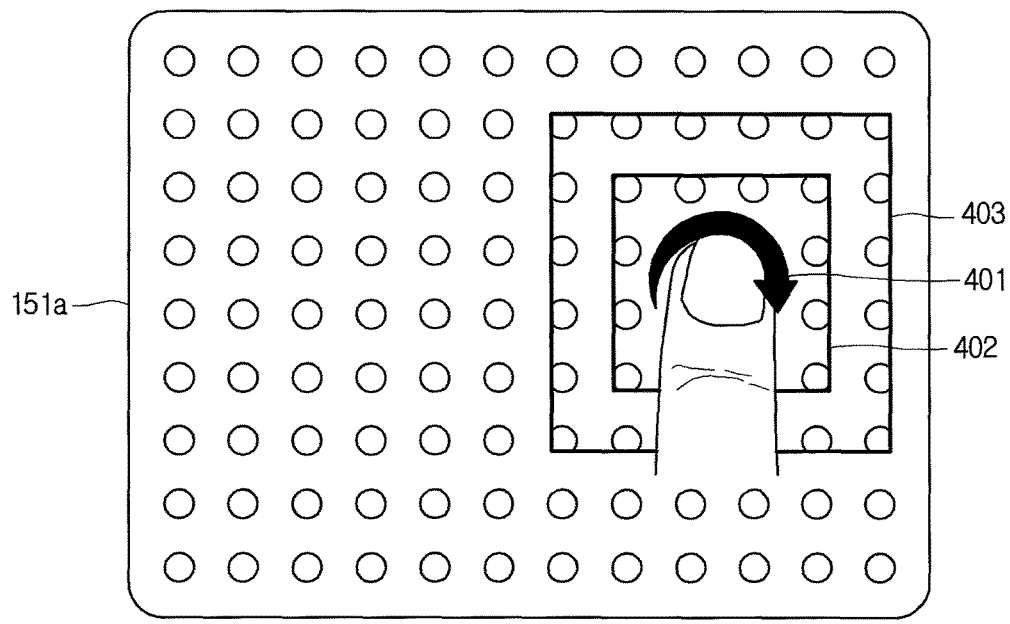

Referring to FIG. 2A, a partial area 151a of the display unit 151 includes a plurality of sensing points that are references for recognizing touch. Herein, the plurality of sensing points may be disposed in the partial area 151a of the display unit 151 at a predetermined interval and may be references for recognizing the user touch input for each sensing point. Accordingly, the touch sensor can convert a pressure applied to a specific portion of the display unit 151 or changes in capacitance occurring at a specific portion into electrical input signals. Since content for a sensing point of a touch screen is known, its detailed description is omitted.

Referring to FIG. 2A, the partial area 151a includes a predetermined size of a first area 401, a second area 402, and a third area 403. As shown, the second area 402 is broader than the first area 401 and the second area 402 includes the first area 401. The third area 403 is also broader than the second area 402 and the third area 403 includes the second area 402.

A description will now be given of the controller 180 recognizing a rubbing touch input recognition when the user provides a clockwise rotating touch input, that is, a rubbing touch input based on the first area 401. Referring to FIG. 2B, when the controller 180 continuously detects a touch state from sensing points in the first area 401, a touch state from sensing points in the second area 402 and an untouched state temporarily, or an untouched state or a temporarily touched state from sensing points in the third area 403, the controller 180 can recognize a touch input for the partial area 151a as a rubbing touch input.

In addition, whether there is a touch state detection of sensing points in the second area 402 may vary according to a rotation direction of the user's rubbing touch, a touch input speed of the user's rubbing touch, and the user's touch area. Moreover, the description for the rubbing touch input of FIG. 2B is just an example and the controller 180 can recognize a touch input rotating in a counterclockwise direction and one direction to another direction in addition to the touch input rotating in a clockwise direction.

Figure 3A:
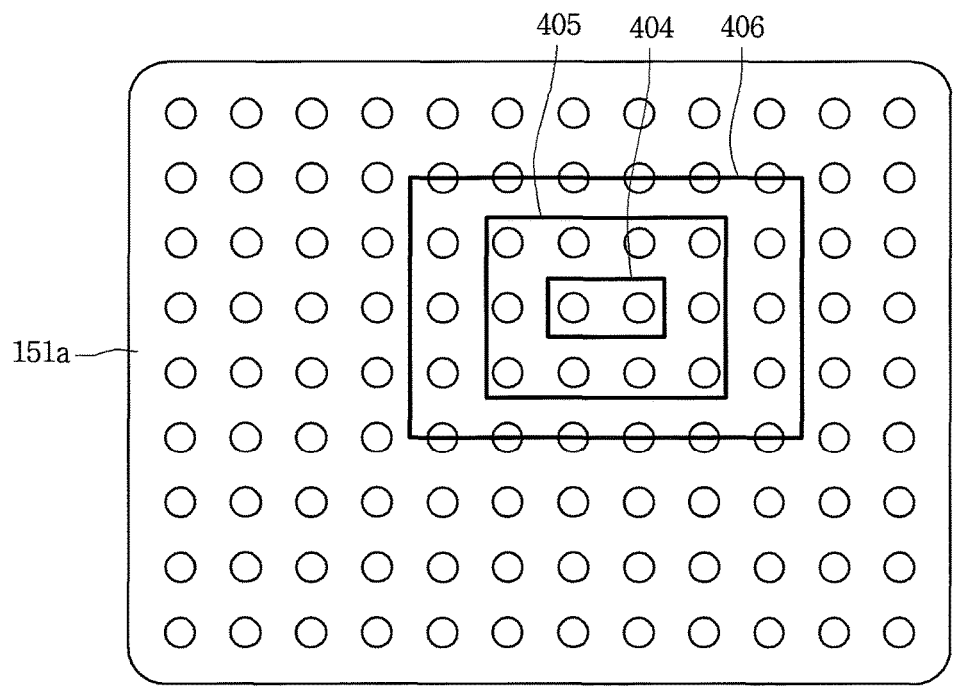
FIGS. 3A and 3B are conceptual diagrams illustrating a rubbing touch according to another embodiment of the present invention.
Figure 3B:
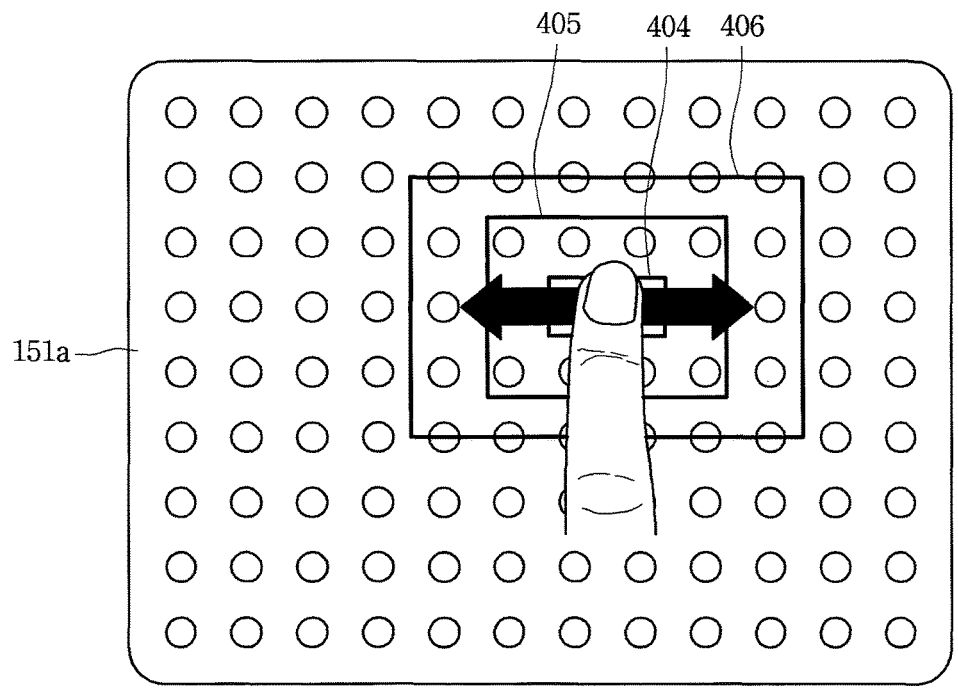

Next, FIGS. 3A and 3B are conceptual diagrams illustrating a rubbing touch according to another embodiment of the present invention. Referring to FIG. 3A, the partial area 151a of the display unit 151 includes a plurality of sensing points that are references for recognizing touch. The plurality of sensing points are disposed in the partial area 151a at a predetermined interval and are references for recognizing the user touch input for each sensing point. Accordingly, the touch sensor converts a pressure applied to a specific portion of the display unit 151 or changes in capacitance occurring at a specific portion into electrical input signals. Since content for a sensing point of a touch screen is known publicly, its detailed description is omitted.

Referring to FIG. 3A, the partial area 151a includes a predetermined size of a fourth area 404, a fifth area 405, and a sixth area 406. The fifth area 405 is broader than the fourth area 404 and the fifth area 405 includes the fourth area 404. The sixth area 406 is broader than the fifth area 405 and the sixth area 406 includes the fifth area 405.

Referring to FIG. 3B, the controller 180 recognizes a rubbing touch input when the user provides a touch input rubbing horizontally based on the fourth area 404 is described. As shown, when the controller 180 continuously detects a touch state from sensing points in the fourth area 404, a touch state from sensing points in the fifth area 405 and an untouched state temporarily, or an untouched state or a temporarily touched state from sensing points in the sixth area 406, the controller 180 can recognize a touch input for the partial area 151a as a rubbing touch input.

Herein, whether there is a touch state detection of sensing points in the fifth area 405 can vary according to a touch input direction of the user's rubbing touch, a touch input speed of the user's rubbing touch, and the user's touch area. Moreover, description for the rubbing touch input of FIG. 3B is an example and the controller 180 can recognize a touch input rubbing in one direction to another direction such as a vertical direction in addition to a touch input rubbing in a horizontal direction. Also, when a touch input area is more than a predetermined area or a touch input time is more than a predetermined time, the controller 180 can not determine the touch input as a rubbing touch input.

Additionally, when the terminal 100 is in a sleep mode, as obtaining a rubbing touch input, the controller 180 can switch from a sleep mode to a normal mode. Herein, the sleep mode corresponds to a mode in which the display unit 151 of the terminal 100 is turned off and corresponds to a mode in which a partial configuration of the terminal 100 is turned off. For example, the sleep mode corresponds to a mode in which at least one of the display unit 151 and the sensing unit 140 of the display unit 151 is turned off.

Further, the sleep mode can have a different operating period, sensing sensitivity, and power consumption of the proximity sensor 141 and the touch sensor of the sensing unit 140 than the normal mode. Further, the sleep mode is also referred to as a doze mode. For example, the sensing sensitivity of the proximity sensor 141 and the touch sensor in the sleep mode may become insensitive compared to that in the normal mode and an operating period in the sleep mode may be longer than that in the normal mode. In more detail, for a sleep mode in which the display unit 151 is turned off, if a sensing value sensed by the proximity sensor 141 is more than a reference value, the controller 180 can operate in a second sleep mode.

The second sleep mode may be a mode in which the operating period of the proximity sensor 141 and the touch sensor is longer than that of the first sleep mode and the sensing sensitivity of the proximity sensor 141 and the touch sensor is more insensitive than that of the first sleep mode. Accordingly, the power consumption of the proximity sensor 141 and the touch sensor in the second sleep mode can be less than that in the first sleep mode. Then, for a sleep mode in which the display unit 151 is turned off, if a sensing value sensed by the proximity sensor 141 is less than a reference value, the controller 180 can operate in the first sleep mode. The first sleep mode may be a mode in which the operating period of the proximity sensor 141 and the touch sensor is shorter than that of the second sleep mode and the sensing sensitivity of the proximity sensor 141 and the touch sensor is more sensitive than that of the second sleep mode. Accordingly, a general touch can be recognized in the first sleep mode but may not be recognized in the second sleep mode and a rubbing touch input may be recognized in the first sleep mode and the second sleep mode.

Referring to FIG. 1, the proximity sensor 141 may be disposed in an inner area of a terminal surrounded by the touch screen or near the touch screen. The proximity sensor 141 refers to a sensor for detecting whether there is an object approaching a predetermined detection surface or whether there is an object around by using the force of an electromagnetic field or infrared, without mechanical contact. The proximity sensor 141 also generally has a longer lifecycle and a higher availability than a contact type sensor.

Examples of the proximity sensor 141 include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. When the touch screen is a capacitive type, it is configured to detect the proximity of a pointer by using a change in electric field according to the proximity of the pointer. In this instance, the touch screen (or a touch sensor) may be classified as a proximity sensor.

Hereinafter, for convenience of description, an action for recognizing the position of a pointer on the touch screen as the pointer is close to the touch screen without contacting the touch screen is called "proximity touch" and an action that a pointer actually contacts the touch screen is called "contact touch." A position that a pointer is proximity-touched on the touch screen means a position that the pointer vertically corresponds to the touch screen when the pointer is proximity-touched. The proximity sensor 141 can detect a proximity touch and a proximity touch pattern (for example, a proximity touch distance, a proximity touch direction, a proximity touch speed, a proximity touch time, a proximity touch position, and a proximity touch movement state). Information corresponding to the detected proximity touch operation and proximity touch pattern can be output on the touch screen.

The audio output module 152 outputs audio data received from the wireless communication unit 110 or stored in the memory 160 in a call signal reception or call mode, a recording mode, a voice recognition mode, or a broadcast reception mode. The sound output unit 152 can also output a sound signal relating to a function (for example, a call signal reception sound and a message reception sound) performed by the terminal 100. The audio output module 152 includes a receiver, a speaker, and a buzzer.

The alarm unit 153 outputs a signal for notifying an event occurrence of the terminal 100. An example of an event occurring in a terminal includes call signal reception, message reception, key signal input, and touch input. The alarm unit 153 can output another form of signal other than a video signal or an audio signal, for example, a signal for notifying an event occurrence by vibration. The video signal or the audio signal may be output through the display unit 151 or the audio output module 152, so that the display unit 151 and audio output module 152 can be classified as part of the alarm unit 153.

The haptic module 154 generates various haptic effects that the user may feel. A representative example of a haptic effect that the haptic module 154 generates is vibration. The intensity and pattern of a vibration that the haptic module 154 generates are controllable. For example, the haptic module 154 can synthesize and output different vibrations or output different vibrations sequentially.

The haptic module 154 can generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat. The haptic module 154 may be implemented to deliver a haptic effect through a direct contact and also allow the user to feel a haptic effect through a muscle sense such as a finger or an arm. The haptic module 154 can also be more than two according to a configuration aspect of the terminal 100.

Additionally, the haptic module 154 includes a vibration device for generating vibration. For example, the haptic module 154 includes at least one vibration motor and the vibration motor may have various forms such as bar type and coin type. Also, the haptic module 154 may be provided in various positions according to the form of the terminal 100.

In addition, the memory 160 stores data supporting various functions of the terminal 100. The memory 160 may store a plurality of application programs or applications running on the terminal 100, and data and commands for operations of the terminal 100. At least part of such an application program can be downloaded from an external server through a wireless communication. Additionally, at least part of such an application program may be included in the terminal 100 from the time of shipment in order to perform a basic function (for example, an incoming call, a calling function, and a message reception) of the terminal 100. Moreover, an application program may be stored in the memory 160 and installed on the terminal 100, so that it may run to perform an operation (or a function) of the terminal 100 by the controller 180.

The memory 160 includes at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The terminal 100 may operate in relation to a web storage performing a storage function of the memory 160 on internet.

Further, the interface unit 170 serves as a path to external devices connected to the terminal 100. The interface unit 170 can receive data from an external device, receive power and deliver it to each component in the terminal 100, or transmit data in the terminal 100 to an external device. For example, the interface unit 170 includes a wired/wireless headset port, an external charger port, a wired/wireless data port, a memory card port, a port connecting a device equipped with an identification module, an audio I/O port, a video I/O port, and an earphone port.

The identification module, as a chip storing various information for authenticating the usage authority of the terminal 100, includes the user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through a port.

When the mobile terminal 100 is connected to an external cradle, the interface unit 170 becomes a path through which power of the cradle is supplied to the terminal 100 or a path through which various command signals input from the cradle are delivered to the terminal 100 by the user. The various command signals or the power input from the cradle can operate as a signal for recognizing that the terminal 100 is accurately mounted on the cradle.

The controller 180 typically controls overall operations of the terminal 100. For example, the controller 180 performs a control and processing relating to voice call, data communication, and a video call. The controller 180 can include a multimedia module 181 for multimedia playback. The multimedia module 181 may be implemented in the controller 180 or implemented separated from the controller 180. The controller 180 can perform pattern recognition processing to recognize handwriting input and drawing input on the touch screen as a text and an image, respectively.

In addition, the controller 180 can execute an intelligent agent application program. Herein, the intelligent agent corresponds to an application program for performing an autonomous process to accomplish a task instead of the user in order for a specific purpose.

Moreover, an intelligent agent application program running on the terminal 100 may be called a genie agent. A genie is a character of a fairy in the movie Aladdin and the magic lamp of Arabian nights. Thus, the intelligent agent application program running on the terminal 100 performs desired functions or operations like the genie in the lamp. Accordingly, the controller 180 can provide user-intended functions or operations of the terminal 100 by executing an intelligent agent application program. The genie experience is also fun and entertaining for the user. Thus, the expression that the terminal 100 performs a function through an intelligent agent corresponds to the controller 180 processing an intelligent agent application program to perform a function and an intelligent agent corresponds to an intelligent agent application program.

In addition, the power supply unit 190 can receive external power or internal power under control of the controller 180 and then supply power necessary for an operation of each component. Moreover, the terminal 100 includes at least one physical key at the rear of the terminal 100. Herein, the physical key includes at least one of a touch key and a push key included in the user input unit 130. This will be described with reference to FIG. 4.

Figure 4:
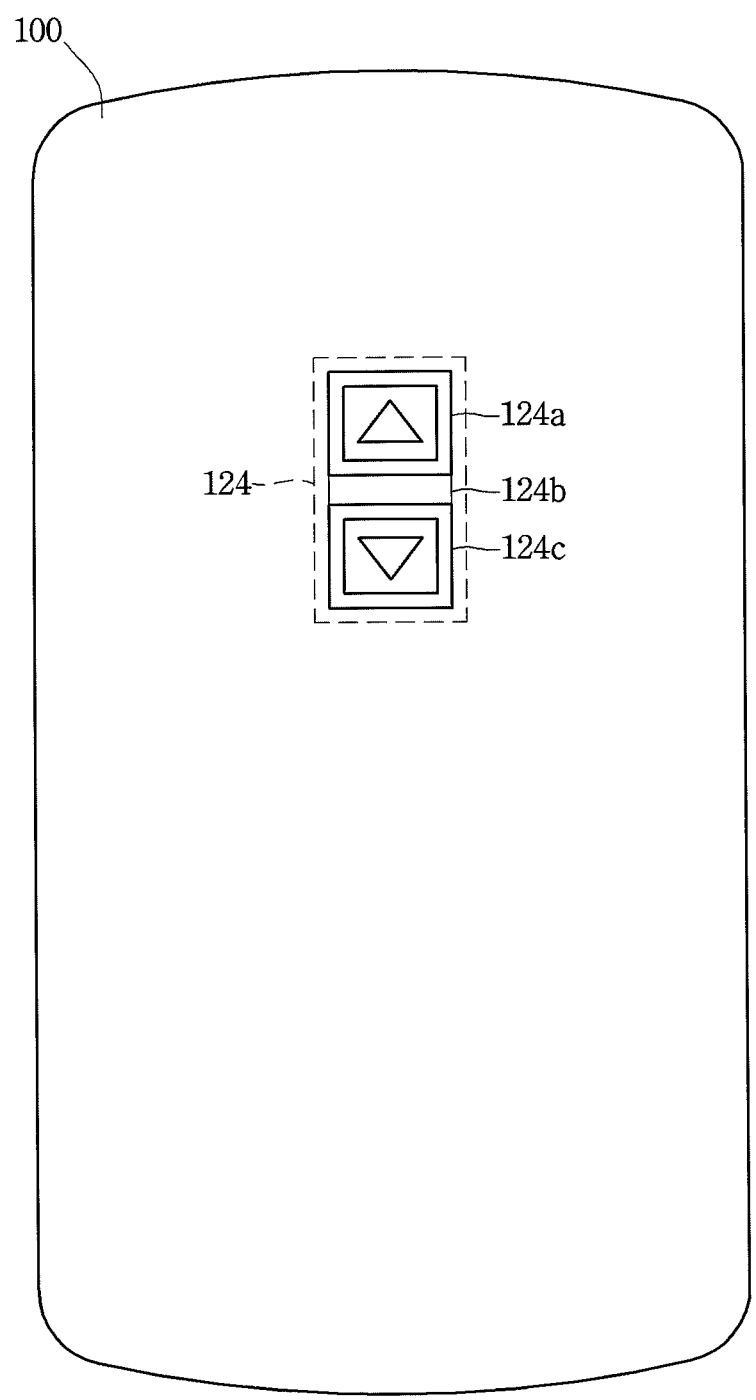
FIG. 4 is a view illustrating a rear key of a terminal according to an embodiment of the present invention.

In particular, FIG. 4 is a view illustrating a rear key of a terminal according to an embodiment of the inventive concept. Referring to FIG. 4, a rear key 124 is provided at the rear of the terminal 100. Herein, the rear of the terminal 100 corresponds to a surface opposite to the display unit 151 of the terminal 100. The rear key 124 may be configured with a plurality of keys or one key. For example, as shown in FIG. 4, the rear key 124 includes an upper end key 124a, a stop key 124b, and a lower end key 124c. The rear key 124 may be a physical key or a touch key. Additionally, the rear key 124 may be a touch key where a physical push input is available.

Various embodiments described herein may be implemented in recording media that can be readable by computers or devices similar thereto through software, hardware, or a combination thereof. Through hardware implementations, embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing various other functions. In some cases, such embodiments may be implemented by the controller 180.

Through software implementations, embodiments relating to procedures or functions may be implemented together with an additional software module for performing at least one function or operation. Software code may be implemented by a software application written in an appropriate program language. The software code may be stored in the memory 160 and executed by the controller 180. The terminal 100 may be a portable terminal or a stationary terminal. Accordingly, the terminal 100 can be personally carried by the user or be mounted in a predetermined area.

Figure 5:
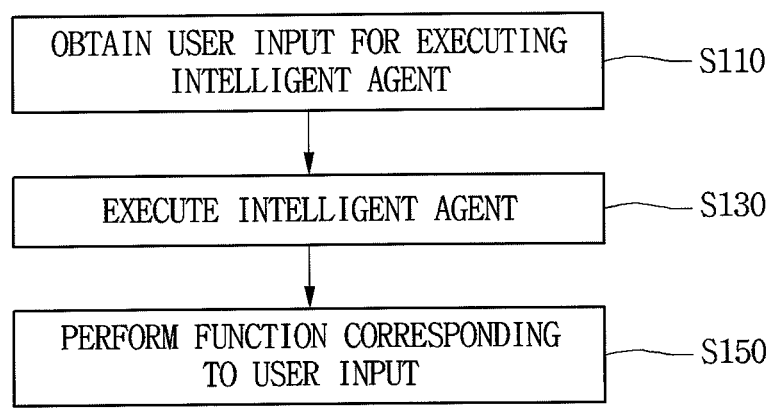
FIG. 5 is a flowchart illustrating an operating method of a terminal according to an embodiment of the present invention.

An operation of a terminal including an intelligent agent according to an embodiment of the present invention will now be described. In particular, FIG. 5 is a flowchart illustrating an operating method of a terminal according to an embodiment of the present invention. Referring to FIG. 5, the controller 180 obtains a first user input for executing an intelligent agent (S110).

The controller 180 can obtain the first user input for executing the intelligent agent through at least one of the user input unit 130, the touch sensor, the camera 121, and the microphone 122. As one embodiment, the controller 180 can obtain a touch input rubbing a partial area of the display unit 151 as the first user input for executing an intelligent agent. As another embodiment, the controller 180 can obtain the first user input for executing an intelligent agent through a touch key and a push key included in the user input unit 130.

As still another embodiment, the controller 180 can obtain the first user input for executing an intelligent agent through the microphone 122. As another embodiment, the controller 180 can obtain the first user input for executing an intelligent agent through the camera 121. As another embodiment, the controller 180 can obtain a specific movement for a terminal, that is, the first user input for executing an intelligent agent, through a motion sensor included in the sensing unit 140.

Figure 6:
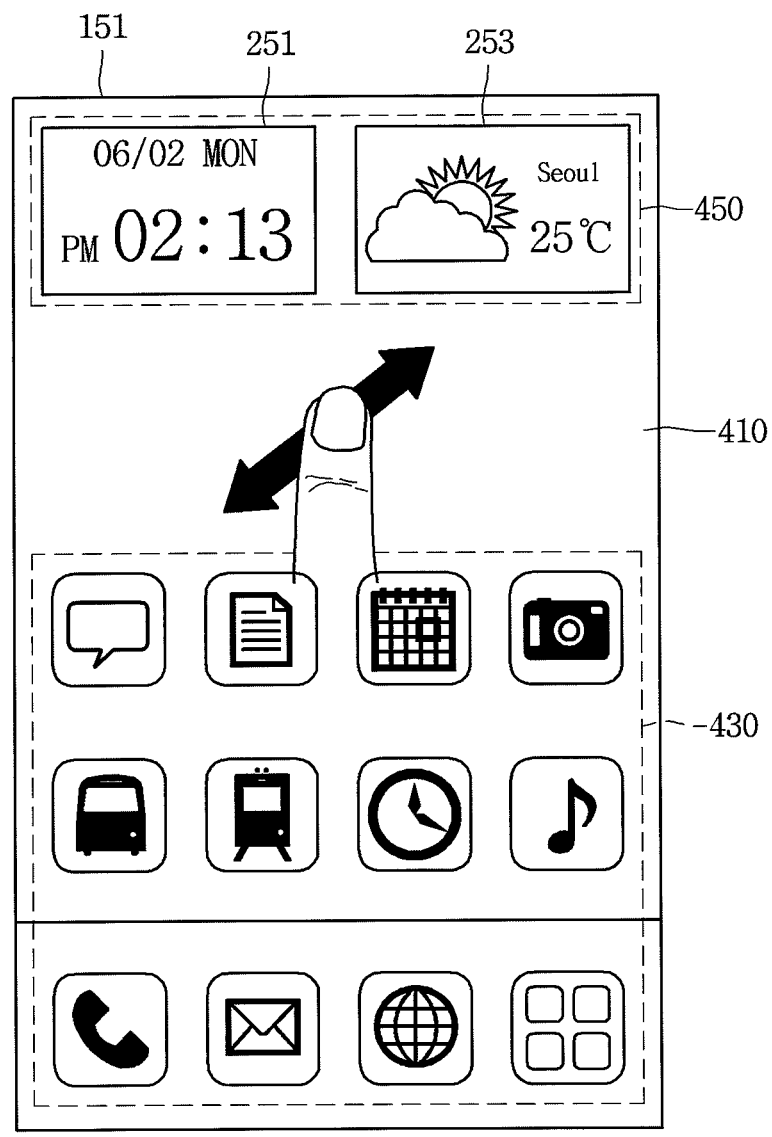
FIG. 6 is a view of the user input for executing an intelligent agent according to an embodiment of the present invention.

This will be described with reference to FIGS. 6 to 9. In particular, FIG. 6 is a view of the user input for executing an intelligent agent according to an embodiment of the present invention. Referring to FIG. 6, the controller 180 can display at least one application icon in a partial area of the screen of the display unit 151. Herein, an area where an application icon is displayed on the screen of the display unit 151 is referred to as an application area 430. Then, the controller 180 can display a widget for representing specific information in a partial area of the screen of the display unit 151. Herein, an area where an application icon is displayed on the screen of the display unit 151 is referred to as an application area 450. For example, the controller 180 can display a time widget 251 and a weather widget 253 in the application area 450.

In addition, an area where no specific object such as an application icon or widget is displayed on the screen of the display unit 151 is referred to as a blank area 410. However, a background image may be displayed in the blank area 410. The controller 180 can obtain a touch input rubbing the blank area 410 of the display unit 151 as the first user input for executing an intelligent agent. Herein, as mentioned above, a rubbing touch input corresponds to a touch input rotating in one direction or a touch input touching in one direction and then continuously touching in the opposite direction of the one direction. Moreover, in correspondence to a touch input rubbing the blank area 410, the controller 180 can display a function corresponding to at least one application that the user uses frequently. This will be described later.

Figure 7:
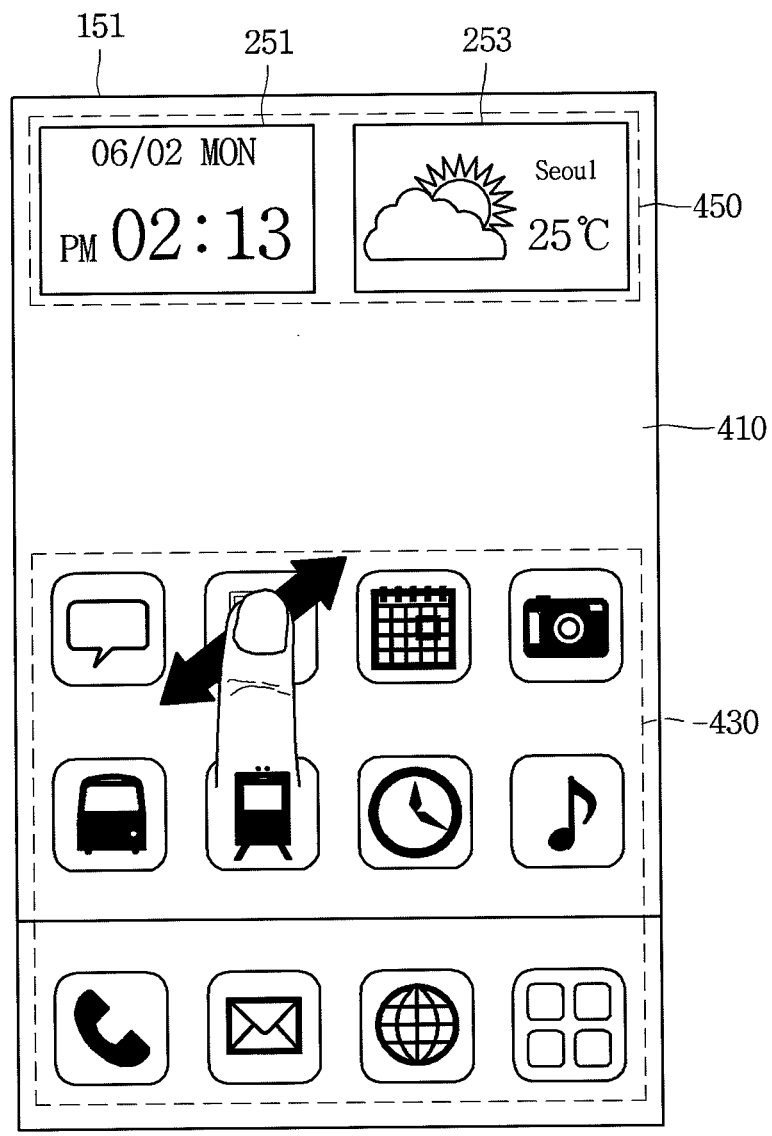
FIG. 7 is a view of the user input for executing an intelligent agent according to another embodiment of the present invention.

Next, FIG. 7 is a view of the user input for executing an intelligent agent according to another embodiment of the present invention. Referring to FIG. 7, the controller 180 can obtain a touch input rubbing one of at least one application icon displayed in the application area 430 on the screen of the display unit 151 as a first user input for executing an intelligent agent. Herein, as mentioned above, a rubbing touch input corresponds to a touch input rotating in one direction or a touch input touching in one direction and then continuously touching in the opposite direction of the one direction. Moreover, in correspondence to a touch input rubbing a specific application icon, the controller 180 can display a function relating to a specific application corresponding to the touched application icon. This will be described later.

Figure 8:
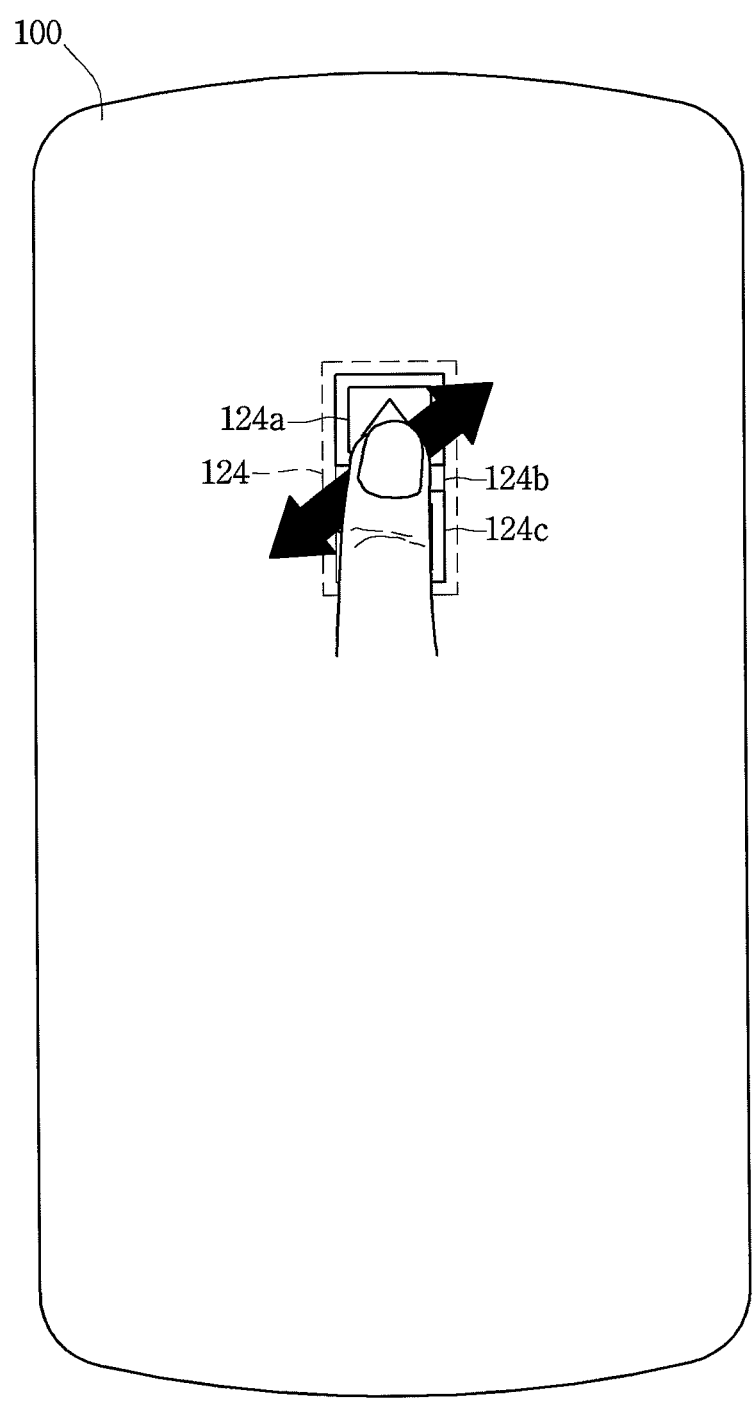
FIG. 8 is a view of the user input for executing an intelligent agent according to another embodiment of the present invention.

FIG. 8 is a view of the user input for executing an intelligent agent according to still another embodiment of the present invention. Referring to FIG. 8, the controller 180 can obtain a touch input rubbing the rear key 124 at the rear of the terminal 100 as a first user input for executing an intelligent agent. Herein, as mentioned above, the rear key 124 may be a touch input available touch key and includes a plurality of keys such as the upper end key 124a, the stop key 124b, and the lower end key 124c. Accordingly, the controller 180 can obtain a touch input rubbing at least one of the upper end key 124a, the stop key 124b, and the lower end key 124c as the first user input for executing an intelligent agent.

Herein, as mentioned above, a rubbing touch input corresponds to a touch input rotating in one direction or a touch input touching in one direction and then continuously touching in the opposite direction of the one direction. Moreover, in correspondence to a touch input rubbing the rear key 124, the controller 180 can display a function corresponding to at least one application that the user uses frequently. This will be described later.

Figure 9:
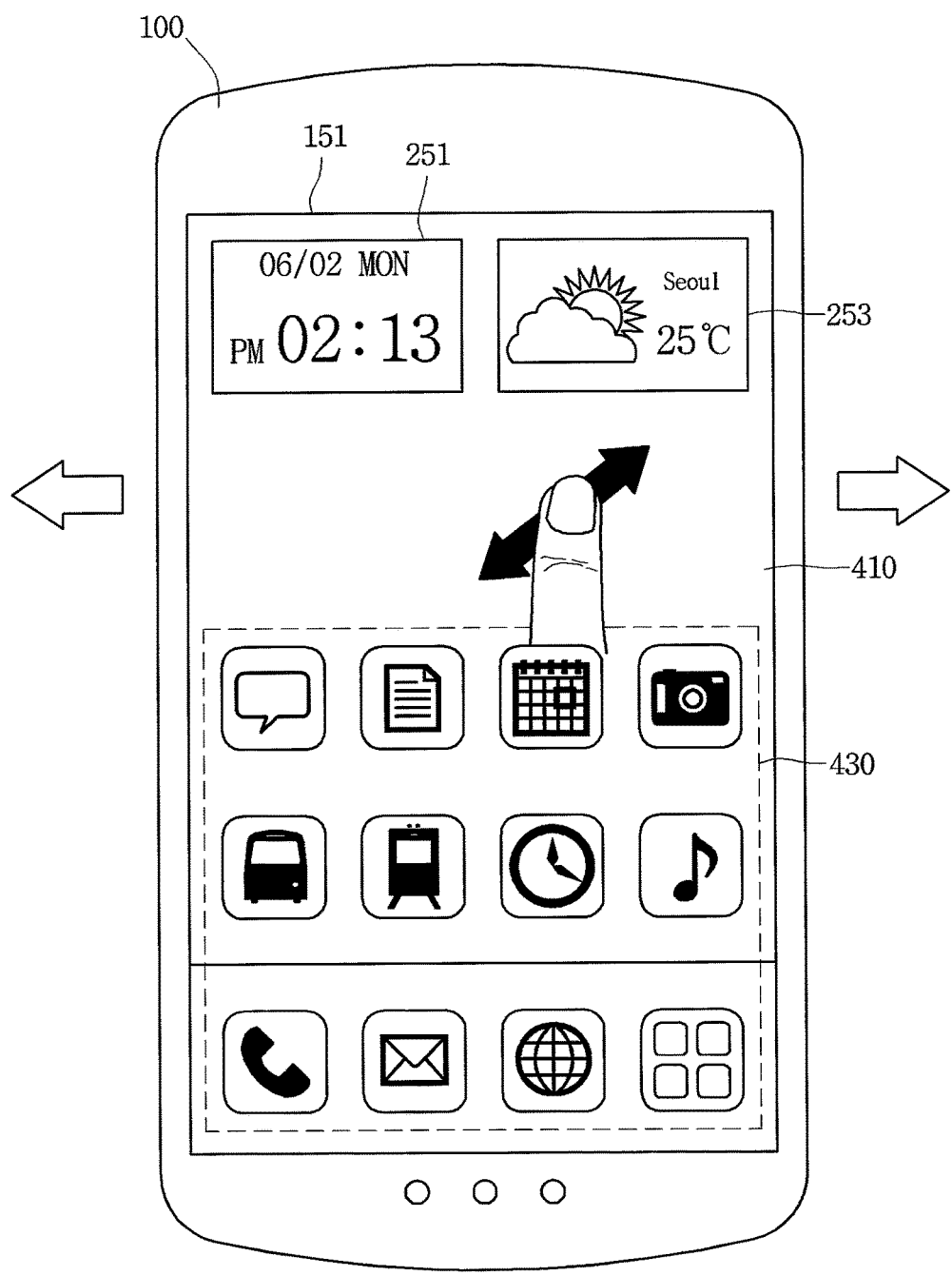
FIG. 9 is a view of the user input for executing an intelligent agent according to another embodiment of the present invention.

Next, FIG. 9 is a view of the user input for executing an intelligent agent according to yet another embodiment of the present invention. Referring to FIG. 9, the controller 180 can obtain a touch input rubbing the blank area 410 of the display unit 151 and a movement shaking the terminal 100 as the first user input for executing an intelligent agent. Further, the controller 180 can obtain a movement input shaking the terminal 100 through the sensing unit 140. For example, the sensing unit 140 can sense the user's movement shaking the terminal 100 through at least one of an acceleration sensor, a gravity sensor, a gyroscope sensor, and a motion sensor included in the sensing unit 140.

Further, in correspondence to a touch input rubbing the blank area 410 and a movement shaking the terminal 100, the controller 180 can display a function of a recommendation application corresponding to the current location of the user. In particular, the current location of the user can be the location of the terminal obtained by the location information module 115 of the terminal 100. Additionally, the current location of the user may be the location of the terminal 100, which is obtained based on a communication state of at least one of the broadcast reception module 111, the mobile communication module 112, the wireless internet module 113, the short range communication module 114, and the location information module 115 included in the wireless communication unit 110 of the terminal 100. For example, the current location of the user may be location information of the terminal 100, which is obtained based on wireless AP information received by a Wi-Fi module of the terminal 100.

Additionally, while a screen for a specific application is displayed on the display unit 151, the controller 180 can obtain a touch input rubbing a specific area of the displayed screen as the first user input for executing an intelligent agent. Accordingly, the controller 180 can display a function or perform an operation in relation to a specific application being displayed on the screen. This will be described later.

Additionally, the controller 180 can obtain the first user input for executing an intelligent agent through the microphone 122. For example, the microphone 122 can obtain a specific voice or the user voice speaking a specific sentence, and the controller 180 can obtain the specific voice or the specific sentence obtained by the microphone 122 as the first user input for executing an intelligent agent. Additionally, the controller 180 can obtain a specific image that is the first user input for executing an intelligent agent through the camera 121. For example, the camera 121 can obtain a specific image, and the controller 180 can obtained the specific image obtained by the camera 121 as the first user input for executing an intelligent agent.

In addition, when obtaining the first user input for executing an intelligent agent, the controller 180 can output at least one of visual effect and audio effect. For example, when obtaining the first user input for executing an intelligent agent, the controller 180 can output a visual effect to the display unit 151. Additionally, when obtaining the first user input for executing an intelligent agent, the controller 180 can output audio effect to the audio output module 152.

Figure 10:
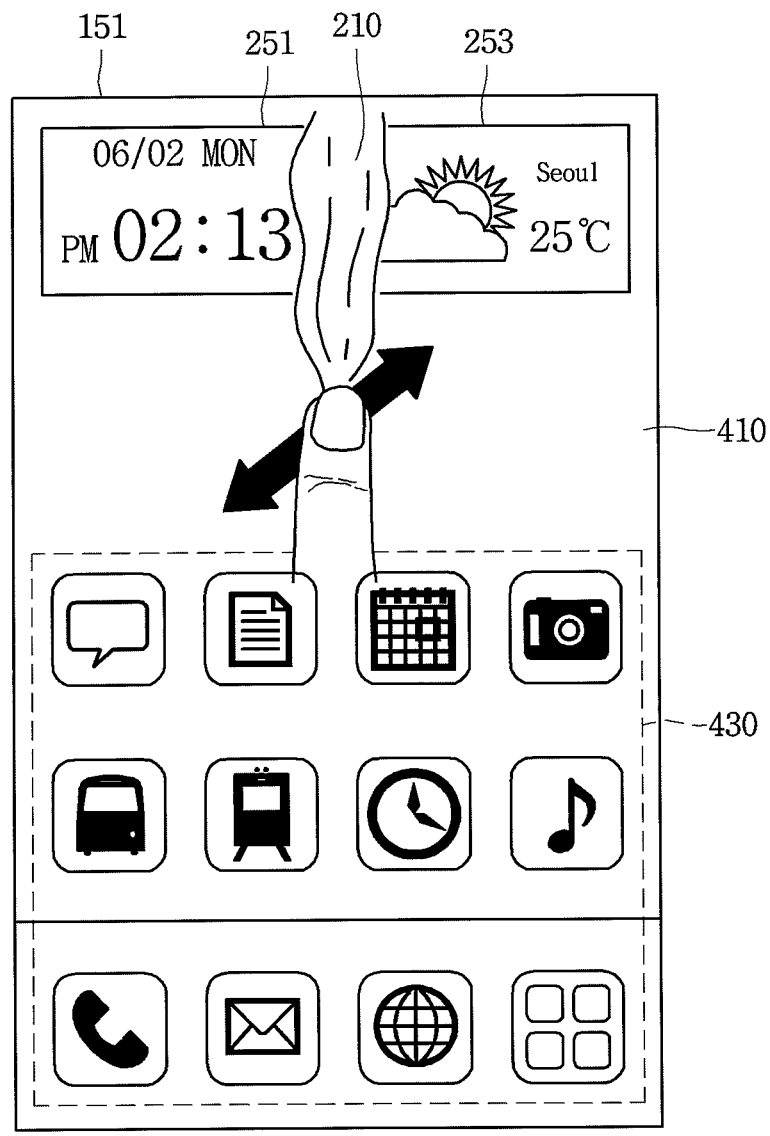
FIG. 10 is a view of a visual effect corresponding to a first user input according to an embodiment of the present invention.

This will be described with reference to FIG. 10. In particular, FIG. 10 is a view of a visual effect corresponding to a first user input according to an embodiment of the present invention. Referring to FIG. 10, as mentioned above, the controller 180 can obtain a touch input rubbing the blank area 410 of the display unit 151 as the first user input for executing an intelligent agent. When obtaining a rubbing touch input, the controller 180 can output a visual effect 210 such as rising smoke to a specific area of the display unit 151 where the rubbing touch input is detected. Accordingly, it is implied that the genie agent that is an intelligent agent is to be executed.

Figure 11:
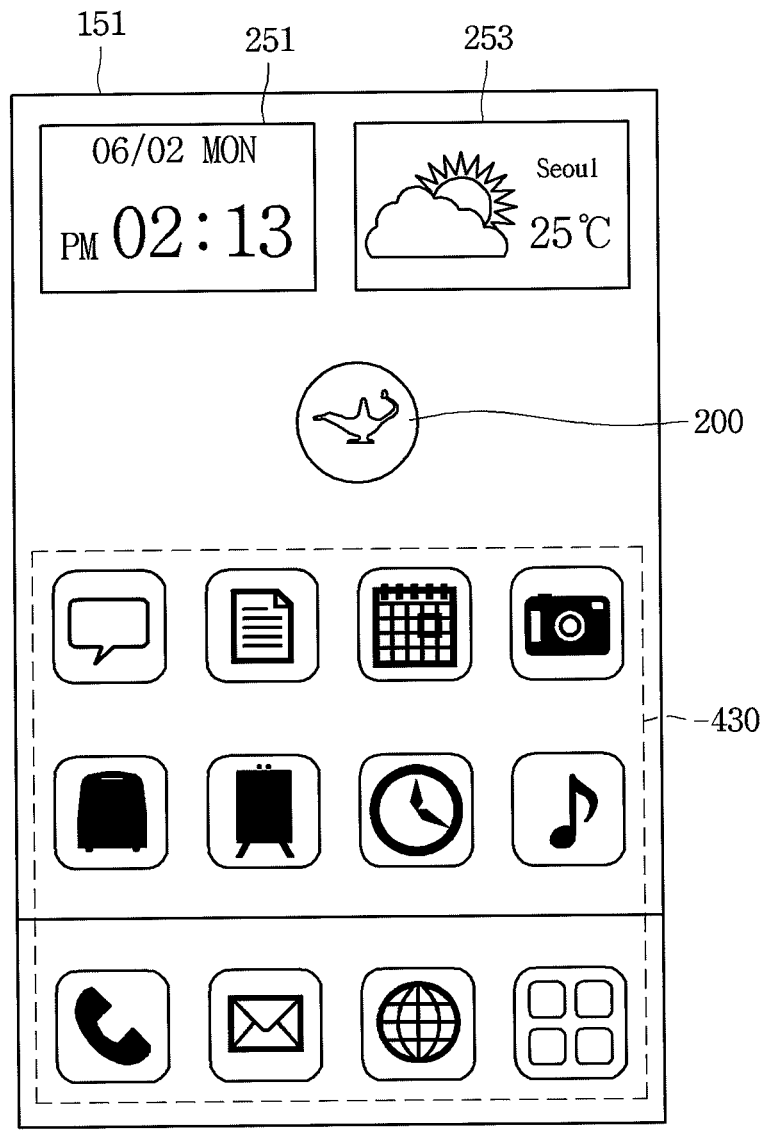
FIG. 11 is a view illustrating a screen where an intelligent agent icon is displayed according to an embodiment of the present invention.

Referring again to FIG. 5, controller 180 executes an intelligent agent application program based on the obtained first user input (S130). The controller 180 can execute an intelligent agent application program stored in the memory 160 based on the obtained first user input. Then, as shown in FIGS. 11 to 13, the controller 180 can display at least one of an intelligent agent icon 200 representing that an intelligent agent is in execution (FIG. 11), an intelligent agent status bar 205 (FIG. 12), and an intelligent agent execution effect 207 (FIG. 13) on the display unit 151.

This will be described with reference to FIGS. 11 to 13. In particular, FIG. 11 is a view illustrating a screen where an intelligent agent icon is displayed according to an embodiment of the present invention. Referring to FIG. 11, when executing an intelligent agent, the controller 180 can display an intelligent agent icon 200 representing that the intelligent agent is executed on the display unit 151. For example, the controller 180 can display the intelligent agent icon 200 in an area where the first user input is obtained on a screen displayed on the display unit 151. The intelligent agent icon 200 may be configured with various forms and colors. For example, as shown in FIG. 11, the intelligent agent icon 200 may be a circular icon where a lamp is drawn. Then, the controller 180 can move the intelligent agent icon 200 based on the user input for the displayed intelligent agent icon 200. Additionally, the controller 180 can perform a specific operation of the terminal 100 corresponding to a drag and drop input and a tap input for the intelligent agent icon 200. This will be described later.

Figure 12:
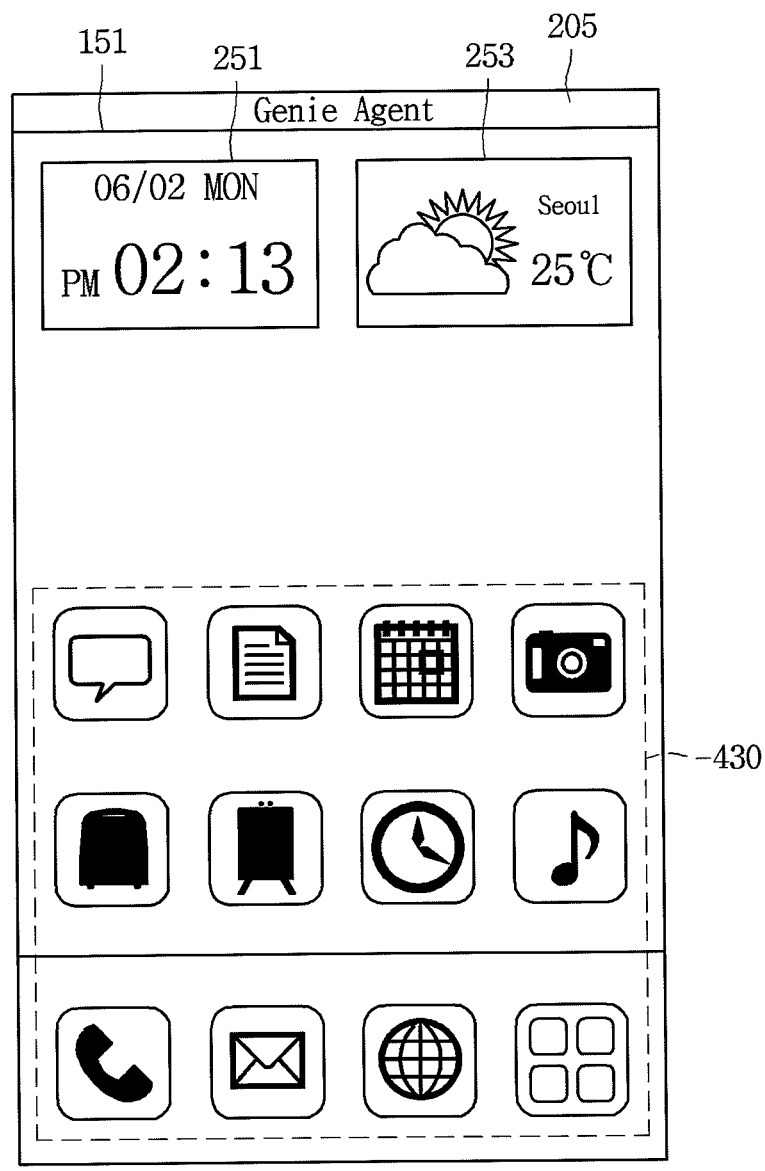
FIG. 12 is a view illustrating a screen where an intelligent agent status bar is displayed according to an embodiment of the present invention.

Next, FIG. 12 is a view illustrating a screen where an intelligent agent status bar is displayed according to an embodiment of the present invention. Referring to FIG. 12, when executing an intelligent agent, the controller 180 can display an intelligent agent status bar 205 representing that the intelligent agent is executed on the display unit 151. For example, the controller 180 can display the intelligent agent status bar 205 at the upper end of a screen displayed on the display unit 151. The intelligent agent status bar 205 may be configured with various forms and colors. Then, the controller 180 can perform a specific operation of the terminal 100 based on the user input for the intelligent agent status bar 205. Additionally, the controller 180 can change at least one of the form and color of the intelligent agent status bar 205 displayed on the display unit 151 according to an operating state of an intelligent agent. This will be described later.

Figure 13:
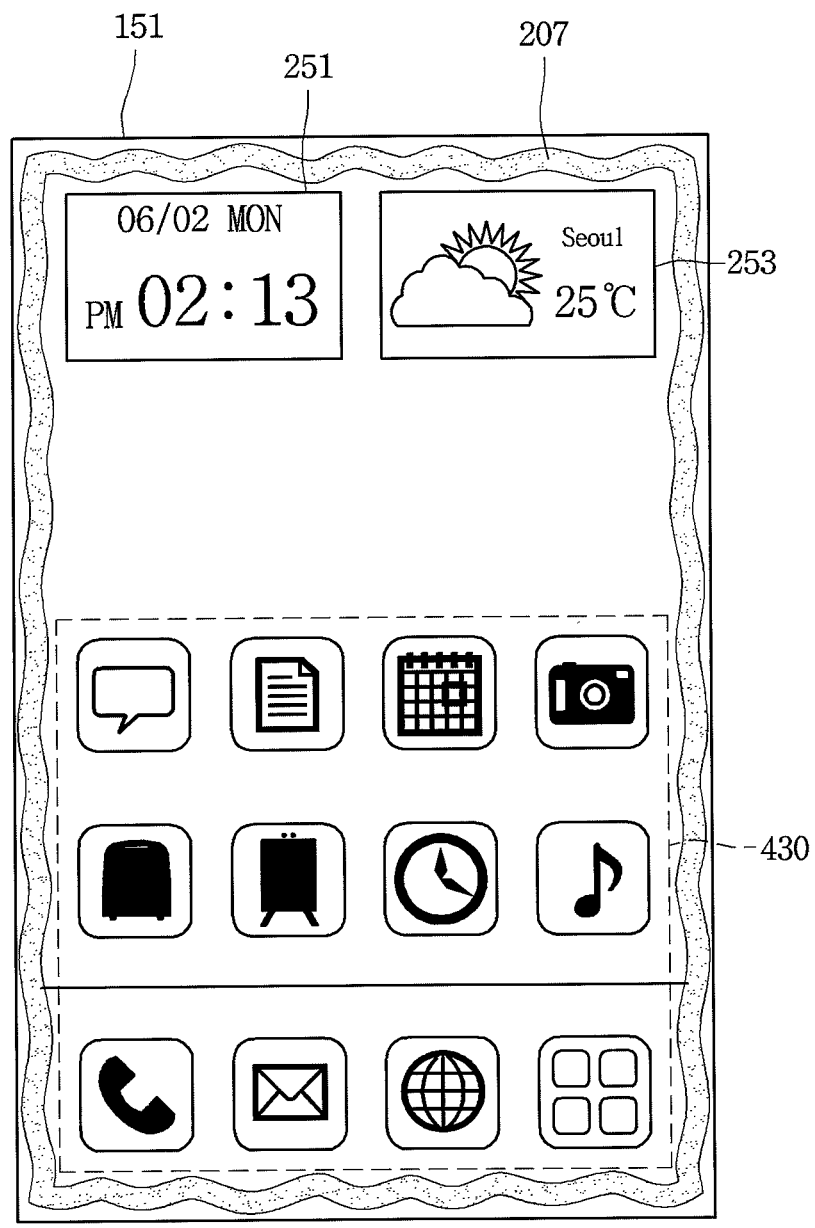
FIG. 13 is a view illustrating a screen where an intelligent agent execution effect is displayed according to an embodiment of the present invention.

FIG. 13 is a view illustrating a screen where an intelligent agent execution effect is displayed according to an embodiment of the present invention. In particular, referring to FIG. 13, when executing an intelligent agent, the controller 180 can display an intelligent agent execution effect 207 representing that the intelligent agent is executed on the display unit 151. For example, the controller 180 can display the intelligent agent execution effect 207 like a light shining in an outer area of a screen displayed on the display unit 151. Herein, the intelligent agent execution effect 207 may be configured with various forms and colors. Then, the controller 180 can perform a specific operation of the terminal 100 based on the user input for the intelligent agent execution effect 207. Additionally, the controller 180 can change at least one of the form and color of the intelligent agent execution effect 207 displayed on the display unit 151 according to an operating state of an intelligent agent. This will be described later.

Moreover, as shown in FIG. 14A, when executing an intelligent agent, the controller 180 can display a simple menu for the intelligent agent on the display unit 151. For example, the controller 180 can display a simple screen 220 for displaying a simple menu for an intelligent agent (hereinafter referred to as a simple screen) on the display unit 151. The simple screen 220 corresponds to a screen where recommended functions and operations of the terminal 100 are displayed to the user through an intelligent agent application program. The controller 180 can display the simple screen 220 on the display unit 151 according to the type of the obtained first user input and an operating state of the terminal 100 when the first user input is obtained, and display on the display unit 151 at least one of the intelligent agent icon 200, the intelligent agent status bar 205, and the intelligent agent execution effect 207.

Figure 14B:
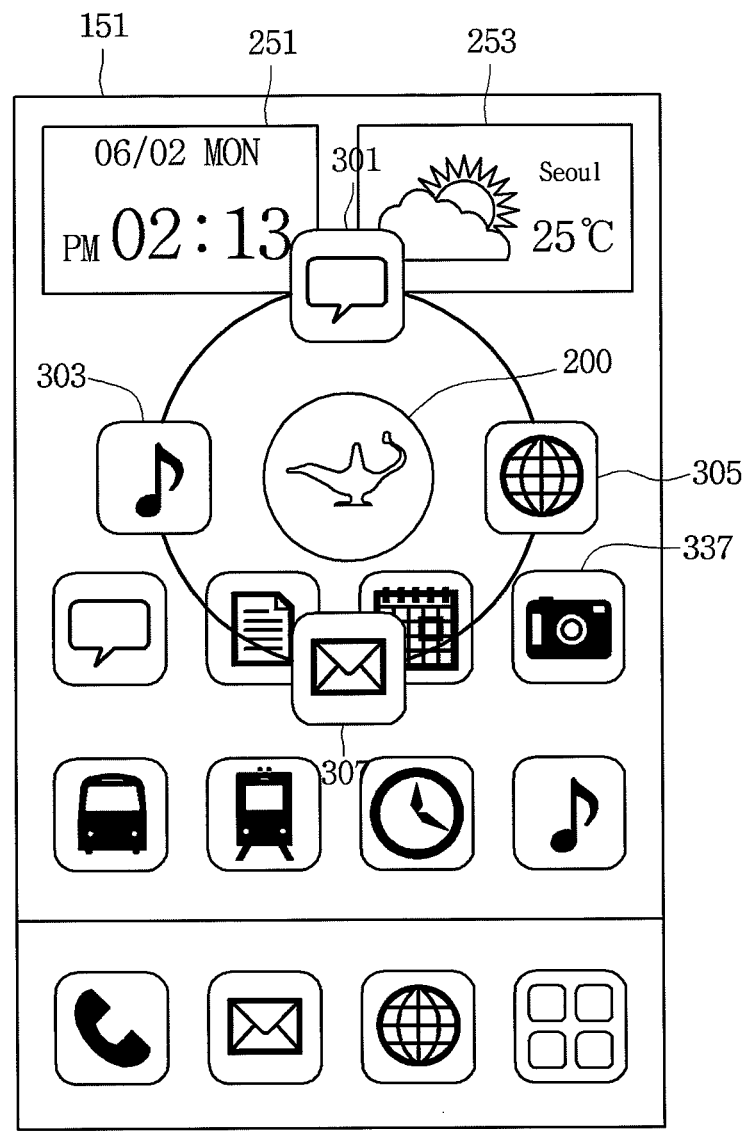
FIG. 14B is a view illustrating a simple screen display according to another embodiment of the present invention.

This will be described with reference to FIGS. 14A and 14B. In particular, FIG. 14A is a view illustrating a simple screen display according to an embodiment of the present invention. Referring to FIG. 14A, when executing an intelligent agent, the controller 180 can display the simple screen 220 for an intelligent agent on the display unit 151. The controller 180 can display on the simple screen 220 at least one of the intelligent agent icon 200, an application icon for at least one recommendation function, and a menu window for at least one recommendation function. The controller 180 can display an icon for a recommendation function corresponding to a usage pattern of the terminal 100 and a state of the terminal 100.

Herein, the usage pattern of the terminal 100 includes a usage frequency, a usage function, and a usage time of an application that the user uses. In addition, the state of the terminal 100 includes a screen displayed on the display unit 151 of the terminal 100, an input state of the terminal 100, location information obtained by the terminal 100, and a communication state of the terminal 100. For example, as shown in FIG. 14A, the controller 180 can display a message application icon 301, a music application icon 303, a web browser icon 305, and an e-mail application icon 307 as an application icon for a recommendation function on the simple screen 220.

Next, FIG. 14B is a view illustrating a simple screen display according to another embodiment of the present invention. Referring to FIG. 14B, the controller 180 can display a home screen, that is, a basic screen of the terminal 100, on the screen of the display unit 151. As mentioned above, various objects such as widgets and application icons can be displayed on the home screen. Then, when executing an intelligent agent, the controller 180 can display a simple menu for the intelligent agent on the display unit 151. The controller 180 can display on the simple menu at least one of the intelligent agent icon 200, an application icon for at least one recommendation function, and a menu window for at least one recommendation function.

The controller 180 can display an icon for a recommendation function corresponding to a usage pattern of the terminal 100 and a state of the terminal 100. Herein, the usage pattern of the terminal 100 includes a usage frequency, a usage function, and a usage time of an application that the user uses. Further, the state of the terminal 100 includes a screen displayed on the display unit 151 of the terminal 100, an input state of the terminal 100, location information obtained by the terminal 100, and a communication state of the terminal 100. For example, as shown in FIG. 14B, the controller 180 can display a message application icon 301, a music application icon 303, a web browser icon 305, and an e-mail application icon 307 as an application icon for recommendation function on the simple menu.

Moreover, when obtaining the user input rotating at least one icon or menu window displayed on a simple menu according to an intelligent agent execution, the controller 180 can display an icon or menu window different from an icon or menu window displayed on the simple menu. This will be described with reference to FIGS. 15A and 15B.

Figure 15A:
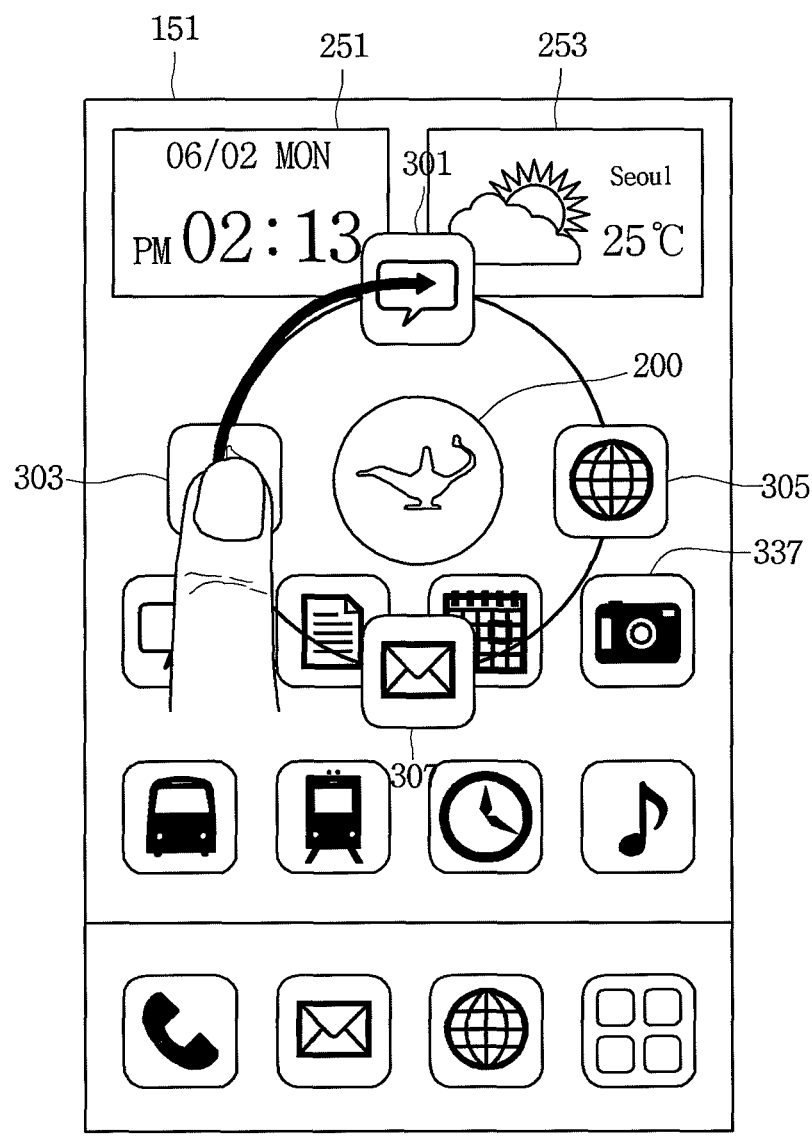
FIG. 15A is a view illustrating the user input rotating a simple menu according to an embodiment of the present invention.
Figure 15B:
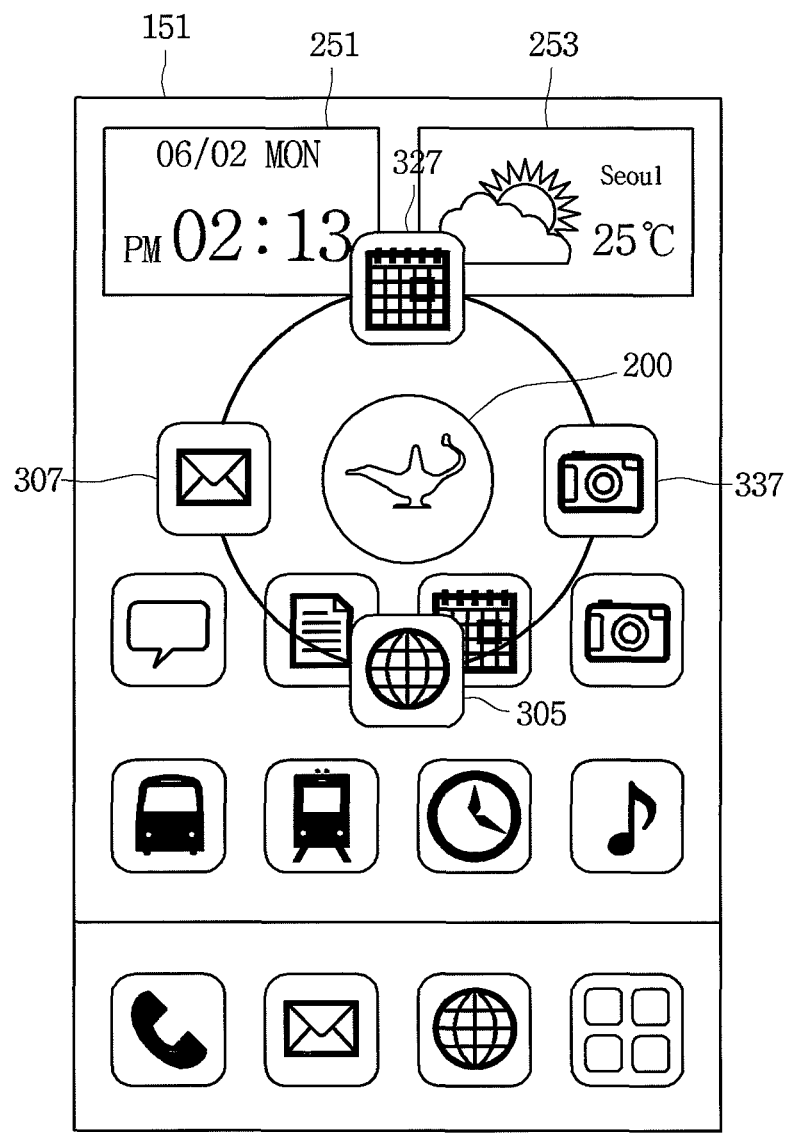
FIG. 15B is a view illustrating a new icon display according to an embodiment of the present invention.

In particular, FIG. 15A is a view illustrating the user input rotating a simple menu according to an embodiment of the present invention, and FIG. 15B is a view illustrating a new icon display according to an embodiment of the present invention. Referring to FIG. 15A, the controller 180 can display a simple menu for an executed intelligent agent on the screen of the display unit 151. The controller 180 can display on a simple menu an intelligent agent icon 200, and a message application icon 301, a music application icon 303, a web browser icon 305, and an e-mail application icon 307 as an application icon for at least one recommendation function.

Then, the controller 180 can obtain the user input rotating the music application icon 303, that is, one icon included in a simple menu displayed on the screen of the display unit 151, in a clockwise direction. Accordingly, the controller 180 can display a new application icon on the simple menu. As shown in FIG. 15B, the controller 180 can display a schedule application 327, a camera application icon 337, a web browser icon 305, and an e-mail application icon 307 as an application icon for at least one recommendation function included in a simple menu. Herein, the schedule application 327 and the camera application 337 may be application icons for a new recommendation function not displayed before the user input rotating the one icon included in the simple menu and the number of application icons for a new commendation function may vary according to an input degree of the user input rotating the one icon. Additionally, the user input rotating at least one icon or menu window displayed in a simple menu may be input in a counterclockwise direction in addition to a clockwise direction.

Moreover, the controller 180 can display an icon for at least one recommendation function included in a simple menu at a fixed position according to the user selection. For example, the controller 180 can display an application icon for a specific application in a simple menu according to intelligent agent execution regardless of whether or not the user uses it. Additionally, the controller 180 can fix an application icon for a specific application displayed in a simple menu at a specific position of the simple menu according to the user setting and display it on the display unit 151.

Additionally, the controller 180 can display an icon for a recommendation function corresponding to a usage pattern of the terminal 100 and a state of the terminal 100. The controller 180 can learn a recommendation function for the user or a recommended application according to an intelligent agent execution based on a usage pattern of the terminal 100. This will be described with reference to Table 1. In particular, Table 1 is a table representing the number of application usages and a set recommendation priority according to an embodiment of the present invention.

TABLE 1

|  | Priority | Execution count (for one week) |
|---|---|---|
| First application | 1 | 50 |
| Second application | 3 | 30 |
| Third application | 2 | 45 |
| Fourth application | 5 | 10 |
| Fifth application | 4 | 10 |
| Sixth application | 0 | 3 |

Referring to Table 1, the controller 180 can count the number of executions of a first application to a sixth application, that is, a plurality of applications, for one week corresponding to a predetermined period. Then, each of the plurality of applications can have a priority indicating a user recommendation. Herein, the priority for the user recommendation corresponds to a weight for the number of executions according to the user's usage pattern. Further, the controller 180 can recommend a recommendation application according to an intelligent agent execution in the order of a higher priority and a higher execution count.

Accordingly, the controller 180 can recommend the first application, the third application, the second application, the fifth application, and the fourth application in the order to the user as an application recommended to the user according to an intelligent agent execution based on a priority and an execution count. Then, as mentioned above, when obtaining the user input for displaying a new application icon, the controller 180 can display a new application icon according to the order of recommended applications based on a priority and an execution count. Accordingly, when displaying the first application icon, the third application icon, the second application icon, and the fifth application icon as a recommended application on the display unit 151, as obtaining the user input for displaying a new application, the controller 180 can display the fourth application icon.

Additionally, the controller 180 can execute a specific application regardless of a priority or a usage count according to an intelligent agent execution based on the user setting or the user selection or display a specific application icon for a specific application on the display unit 151. For example, the controller 180 can fix the sixth application icon of which priority is 0 at a specific position of a simple menu according to an intelligent agent execution and then display it.

Description for an icon for a recommendation function corresponding to a usage pattern of the terminal 100 is exemplary and is not limited thereto. Accordingly, the present invention can learn the user pattern based on various references according to the user's or a designer's setting and provide a recommendation function according to an intelligent agent execution to the user. Additionally, description for the above-mentioned simple menu and simple screen is exemplary and is not limited thereto. Various screens according to the user's or designer's setting can be displayed on the display unit 151 according to the execution of an intelligent agent. Then, a simple menu according to an intelligent agent execution can be displayed on various screens. Detailed content for a simple screen is described later. Additionally, the number of icons or the number of menu windows of an application displayed in a simple menu can be set variously according to the user's or designer's setting. Hereinafter, four application icons are used as one example.

Moreover, when executing the intelligent agent, the controller 180 can operate at least one of the camera 121, the microphone 122, at least one sensor included in the sensing unit 140, and the location information module 115. A configuration of the terminal 100 operating according to the intelligent agent execution can be set variously according to the user's or designer's selection. Therefore, the controller 180 can operate at least one of the camera 121, the microphone 122, at least one sensor included in the sensing unit 140, and the location information module 115 based on the user's setting.

Returning again to FIG. 5, the controller 180 performs a function corresponding to the obtained first user input (S150). As one embodiment, the controller 180 can display at least one function corresponding to the obtained first user input on the display unit 151 based on at last one of an input type of the obtained first user input, an operation of the terminal 100 during input, and a state of the terminal 100.

Herein, at least one function corresponding to the obtained first user input corresponds to an operation of the terminal 100 or a function of the terminal 100 and corresponds to an operation or function by an application program included in the terminal 100. In more detail, the controller 180 can display an icon or menu window corresponding to each of a plurality of functions corresponding to the obtained first user input on the display unit 151. Then, when obtaining a second user input for selecting one of an icon or menu window corresponding to a plurality of displayed functions, the controller 180 can perform a function corresponding to the selected icon or menu window.

This will be described in more detail based on various embodiments. As a first embodiment, a function performance according to the user input for a displayed intelligent agent icon 200 of the terminal 100 is described. In correspondence to the user input dragging and dropping the intelligent agent icon 200, which is displayed on the display unit 151, on a specific application icon, the controller 180 can perform a specific function corresponding to a specific application or display a menu window for at least one function corresponding to a specific application.

Figure 16A:
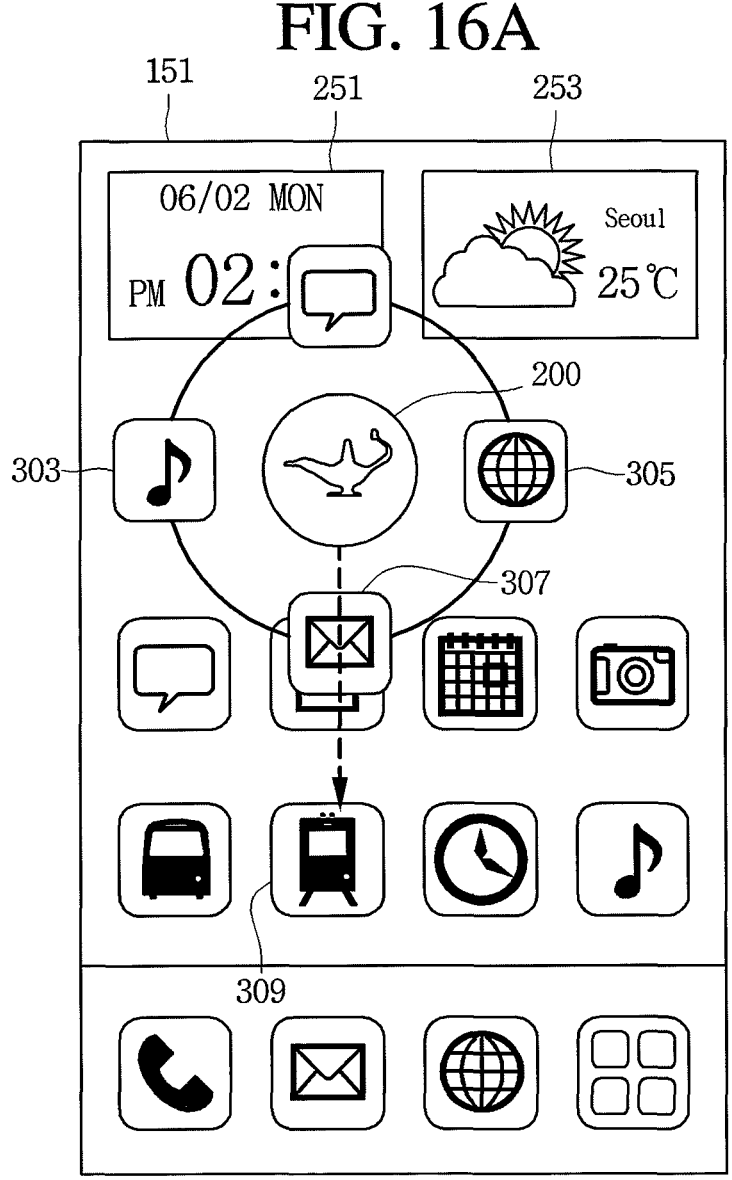
FIG. 16A is a view illustrating the user input for an intelligent agent icon according to an embodiment of the present invention.
Figure 16B:
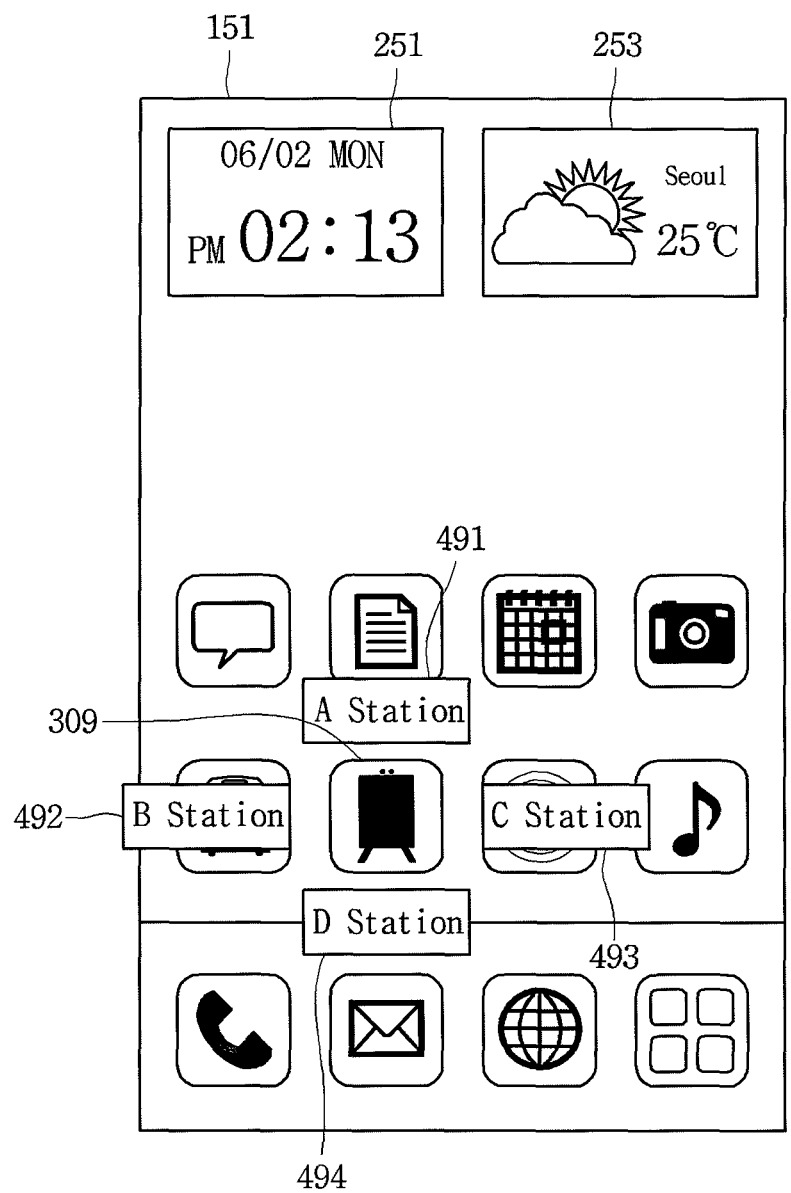
FIG. 16B is a view illustrating a menu window display for a function corresponding to a specific application according to an embodiment of the present invention.

FIG. 16A is a view illustrating the user input for an intelligent agent icon according to an embodiment of the present invention, and FIG. 16B is a view illustrating a menu window display for a function corresponding to a specific application according to an embodiment of the present invention. Referring to FIG. 16A, the controller 180 can obtain the user input dragging and dropping the intelligent agent icon 200, which is displayed on the display unit 151, on a train application icon 309. Accordingly, the controller 180 can display a menu window for at least one function corresponding to a train application, on the display unit 151. Referring to FIG. 16B, the controller 180 can display menu windows 491, 492, 493, and 494 on the display unit 151, as a menu window for at least one function corresponding to the train application.

The menu windows 491, 492, 493, and 494 for a plurality of train stations may be menu windows for selecting destinations. Accordingly, in this example, the first menu window 491 is a menu window for selecting a train station A as the destination, the second menu window 492 is a menu window for selecting a train station B as the destination, the third menu window 493 is a menu window for selecting a train station C as the destination, and the fourth menu window 494 is a menu window for selecting a train station D as the destination.

Then, the controller 180 can obtain a second user input for selecting one of the menu windows 491, 492, 493, and 494 for a plurality of train stations displayed on the display unit 151. As one embodiment, the controller 180 can obtain the user input for touching one of the menu windows 491, 492, 493, and 494 for a plurality of displayed train stations.

Figure 17:
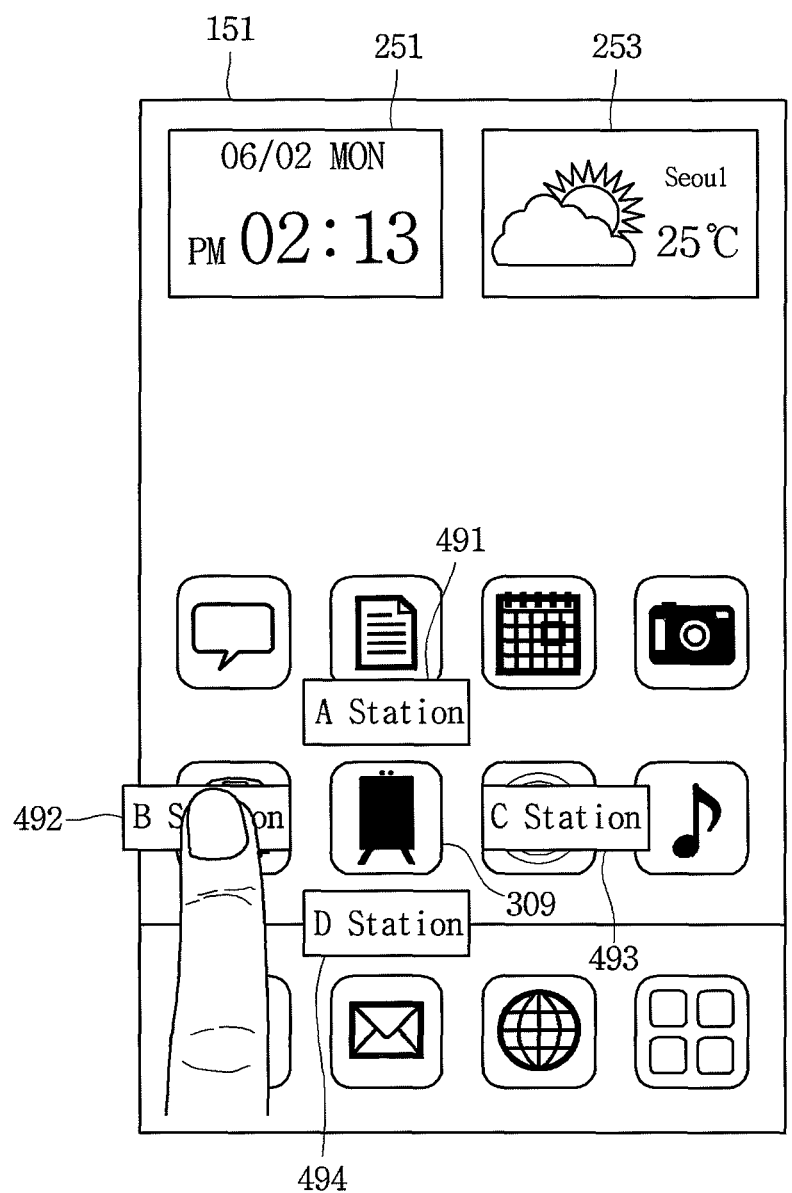
FIG. 17 is a view illustrating a touch input for selecting a menu window according to an embodiment of the present invention.

This will be described with reference to FIG. 17. In particular, FIG. 17 is a view illustrating a touch input for selecting a menu window according to an embodiment of the present invention. Referring to FIG. 17, the controller 180 can obtain the user input for tap-touching the second menu window 492 among the menu windows 491, 492, 493, and 494 for the plurality of train stations displayed on the display unit 151 as the user input for selecting the train station B as the destination.

Figure 18:
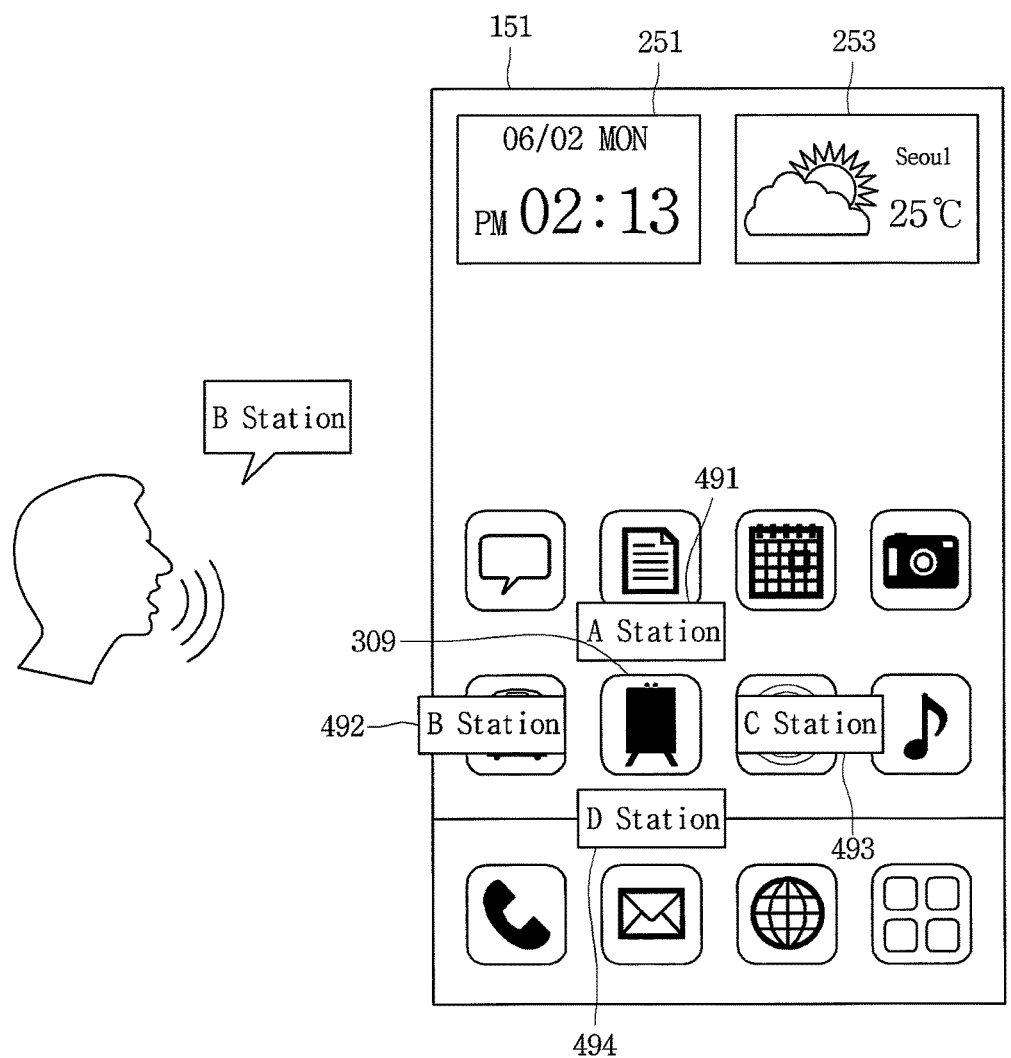
FIG. 18 is a view illustrating a voice input for selecting a menu window according to an embodiment of the present invention.

As another embodiment, the controller 180 can obtain the user's voice input for selecting one of the menu windows 491, 492, 493, and 494. This will be described with reference to FIG. 18. In particular, FIG. 18 is a view illustrating a voice input for selecting a menu window according to an embodiment of the present invention. Referring to FIG. 18, the controller 180 can obtain the user's voice input speaking the train station B corresponding to the second menu window 492 as the user input for selecting the train station B as the destination.

Figure 19:
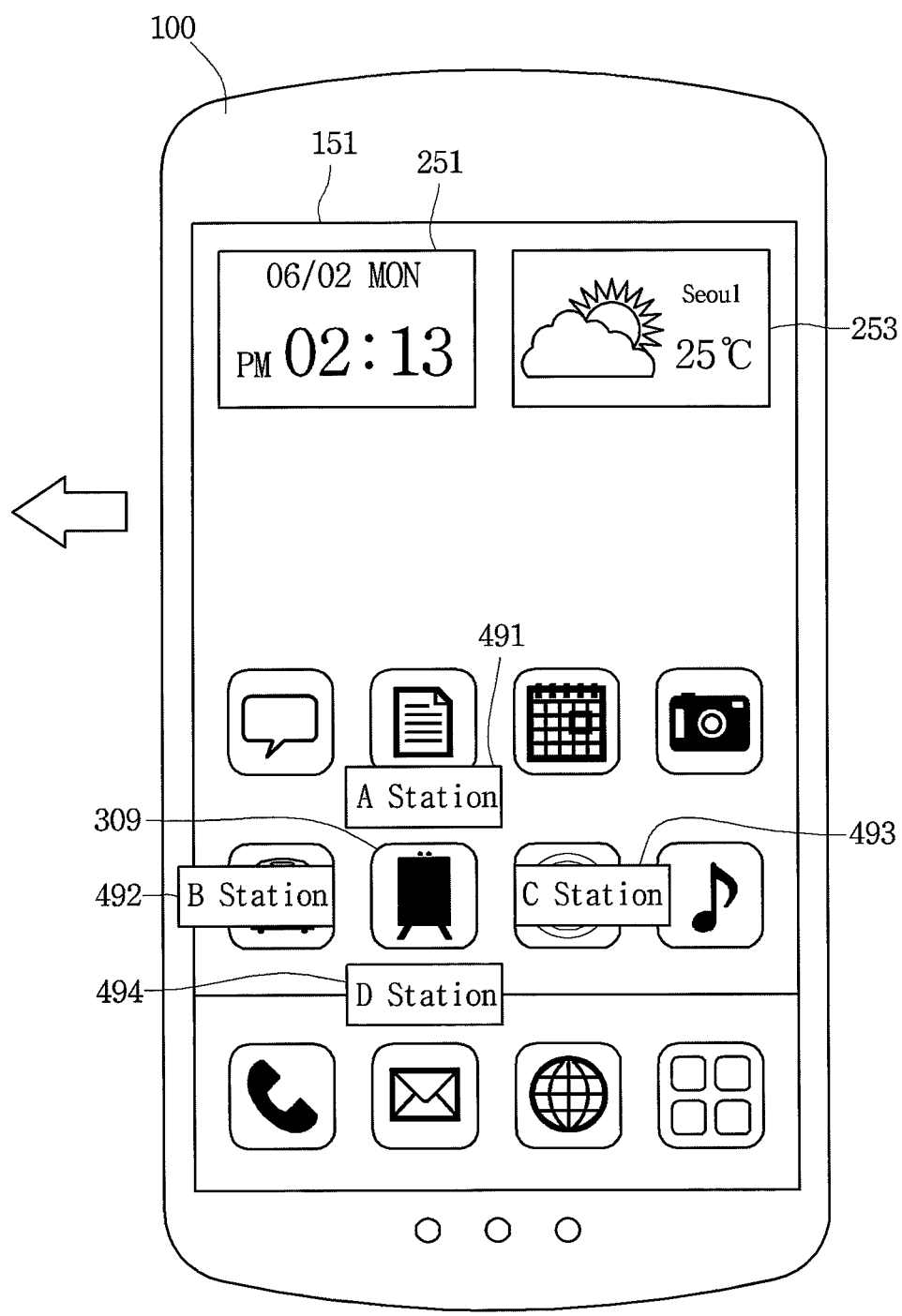
FIG. 19 is a view illustrating a terminal movement for selecting a menu window according to an embodiment of the present invention.

As another embodiment, the controller 180 can obtain a movement of the terminal 100 for selecting one of the menu windows 491, 492, 493, and 494. This will be described with reference to FIG. 19. In particular, FIG. 19 is a view illustrating a terminal movement for selecting a menu window according to an embodiment of the present invention. Referring to FIG. 19, the controller 180 can obtain a movement of the terminal 100 moving in a horizontal direction that is a direction corresponding to the second menu window 492 through the sensing unit 140 as the user input for selecting the train station B as the destination.

Moreover, the controller 180 can perform a function corresponding to the selected menu window. For example, the controller 180 can provide path information on a train path using the selected train station B as the destination, based on the second menu window 492. This will be described with reference to FIG. 20.

Figure 20:
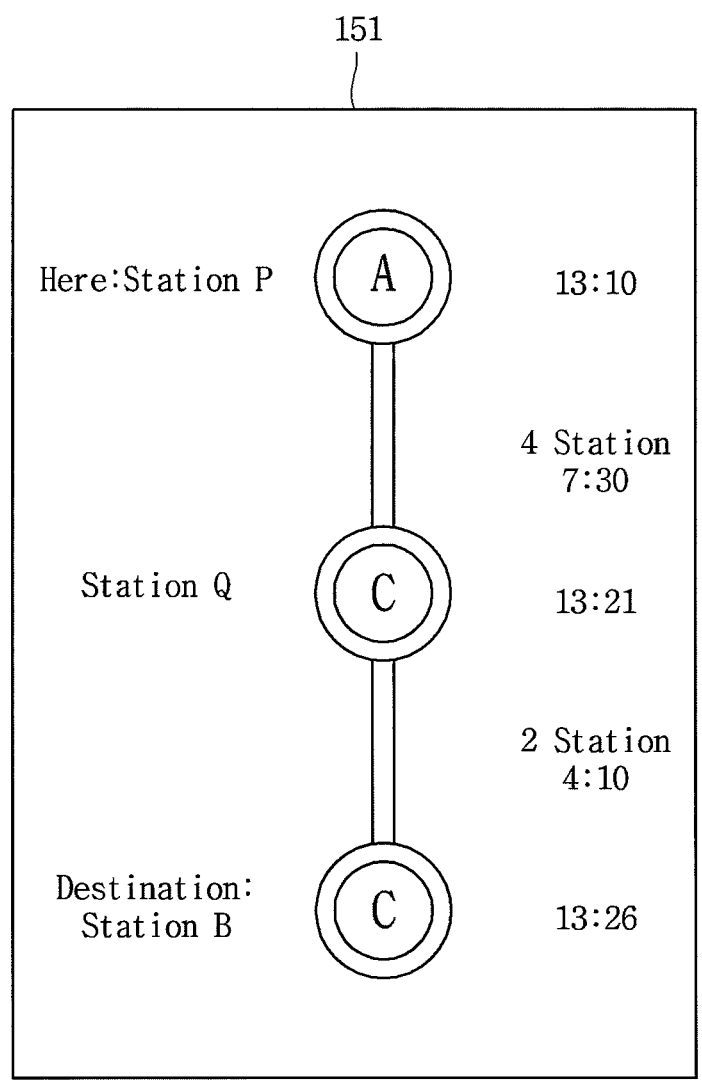
FIG. 20 is a view illustrating a train path information display according to an embodiment of the present invention.

FIG. 20 is a view illustrating a train path information display according to an embodiment of the present invention. Referring to FIG. 20, the controller 180 can display path information on a train path using the train station B selected from the current location as the destination, based on a second user input for selecting the second menu window 492. Herein, the current location means the user's current location and can be obtained by the location information module 115 of the terminal 100. Then, the path information includes a train station corresponding to the current position, a via station, a destination station, a time required for each section, and a train time.

Description for a function corresponding to the specific application is just exemplary and is not limited thereto. Accordingly, the present invention is applicable to various applications in addition to the train application, and various functions performed in a corresponding application can be provided in correspondence to an intelligent agent icon. Moreover, in a function performance according to the user input for the displayed intelligent agent icon 200, the controller 180 can perform a function included in a folder displayed on the display unit 151 or display a menu window for a function corresponding to a specific application. Herein, the folder displayed on the display unit 151 corresponds to a folder including at least one application icon.

This will be described with reference to FIGS. 21 and 22. In particular, FIG. 21 is a view illustrating the user input for an intelligent agent icon according to another embodiment of the present invention, and FIG. 22 is a view illustrating a menu window display for a function corresponding to a specific application according to another embodiment of the present invention.

Figure 21:
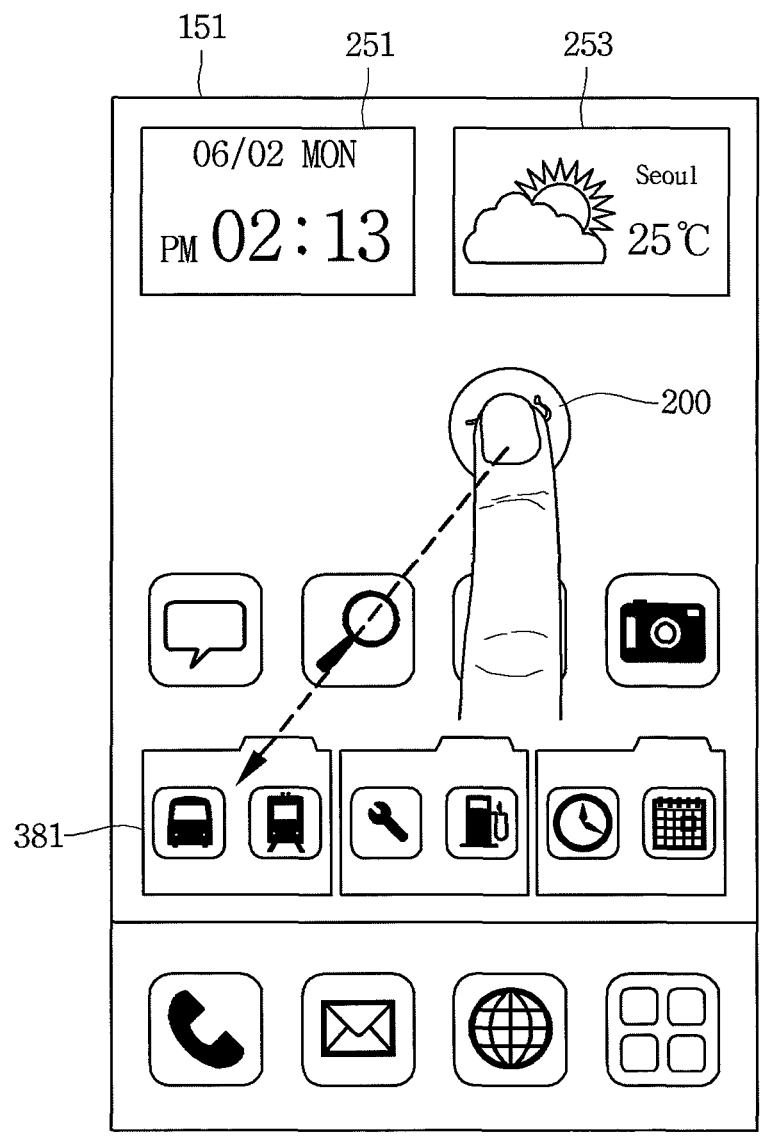
FIG. 21 is a view illustrating the user input for an intelligent agent icon according to another embodiment of the present invention.
Figure 22:
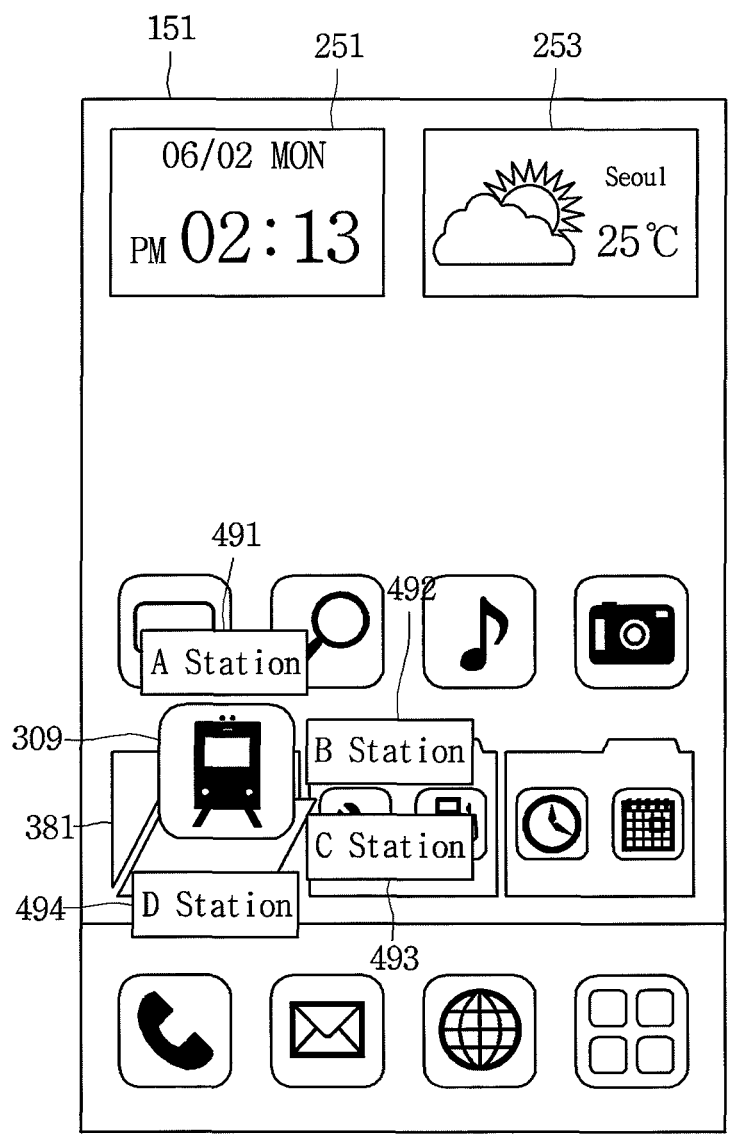
FIG. 22 is a view illustrating a menu window display for a function corresponding to a specific application according to another embodiment of the present invention.

Referring to FIG. 21, the controller 180 can obtain the user input for dragging and dropping the intelligent agent icon 200, which is displayed on the display unit 151, on a first folder 381. Herein, the first folder 381 may be a folder including a bus application icon and a train application icon. Accordingly, the controller 180 can display a menu window for at least one function corresponding to the first folder 381, on the display unit 151. Herein, at least one function corresponding to the first folder 381 that is the selected folder may be a function of a specific application corresponding to a specific application icon among a plurality of application icons included in the first folder 381. In more detail, the controller 180 can display a menu window for a function corresponding to a specific application icon corresponding to a usage pattern of the terminal 100 and a state of the terminal 100 among a plurality of application icons included in the first folder 381.

Herein, the usage pattern of the terminal 100 includes a usage frequency, a usage function, and a usage time of an application that the user uses. Then, the state of the terminal 100 includes a screen displayed on the display unit 151 of the terminal 100, an input state of the terminal 100, location information obtained by the terminal 100, and a communication state of the terminal 100. Referring to FIG. 22, the controller 180 can display menu windows 491, 492, 493, and 494 on the display unit 151, as a menu window for a function corresponding to a train application train among a plurality of application icons included in the first folder 381.

The menu windows 491, 492, 493, and 494 for a plurality of train stations may be menu windows for selecting destinations. Accordingly, the first menu window 491 is a menu window for selecting a train station A as the destination, the second menu window 492 is a menu window for selecting a train station B as the destination, the third menu window 493 is a menu window for selecting a train station C as the destination, and the fourth menu window 494 is a menu window for selecting a train station D as the destination. Then, the controller 180 can obtain a second user input for selecting one of the menu windows 491, 492, 493, and 494 and provide train path information for the destination corresponding to the selected menu window. This is described above so that detailed description will be omitted.

As a second embodiment, a function performance through an intelligent agent according to the user input obtained when the intelligent agent icon 200 of the terminal 100 is not displayed is described. When obtaining the user input rubbing an application icon displayed on the screen of the display unit 151, the controller 180 can perform a specific function of a specific application corresponding to an application icon corresponding to the user input or display a menu window for at least one function corresponding to a specific application. Additionally, when obtaining the user input rubbing a specific area on the screen of the display unit 151 where a specific application is executed, the controller 180 can perform a specific function of the executed application or may display a menu window for at least one function corresponding to the executed application.

Figure 23:
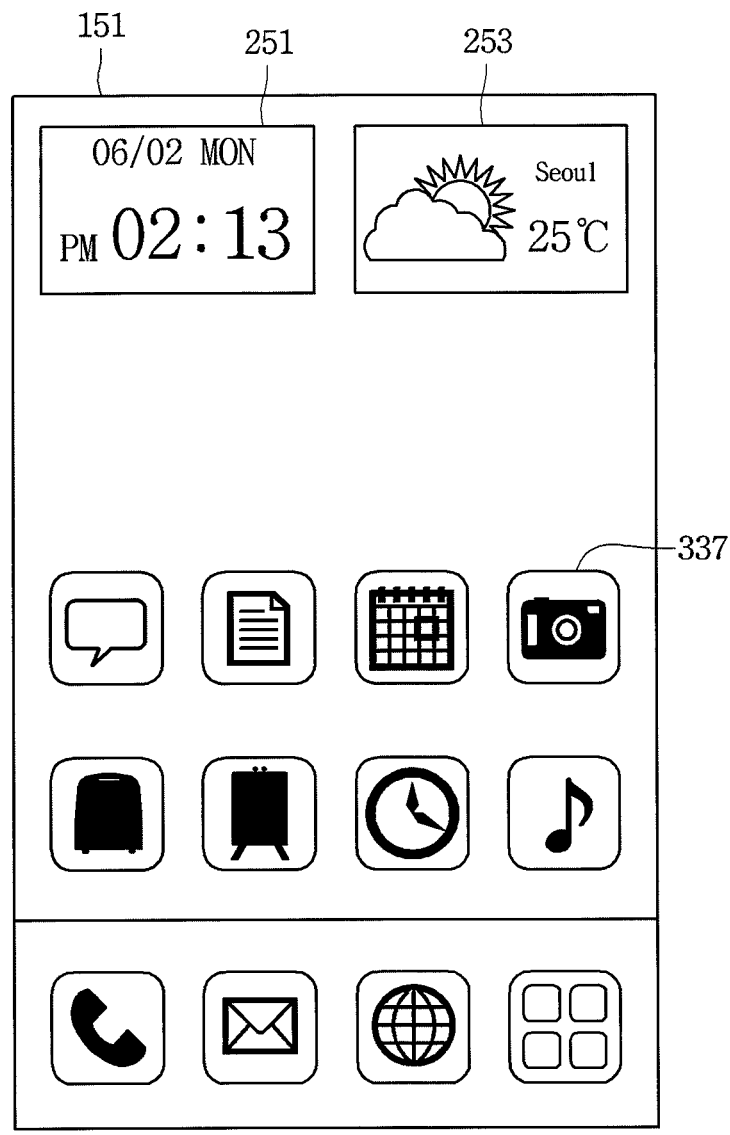
FIG. 23 is a view illustrating a home screen according to an embodiment of the present invention.

This will be described with reference to FIGS. 23 to 27. In particular, FIG. 23 is a view illustrating a home screen according to an embodiment of the present invention. Referring to FIG. 23, the controller 180 can display a home screen, that is, a basic screen of the terminal 100, on the screen of the display unit 151. As mentioned above, various objects such as widgets and application icons can be displayed on the home screen. For example, as shown in FIG. 23, the controller 180 can display a camera application icon 337 on the home screen. Herein, the camera application icon 337 is an icon corresponding to a camera application.

Figure 24:
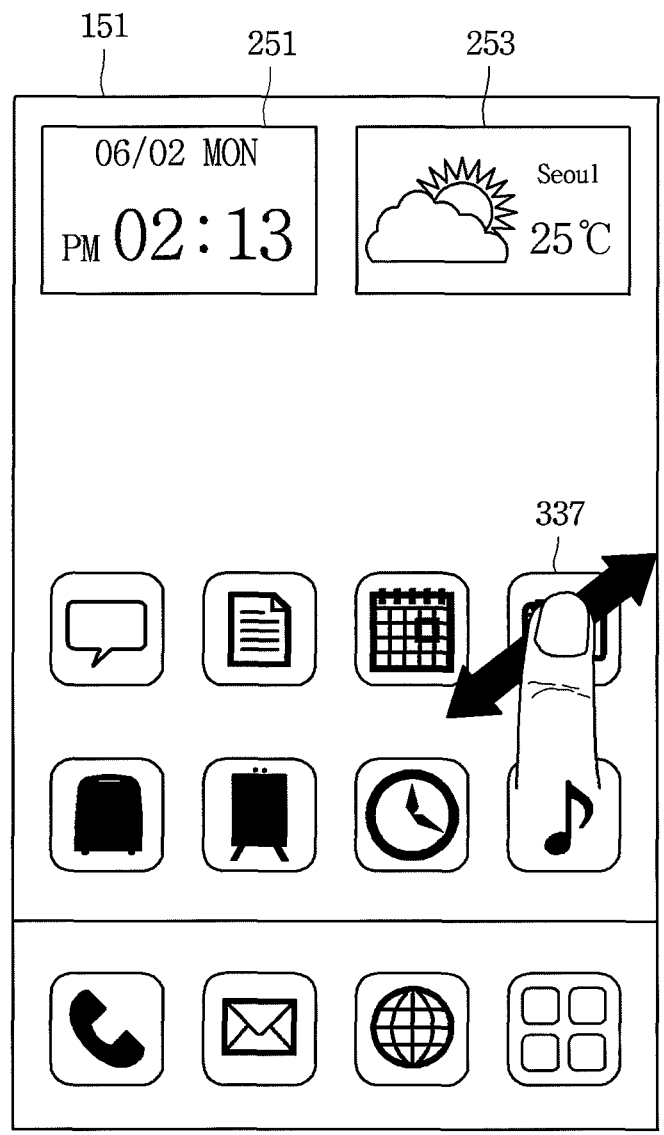
FIG. 24 is a view illustrating the user input rubbing a camera application icon according to an embodiment of the present invention.

FIG. 24 is a view illustrating the user input rubbing the camera application icon 337 according to an embodiment of the present invention. Referring to FIG. 24, the controller 180 can obtain the user input rubbing the camera application icon 337 displayed on the display unit 151. Herein, as mentioned above, the user input rubbing the camera application icon 337 corresponds to a touch input rotating in one direction based on the camera application icon 337, and corresponds to a touch input touching the camera application icon 337 in one direction and then continuously touching it in the opposite direction of the one direction. When obtaining the user input rubbing the camera application icon 337, the controller 180 can perform a specific function of the camera application or execute an intelligent agent to display a menu window for at least one function of the camera application.

Figure 25:
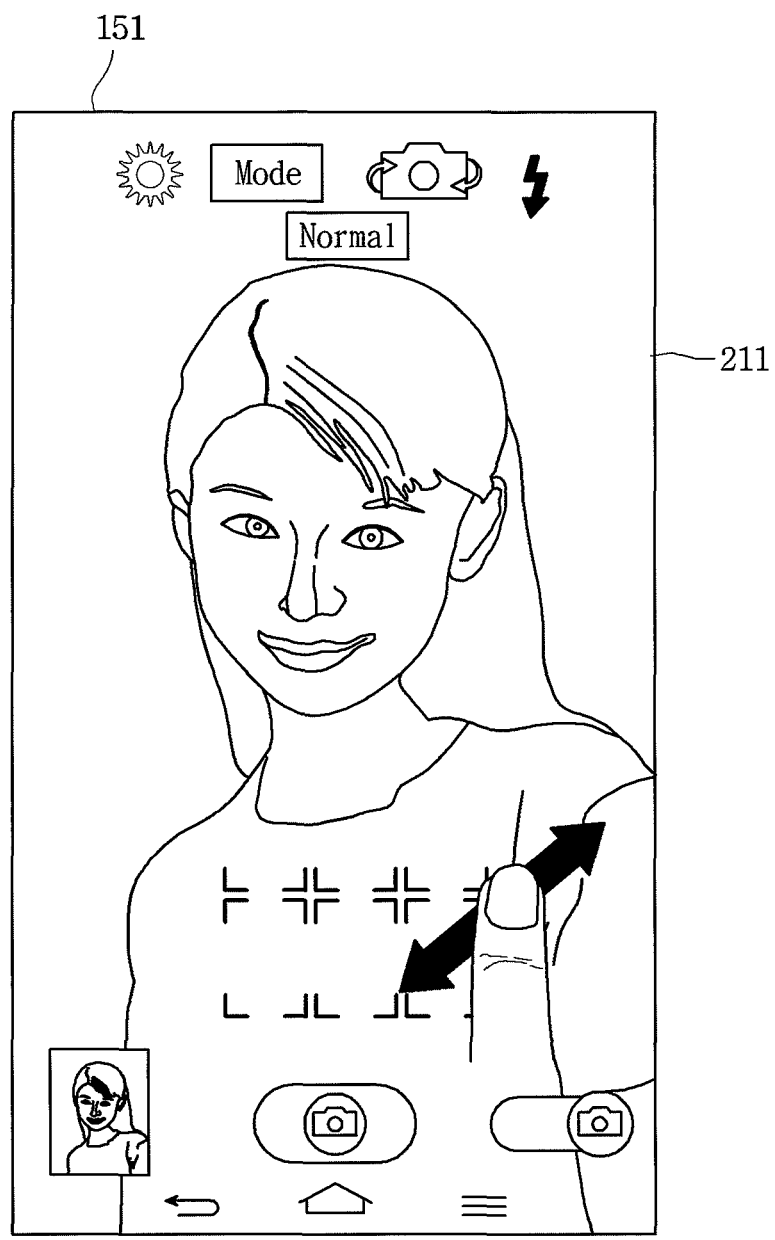
FIG. 25 is a view illustrating a rubbing user input on a camera application screen according to an embodiment of the present invention.

FIG. 25 is a view illustrating a rubbing user input on a camera application screen 221 according to an embodiment of the present invention. Referring to FIG. 25, the controller 180 can execute a camera application and display the camera operation screen 221 for the executed camera application on the display unit 151. Then, the controller 180 can obtain the user input rubbing a specific area of the camera operation screen 211. As mentioned above, the user input rubbing a specific area of the camera operation screen 211 corresponds to a touch input rotating the specific area in one direction and corresponds to a touch input touching the specific area in one direction and then continuously touching it in the opposite direction of the one direction. When obtaining the user input rubbing the specific area of the camera operation screen 211, the controller 180 can perform a specific function of the camera application or execute an intelligent agent to display a menu window for at least one function of the camera application.

Based on the user input rubbing the camera application icon 337 or the camera operation screen 211, the controller 180 can perform a specific function of the camera application or execute an intelligent agent to display a menu window for at least one function of the camera application. Then, the controller 180 can perform a specific function of the camera application or display a menu window for at least one function of the camera application, through the executed intelligent agent.

Figure 26:
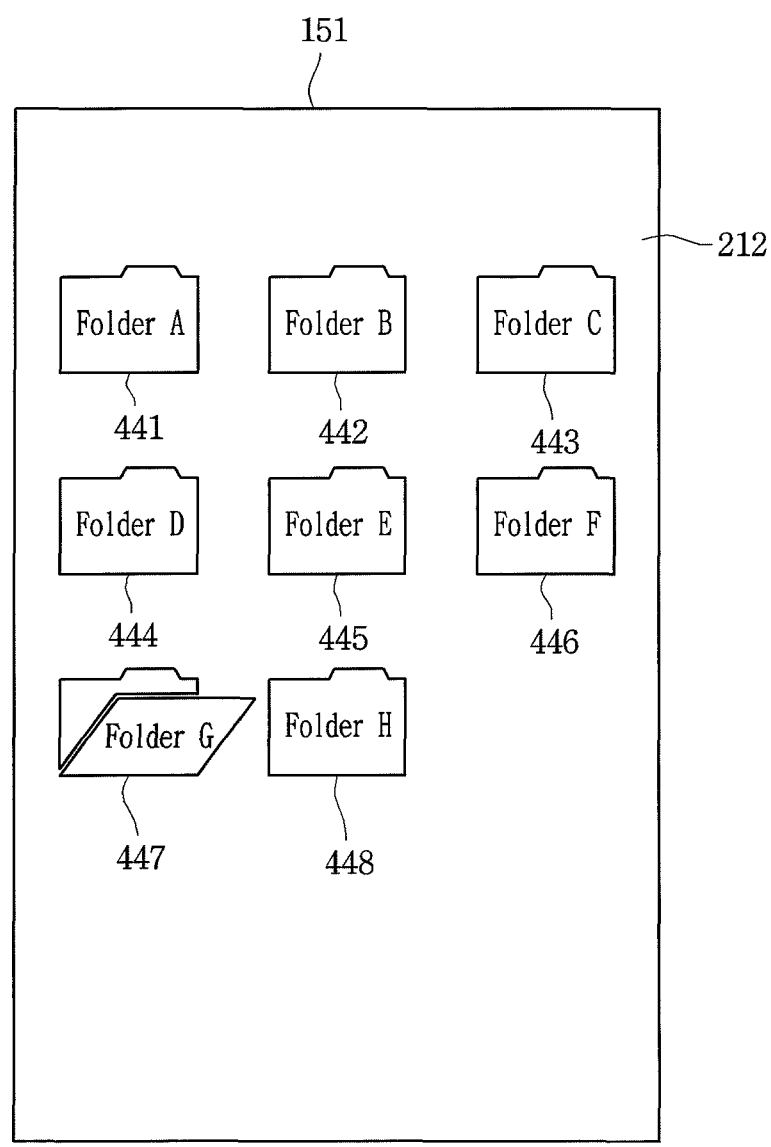
FIG. 26 is a view illustrating a picture folder display screen according to an embodiment of the present invention.

An embodiment will be described with reference to FIG. 26. In particular, FIG. 26 is a view illustrating a picture folder display screen according to an embodiment of the present invention. Referring to FIG. 26, when obtaining the user input rubbing the camera application icon 337 or the camera operation screen 221, the controller 180 can display a picture folder display screen 212 on the display unit 151 to designate a folder for storing pictures captured through a camera application. The controller 180 can display a plurality of folders 441, 442, 443, 444, 445, 446, 447, and 448 on the picture folder display screen 212. Captured pictures may be classified in the plurality of folders 441, 442, 443, 444, 445, 446, 447, and 448. After obtaining the user input selecting a folder G 447, that is one of the plurality of folders 441, 442, 443, 444, 445, 446, 447, and 448, the controller 180 can classify pictures captured through the camera 121 for the folder G 447 and store them in the memory 160.

Figure 27:
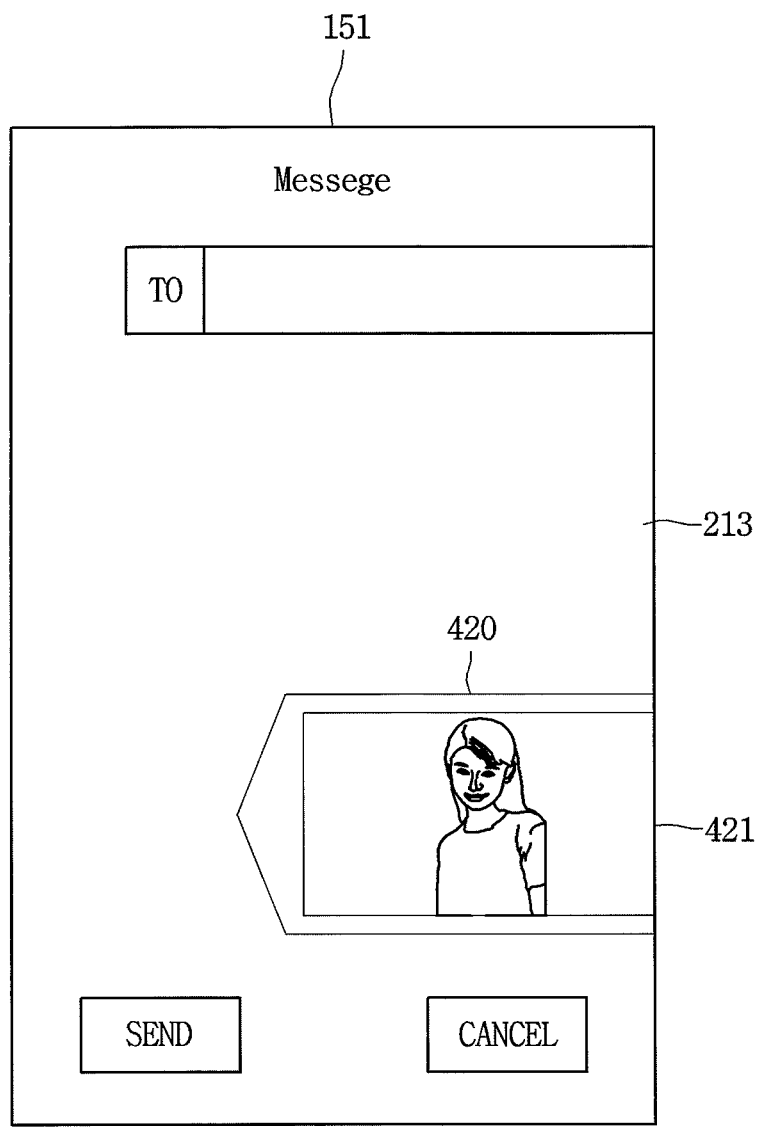
FIG. 27 is a view illustrating a message transmission screen according to an embodiment of the present invention.

Another embodiment will be described with reference to FIG. 27. In particular, FIG. 27 is a view illustrating a message transmission screen according to an embodiment of the present invention. Referring to FIG. 27, based on the user input rubbing the camera application icon 337 or the camera operation screen 221, the controller 180 can display a message screen 213 for transmitting a captured picture on the display unit 151. Then, the controller 180 can display a message input window 420 on the message screen 213 and add a picture 421 captured through a camera application to the input window 420.

Description for an intelligent agent operation of the terminal 100 for the camera application is exemplary and is not limited thereto. Accordingly, various operations and functions relating to a camera application may be executed through an intelligent agent of the terminal 100 according to the user's or designer's setting. Moreover, another embodiment is described for a function performance through an intelligent agent according to the user input obtained when the intelligent agent icon 200 of the terminal 100 is not displayed.

Figure 28:
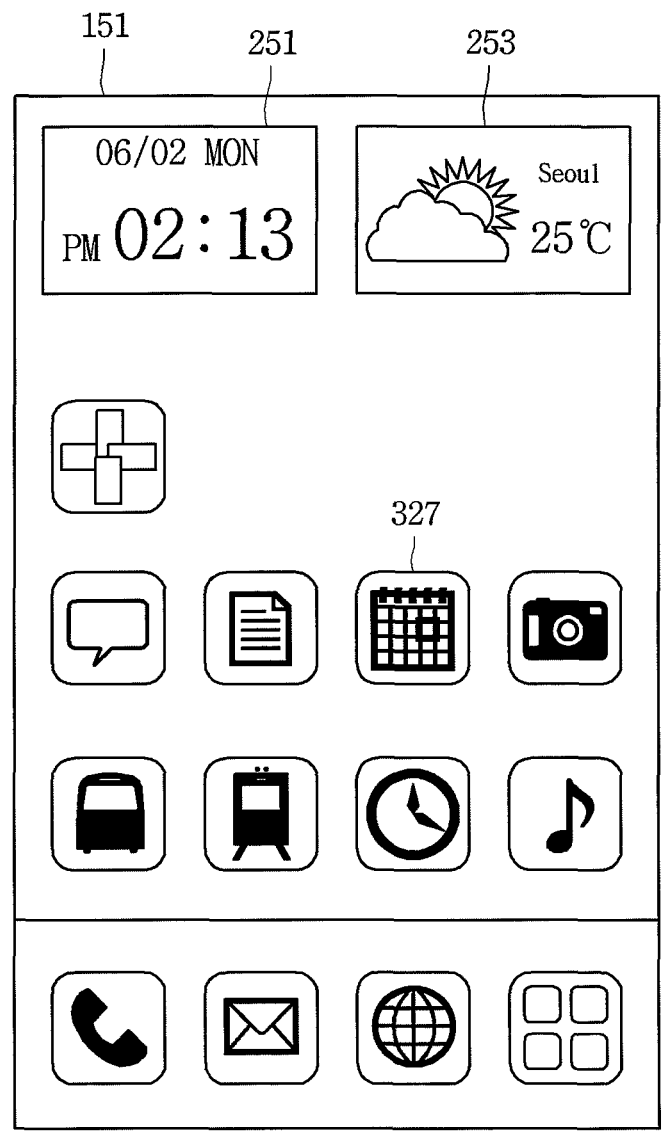
FIG. 28 is a view illustrating a home screen according to another embodiment of the present invention.

FIG. 28 is a view illustrating a home screen according to another embodiment of the present invention. Referring to FIG. 28, the controller 180 can display a home screen, that is, a basic screen of the terminal 100, on the screen of the display unit 151. The controller 180 can display a schedule application icon 327 on the home screen. Herein, the schedule application icon 327 is an icon corresponding to a schedule application.

Figure 29:
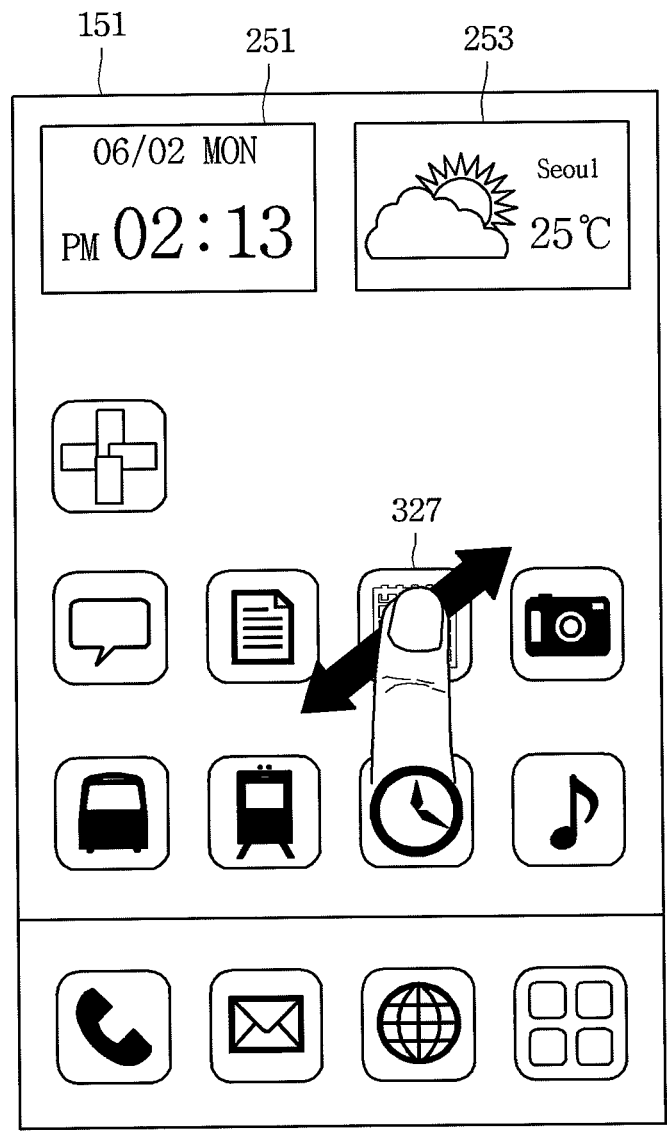
FIG. 29 is a view illustrating the user input rubbing a schedule application icon according to an embodiment of the present invention.

FIG. 29 is a view illustrating the user input rubbing the schedule application icon 327 according to an embodiment of the present invention. Referring to FIG. 29, the controller 180 can obtain the user input rubbing the schedule application icon 327 displayed on the display unit 151. As mentioned above, the user input rubbing the schedule application icon 327 corresponds to a touch input rotating in one direction based on the schedule application icon 327, and corresponds to a touch input touching the schedule application icon 337 in one direction and then continuously touching it in the opposite direction of the one direction. When obtaining the user input rubbing the schedule application icon 327, the controller 180 can perform a specific function of the schedule application or execute an intelligent agent to display a menu window for at least one function of the schedule application.

Figure 30:
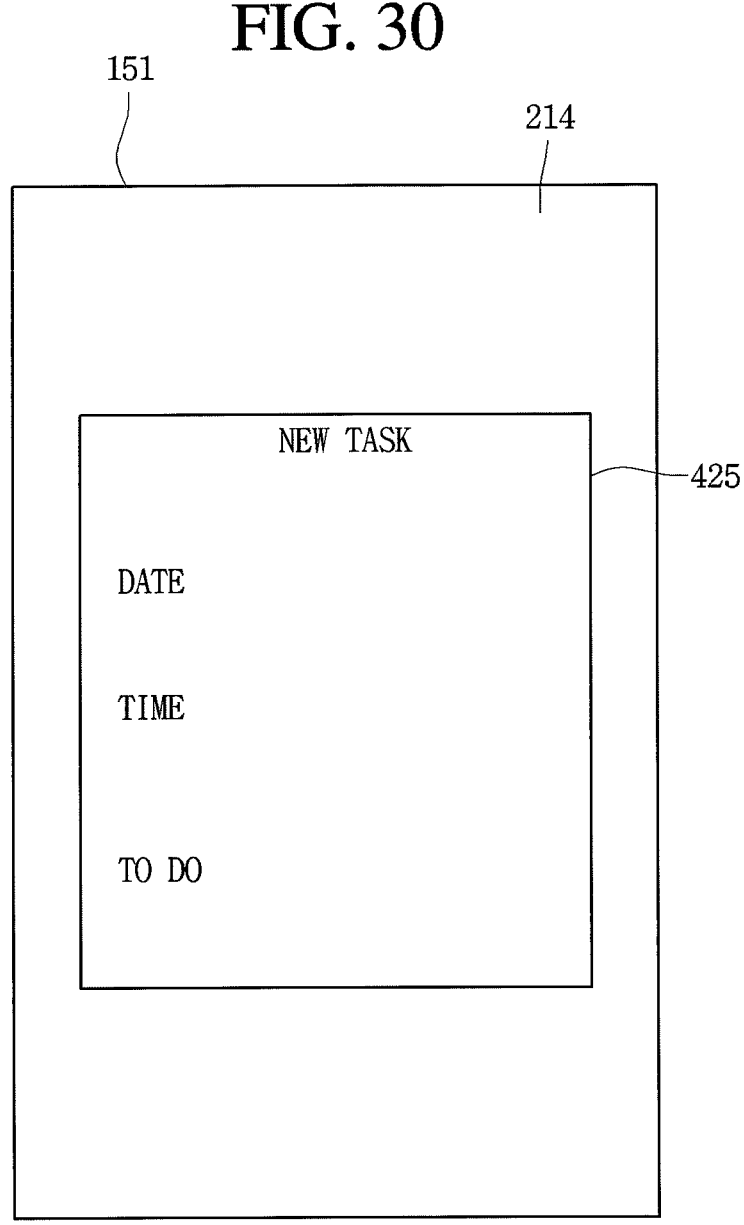
FIG. 30 is a view illustrating a schedule input screen according to an embodiment of the present invention.

An embodiment will be described with reference to FIG. 30. In particular, FIG. 30 is a view illustrating a schedule input screen according to an embodiment of the present invention. Referring to FIG. 30, when obtaining the user input rubbing the schedule application icon 327, the controller 180 can display a schedule input screen 214 for adding a new schedule to the schedule application on the display unit 151. The controller 180 can display a schedule input window 425 on the schedule input schedule 214. The schedule input window 425 can receive the input of the date, time, and content of a new schedule.

Another embodiment will be described with reference to FIGS. 31 to 33. In particular, FIG. 31 is a view illustrating a schedule display screen according to an embodiment of the present invention, FIG. 32 is a view illustrating a schedule input cursor display screen according to an embodiment of the present invention, and FIG. 33 is a view illustrating the user input for a schedule input cursor according to an embodiment of the present invention.

Figure 31:
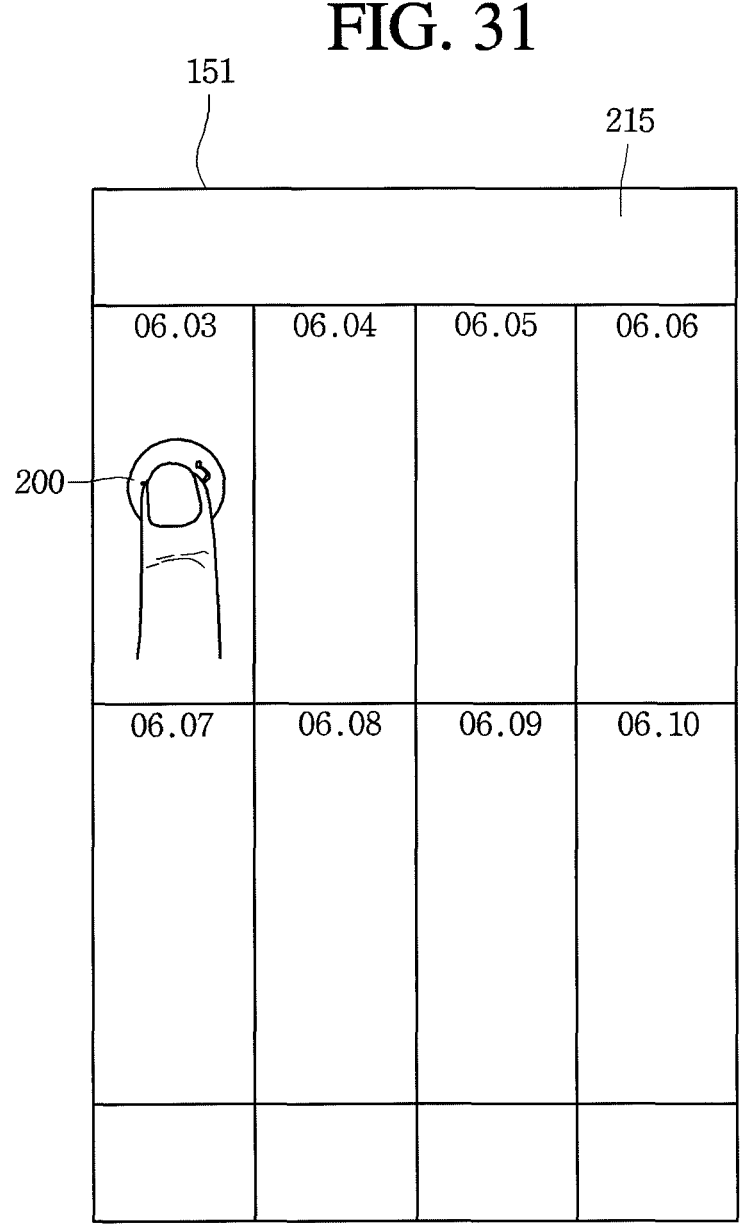
FIG. 31 is a view illustrating a schedule display screen according to an embodiment of the present invention.
Figure 32:
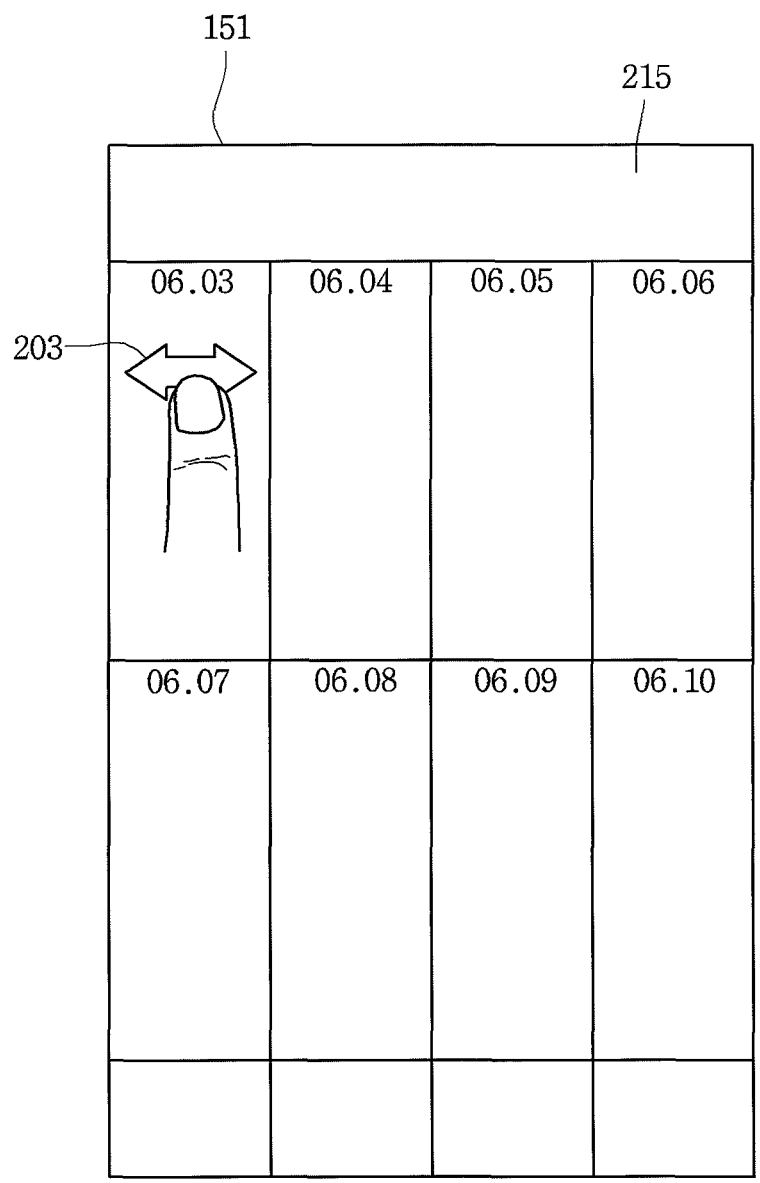
FIG. 32 is a view illustrating a schedule input cursor display screen according to an embodiment of the present invention.

Referring to FIG. 31, when obtaining the user input rubbing the schedule application icon 327, the controller 180 can display on the display unit 151 a schedule display screen 215 for displaying predetermined content stored in a predetermined application. Then, the controller 180 can display the intelligent agent icon 200 on the schedule display screen

215. As shown in FIG. 32, when obtaining the user input touching the intelligent agent icon 200 displayed on the predetermined display screen 215 for more than a reference time, the controller 180 can convert the intelligent agent icon 200 into a predetermined input cursor 203 for inputting a predetermined input period and display it.

Figure 33:
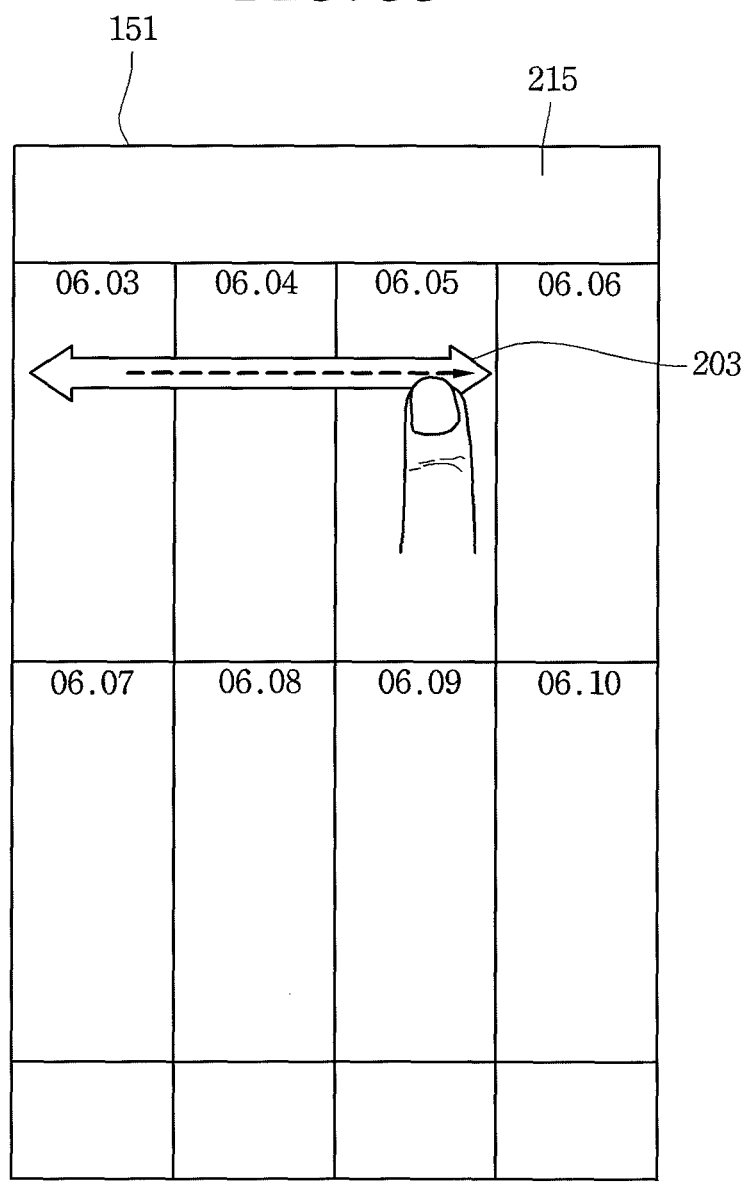
FIG. 33 is a view illustrating the user input for a schedule input cursor according to an embodiment of the present invention.

Then, as shown in FIG. 33, the controller 180 can obtain the user input for selecting a predetermined input period corresponding to the user input dragging the predetermined input cursor 203. For example, when obtaining the user input dragging the predetermined input cursor 203 from a June 3 space to a June 5 space, the controller 180 can display an input window for receiving a new schedule from June 3 to June 5 and then receive the new schedule from June 3 to June 5.

Description for an intelligent agent operation of the terminal 100 for the schedule application is exemplary and is not limited thereto. Accordingly, various operations and functions relating to a schedule application can be executed through an intelligent agent of the terminal 100 according to the user's or designer's setting. As a third embodiment, a function performance according to a touch input and the user input for executing an intelligent agent of the terminal 100 is described. When obtaining a touch input rubbing a specific application icon displayed on the display unit 151 and the user's voice speaking a specific sentence, the controller 180 can perform a function corresponding to the specific application and the specific sentence. Herein, the specific sentence may be commands or questions in natural language.

Figure 34:
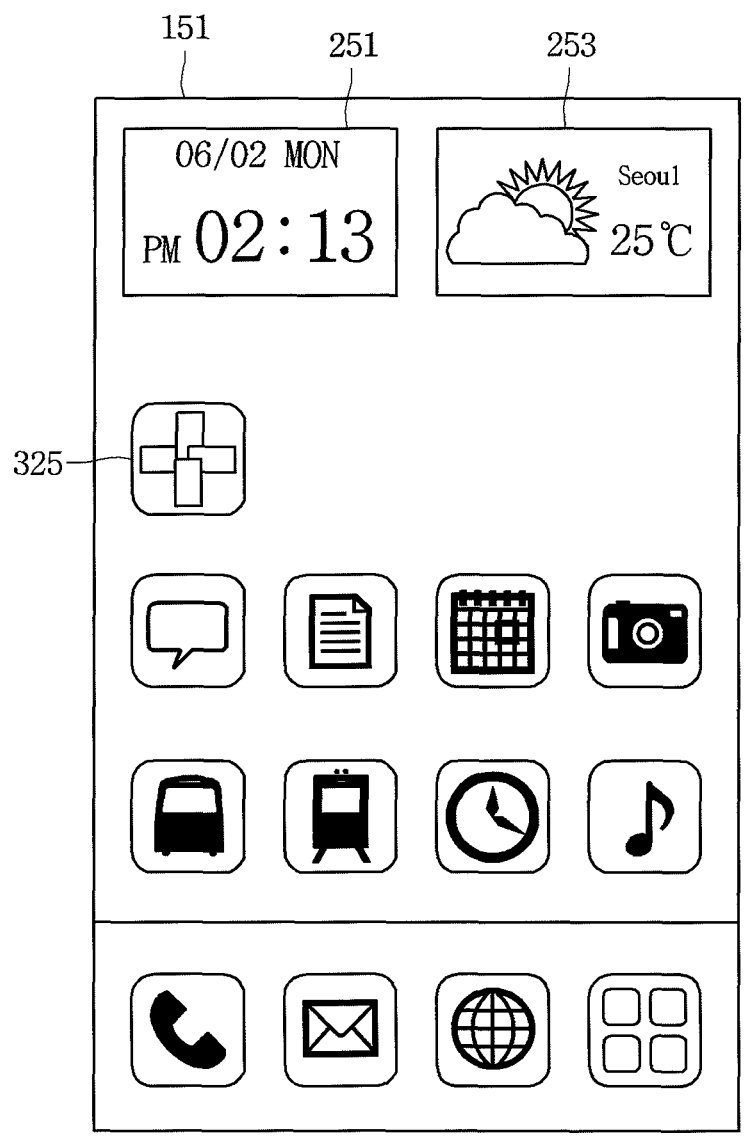
FIG. 34 is a view illustrating a home screen according to another embodiment of the present invention.

This will be described with reference to FIGS. 34 to 37. In particular, FIG. 34 is a view illustrating a home screen according to another embodiment of the present invention. Referring to FIG. 34, the controller 180 can display a home screen, that is, a basic screen of the terminal 100, on the screen of the display unit 151. The controller 180 can display a picture application icon 325 on the home screen. Herein, the picture application icon 325 is an icon corresponding to a picture application.

Figure 35:
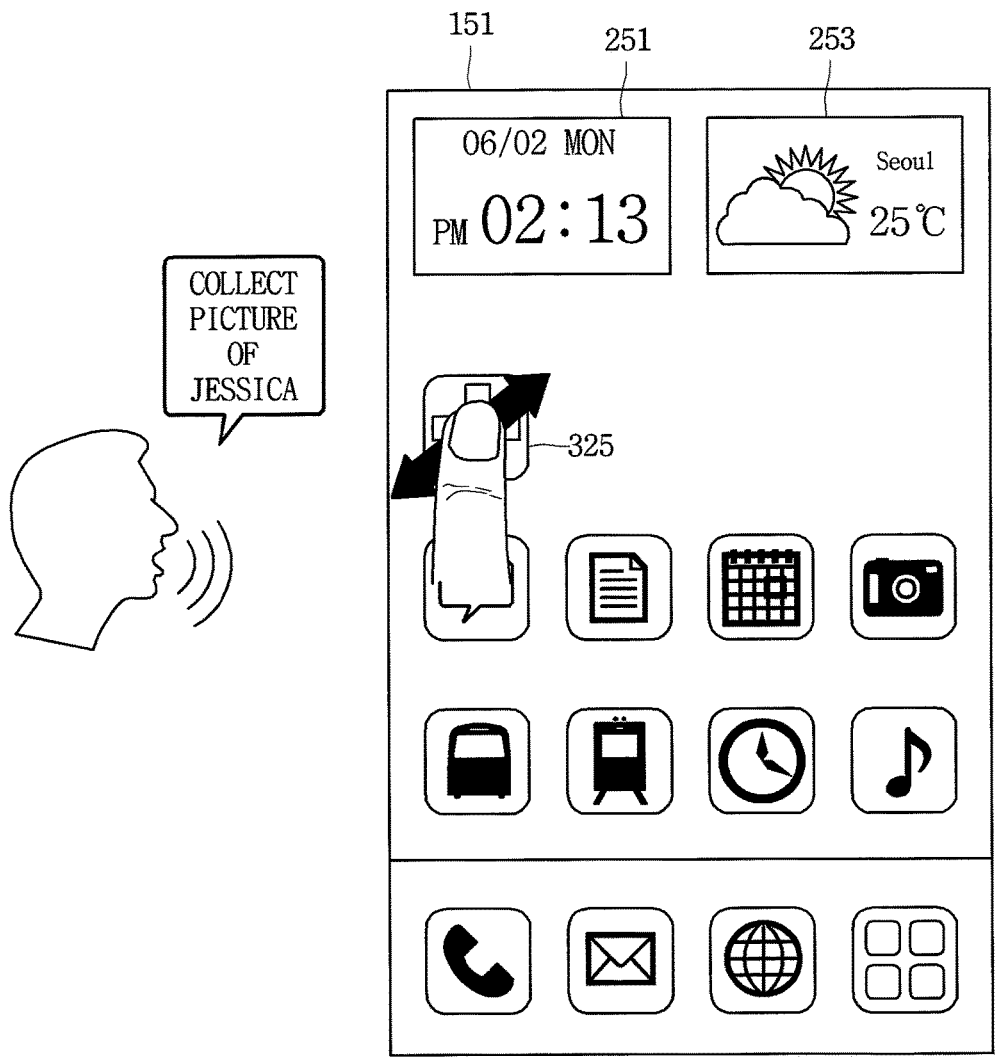
FIG. 35 is a view illustrating a touch input and a voice input for a picture application according to an embodiment of the present invention.

FIG. 35 is a view illustrating a touch input and a voice input for a picture application according to an embodiment of the present invention. Referring to FIG. 35, the controller 180 can obtain the user input rubbing a picture application icon 325 displayed on the display unit 151 and the user voice "collect pictures of Jessica." Herein, the user input rubbing a picture application icon 325 and the user voice "collect pictures of Jessica" may be input to the terminal 100 simultaneously or within a predetermined time. Also, as mentioned above, the user input rubbing the picture application icon 325 corresponds to a touch input rotating in one direction based on the picture application icon 325, and corresponds to a touch input touching the picture application icon 325 in one direction and then continuously touching it in the opposite direction of the one direction. The controller 180 can collect pictures of Jessica stored in the memory 160 according to the obtained user input and user voice. Additionally, the controller 180 can display on the display unit 151 pictures of Jessica stored in the memory 160 according to the obtained user input and user voice.

Figure 36:
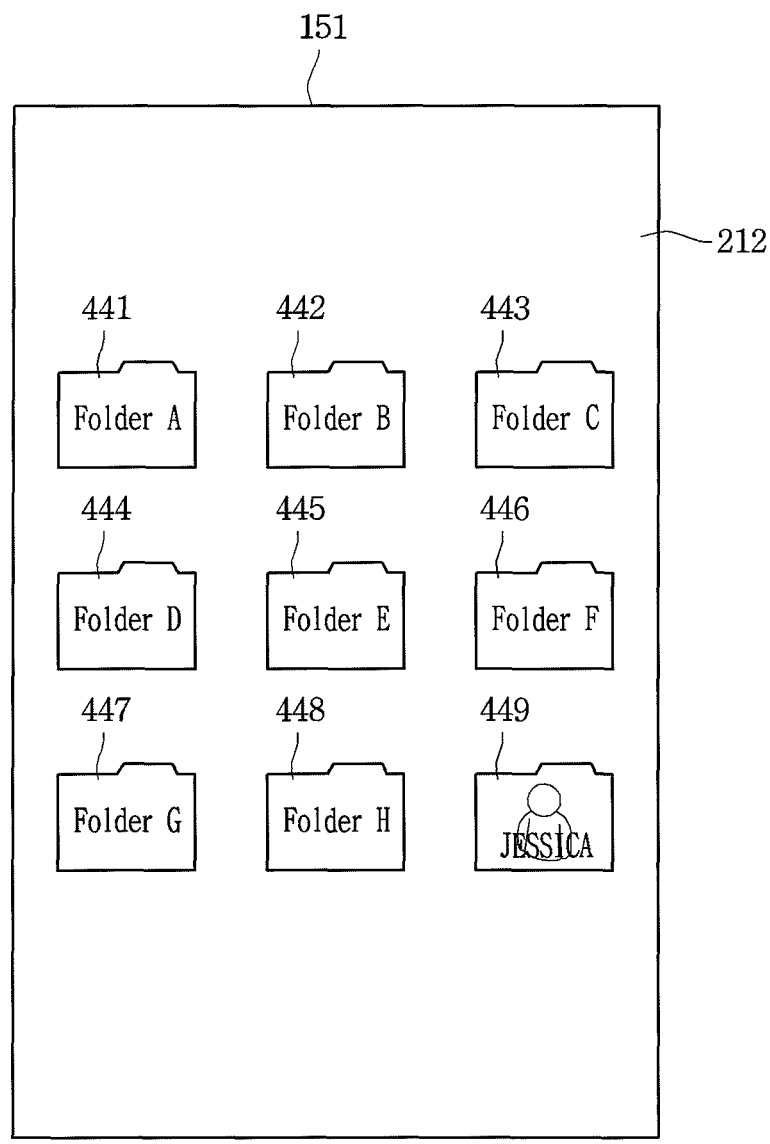
FIG. 36 is a view illustrating a screen for classifying collected pictures by a folder according to an embodiment of the present invention.

An embodiment will be described with reference to FIG. 36. In particular, FIG. 36 is a view illustrating a screen for classifying collected pictures by a folder according to an embodiment of the present invention. Referring to FIG. 36, the controller 180 can display a picture folder display screen 212 on the display unit 151 and display a plurality of folders 441, 442, 443, 444, 445, 446, 447, 448, and 449 on the picture folder display screen 212. The controller 180 can classify at least one picture of Jessica for the Jessica folder 449 among the plurality of folders 441, 442, 443, 444, 445, 446, 447, 448, and 449. Accordingly, the Jessica folder 449 includes only pictures of Jessica stored in the memory 160. Further, the Jessica folder 449 may be a newly generated folder according to the obtained user input and user voice.

Figure 37:
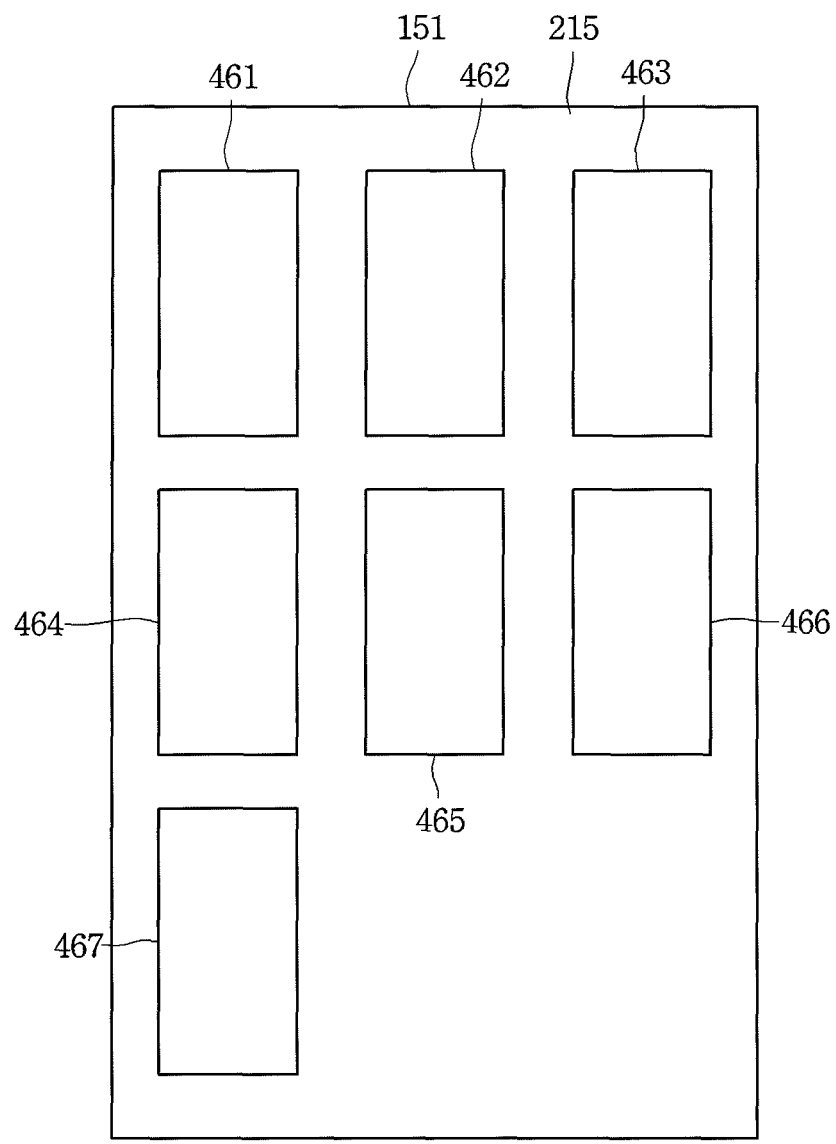
FIG. 37 is a view illustrating a picture display screen according to an embodiment of the present invention.

Another embodiment will be described with reference to FIG. 37. In particular, FIG. 37 is a view illustrating a picture display screen according to an embodiment of the present invention. Referring to FIG. 37, in correspondence to the obtained user input and user's voice, the controller 180 can display on the display unit 151 a picture display screen 215 displaying at least one picture of Jessica. Therefore, the controller 180 can display a plurality of pictures 461, 462, 463, 464, 465, 466, and 467 where Jessica is captured in a predetermined size on the picture display screen 215. Herein, a plurality of pictures 461, 462, 463, 464, 465, 466, and 467 where Jessica is captured may be pictures stored in the memory 160.

Description for an intelligent agent operation of the terminal 100 for the picture application is exemplary and is not limited thereto. Accordingly, various operations and functions relating to a picture application can be executed through an intelligent agent of the terminal 100 according to the user's or designer's setting. Additionally, a function performance corresponding to a specific sentence according to the acquisition of the user input rubbing an application icon of the terminal 100 and the user's voice can be applied to various applications in addition to the picture application.

As a fourth embodiment, a function performance according to the user input for the displayed intelligent agent icon 200 of the terminal 100 or a displayed widget is described. In correspondence to the user input dragging and dropping the intelligent agent icon 200, which is displayed on the display unit 151, on a specific widget, the controller 180 can perform a specific function corresponding to a specific widget or may display a menu window for at least one function corresponding to a specific widget. Additionally, in correspondence to the user input rubbing a widget displayed on the display unit 151, the controller 180 can perform a specific function corresponding to a specific widget or may display a menu window for at least one function corresponding to a specific widget.

As one embodiment, a function performance corresponding to a weather widget is described with reference to FIGS. 38 and 39. In particular, FIG. 38 is a view illustrating the user input for a weather widget according to an embodiment of the present invention, and FIG. 39 is a view illustrating a weather information display screen according to an embodiment of the present invention.

Figure 38:
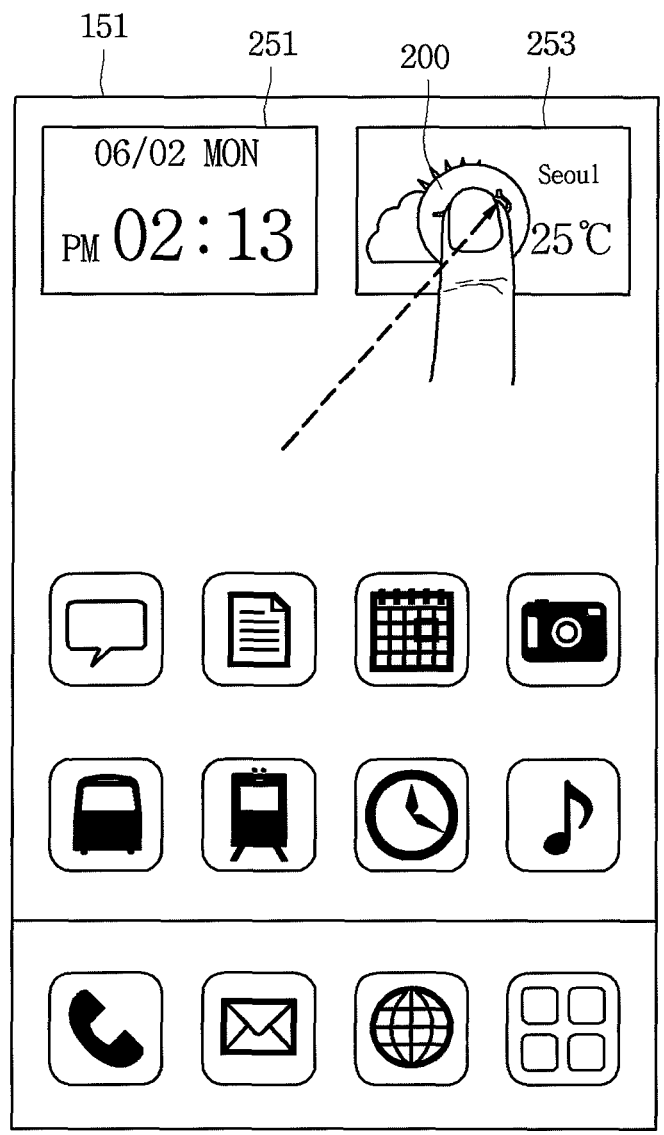
FIG. 38 is a view illustrating the user input for a weather widget according to an embodiment of the present invention.

Referring to FIG. 38, the controller 180 can obtain the user input dragging and dropping the intelligent agent icon 200, which is displayed on the display unit 151, on a weather widget 253. Herein, the weather widget 253 corresponds to a widget for displaying weather information. Accordingly, the controller 180 can display weekly weather information corresponding to the weather widget 253. As shown in FIG. 39, the controller 180 can display on the display unit 151 a weather information display screen 216 displaying weekly weather information of Seoul that is the current location. Accordingly, the controller 180 can display on the weather information screen 216 of the display unit 151 the weather forecast for a predetermined period of a specific region.

As another embodiment, a function performance corresponding to a time widget is described with reference to FIGS. 40 and 41. In particular, FIG. 40 is a view illustrating the user input for a time widget according to an embodiment of the present invention, and FIG. 41 is a view illustrating another schedule information display screen according to an embodiment of the present invention.

Figure 40:
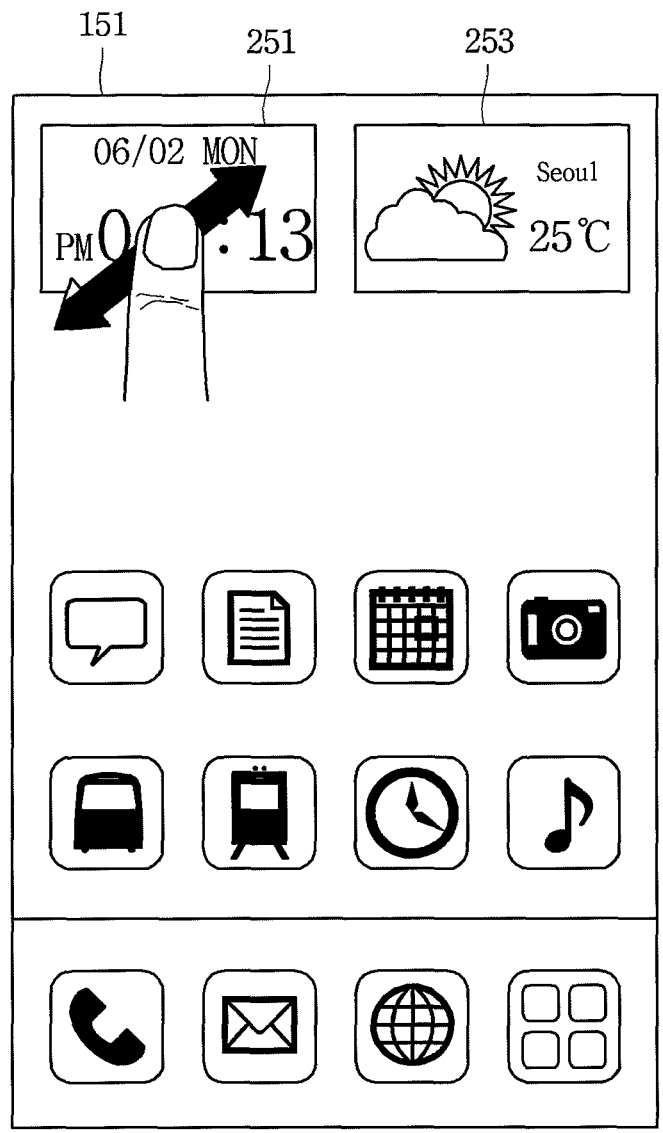
FIG. 40 is a view illustrating the user input for a time widget according to an embodiment of the present invention.
Figure 41:
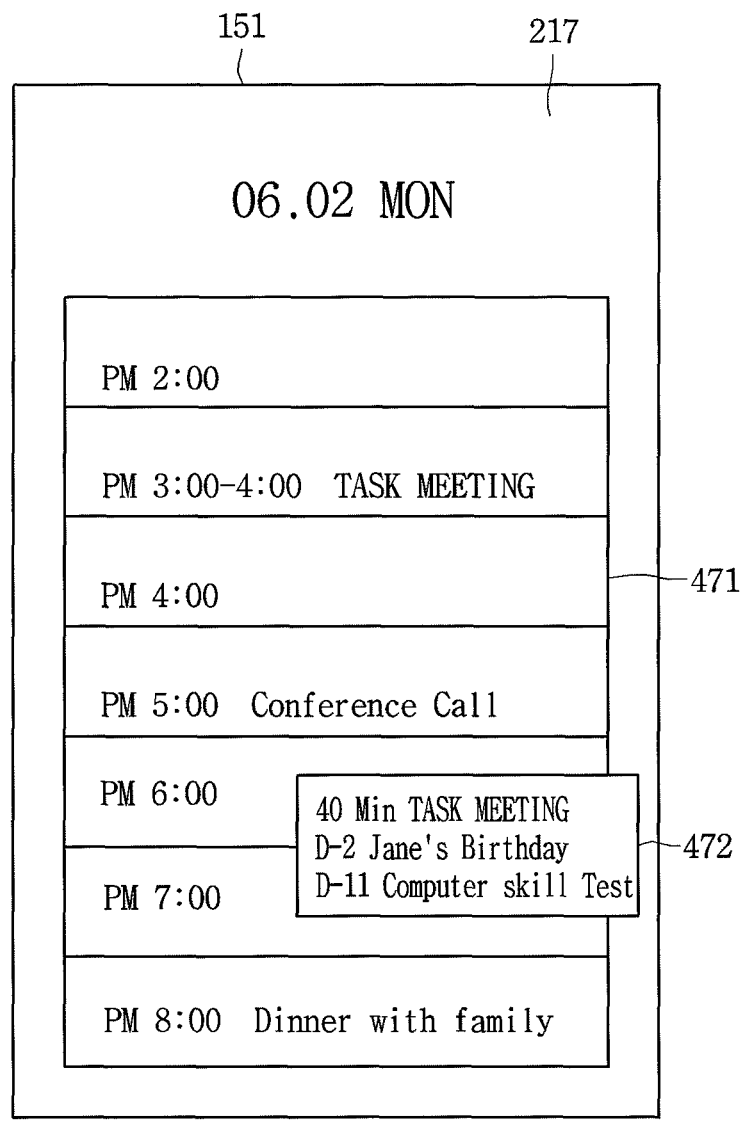
FIG. 41 is a view illustrating another schedule information display screen according to an embodiment of the present invention.

Referring to FIG. 40, the controller 180 can display a time widget 251 on the display unit 151. Then, the controller 180 can obtain the user input rubbing the displayed time widget 251. Herein, the time widget 251 corresponds to a widget for displaying information on time. Accordingly, the controller 180 can display schedule information as a function corresponding to the time widget 251. As shown in FIG. 41, the controller 180 can display on the display unit 151 a schedule information display screen 217 displaying a schedule after the current time. The controller 180 can display a schedule table 471 and an important schedule pop-up window 472 for a schedule after the current time.

The controller 180 can display the remaining time until an important schedule from the current time and schedule content on the important schedule pop-up window 472. Then, the controller 180 can display the remaining time until an important schedule in a D-day format on the important schedule pop-up window 472. Description for an intelligent agent operation of the terminal 100 for the widget is exemplary and is not limited thereto. Accordingly, various operations and functions relating to a widget can be executed through an intelligent agent of the terminal 100 according to the user's or designer's setting.

Figure 42:
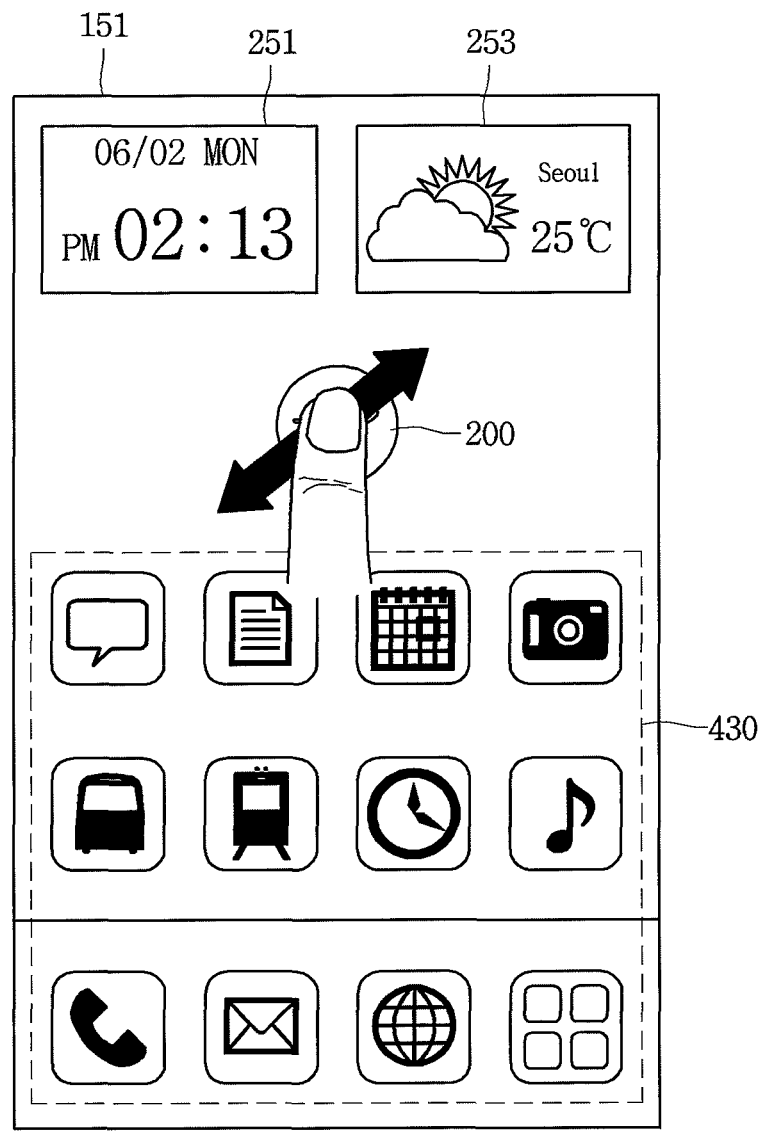
FIG. 42 is a view illustrating the user input for an intelligent agent icon according to another embodiment of the present invention.

As a fifth embodiment, a function performance according to the user input for a displayed intelligent agent icon 200 of the terminal 100 is described. In particular, FIG. 42 is a view illustrating the user input for an intelligent agent icon according to another embodiment of the present invention. Referring to FIG. 42, the controller 180 can obtain the user input rubbing the intelligent agent icon 200 displayed on the display unit 151. As mentioned above, the user input rubbing the intelligent agent icon 200 corresponds to a touch input rotating in one direction based on the intelligent agent icon 200, and corresponds to a touch input touching the intelligent agent application icon 200 in one direction and then continuously touching it in the opposite direction of the one direction.

In correspondence to the user input rubbing the intelligent agent icon 200 displayed on the display unit 151, the controller 180 can perform at least one of a home screen arrangement and an application arrangement. Herein, the home screen arrangement corresponds to adding, deleting, and moving at least one application icon or at least one widget, which is displayed on the home screen. The application arrangement corresponds to adding, deleting, and moving at least one application executed by the controller 180 or stored in the memory 160.

As one embodiment, in correspondence to the user input rubbing the intelligent agent icon 200 displayed on the display unit 151, the controller 180 can display on the display unit 151 an application arrangement information window for notifying an application that the user does not use. Then, when obtaining at least one application included in the application arrangement information window, the controller 180 can delete at least one application in the application arrangement information window from the memory 160. Moreover, the controller 180 can display the application arrangement information window on the display unit 151 periodically and may not display the application arrangement information window on the display unit 151 according to the user setting.

As another embodiment, in correspondence to the user input rubbing the intelligent agent icon 200 displayed on the display unit 151, the controller 180 can distinguish and display at least one application icon displayed on the home screen according to a predetermined reference. For example, the controller 180 can display the size of an application icon of a frequently used application to be large and display the size of an application icon of a less frequently used application to be small.

Figure 43:
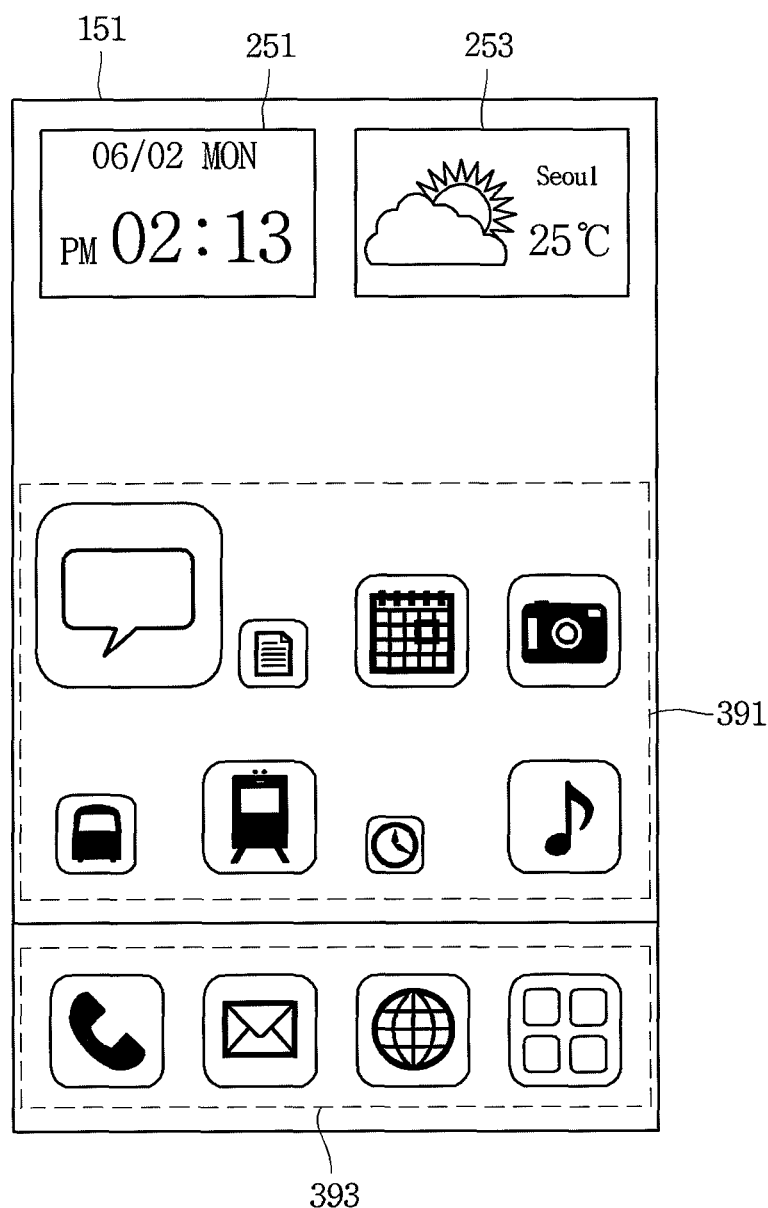
FIG. 43 is a view illustrating a home screen according to another embodiment of the present invention.

This will be described with reference to FIG. 43. In particular, FIG. 43 is a view illustrating a home screen according to another embodiment of the present invention. As shown in FIG. 43, in correspondence to the user input rubbing the intelligent agent icon 200 displayed on the display unit 151, the controller 180 can distinguish and display the sizes of a plurality of displayed application icons 391 according to the user's usage frequency. Accordingly, the application icon of a frequently used application can be displayed larger than the application icon of a less frequently used application. Further, the controller 180 can display the sizes of a plurality of applications corresponding to a basic application in a predetermined size regardless of the user's usage frequency.

As another example, the controller 180 can activate and display the application icon of a frequently used application and deactivate and display the application icon of a less frequently used application. Description for an intelligent agent operation of the terminal 100 for the application arrangement and the application icon arrangement is exemplary and is not limited thereto. Accordingly, various operations and functions relating to an application arrangement and an application icon arrangement can be executed through an intelligent agent of the terminal 100 according to the user's or designer's setting.

As a sixth embodiment, a function performance according to the user input for a displayed simple screen 220 of the terminal 100 is described. Moreover, when executing an intelligent agent, the controller 180 can display a simple menu for the intelligent agent on the display unit 151. The controller 180 can display an intelligent agent icon 200 and at least one recommendation function on the simple screen 220. Further, the controller 180 can display an icon for a recommendation function corresponding to a usage pattern of the terminal 100 and a state of the terminal 100. This is described above. Then, in correspondence to the user input for at least one of the intelligent agent icon 200 displayed on the simple screen 220, an icon for at least one recommendation function, and a menu window for at least one recommendation function, the controller 180 can perform a specific function or a specific operation of the terminal 100.

An embodiment will be described with reference to FIGS. 44 and 45. In particular, FIG. 44 is a view illustrating the user input for a simple screen according to an embodiment of the present invention, and FIG. 45 is a view illustrating a menu window display for a function corresponding to a music application according to an embodiment of the present invention.

Figure 44:
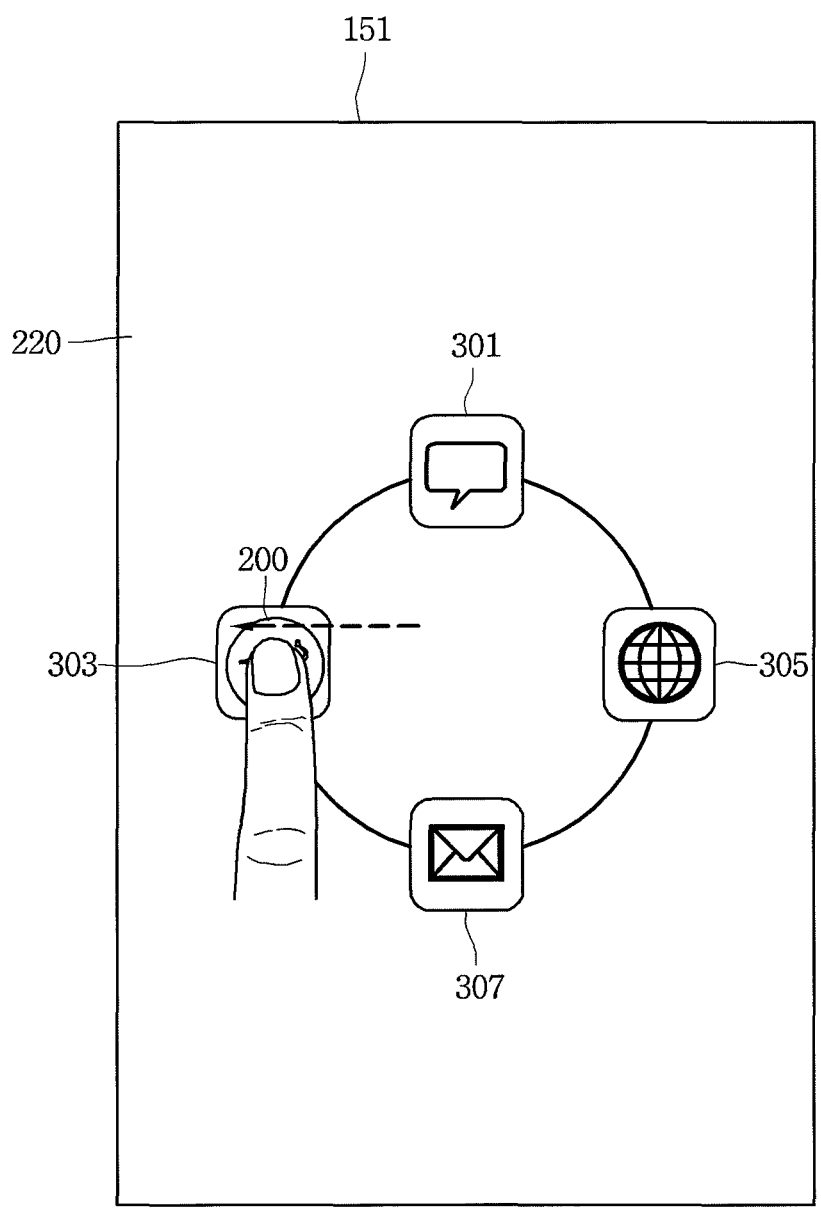
FIG. 44 is a view illustrating the user input for a simple screen according to an embodiment of the present invention.

Referring to FIG. 44, the controller 180 can display on a simple menu 220 an intelligent agent icon 200, and a message application icon 301, a music application icon 303, a web browser icon 305, and an e-mail application icon 307 as an application icon for at least one recommendation function. Then, the controller 180 can obtain the user input dragging and dropping the intelligent agent icon 200, which is displayed on the simple screen 220, on a music application icon 303. Accordingly, the controller 180 can display a menu window for at least one function corresponding to a music application on the display unit 151.

Figure 45:
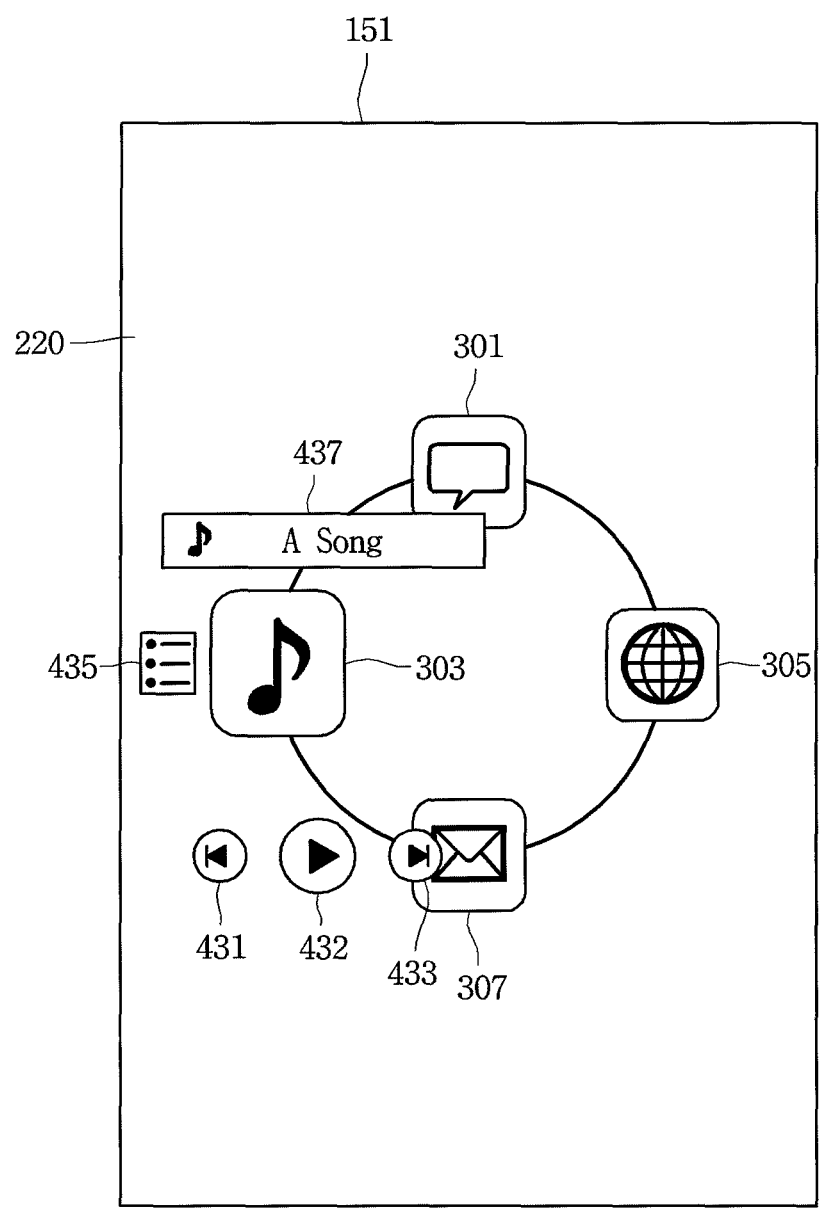
FIG. 45 is a view illustrating a menu window display for a function corresponding to a music application according to an embodiment of the present invention.

Referring to FIG. 45, the controller 180 can display a previous track 431, a play/stop 432, a next track 433, a play list 435, and a play information window 437, as a menu window for at least one function corresponding to a music application. Herein, the previous track 431 is a menu for moving to a previous song, the play/stop 432 is a menu for playing or stopping a song, the next track 433 is a menu for moving to the next song, the play list 435 is a menu for editing a list for at least one song that is a play target, and the play information window 437 is a menu for displaying information on a song in play. Then, the controller 180 can obtain a second user input for selecting one of menu windows 431, 432, 433, 435, and 437 for at least one function corresponding to a music application displayed on the display unit 151. The controller 180 can perform a function of a music application corresponding to an obtained second user input.

Another embodiment will be described with reference to FIGS. 46 and 47. In particular, FIG. 46 is a view illustrating the user input for a simple screen according to another embodiment of the present invention, and FIG. 47 is a view illustrating a menu window display for a function corresponding to a music application according to an embodiment of the present invention.

Figure 46:
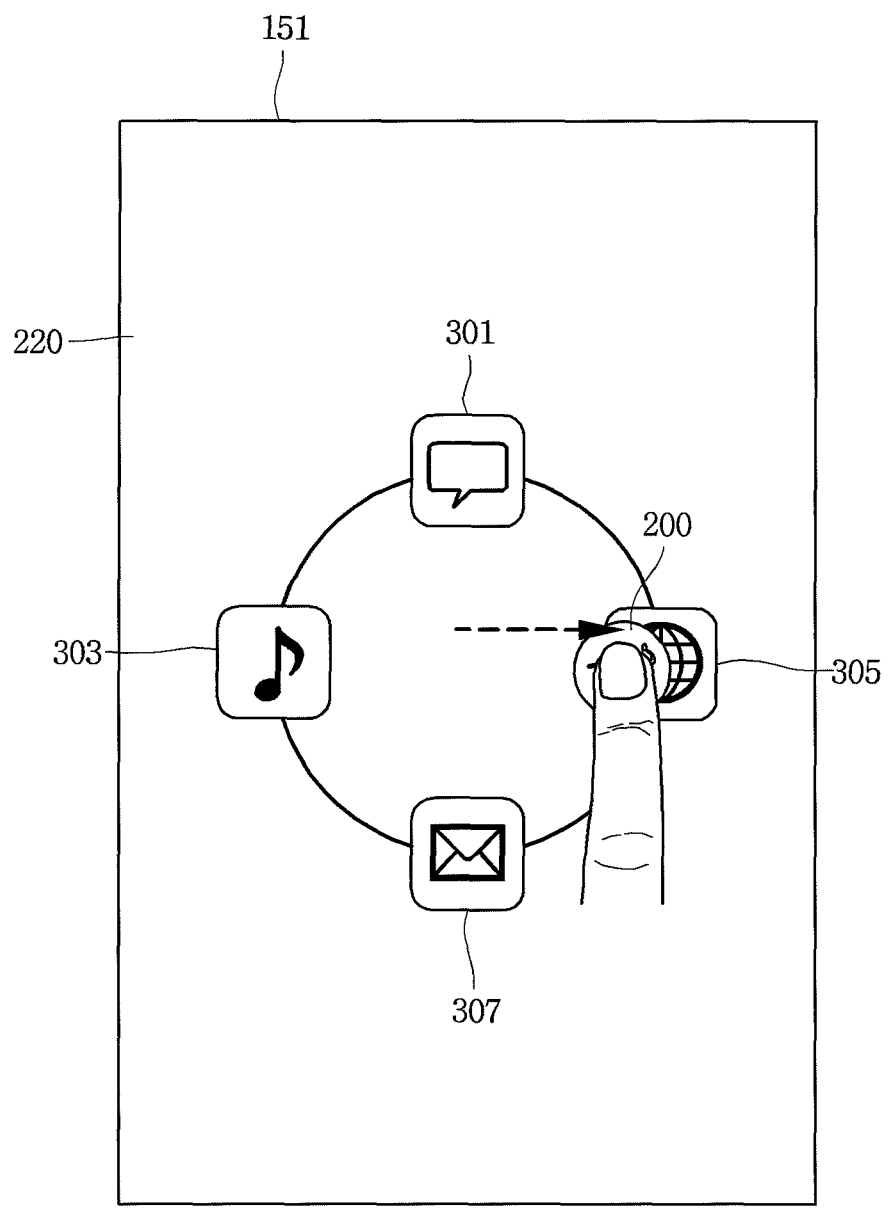
FIG. 46 is a view illustrating the user input for a simple screen according to another embodiment of the present invention.
Figure 47:
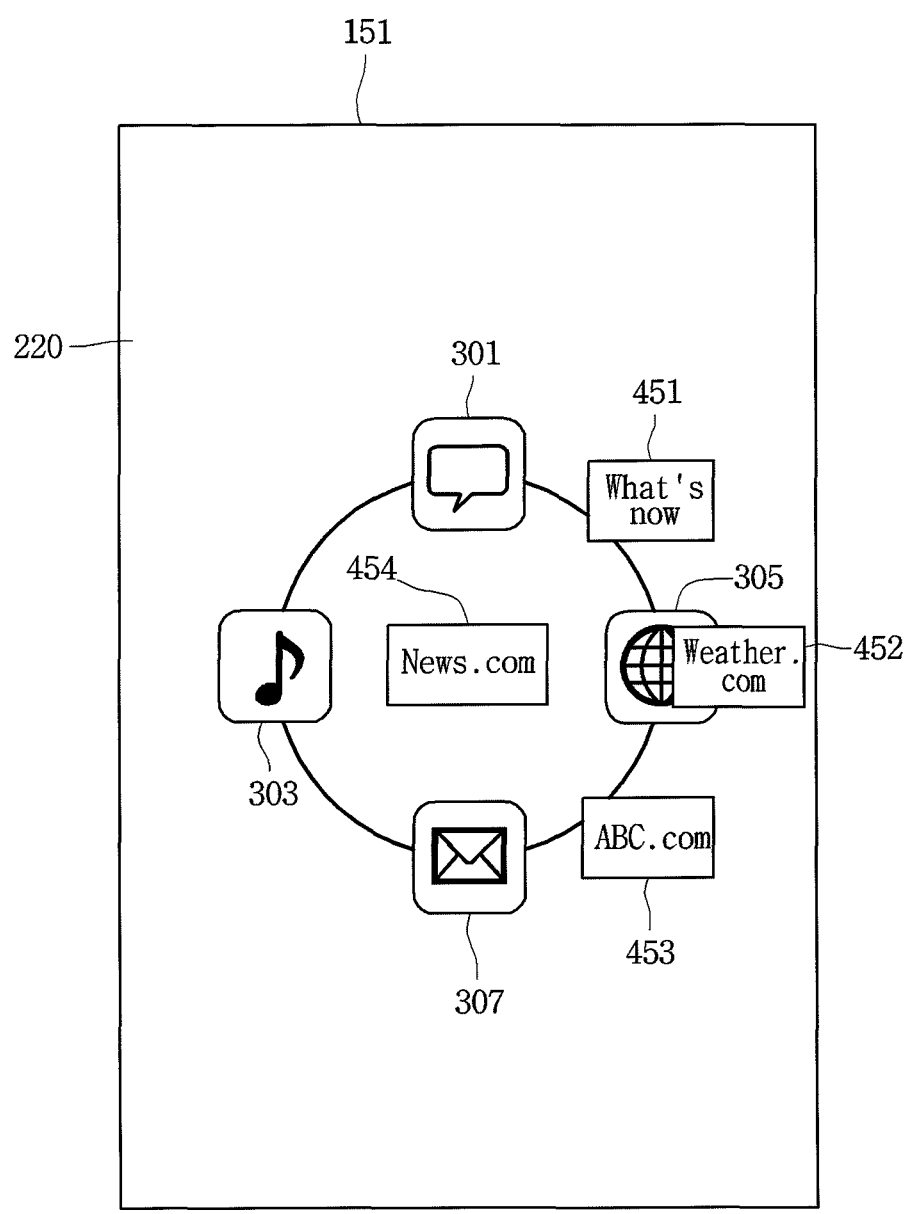
FIG. 47 is a view illustrating a menu window display for a function corresponding to a music application according to an embodiment of the present invention.

Referring to FIG. 46, the controller 180 can display on a simple menu 220 an intelligent agent icon 200, and a message application icon 301, a music application icon 303, a web browser icon 305, and an e-mail application icon 307 as an application icon for at least one recommendation function. Then, the controller 180 can obtain the user input dragging and dropping the intelligent agent icon 200, which is displayed on the simple screen 220, on the web browser icon 305. Accordingly, the controller 180 can display a menu window for at least one function corresponding to a web browser application. Referring to FIG. 47, the controller 180 can display a plurality of recommendation site icons 451, 452, 453, and 454 on the display unit 151, as a menu window for at least one function corresponding to the web browser application.

Herein each of the plurality of recommendation site icons 451, 452, 453, and 454 is an icon for connecting one of a web site that the user frequently accesses and a web site that the user stores. Then, the controller 180 can obtain a second user input for selecting one of the plurality of recommendation site icons 451, 452, 453, and 454 corresponding to a web browser application displayed on the display unit 151. The controller 180 can display on the display unit 151 a web browser screen for a site corresponding to the obtained second user input. For example, when obtaining a second user input for selecting a second site icon 452, the controller 180 can display a web browser screen for weather.com on the display unit 151.

Description for an intelligent agent operation of the terminal 100 for the simple screen is exemplary and is not limited thereto. Accordingly, various operations and functions relating to a simple screen can be executed through an intelligent agent of the terminal 100 according to the user's or designer's setting.

As a seventh embodiment, a function performance according to the current location of the terminal 100 and an obtained user input is described. When executing an intelligent agent, the controller 180 can obtain the current location information of the user. Herein, the current location information of the user corresponds to the current position information of the terminal 100. Therefore, the controller 180 can display an icon for at least one recommendation function corresponding to the current location of the terminal 100 and the user input for an intelligent agent icon 200. Herein, an icon for at least one recommendation function corresponds to a specific application icon or a menu window for a specific function.

An embodiment will be described with reference to FIGS. 48 and 49. In particular, FIG. 48 is a view illustrating a recommendation application display screen corresponding to the current location according to an embodiment of the present invention, and FIG. 49 is a view illustrating a recommendation application display screen corresponding to the current location according to another embodiment of the present invention.

Figure 48:
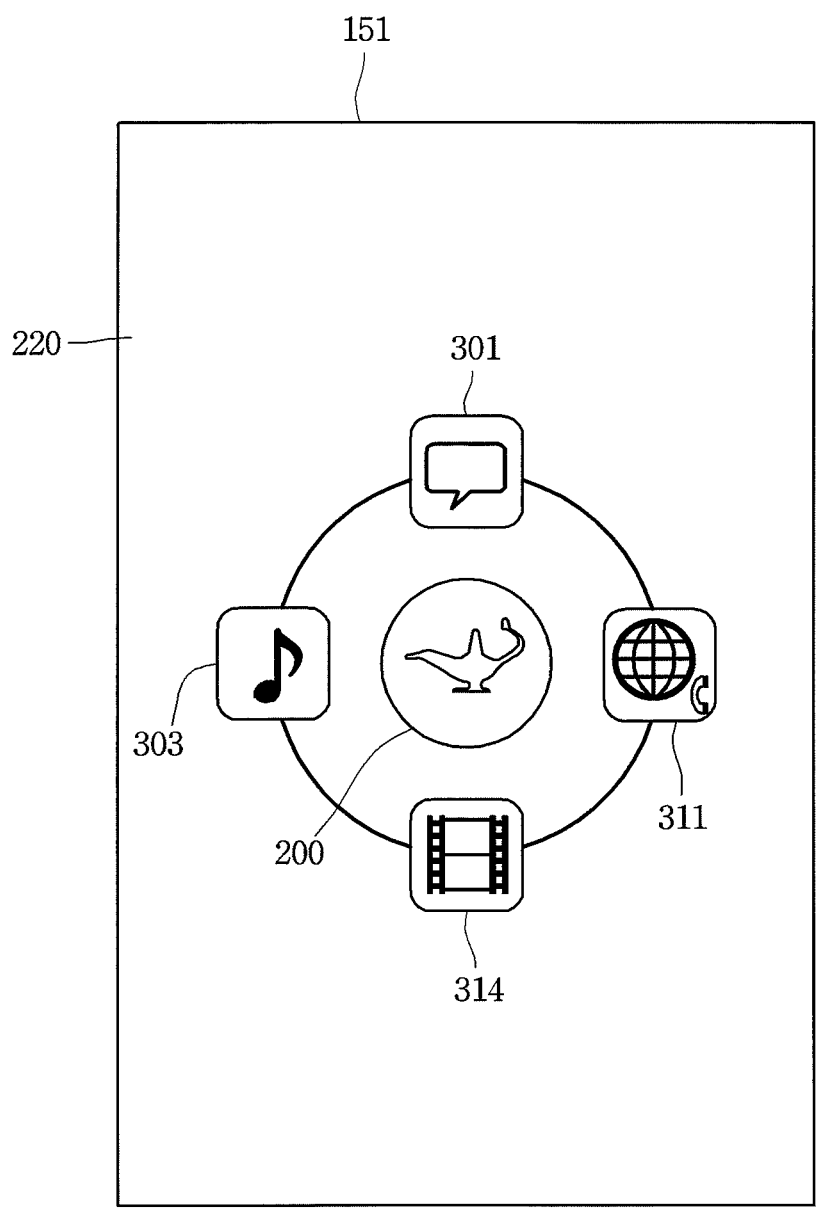
FIG. 48 is a view illustrating a recommendation application display screen corresponding to the current location according to an embodiment of the present invention.
Figure 49:
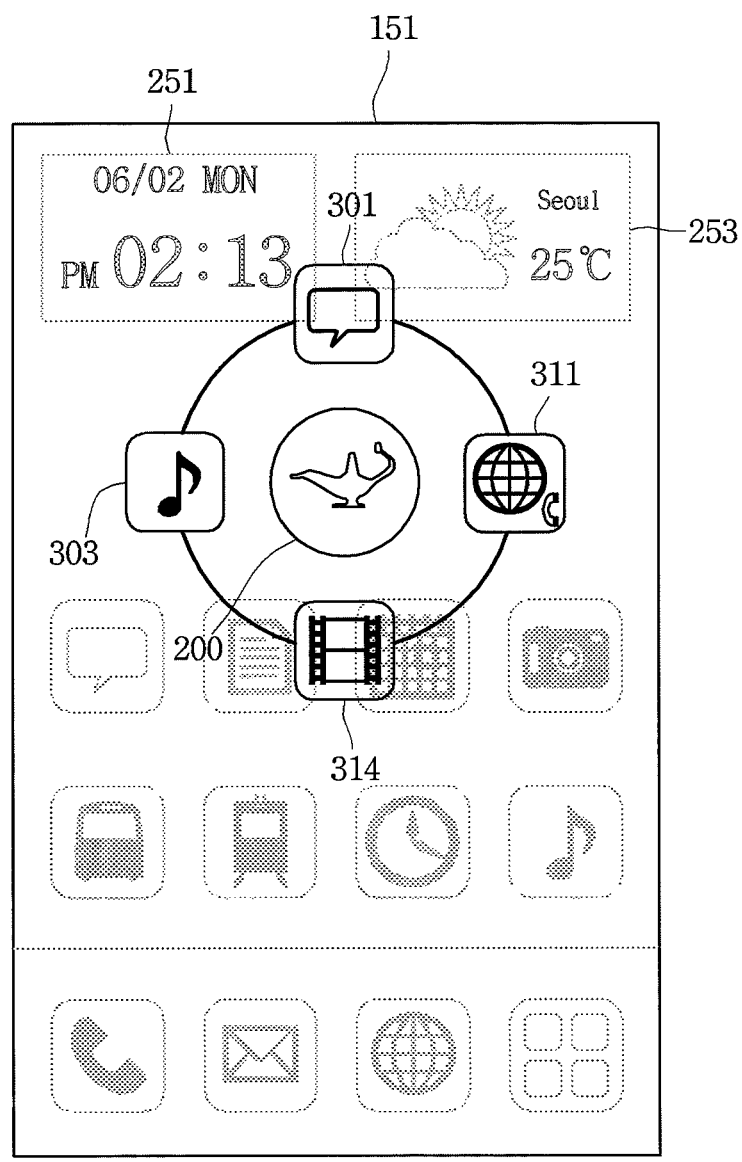
FIG. 49 is a view illustrating a recommendation application display screen corresponding to the current location according to another embodiment of the present invention.

Referring to FIG. 48, when executing an intelligent agent, the controller 180 can obtain the current location information of the user. When the obtained current location information relates to inside the user's home, the controller 180 can display an icon for at least one application that is frequently used inside the home on the simple screen 220. Therefore, the controller 180 can display on the simple screen 220 an intelligent agent icon 200, and a message application icon 301, a music application icon 303, an internet call application icon 311, and a video application icon 314 as a recommendation application icon for a home location. Herein, the internet call application icon 311 is an icon corresponding to an internet call (for example, VoIP) application, and the video application icon 314 is an icon corresponding to an application for playing video.

Moreover, the controller 180 can display an application icon corresponding to the obtained current location information on a home screen instead of the simple screen 220. As shown in FIG. 49, the controller 180 can display on the home screen displayed on the display unit 151, an intelligent agent icon 200, a message application icon 301 as a recommendation application icon for a home inside, a music application icon 303, an internet call application icon 311, and a video application icon 314. In addition, the controller 180 can distinguish the intelligent agent icon 200 according to an intelligent agent execution, the message application icon 301, the music application icon 303, the web browser icon 311, and the e-mail application icon 314 from other objects of the home screen and then display them. For example, the controller 180 can activate and display the intelligent agent icon 200 according to an intelligent agent execution, the message application icon 301, the music application icon 303, the web browser icon 311, and the e-mail application icon 314 from other objects of the home screen and deactivate and display the other objects of the home screen.

Another embodiment will be described with reference to FIGS. 50 and 51. In particular, FIG. 50 is a view illustrating a recommendation application display screen corresponding to the current location according to another embodiment of the present invention, and FIG. 51 is a view illustrating a recommendation application display screen corresponding to the current location according to another embodiment of the present invention.

Figure 50:
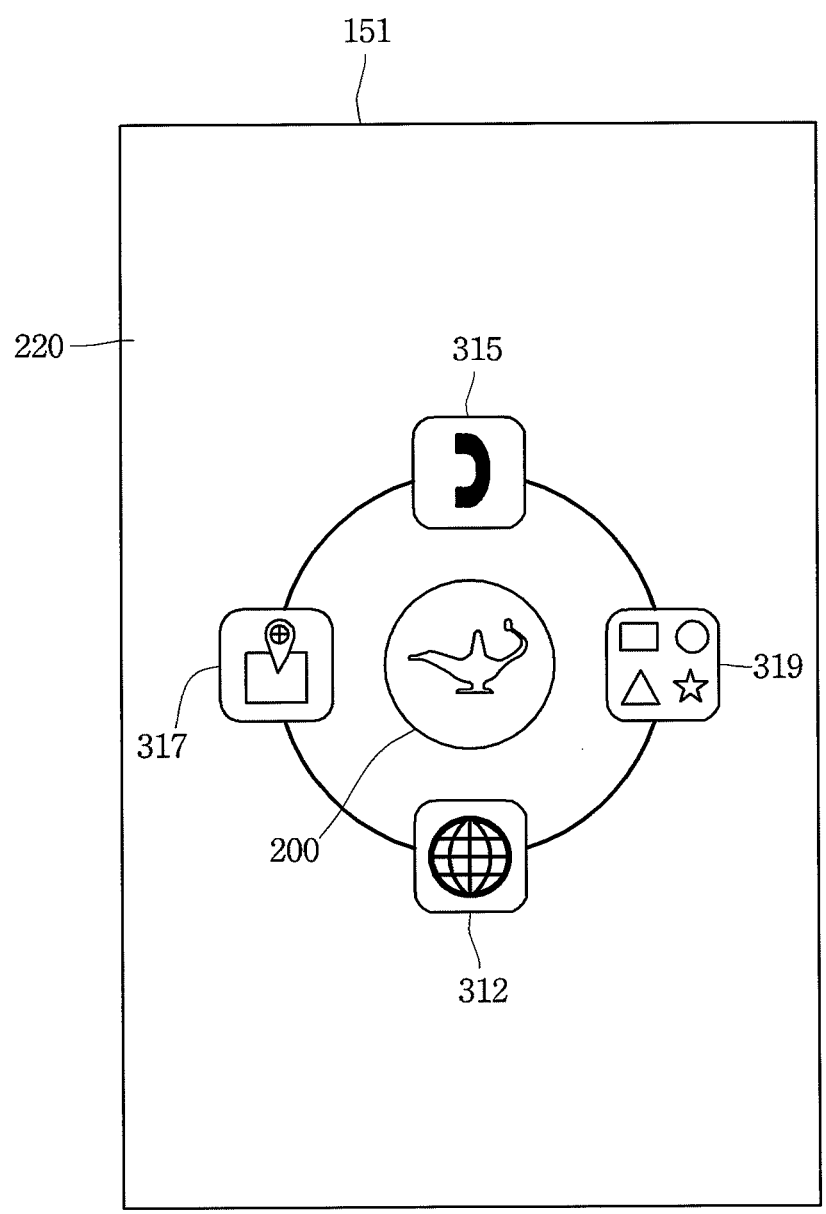
FIG. 50 is a view illustrating a recommendation application display screen corresponding to the current location according to another embodiment of the present invention.
Figure 51:
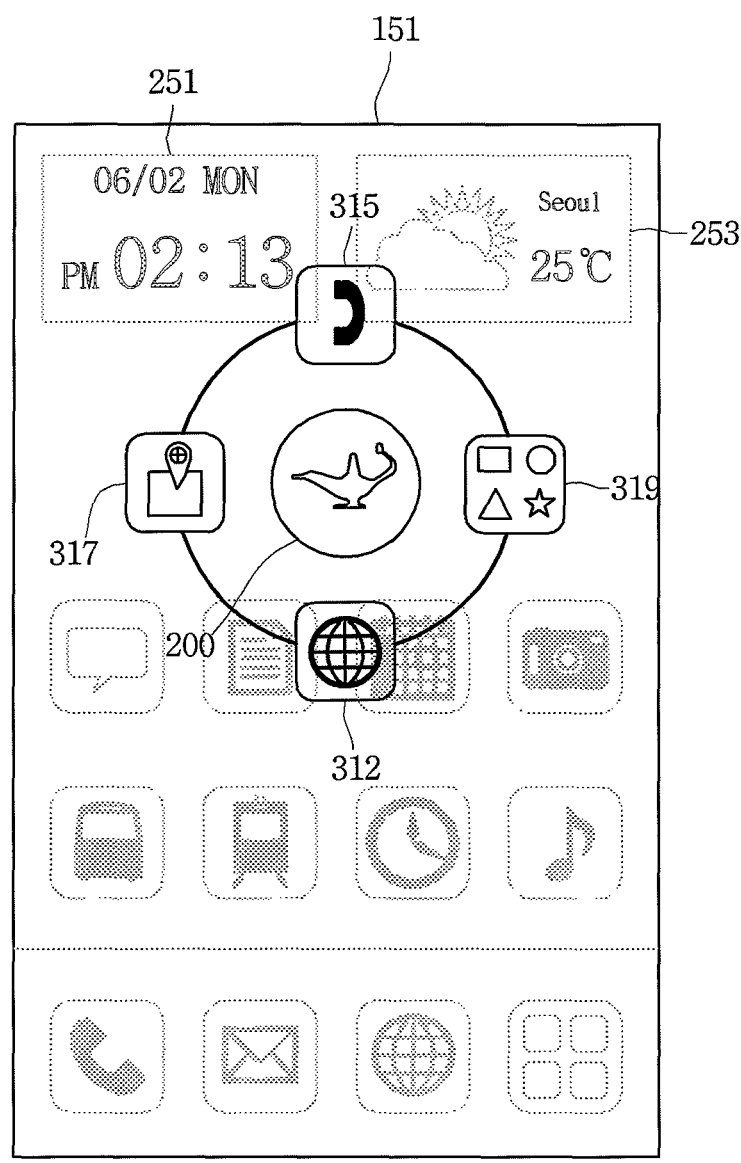
FIG. 51 is a view illustrating a recommendation application display screen corresponding to the current location according to another embodiment of the present invention.

Referring to FIG. 50, when executing an intelligent agent, the controller 180 can obtain the current location information of the user. When the obtained current location information relates to outside the user's home outside, the controller 180 can display an icon for at least one application that is frequently used in the home outside or frequently used on the move, on the simple screen 220. Therefore, the controller 180 can display on the simple screen 220 displayed on the display unit 151, an intelligent agent icon 200, and a call application icon 315, a map application icon 317, a game application icon 319, and a web browser icon 312 as a recommendation application icon for a home outside location. Herein, the call application icon 315 is an icon corresponding to a call application, and the map application icon 317 is an icon corresponding to a map application.

Further, the game application icon 319 is an icon corresponding to a game application. Moreover, the controller 180 can display an application icon corresponding to the obtained current location information on a home screen instead of the simple screen 220. As shown in FIG. 51, the controller 180 can display on the home screen displayed on the display unit 151, the intelligent agent icon 200, and the call application icon 315, the map application icon 317, the game application icon 319, and the web browser icon 312 as a recommendation application icon for a home outside location. In addition, the controller 180 can distinguish the intelligent agent icon 200 according to an intelligent agent execution, the call application icon 315, the map application icon 317, the game application icon 319, and the web browser icon 312 from other objects of the home screen and then display them. For example, the controller 180 can activate and display the intelligent agent icon 200 according to an intelligent agent execution, the call application icon 315, the map application icon 317, the game application icon 319, and the web browser icon 312 from other objects of the home screen and then deactivate and display the other objects of the home screen.

As another embodiment, when executing an intelligent agent, the controller 180 can obtain the current location information of the terminal 100 and information on a movement of the terminal 100. Then, the controller 180 can display an icon for at least one recommendation function corresponding to the obtained current location information and the information on a movement of the terminal 100 or execute at least one function and application. Herein, an icon for at least one recommendation function corresponds to a specific application icon or a menu window for a specific function.

As an embodiment, when executing an intelligent agent, if the obtained current location information of the terminal 100 is the user's running course and the obtained information on a movement of the terminal 100 is the user's running speed, the controller 180 can execute a jogging application. Then, the controller 180 can track the user's jogging history based on the executed jogging application. In addition, the controller 180 can play music suited for jogging exercise.

As another embodiment, when executing an intelligent agent, if the obtained the current location information of the terminal 100 is a vehicle road and the obtained information on a movement of the terminal 100 is a vehicle speed, the controller 180 can execute a navigation application. Then, the controller 180 can display at least one selection window for the user's important destination from the executed navigation application screen. In addition, the controller 180 can guide a path for the selected destination through the executed navigation application based on the user input for the displayed selection window.

Description for a recommendation function corresponding to the current location is just exemplary and is not limited thereto. Accordingly, various operations and functions can be executed through an intelligent agent of the terminal 100 according to user's or designer's setting and the obtained current location.

As an eighth embodiment, a function performance of an intelligent agent according to the user input on a specific application screen of the terminal 100 is described. The controller 180 can display a screen for the executed specific application on the display unit 151. The controller 180 can obtain the user input corresponding to an intelligent agent from a screen for a specific application. Further, the controller 180 can display a menu window for at least one function or perform at least one function corresponding to the specific application and the obtained user input.

Figure 53:
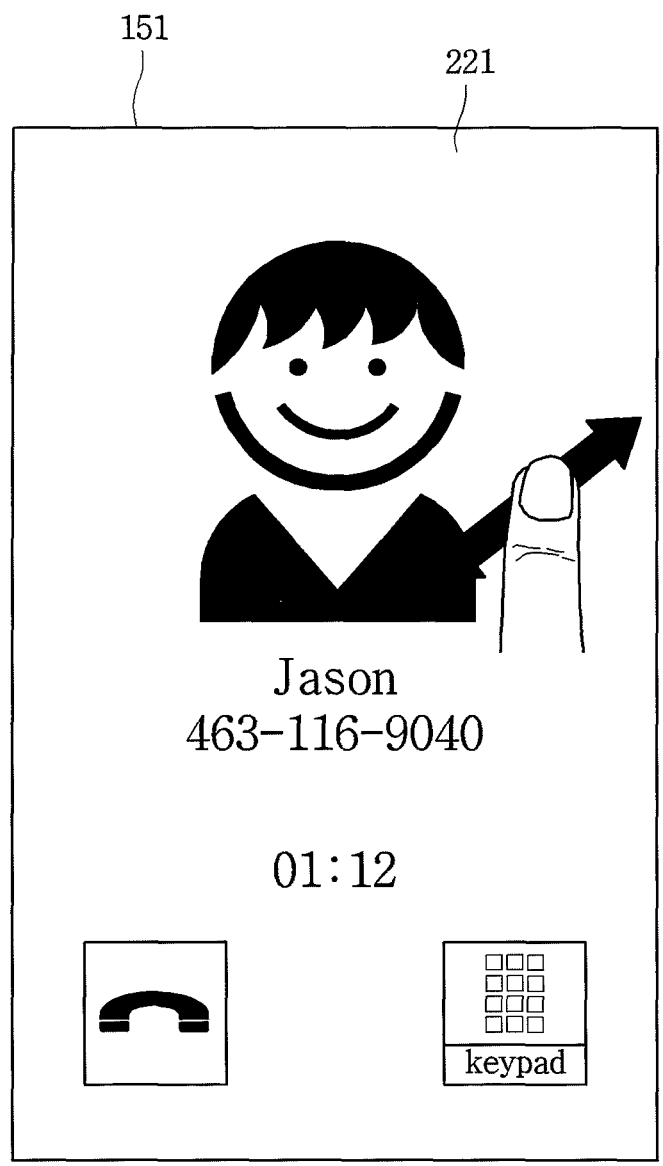
FIG. 53 is a view illustrating the user input for a screen during a call according to an embodiment of the present invention.
Figure 54:
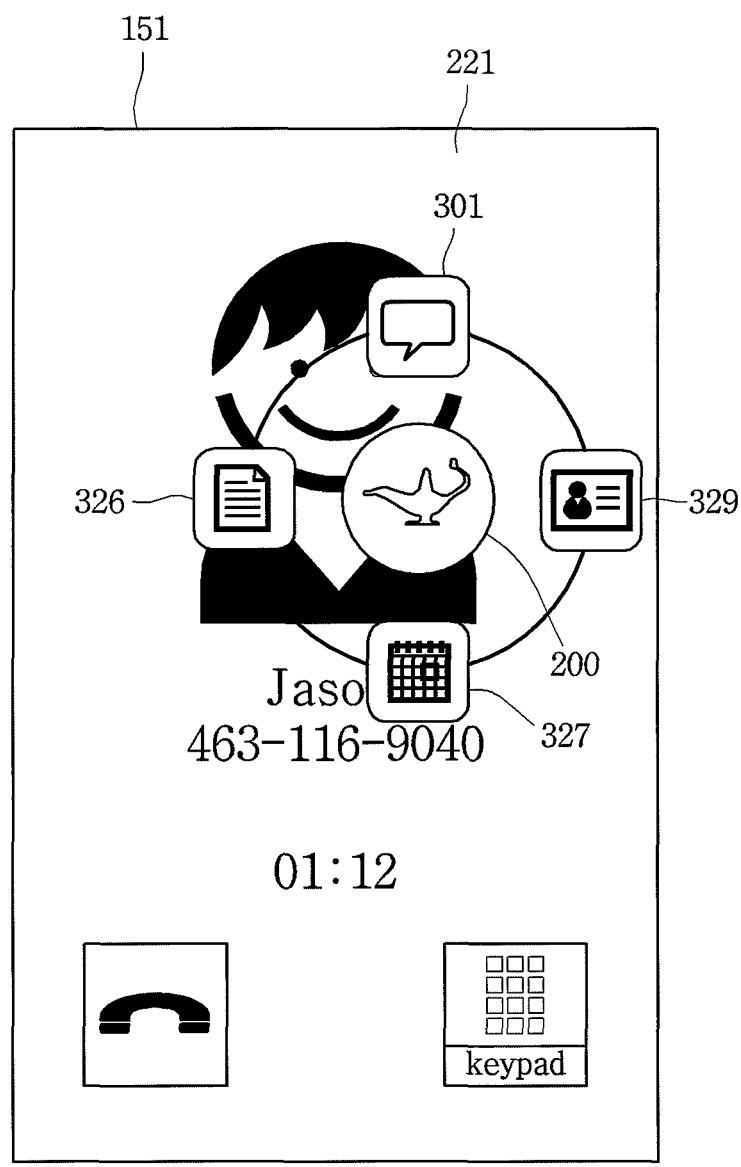
FIG. 54 is a view illustrating a menu window display for a function corresponding to a screen during a call according to an embodiment of the present invention.

An embodiment will be described with reference to FIGS. 52 to 54. In particular, FIG. 52 is a view illustrating a screen during a call according to an embodiment of the present invention, FIG. 53 is a view illustrating the user input for a screen during a call according to an embodiment of the present invention, and FIG. 54 is a view illustrating a menu window display for a function corresponding to a screen during a call according to an embodiment of the present invention.

Figure 52:
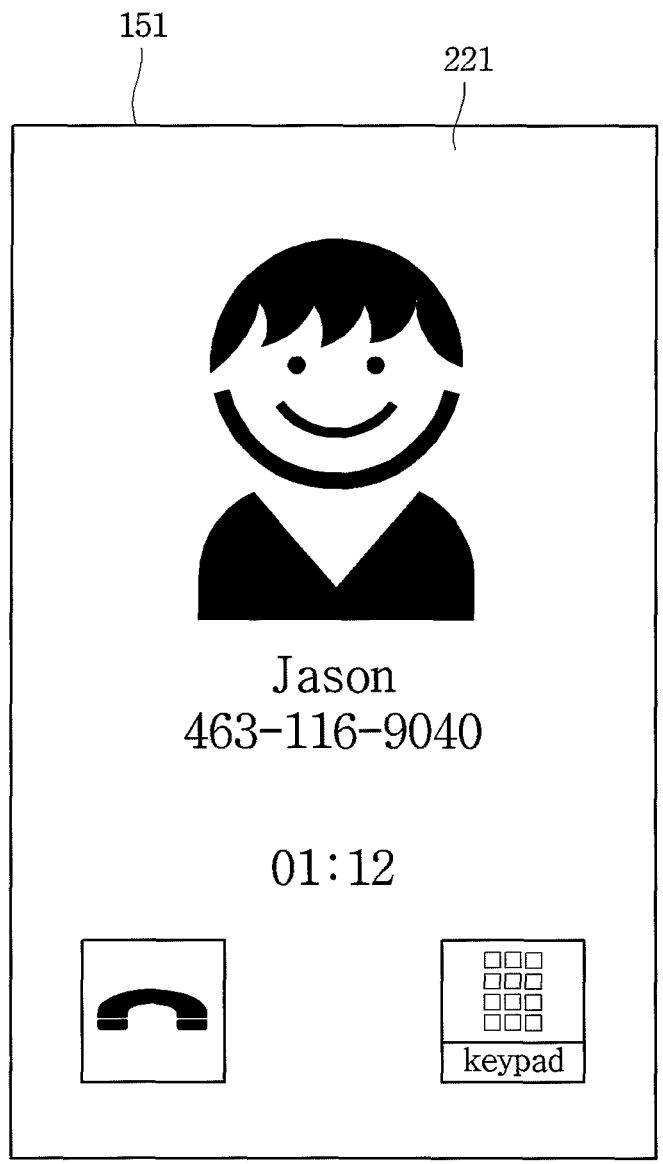
FIG. 52 is a view illustrating a screen during a call according to an embodiment of the present invention.

Referring to FIG. 52, the controller 180 can display a screen 221 during a call according to a call application execution on the display unit 151. As shown in FIG. 53, the controller 180 can obtain a touch input rubbing a partial area of the screen 221 during a call as a first user input for executing an intelligent agent. When obtaining the user input rubbing a partial area of the screen 221 during a call, the controller 180 can execute an intelligent agent to display an available menu window during a call or an icon for an application that the user uses during a call. Then, the controller 180 can display on the display unit 151 an available menu window during a call or an icon for an application that the user uses during a call. For example, as shown in FIG. 54, the controller 180 can display, on the screen 221 during a call, an intelligent agent icon 200, and a message application icon 301, a memo application icon 326, a schedule application icon 327, and a contact application icon 329 as at least one application for an available function during a call.

Herein, the memo application icon 326 is an icon corresponding to a memo application, and the contact application icon 329 is an icon corresponding to a contact application. Then, the controller 180 can obtain the user input for selecting at least one of the intelligent agent icon 200 displayed on the screen 221 during a call, the message application icon 301, the memo application icon 326, the schedule application icon 327, and the contact application icon 329. The controller 180 can execute an application corresponding to the selected application icon. Additionally, the controller 180 can perform a specific function or a specific operation corresponding to the selected application icon.

Figure 58:
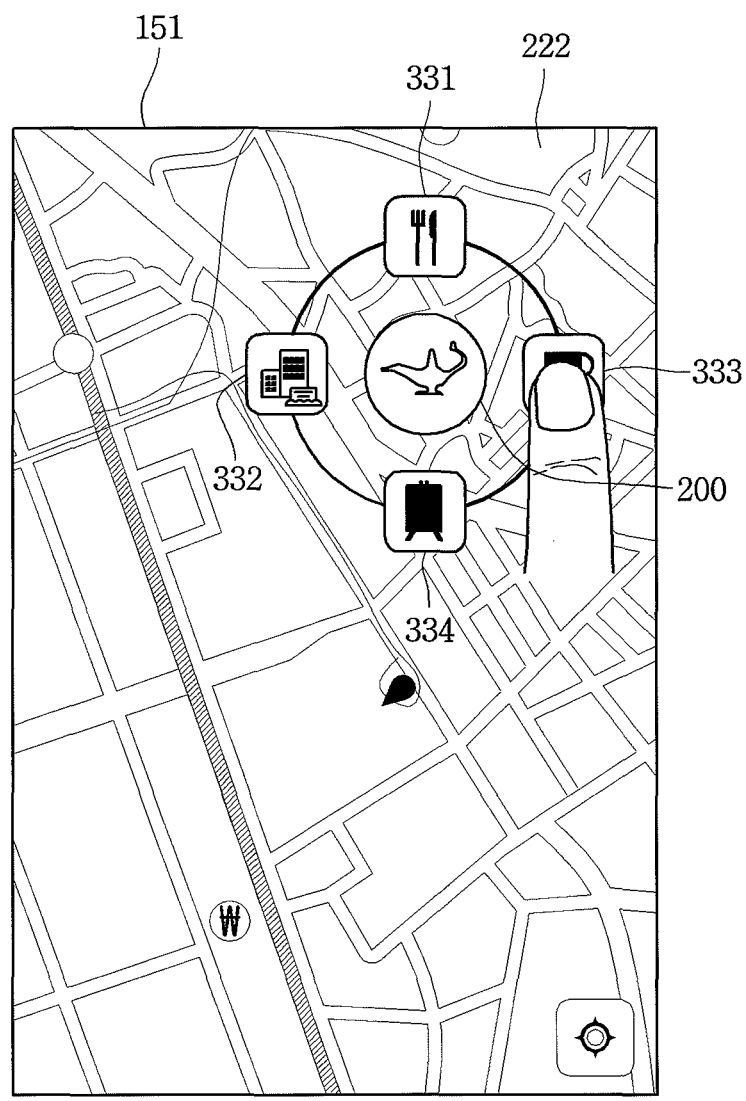
FIG. 58 is a view illustrating the user input for a menu window according to an embodiment of the present invention.
Figure 59:
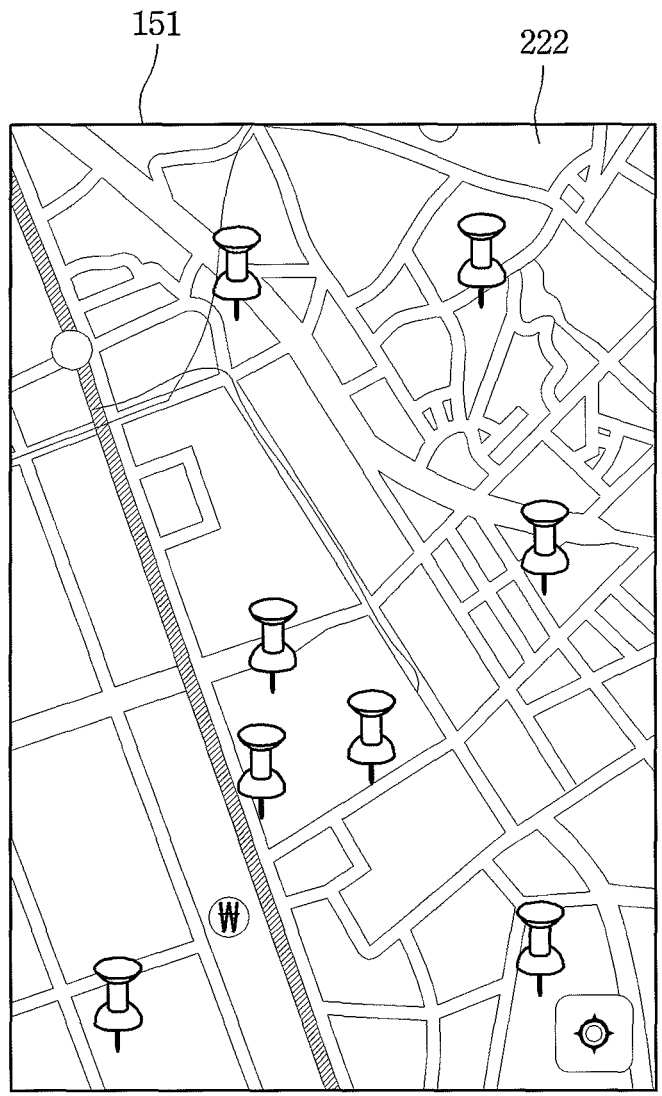
FIG. 59 is a view illustrating a cafe location display according to an embodiment of the present invention.

Another embodiment will be described with reference to FIGS. 55 to 59. In particular, FIG. 55 is a view illustrating a map application operation screen according to an embodiment of the present invention, FIG. 56 is a view illustrating the user input for a map application operation screen according to an embodiment of the present invention, FIG. 57 is a view illustrating a menu window display for a function corresponding to a map application operation screen according to an embodiment of the present invention, FIG. 58 is a view illustrating the user input for a menu window according to an embodiment of the present invention, and FIG. 59 is a view illustrating a cafe location display according to an embodiment of the present invention.

Figure 55:
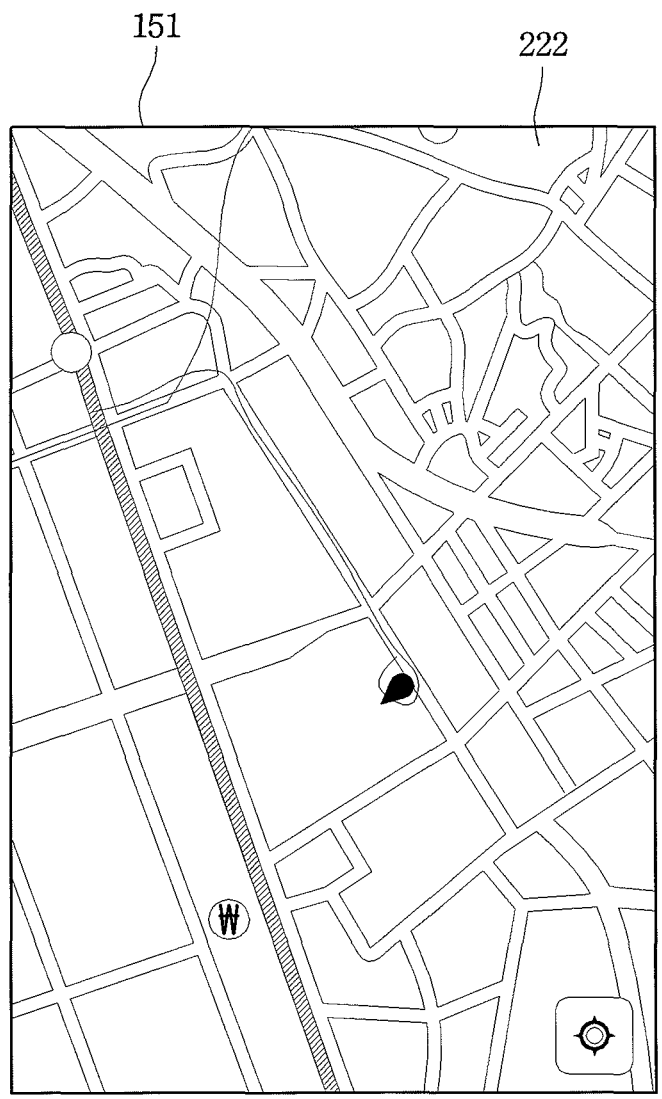
FIG. 55 is a view illustrating a map application operation screen according to an embodiment of the present invention.
Figure 56:
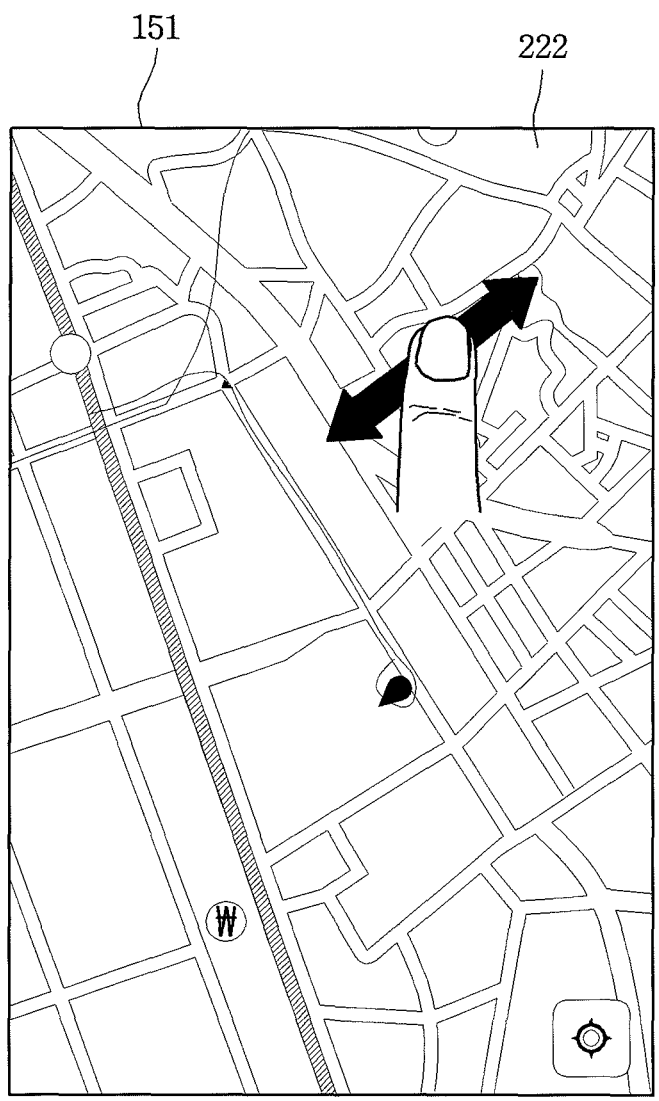
FIG. 56 is a view illustrating the user input for a map application operation screen according to an embodiment of the present invention.

Referring to FIG. 55, the controller 180 can display on the display unit 151 a map application operation screen 222 according to a map application execution. The map application operation screen 222 can display a map for the current location or a specific location. As shown in FIG. 56, the controller 180 can obtain a touch input rubbing a partial area of the map application operation screen 222 as a first user input for executing an intelligent agent. When obtaining the user input rubbing a partial area of the map application operation screen 222, the controller 180 can execute an intelligent agent to display at least one function corresponding to a map application on the display unit 151. Then, the controller 180 can display a menu window for at least one function corresponding to a train application, on the display unit 151.

Figure 57:
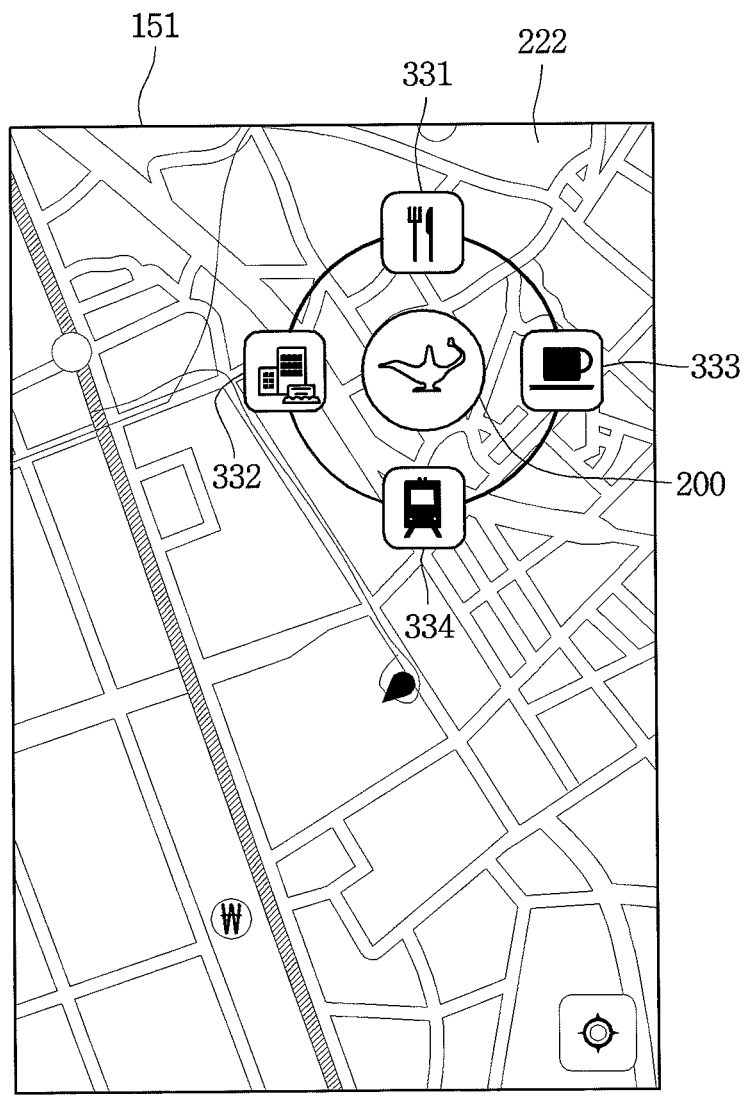
FIG. 57 is a view illustrating a menu window display for a function corresponding to a map application operation screen according to an embodiment of the present invention.

For example, as shown in FIG. 57, the controller 180 can display an intelligent agent icon 200 and category icons 331, 332, 333, and 334 respectively representing a plurality of searchable categories on the map application operation screen 222. The controller 180 can display a restaurant icon 331, a building icon 332, a cafe icon 333, and a public transportation icon 334 with the plurality of category icons 331, 332, 333, and 334. Herein, the restaurant icon 331 is an icon for displaying the location of a restaurant on the map application operation screen 222, and the building icon 332 is an icon for displaying the location of a specific building on the map application operation screen 222.

Further, the cafe icon 333 is an icon for displaying the location of a cafe on the map application operation screen 222, and the public transportation icon 334 is an icon for displaying a public transportation location on the map application operation screen 222. Then, the controller 180 can obtain the user input for selecting at least one of the intelligent agent icon 200, the restaurant icon 331, the building icon 332, the cafe icon 333, and the public transportation icon 334, which are displayed on the map application operation screen 222. The controller 180 can perform an operation corresponding to the selected icon. For example, as shown in FIG. 58, the controller 180 can obtain the user input selecting the cafe icon 333 displayed on the map application operation screen 222. Accordingly, as shown in FIG. 59, the controller 180 can display a marker on a cafe location on a map displayed on the map application operation screen 222 in correspondence to the selected cafe icon 333.

Figure 60:
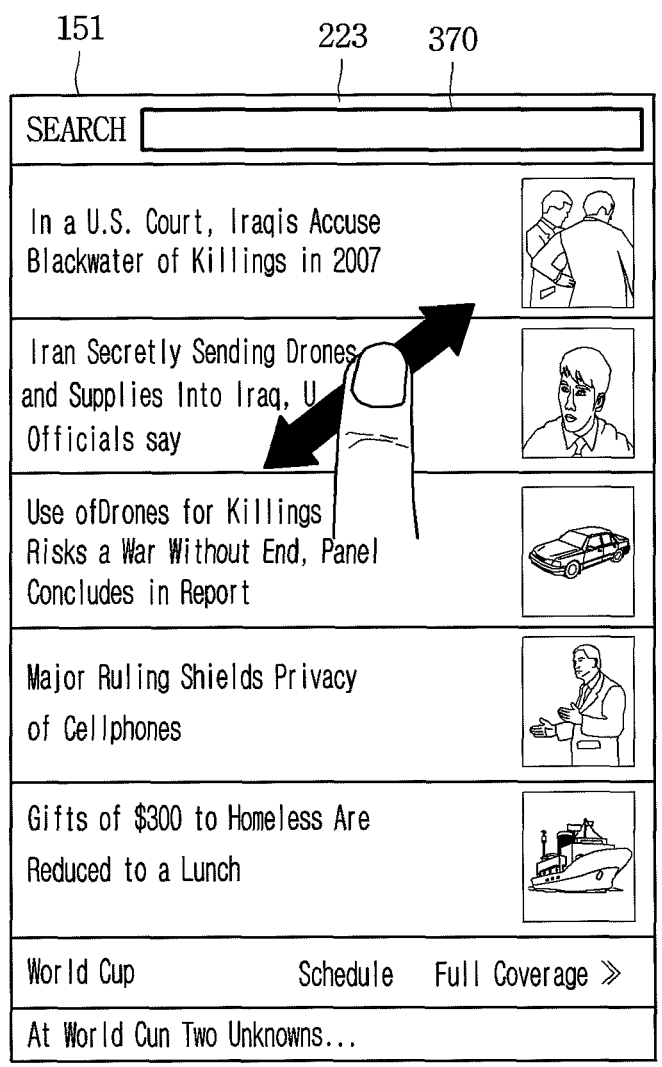
FIG. 60 is a view illustrating the user input for a web browser screen according to an embodiment of the present invention.
Figure 61:
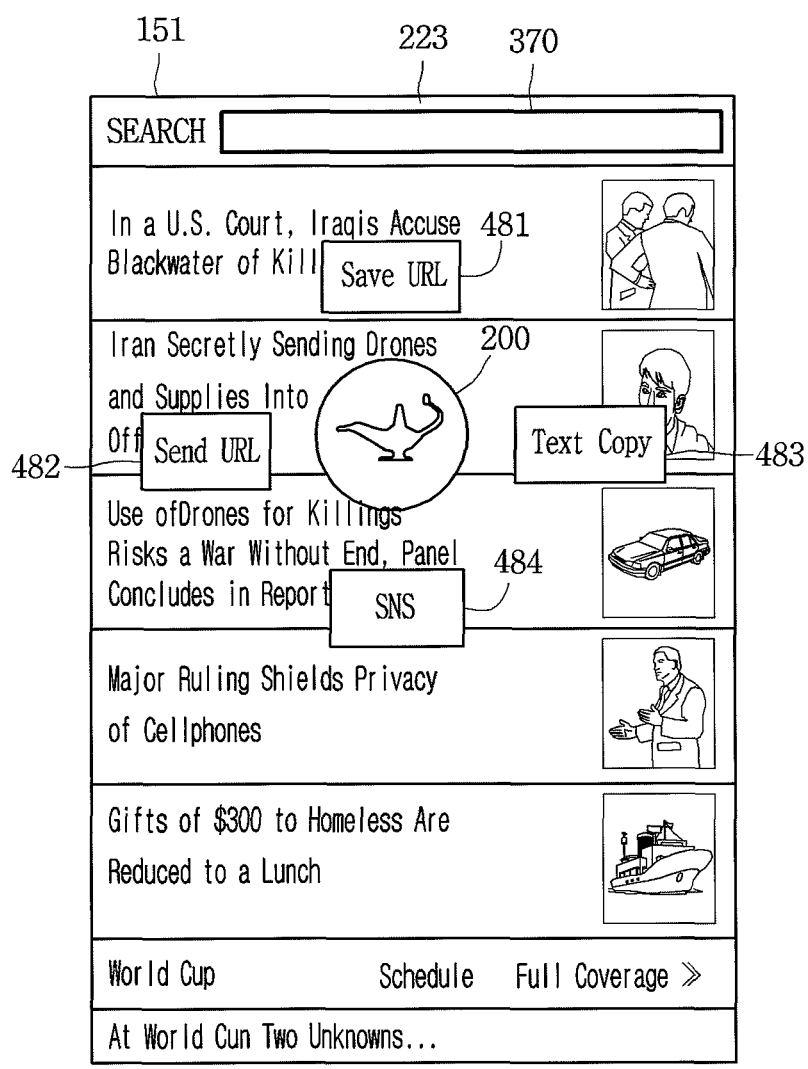
FIG. 61 is a view illustrating a menu window display for a function corresponding to a web browser screen according to an embodiment of the present invention.
Figure 62:
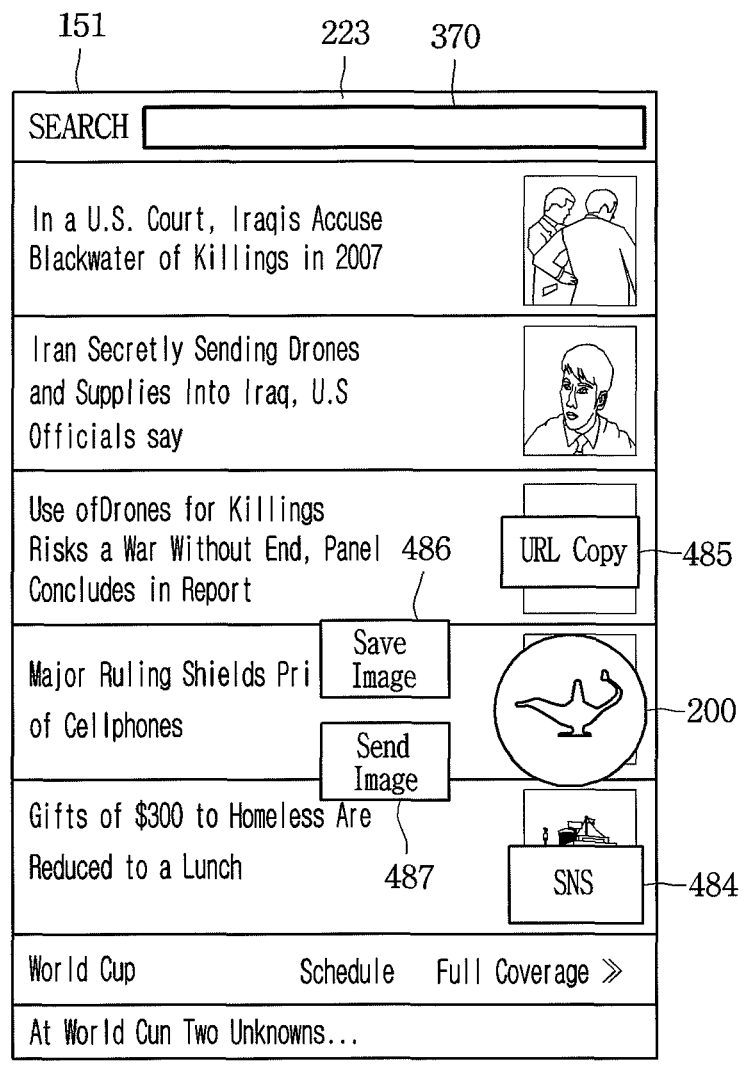
FIG. 62 is a view illustrating a menu window display for a function corresponding to a web browser screen according to another embodiment of the present invention.
Figure 63:
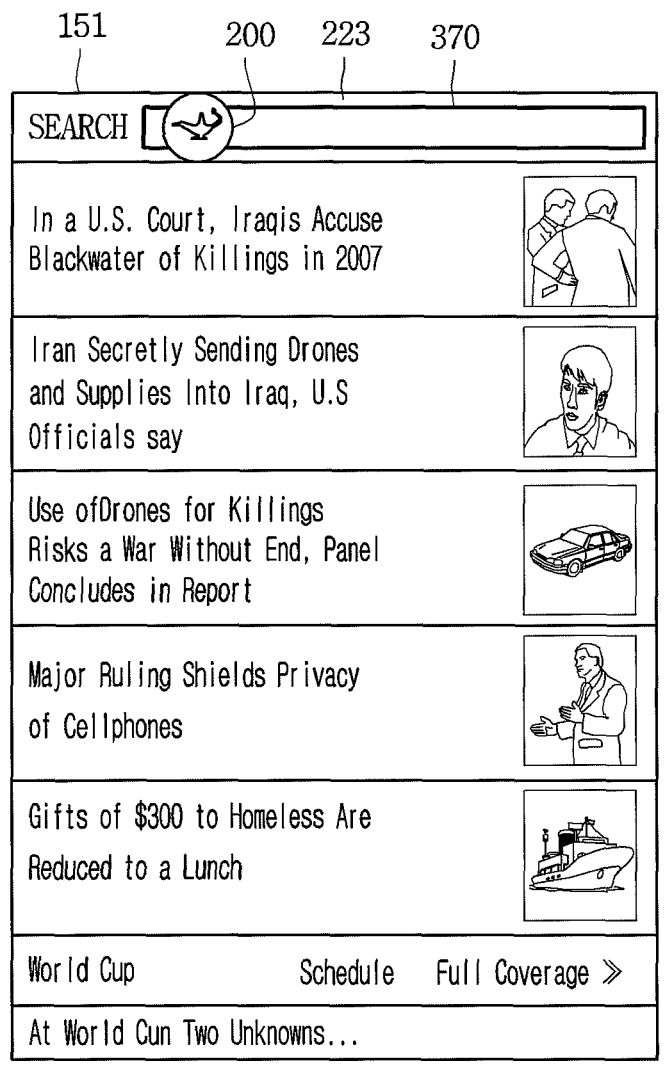
FIG. 63 is a view illustrating the user input for a web browser screen according to another embodiment of the present invention.
Figure 64B:
FIG. 64B is a view illustrating a keyword auto input according to another embodiment of the present invention.

Another embodiment will be described with reference to FIGS. 60 to 65. FIG. 60 is a view illustrating the user input for a web browser screen according to an embodiment of the present invention, FIG. 62 is a view illustrating a menu window display for a function corresponding to a web browser screen according to another embodiment of the present invention, FIG. 63 is a view illustrating the user input for a web browser screen according to another embodiment of the present invention, FIG. 64A is a view illustrating a keyword auto input according to an embodiment of the present invention, and FIG. 64B is a view illustrating a keyword auto input according to another embodiment of the present invention.

Referring to FIG. 60, the controller 180 can display a web browser screen 223 according to a web browser application execution on the display unit 151. The controller 180 can obtain a touch input rubbing a specific area of the web browser screen 223 as a first user input for executing an intelligent agent. When obtaining the user input rubbing a specific area of the web browser screen 223, the controller 180 can execute an intelligent agent for displaying a menu window for a function related to web browsing on the display unit 151. The controller 180 can display a menu window for a function relating to web browsing on the display unit 151.

As one embodiment, when a specific area of the web browser screen 223 corresponding to a first user input is a text area, the controller 180 can display a menu window for a function relating to text on the display unit 151. Accordingly, as shown in FIG. 61, the controller 180 can display, on the web browser screen 223, an intelligent agent icon 200 and a save URL 481, a send URL 482, a copy text 483, and a send SNS 484 as a menu window for a function relating to text. Herein, the save URL 482 is a menu window for saving the Uniform Resource Locator (URL) of text corresponding to the first user input, the send URL 482 is a menu window for sending the URL of a text corresponding to the first user input, the copy text 483 is a menu window for copying a text corresponding to the first user input, and the send SNS 484 is a menu window for sending a text corresponding to the first user input to Social Networking Service (SNS).

As another embodiment, when a specific area of the web browser screen 223 corresponding to the first user input is an image area, the controller 180 can display a menu window for a function relating to an image on the display unit 151. Accordingly, as shown in FIG. 62, the controller 180 can display, on the web browser screen 223, an intelligent agent icon 200, and a copy URL 485, a save image 486, a send image 487, and a send SNS 484 as a menu window for a function relating to image. Herein, the copy URL 485 is a menu window for copying the URL of an image corresponding to the first user input, the save image 486 is a menu window for saving an image corresponding to the first user input, the send image 487 is a menu window for sending an image corresponding to the first user input, and the send SNS 484 is a menu window for sending an image corresponding to the first user input to Social Networking Service (SNS).

As another embodiment, when a specific area of the web browser screen 223 corresponding to the first user input is an input window 370, the controller 180 can input a specific keyword to the input window 370. Herein, the input window 370 corresponds to a window for inputting characters. Then, the controller 180 can input a keyword that the user sets or a frequently input keyword to the input window 370. For example, the controller 180 can input a frequently input keyword to the input window 370 at a specific time and in a specific place. Additionally, the controller 180 can input a specific keyword input to the input window 370 based on the user's keyword input history.

For example, as shown in FIG. 63, when obtaining the user input moving the intelligent agent icon 200 to the input window 370, the controller 180 can input a specific keyword to the input window 370. As shown in FIG. 64A, the controller 180 can input a lottery number, that is, a keyword that the user inputs periodically at a specific time of a specific day, to the input window 370. Additionally, as shown in FIG. 64B, the controller 180 can input a stock price index, that is, a keyword that the user saves, to the input window 370 based on the user's input history.

Description for an intelligent agent operation of the terminal 100 corresponding to the web browser screen is exemplary and is not limited thereto. Accordingly, various functions relating to a web browser can be executed through an intelligent agent of the terminal 100 according to the user's or designer's setting and the user's keyword input history.

As a ninth embodiment, a function performance of an intelligent agent based on the user input for a displayed history as displaying the voice command history according to an intelligent agent execution of the terminal 100 is described. When obtaining the first user input for executing an intelligent agent, the controller 180 can display a voice command history screen 210 for the user's voice command history on the display unit 151. Then, the controller 180 can display a history of voice commands from the user previously and a response history corresponding to the user's voice command. When obtaining the user input for selecting one message in a voice command history displayed on the display unit 151, the controller 180 can perform an operation corresponding to the selected message through an intelligent agent. This will be described with reference to FIG. 65.

Figure 65:
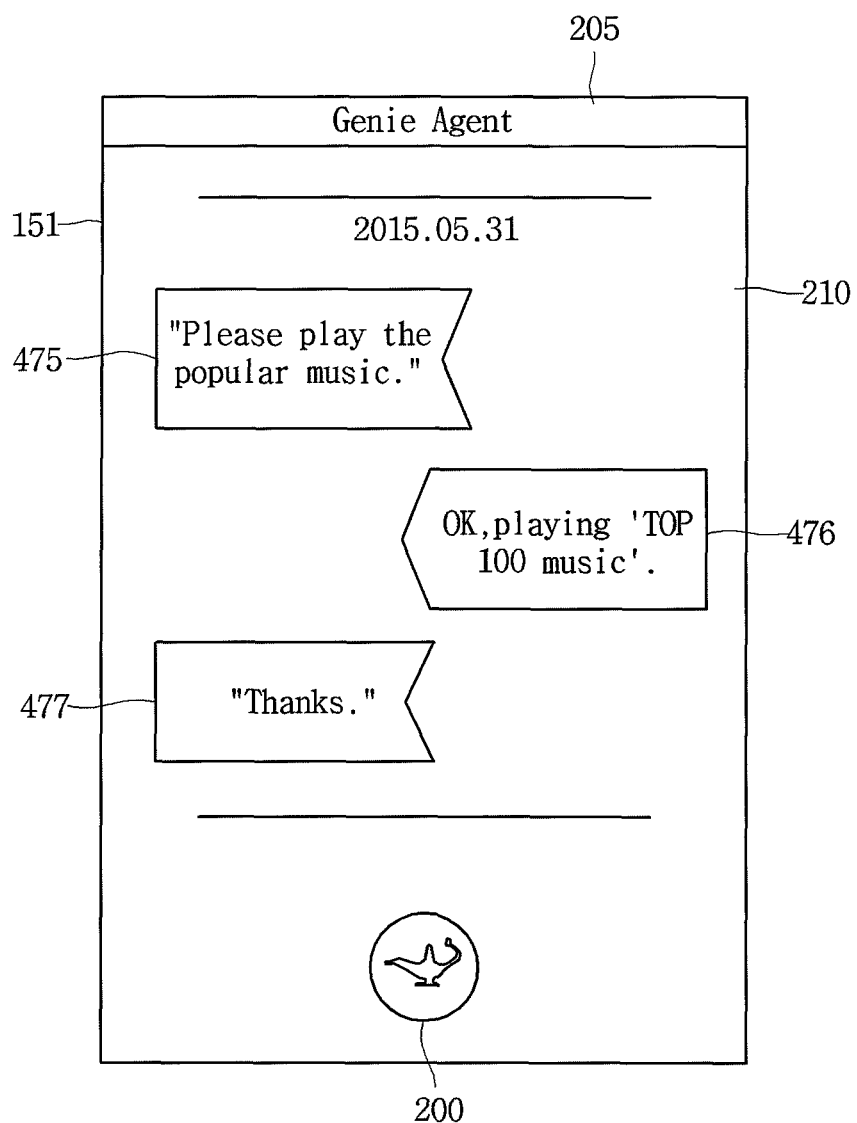
FIG. 65 is a view illustrating a voice command history screen according to an embodiment of the present invention.

In particular, FIG. 65 is a view illustrating a voice command history screen according to an embodiment of the present invention. Referring to FIG. 65, the controller 180 can obtain a first user input for executing an intelligent agent. For example, the controller 180 can obtain a first user input rubbing a partial area of a screen of the display unit 151 and obtain a first user input of the above-mentioned various methods. When obtaining the first user input, the controller 180 can display a voice command history screen 210 for the user's voice command history on the display unit 151. The controller 180 can display, on the voice command history screen 210, a first voice input 475 for a history of user's voice commands, a second voice input 477, and a first voice response 476 that is a response of the terminal 100 for the user's voice command.

For example, as shown in FIG. 65, the voice command history screen 210 includes a first voice response 475 that the terminal 100 plays top 100 music in response to the first voice input 476 for playing popular music and a second voice input 477 for the user saying "thanks." Then, the controller 180 can perform an operation corresponding to a selected message through an intelligent agent based on the user input for selecting one of the first voice input 475, the second voice input 477, and the first voice response 476 displayed on the voice command history screen 210. When obtaining the user input for selecting the first voice input 475 or the first voice response 476, the controller 180 can play top 100 music.

Moreover, when obtaining the user input scrolling the voice command history screen 210 displayed on the display unit 151, the controller 180 can change a message for a voice command history displayed on the voice command history screen 210 in correspondence to the obtained user input. For example, when obtaining the user input scrolling down the voice command history screen 210 displayed on the display unit 151, the controller 180 can display a message for a previous history of a message for a voice command history displayed on the display unit 151, and when obtaining the user input scrolling up the voice command history screen 210, display a message for a history after a message for the voice command history displayed on the display unit 151.

Description for the voice command history screen is exemplary and is not limited thereto. Accordingly, a voice command history screen display according to an intelligent agent execution and an operation according thereto may be set variously according to the user's or designer's selection. Accordingly, the terminal 100 can display a voice command history screen for a voice command history under various conditions and operate variously based on the user input for the displayed voice command history.

Moreover, the controller 180 can obtain the user input for an operation of the microphone 122 of the terminal 100 during an intelligent agent application program operation, and operate the microphone 122 according to the obtained user input. Then, the controller 180 can display on the display unit 151 a voice recognition display representing whether the microphone 122 operates.

This will be described with reference to FIGS. 66 and 67. In particular, FIG. 66 is a view illustrating a voice recognition display according to an embodiment of the present invention, and FIG. 67 is a view illustrating a voice recognition display according to another embodiment of the present invention.

Figure 66:
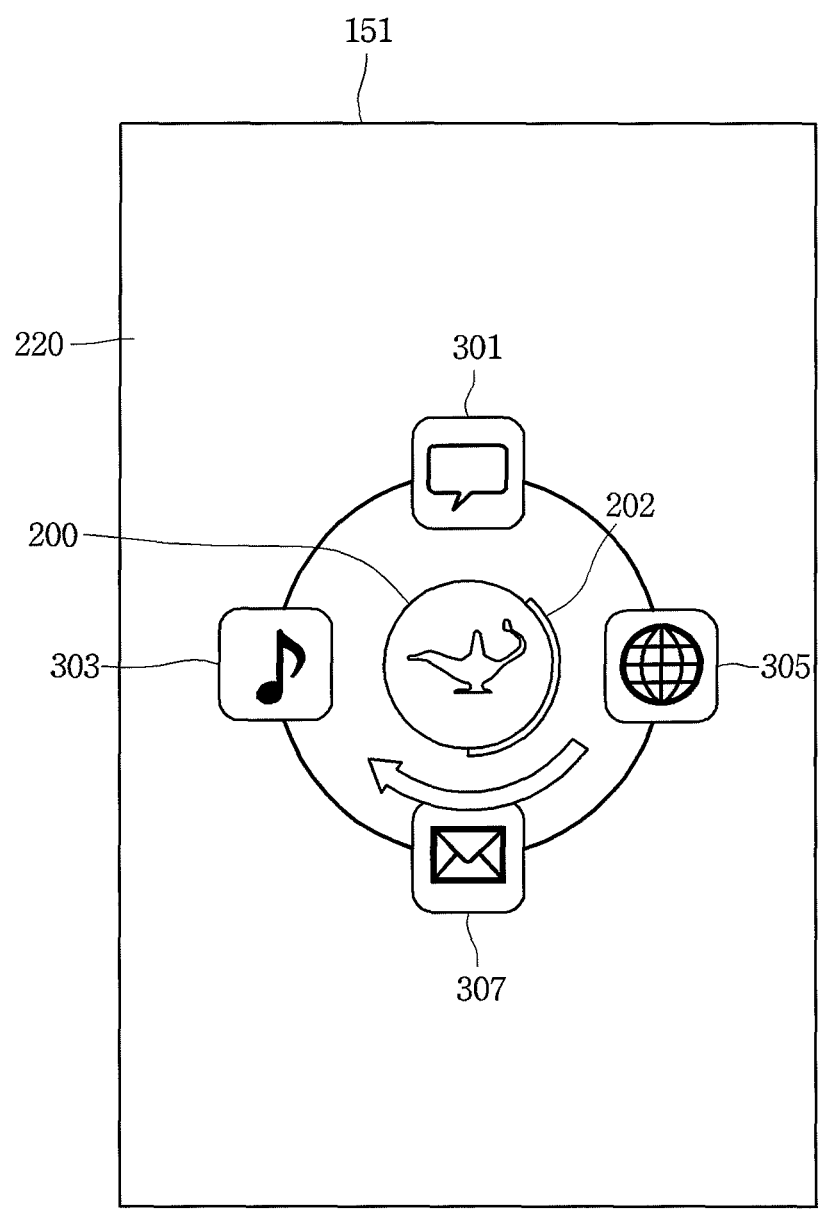
FIG. 66 is a view illustrating a voice recognition display according to an embodiment of the present invention.

As one embodiment, referring to FIG. 66, the controller 180 can display a simple screen 220 according to an intelligent agent execution on the display unit 151. The controller 180 can display a voice recognition display 202 representing that the microphone 122 is in operation in correspondence to an intelligent agent icon 200. The controller 180 can display that the voice recognition display 202 rotates around the circumference of the intelligent agent icon 200 during an operation of the microphone 122. Herein the voice recognition display 202 may be a display representing the terminal 100 is capable of recognizing the user's voice.

Figure 67:
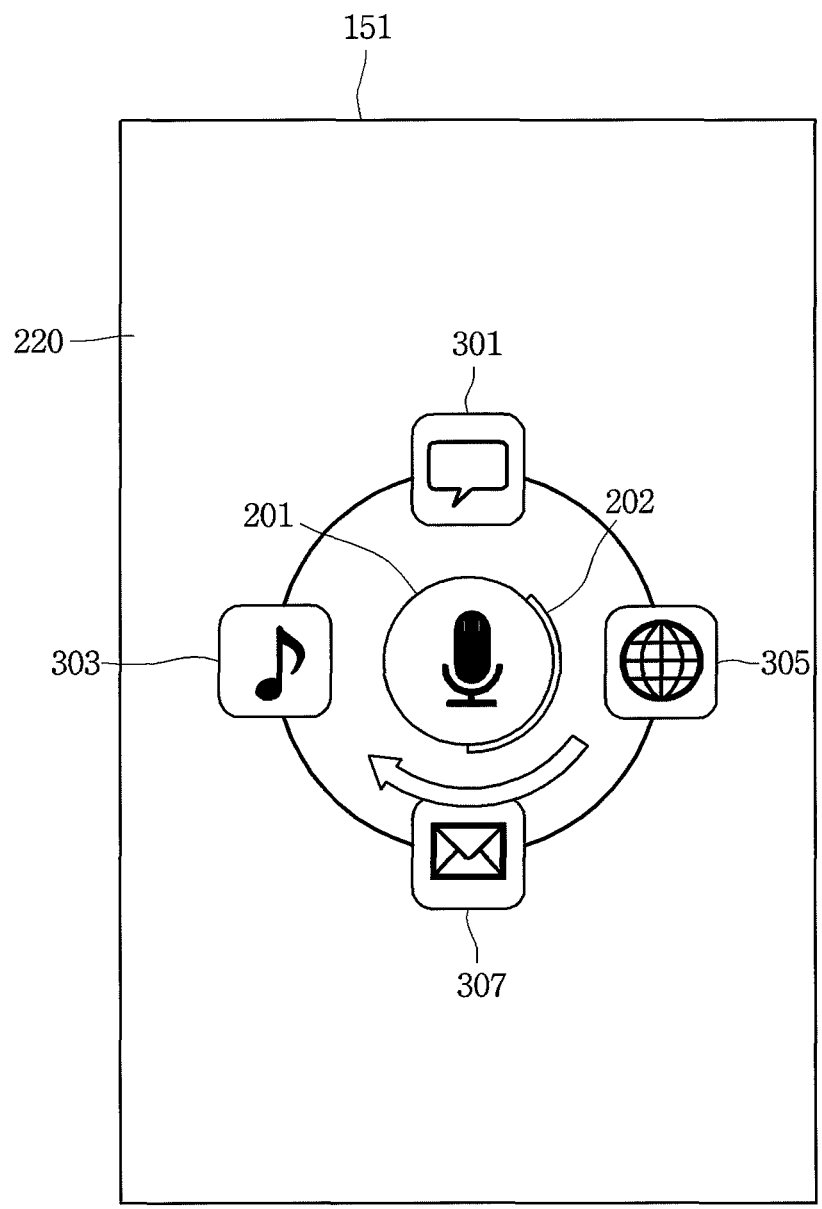
FIG. 67 is a view illustrating a voice recognition display according to another embodiment of the present invention.

As another embodiment, referring to FIG. 67, the controller 180 can display a simple screen 220 according to an intelligent agent execution on the display unit 151. The controller 180 can display a microphone icon 201 at the position of the intelligent agent icon 200 during an operation of the microphone 122. The microphone icon 201 can perform the same operation and function as the intelligent agent icon 200. Additionally, the controller 180 can display a voice recognition display 202 representing that the microphone 122 is in operation in correspondence to the microphone icon 201. The controller 180 can display that the voice recognition display 202 rotates around the circumference of the intelligent agent icon 200 during an operation of the microphone 122. Herein, the voice recognition display 202 may be a display representing the terminal 100 is capable of recognizing the user's voice.

Moreover, when the microphone 122 is not in operation, if obtaining the user input touching the intelligent agent icon 200 or a microphone icon 201 displayed on the display unit 151, the controller 180 can operate the microphone 122. Accordingly, the controller 180 can operate in a state of recognizing the user's voice. In addition, when the microphone 122 is not in operation, if obtaining a movement of the terminal 100 through the sensing unit 140, the controller 180 can operate the microphone 122.

Accordingly, the controller 180 can operate in a state of recognizing the user's voice. For example, the user can shake the terminal as the user input for allowing the terminal 100 to operate in a state of recognizing the user's voice. Moreover, the controller 180 can obtain the user input for terminating an intelligent application program in execution and may terminate an intelligent agent application program in execution.

Figure 68:
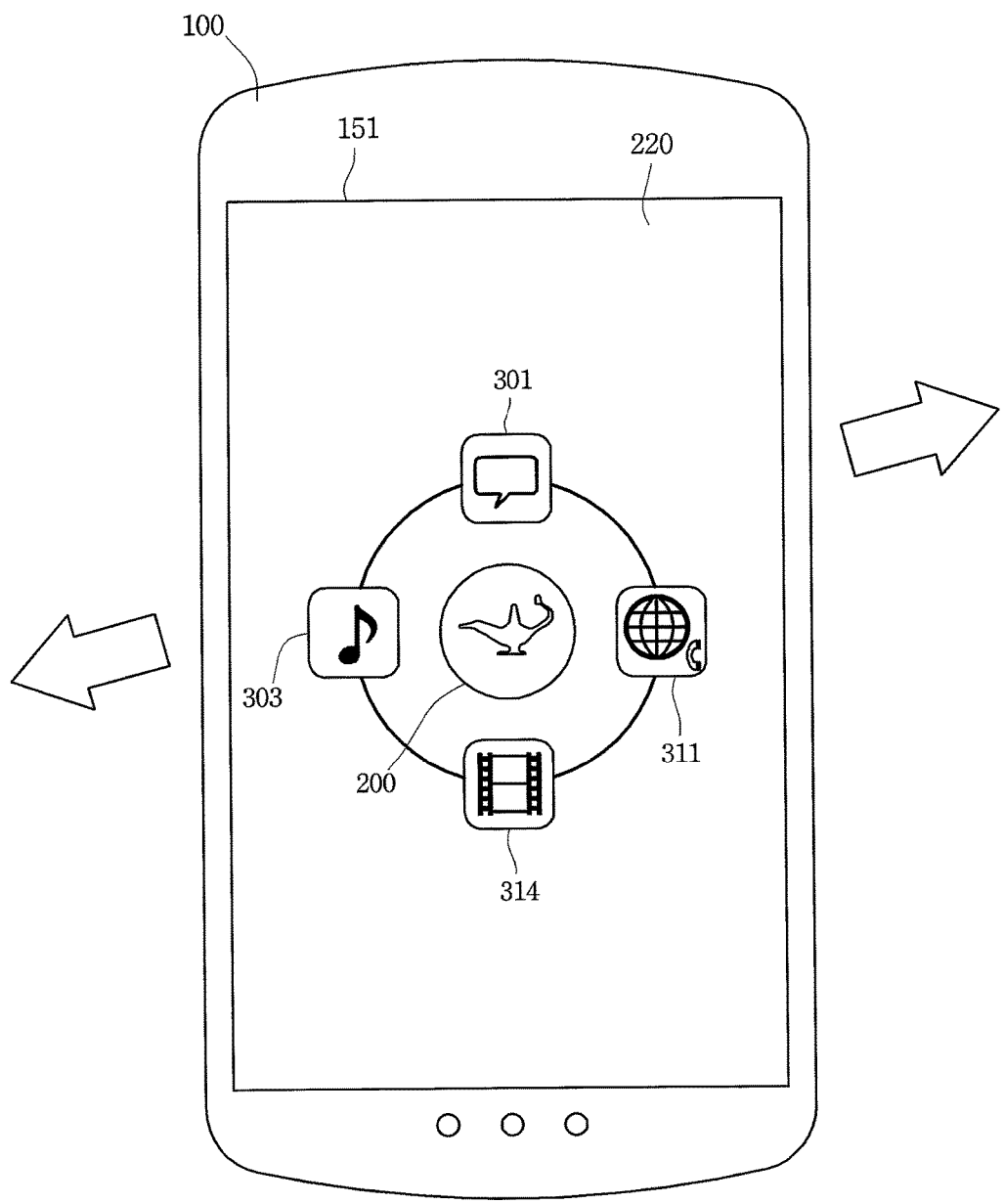
FIG. 68 is a view of the user input for executing an intelligent agent application program according to an embodiment of the present invention.

An embodiment will be described with reference to FIG. 68. In particular, FIG. 68 is a view illustrating the user input for executing an intelligent agent application program according to an embodiment of the present invention. Referring to FIG. 68, the controller 180 can display a simple screen 220 for an intelligent agent in execution on the display unit 151. The controller 180 can obtain a movement of the terminal 100 through the sensing unit 140 and obtain the user input shaking the terminal 100 as the user input for terminating an intelligent agent in execution. Then, when obtaining the user input shaking the terminal 100, the controller 180 can terminate an intelligent agent application program in execution.

Figure 69:
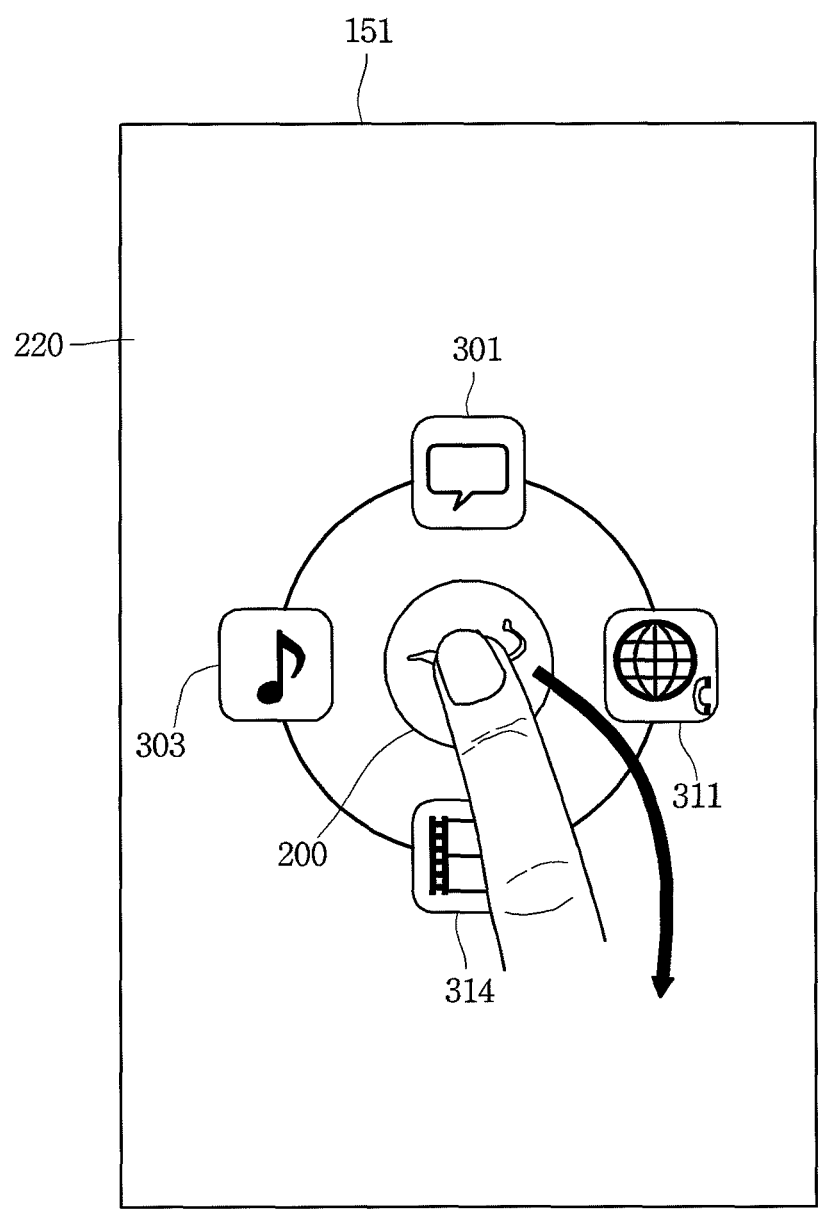
FIG. 69 is a view of the user input for terminating an intelligent agent application program according to another embodiment of the present invention.

Another embodiment will be described with reference to FIG. 69. In particular, FIG. 69 is a view illustrating the user input for terminating an intelligent agent application program according to another embodiment of the present invention. The controller 180 can display a simple menu 220 for an intelligent agent in execution on the display unit 151. The controller 180 can obtain the user input moving an intelligent agent icon 200 displayed on the simple screen 220 by more than a predetermined distance as the user input for terminating an intelligent agent in execution. Then, when obtaining the user input moving the displayed intelligent agent icon 200 by more than a predetermined distance, the controller 180 can terminate an executing intelligent agent application program. Herein, the user input moving the displayed intelligent agent icon 200 by more than a predetermined distance corresponds to the user input moving the intelligent agent icon 200 displayed on the display unit 151 to a blank area of the screen of the display unit 151.

Moreover, the controller 180 can display a guide line 209 for a movement of the intelligent agent icon 200 according to the user input for the intelligent agent icon 200. This will be described with reference to FIG. 70. In particular, FIG. 70 is a view illustrating a guide line display according to an embodiment of the present invention.

Figure 70:
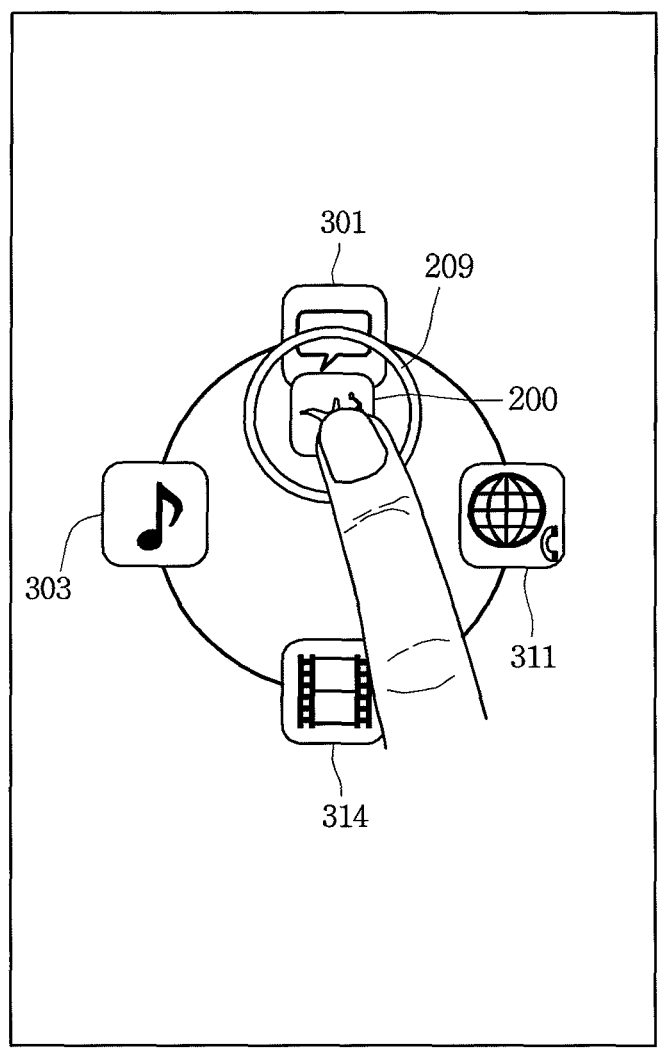
FIG. 70 is a view illustrating a guide line display according to an embodiment of the present invention.

Referring to FIG. 70, the controller 180 can display a guide line 209 in correspondence to the moving intelligent agent icon 200 according to the user input for the intelligent agent icon 200. For example, when performing a specific function or a specific operation according to a movement of the intelligent agent icon 200, the controller 180 can display the guide line 209. Then, when terminating an intelligent agent application program according to a movement of the intelligent agent icon 200, the controller 180 can not display the guide line 209.

Thus, when the intelligent agent icon 200 is out of a predetermined area according to a movement of the intelligent agent icon 200, the controller 180 can not display the guide line 209. Moreover, the controller 180 can obtain the user input for adding an application relating to a function or operation corresponding to an intelligent agent application program. Then, when an intelligent agent application program is executed, the controller 180 can provide a function or operation relating to an added application.

Figure 71:
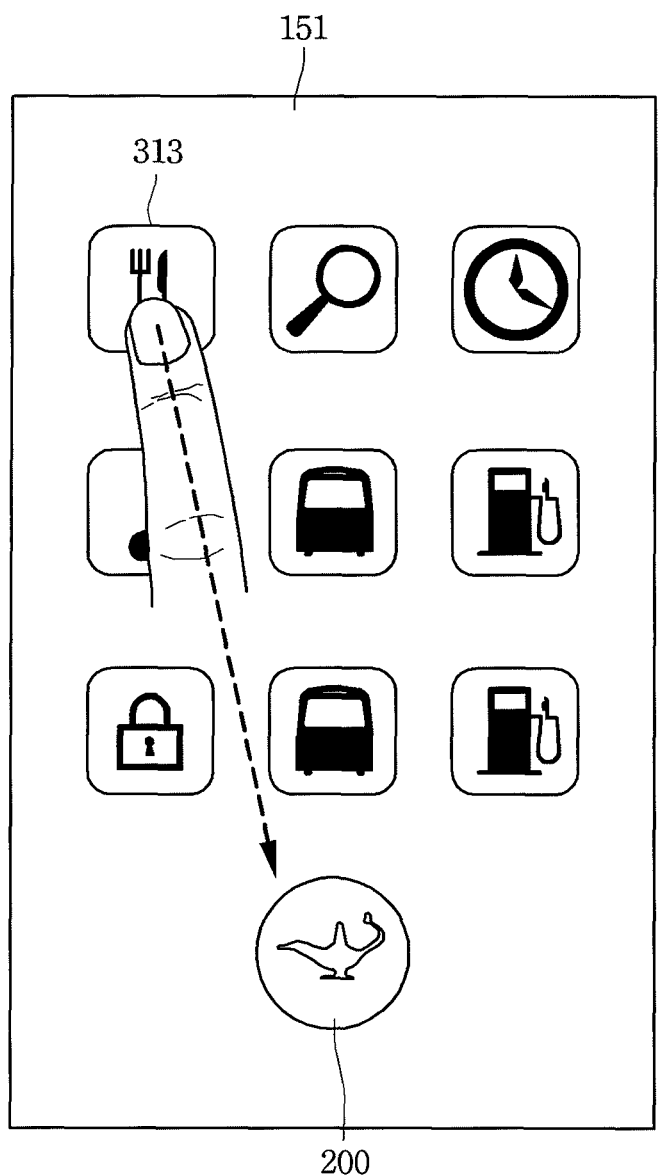
FIG. 71 is a view illustrating a supportable application program for an intelligent agent application program according to an embodiment of the present invention.
Figure 72:
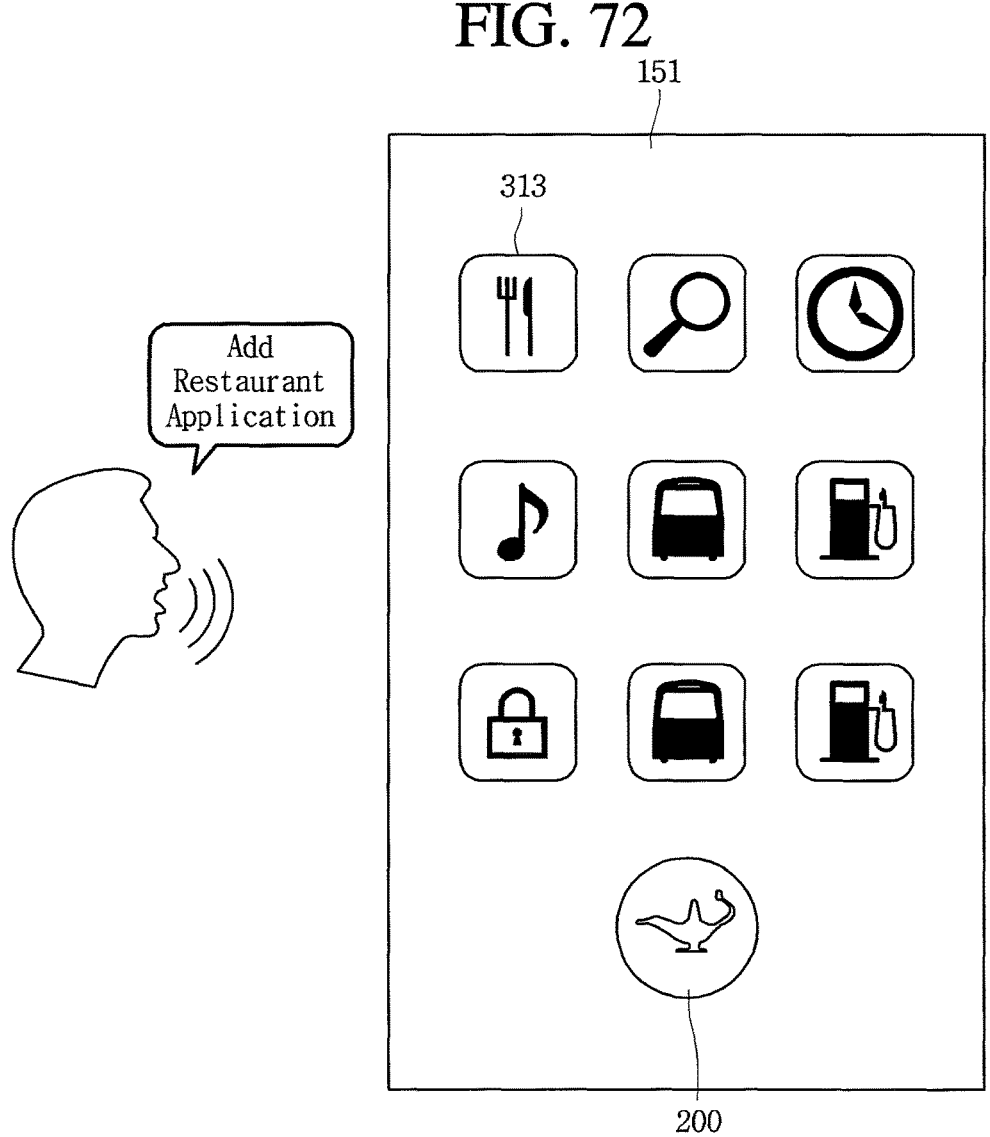
FIG. 72 is a view illustrating a supportable application program addition for an intelligent agent application program according to another embodiment of the present invention.

With reference to FIGS. 71 and 72, a supportable application addition for an executed intelligent agent application program is described. In particular, FIG. 71 is a view illustrating a supportable application program addition for an intelligent agent application program according to an embodiment of the present invention. Referring to FIG. 71, the controller 180 can obtain the user input dragging and dropping a restaurant application icon 313 that is an application to be added on the intelligent agent icon 200 as the user input for adding a supportable application program for an intelligent agent application program. Accordingly, the controller 180 can provide a function or operation of a restaurant application as a function or operation corresponding to an intelligent agent application program.

Next, FIG. 72 is a view illustrating a supportable application program addition for an intelligent agent application program according to another embodiment of the present invention. Referring to FIG. 72, while executing an intelligent agent application program, the controller 180 can obtain the user's voice "add restaurant application" as the user input for adding a supportable application program for an intelligent agent application program. Accordingly, the controller 180 can provide a function or operation of a restaurant application 313 as a function or operation corresponding to an intelligent agent application program.

Moreover, through a setting for an intelligent agent application program, the controller 180 can obtain the user input for adding an application relating to a function or operation corresponding to an intelligent agent application program through a setting for an intelligent agent application program. Then, the controller 180 can provide a function or operation of an added application as a function or operation corresponding to an intelligent agent application program based on the obtained user input. Further, as the terminal 100 recognizes the user inputting the user input for executing an intelligent agent, a function performance corresponding to the recognized user is described.

Figure 73:
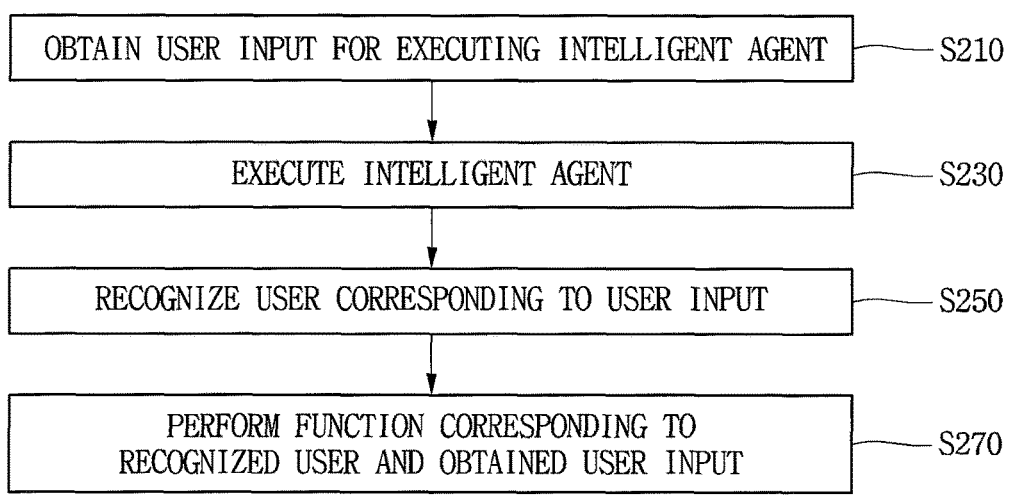
FIG. 73 is a flowchart illustrating an operating method of a terminal according to another embodiment of the present invention.

Next, FIG. 73 is a flowchart illustrating an operating method of a terminal according to another embodiment of the present invention. Referring to FIG. 73, the controller 180 of the terminal 100 obtains the user input for executing an intelligent agent (S210). The controller 180 can obtain the user input for executing an intelligent agent through at least one of the user input unit 130, the touch sensor, the camera 121, and the microphone 122. Herein, the user input for executing an intelligent agent can be identical to or different from the above-mentioned first user input. As one embodiment, the controller 180 can obtain a touch input rubbing a partial area of the display unit 151 as the user input for executing an intelligent agent.

As another embodiment, the controller 180 can obtain the user input for executing an intelligent agent through a touch key and a push key included in the user input unit 130. As another embodiment, the controller 180 can obtain the user's voice that is the user input for executing an intelligent agent through the microphone 122. As another embodiment, the controller 180 can obtain a specific image that is the user input for executing an intelligent agent through the camera 121. As another embodiment, the controller 180 can obtain a specific movement for a terminal, that is, the user input for executing an intelligent agent through a motion sensor included in the sensing unit 140.

Figure 74:
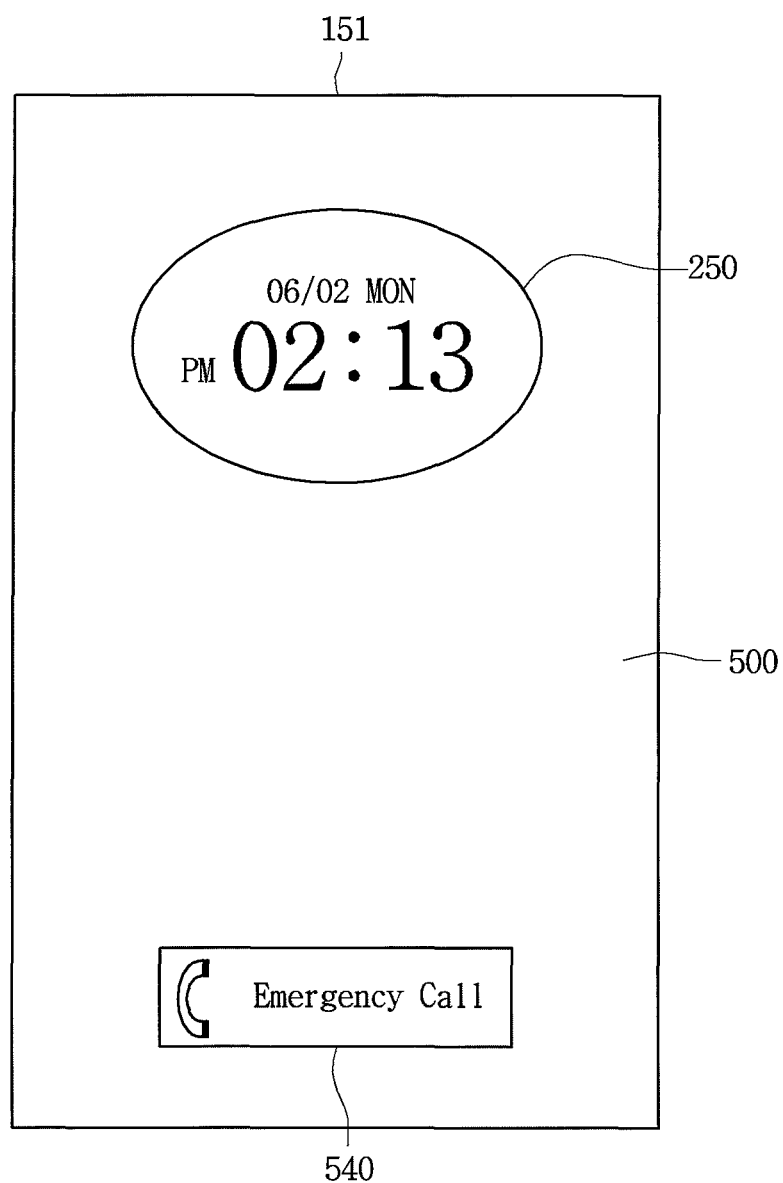
FIG. 74 is a view illustrating a lock screen display according to an embodiment of the present invention.
Figure 75:
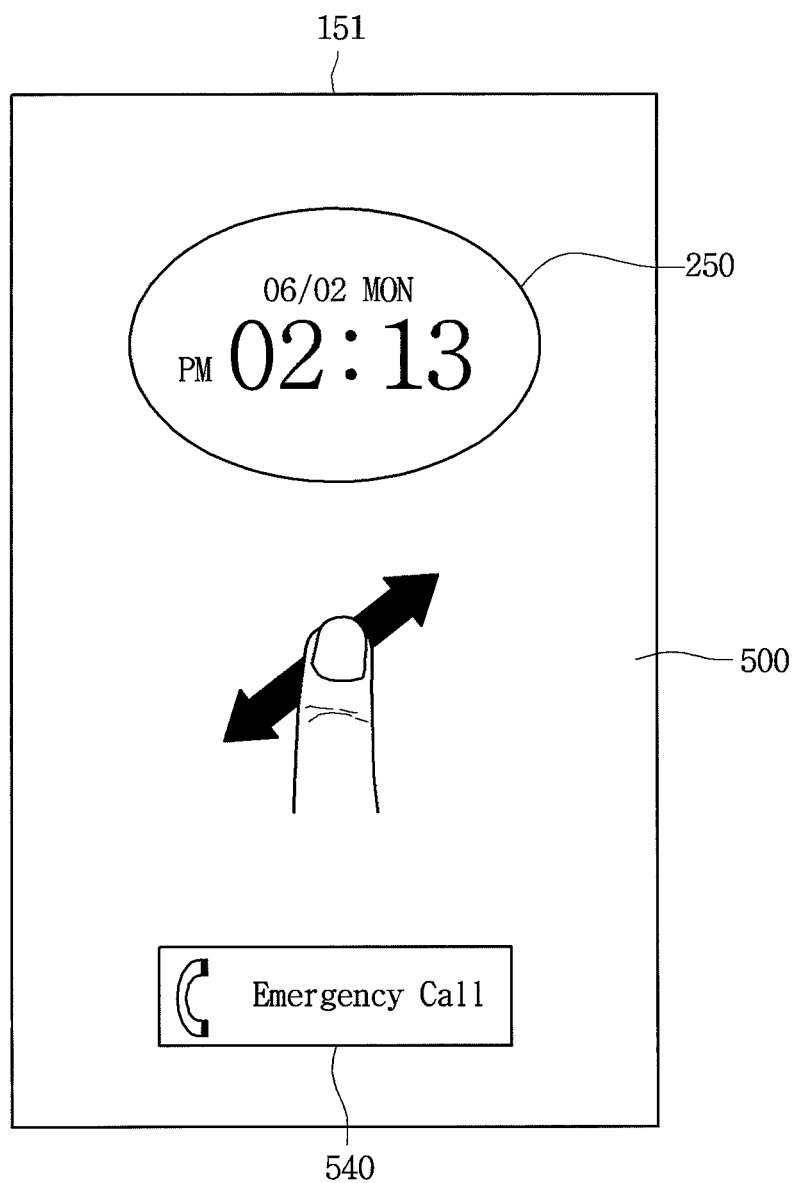
FIG. 75 is a view illustrating the user input for executing an intelligent agent according to an embodiment of the present invention.

This will be described with reference to FIGS. 74 and 75. In particular, FIG. 74 is a view illustrating a lock screen display according to an embodiment of the present invention, and FIG. 75 is a view illustrating the user input for executing an intelligent agent according to an embodiment of the present invention. Referring to FIG. 74, the controller 180 can display a lock screen 500 that is a screen of the display unit 151. Herein, the lock screen 500 is a screen that the terminal 100 displays on the display unit 151 in lock state. Then, when a state of the terminal 100 satisfies a set condition, a lock state corresponds to a state for limiting an input of the user's control command for applications. For example, if not receiving the user input for a predetermined time, the controller 180 can operate in the lock state and display the lock screen 500 on the display unit 151 for a predetermined time. Then, the controller 180 can display at least one of a watch window 250 representing a time and an emergency call icon 540 for emergency call on the lock screen 500.

As shown in FIG. 75, the controller 180 can obtain a touch input rubbing a partial area of the lock screen 500 displayed on the screen of the display unit 151 as the user input for executing an intelligent agent. Herein, as mentioned above, a rubbing touch input corresponds to a touch input rotating in one direction or a touch input touching in one direction and then continuously touching it in the opposite direction of the one direction. Moreover, in correspondence to a touch input rubbing a partial area of the lock screen 500, the controller 180 can perform various operations of the terminal 100. This will be described later.

Referring again to FIG. 73, the controller 180 of the terminal 100 executes an intelligent agent application program based on an obtained user input (S230). The controller 180 can execute an intelligent agent application program stored in the memory 160 based on the obtained user input. Then, as mentioned above, the controller 180 can display at least one of an intelligent agent icon 200 representing that an intelligent agent is in execution, an intelligent agent status bar 205, and an intelligent agent execution effect 207 on the display unit 151. Since content for an intelligent agent application program execution of the terminal 100 is described above, its detailed description is omitted.

The controller 180 of the terminal 100 recognizes the user corresponding to the user input for executing an intelligent agent (S250). The controller 180 can recognize the user based on the user's bio information corresponding to the user input for executing an intelligent agent. Herein, bio information corresponds to various information relating to the user's body. For example, the bio information can be at least one of the user's face, voice, fingerprint, iris, and electrocardiogram.

As an embodiment, the controller 180 can obtain a face image of the user's face corresponding to the user input for executing an intelligent agent through the camera 121. Then, the controller 180 can recognize the user corresponding to the user input based on the obtained face image. Accordingly, the controller 180 can recognize whether the user corresponding to the user input is a registered user.

As another embodiment, the controller 180 can obtain the user's voice corresponding to the user input for executing an intelligent agent through the microphone 122. Then, the controller 180 can recognize the user corresponding to the user input based on the obtained user's voice. Accordingly, the controller 180 can recognize whether the user corresponding to the user input is a registered user.

As another embodiment, the controller 180 can obtain the user's fingerprint image corresponding to the user input for executing an intelligent agent through a fingerprint sensor included in the sensing unit 140. Then, the controller 180 can recognize the user corresponding to the user input based on the obtained fingerprint image. Accordingly, the controller 180 can recognize whether the user corresponding to the user input is a registered user.

Description for the user recognition of the controller 180 is exemplary and is not limited thereto. Accordingly, the user can be recognized based on user's various bio information according to the user's or designer's selection. Moreover, the controller 180 can recognize the user's feeling, emotion state or psychological state based on the user's face expression, voice tone, and motion. For example, the controller 180 can recognize whether the user feels good or bad and whether the user is in an energetic state or a tired state. Besides that, the controller 180 can recognize user's various emotional states.

As an embodiment, the controller 180 can obtain at least one image for the user's face expression or motion through the camera 121. Then, the controller 180 can recognize the user's feeling or psychological state based on the obtained image. As another embodiment, the controller 180 can obtain the user's voice through the microphone 122. Then, the controller 180 can recognize the user's feeling or psychological state based on a tone of the obtained voice.

Since techniques for recognizing the user's feeling or psychological state based on the user's face expression, voice tone, and gesture are known, its detailed description is omitted. In addition, the description for the user's feeling or psychological state recognition is exemplary and is not limited thereto. Accordingly, the user's feeling or psychological state can be recognized through various methods according to the user's or designer's selection.

The controller 180 of the terminal 100 performs a function corresponding to the recognized user and the obtained user input (S270). The controller 180 can perform various functions corresponding to the recognized user and the obtained user input. Additionally, the controller 180 can perform a function corresponding to the recognized user and the obtained user input based on the recognized user's feeling, emotion state, or psychological state.

Hereinafter, this will be described in more detail based on various embodiments. As a tenth embodiment, an operation in a lock screen through a function performance of the terminal 100 is described. First, an embodiment for a function performance of the terminal 100 when a recognized user is a registered user or an unregistered user is described.

As shown in FIG. 75, the controller 180 can obtain a touch input rubbing a partial area of the lock screen 500 displayed on the screen of the display unit 151 as the user input for executing an intelligent agent. Then, the controller 180, as mentioned above, can recognize the user inputting a rubbing touch input and recognize the user's feeling, emotion state, or psychological state. In correspondence to a touch input rubbing a partial area of the lock screen 500, the controller 180 can perform various operations of the terminal 100.

Figure 76:
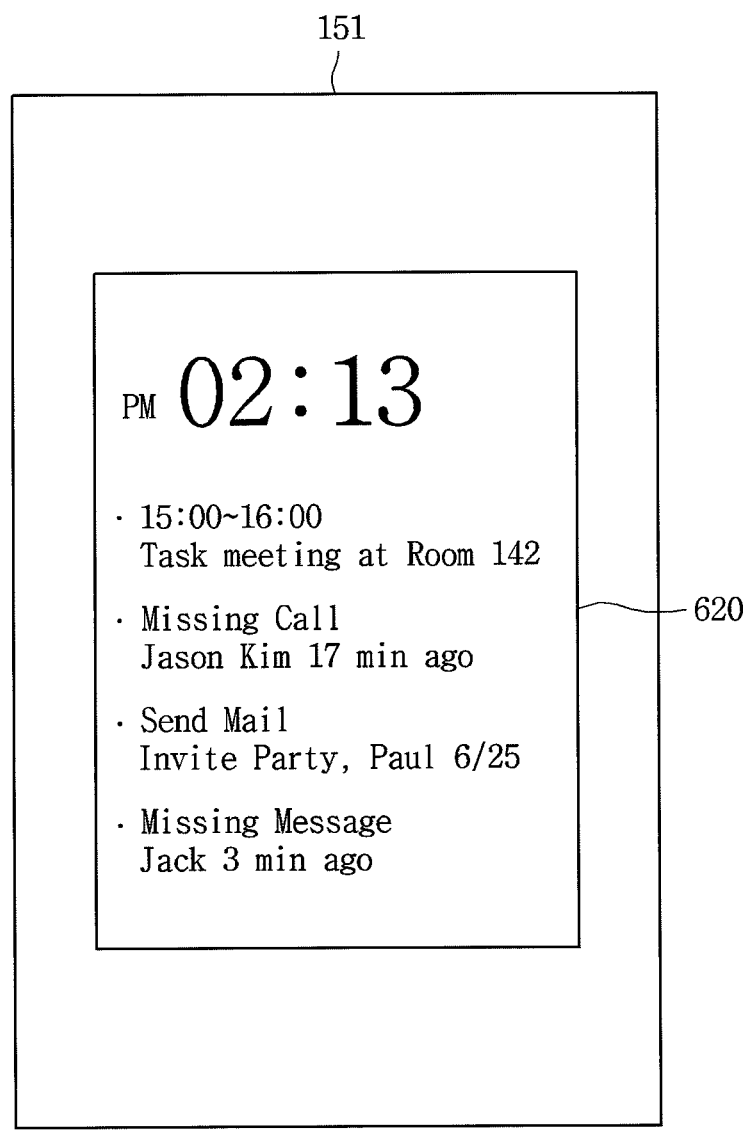
FIG. 76 is a view illustrating a screen of an alarm information display for a recognized user according to an embodiment of the present invention.

An embodiment will be described with reference to FIG. 76. In particular, FIG. 76 is a view illustrating a screen of an alarm information display for a recognized user according to an embodiment of the present invention. When a recognized user is a registered user, in correspondence to a touch input rubbing a partial area of the lock screen 500, the controller 180 can display alarm information for the recognized user on the display unit 151. Accordingly, as shown in FIG. 76, the controller 180 can display on the display unit 151 an alarm window 620 displaying alarm information for a recognized user. The controller 180 can display on the alarm window 620 content for at least one of an important schedule after the current time, a missed call, and a job to do. Besides the above-mentioned content, the controller 180 can display various alarm information relating to the user on the alarm window 620.

Figure 77:
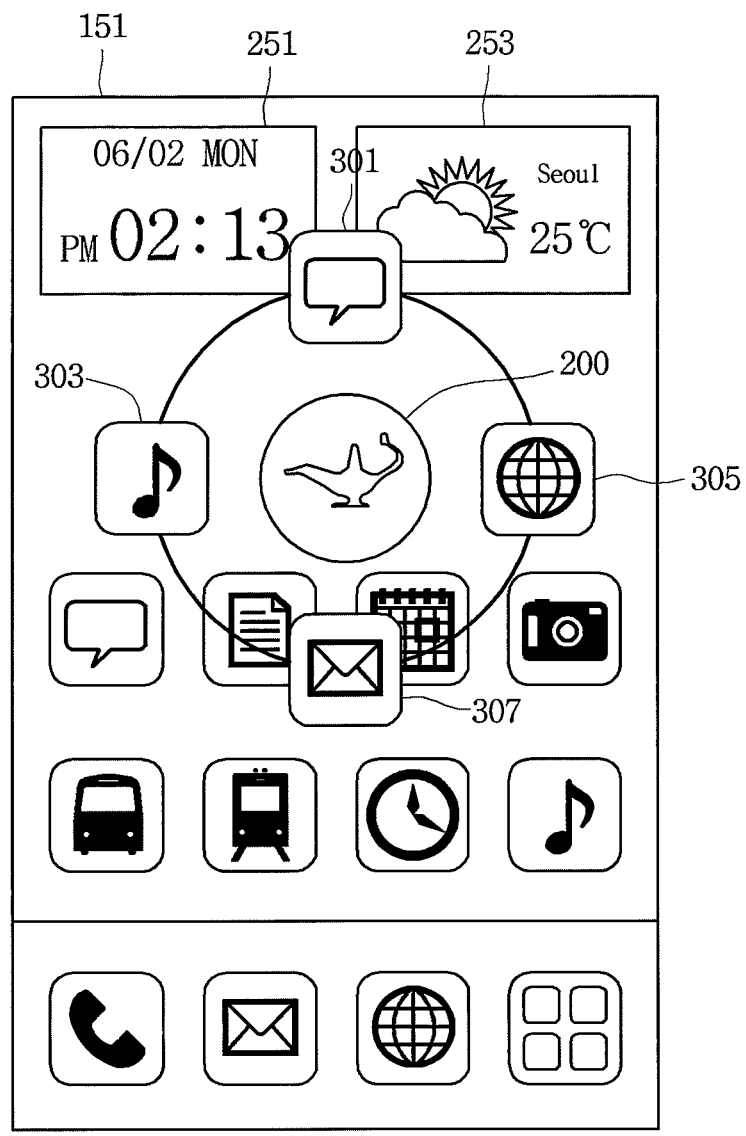
FIG. 77 is a view illustrating a home screen corresponding to a registered user according to an embodiment of the present invention.

Another embodiment will be described with reference to FIG. 77. In particular, FIG. 77 is a view illustrating a home screen corresponding to a registered user according to an embodiment of the present invention. When a recognized user is a registered user, in correspondence to a touch input rubbing a partial area of the lock screen 500, the controller 180 can display a home screen, that is, a basic screen, on the display unit 151 and display a simple menu on a home screen. Referring to FIG. 77, the controller 180 can display on the simple menu at least one of an intelligent agent icon 200, an application icon for at least one recommendation function, and a menu window for at least one recommendation function. The controller 180 can display an icon for a recommendation function corresponding to a usage pattern of the terminal 100 and a state of the terminal 100.

Herein, the usage pattern of the terminal 100 includes a usage frequency, a usage function, and a usage time of an application that the user uses. Then, the state of the terminal 100 includes a screen displayed on the display unit 151 of the terminal 100, an input state of the terminal 100, location information obtained by the terminal 100, and a communication state of the terminal 100. For example, as shown in FIG. 77, the controller 180 can display a message application icon 301, a music application icon 303, a web browser icon 305, and an e-mail application icon 307 as an application icon for a recommendation function on the simple menu. Moreover, when obtaining the user input rotating at least one icon or menu window displayed on a simple menu according to an intelligent agent execution, the controller 180 can display an icon or menu window different from that displayed on the simple menu. This is described above.

Figure 78:
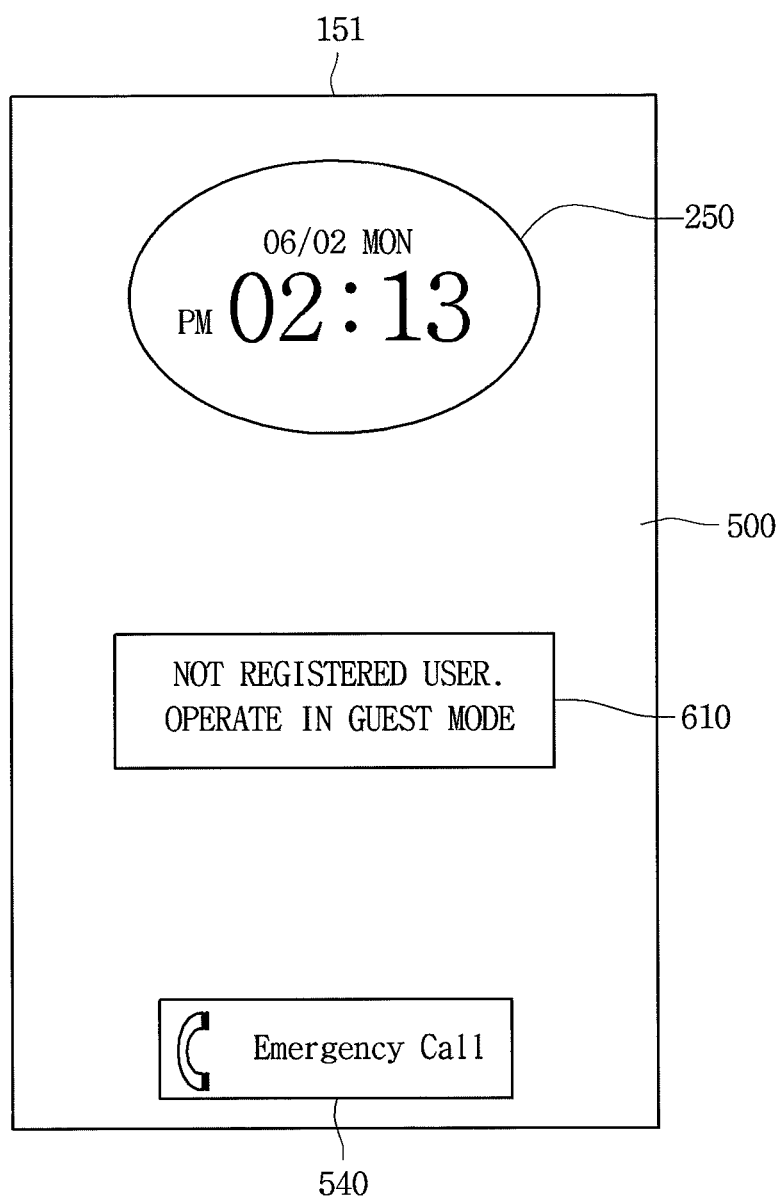
FIG. 78 is a view illustrating a message window for an unregistered user according to an embodiment of the present invention.

Another embodiment will be described with reference to FIG. 78. In particular, FIG. 78 is a view illustrating a message window for an unregistered user according to an embodiment of the present invention. As shown in FIG. 78, when a recognized user is not a registered user, in correspondence to a touch input rubbing a partial area of the lock screen 500, the controller 180 can display a message window notifying that the recognized user is not the registered user, on the display unit 151. The controller 180 can display a message notifying that the recognized user is not the registered user on the message window 610 and thus display a message notifying an operation in a guest mode.

Herein, the guest mode corresponds to a mode in which when another user other than a registered user uses the terminal 100, the user is prevented from using all or part of functions of the terminal 100 and has limited to access all or part of information. Accordingly, when a recognized user is not registered, only part of functions and information of the terminal 100 is provided to the recognized user. Moreover, content for the above-mentioned lock screen 500 can perform a function corresponding to the recognized user in correspondence to a touch input rubbing lock release input areas 520 and 530.

Figure 79:
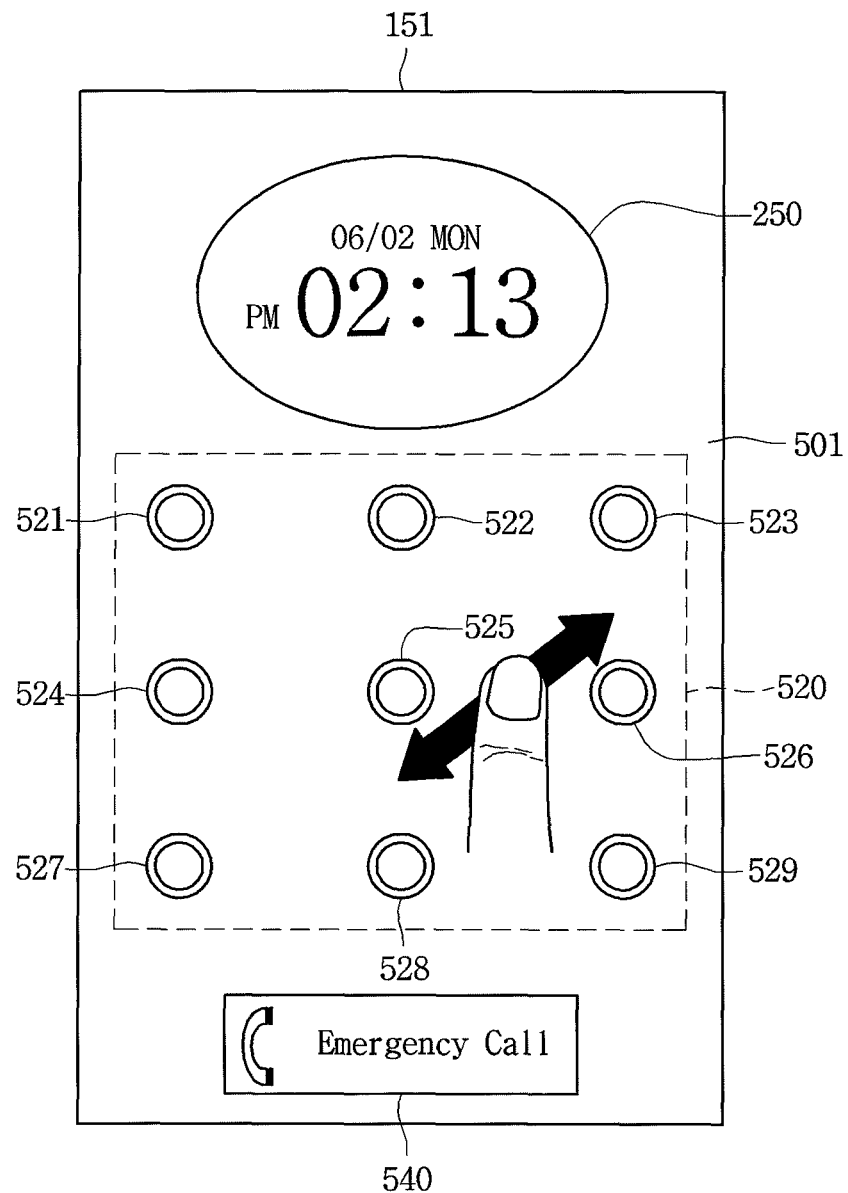
FIG. 79 is a view illustrating a lock screen according to another embodiment of the present invention.
Figure 80:
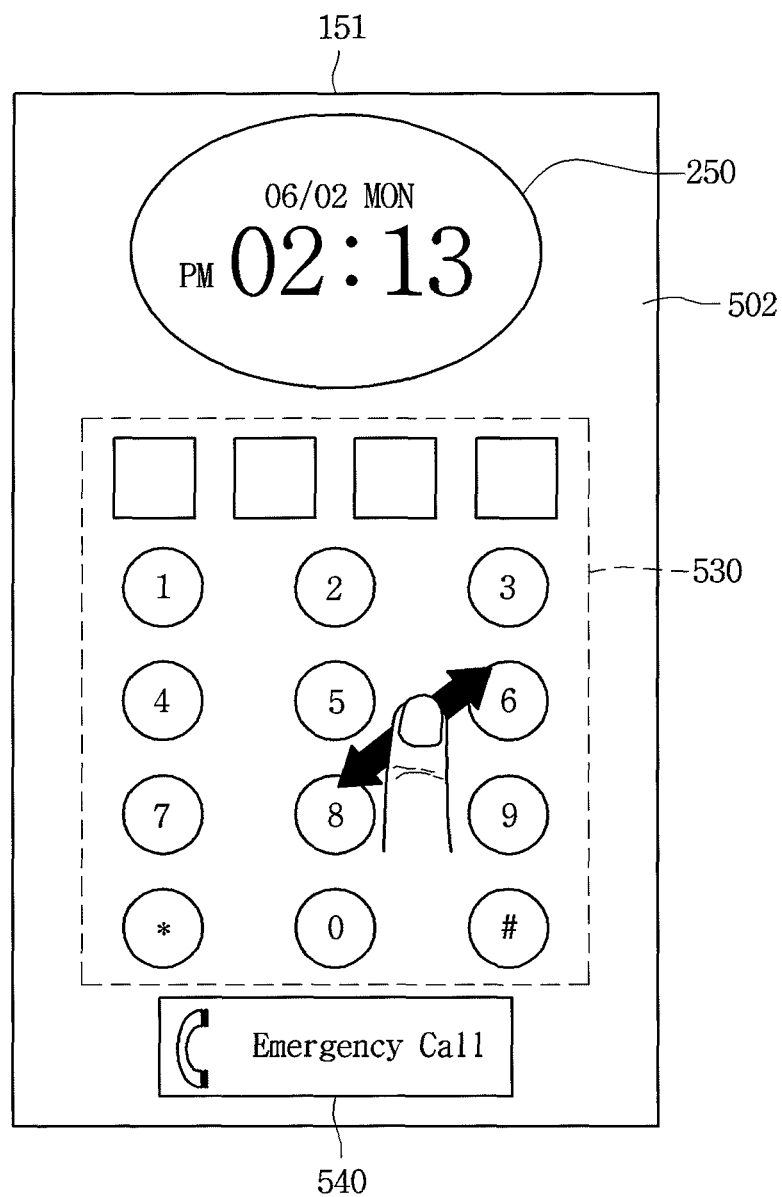
FIG. 80 is a view illustrating a lock screen according to another embodiment of the present invention.

This will be described with reference to FIGS. 79 and 80. In particular, FIG. 79 is a view illustrating a lock screen according to another embodiment of the present invention, and FIG. 80 is a view illustrating a lock screen according to another embodiment of the present invention. Referring to FIG. 79, the controller 180 can display a lock screen 501 on the display unit 151 and display a plurality of lock points 521 to 529 corresponding to a lock pattern in a lock release input area 520 of the lock screen 501. The controller 180 can obtain a lock release pattern input relating to at least one of the plurality of lock points 521 to 529 corresponding to a lock pattern and when the obtained lock release pattern is identical to a registered lock release pattern, can release the lock screen 501. Moreover, the controller 180 can obtain a touch input rubbing the lock release input area 520 as the user input for executing an intelligent agent. The controller 180 can recognize the user corresponding to a rubbing touch input and perform an operation corresponding to the recognized user. Accordingly, as mentioned above, the controller 180 can perform an operation corresponding to the user according to whether a recognized user is a registered user.

Referring to FIG. 80, the controller 180 can display a lock screen 502 on a display unit 151 and display a numeric key for inputting a lock release number in a lock release input area 530 of the lock screen 502. The controller 180 can obtain at least one number corresponding to a lock release number through the user input for numeric key, and when the obtained lock release number is identical to a registered lock release number, can release the lock screen 502. Moreover, the controller 180 can obtain a touch input rubbing the lock release input area 530 as the user input for executing an intelligent agent. The controller 180 can recognize the user corresponding to a rubbing touch input and perform an operation corresponding to the recognized user. Accordingly, as mentioned above, the controller 180 can perform an operation corresponding to the user according to whether a recognized user is a registered user.

In addition, if the recognized user is the registered user, in correspondence to the user input rubbing an area corresponding to a watch window 250 of the lock screen 500, the controller 180 can display information relating to a schedule of the recognized user on the display unit 151. This will be described with reference to FIGS. 81 and 82. In particular, FIG. 81 is a view illustrating the user input for executing an intelligent agent according to another embodiment of the present invention, and FIG. 82 is a view illustrating a schedule information display screen of a recognized user according to an embodiment of the present invention.

Figure 81:
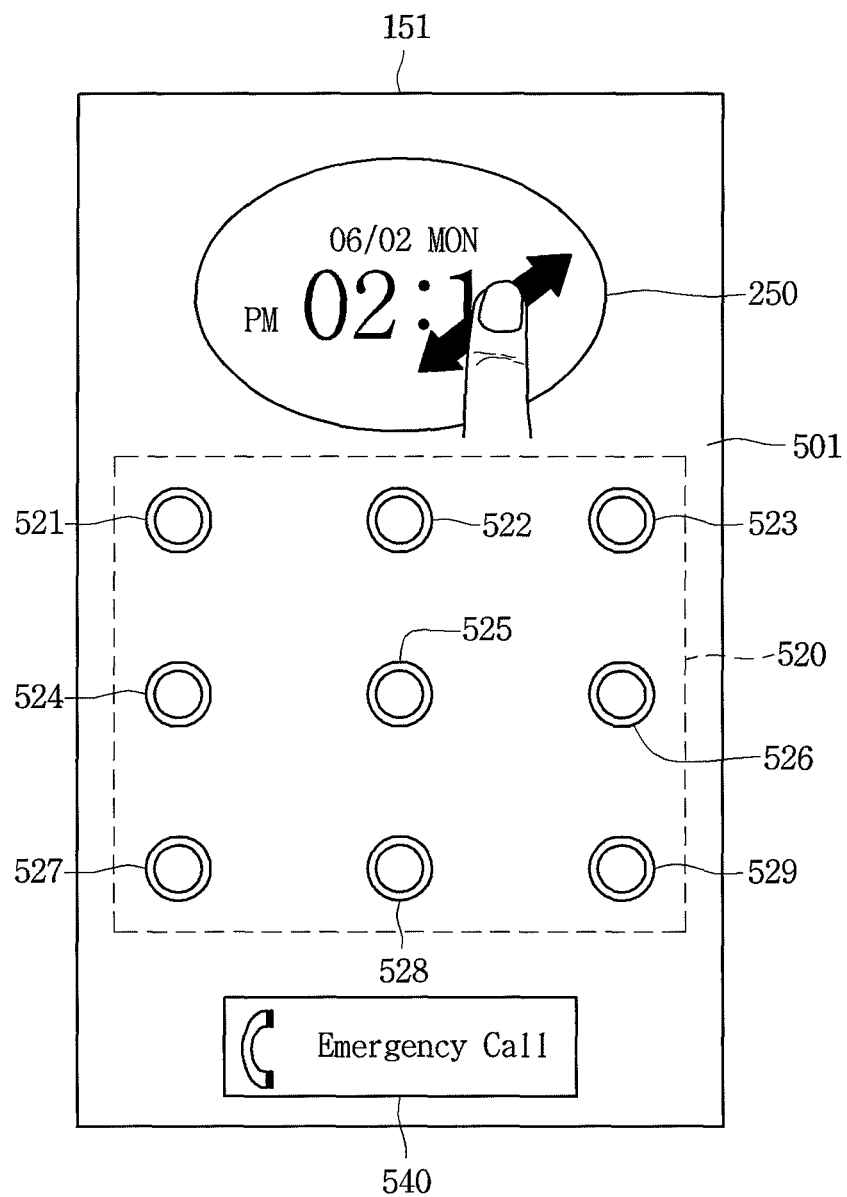
FIG. 81 is a view of the user input for executing an intelligent agent according to another embodiment of the present invention.
Figure 82:
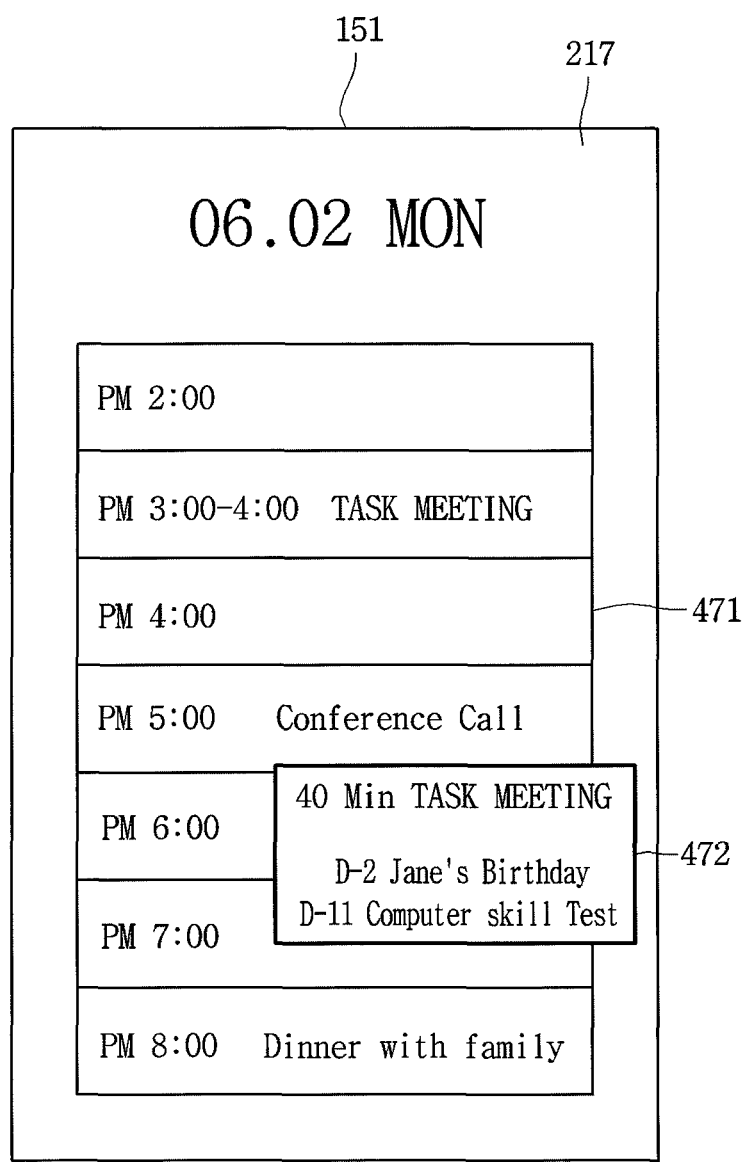
FIG. 82 is a view illustrating a schedule information display screen of a recognized user according to an embodiment of the present invention.

Referring to FIG. 81, if a recognized user is a registered user, in correspondence to a touch input rubbing an area corresponding to a watch window 250 of a lock screen 500, the controller 180 can display information relating to a schedule of the recognized user on the display unit 151. Accordingly, as shown in FIG. 82, the controller 180 can display on the display unit 151 a schedule information display screen 217 displaying a schedule after the current time. The controller 180 can display a schedule table 471 and an important schedule pop-up window 472 for a schedule after the current time. The controller 180 can display the remaining time until an important schedule from the current time and schedule content on the important schedule pop-up window 472. Then, the controller 180 can display the remaining time until an important schedule in a D-day format on the important schedule pop-up window 472.

Further, the controller 180 can perform an operation corresponding to the recognized user's feeling, emotion state, or psychological state in correspondence to the user input for executing an intelligent agent. As an embodiment, when the recognized user's feeling is good, the controller 180 can output a bright screen or a high voice tone. As another embodiment, when the recognized user's is in a tired state, the controller 180 can output a vibrant screen or voice corresponding to an energetic state.

Description for an operation corresponding to the recognized user's feeling, emotion state, or psychological state is exemplary and various operations corresponding to the recognized user's feeling, emotion state, or psychological state may be performed according to the user's or designer's setting.

As an eleventh embodiment, an operation corresponding to an application through a function performance of the terminal 100 is described. The controller 180 can obtain the user input for executing an intelligent agent in correspondence to at least one application and can perform an operation corresponding to the obtained user input. Then, as mentioned above, the controller 180 can perform different operations according to whether recognized user is a registered user.

Figure 83:
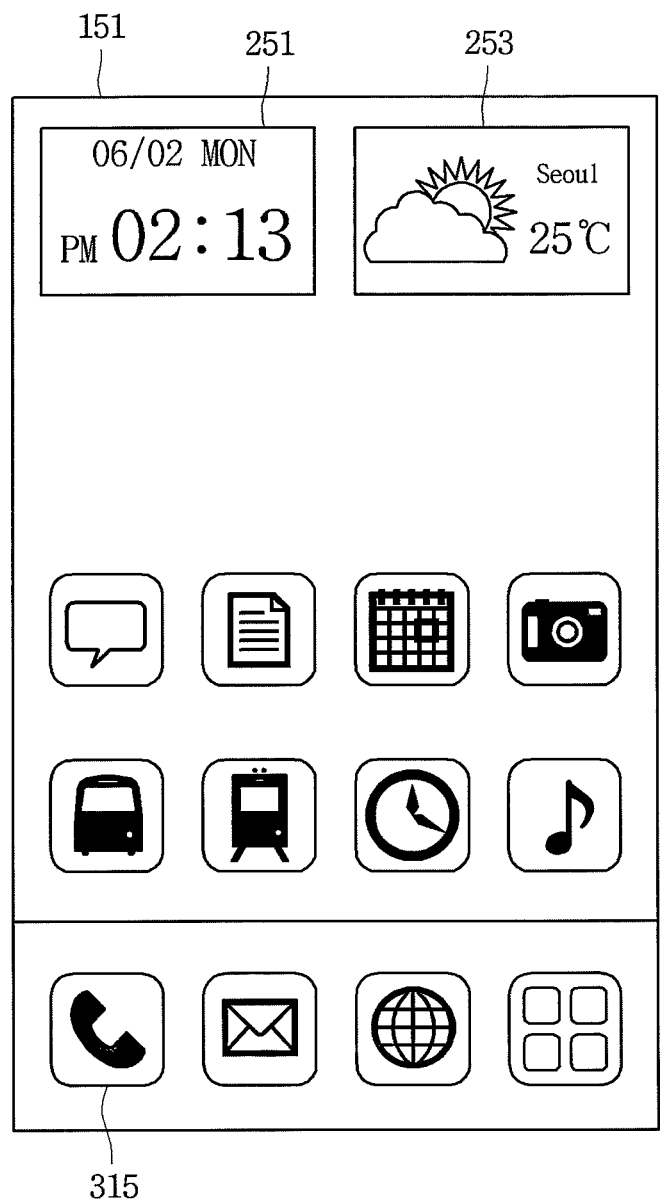
FIG. 83 is a view illustrating a home screen according to an embodiment of the present invention.

An embodiment will be described with reference to FIGS. 83 to 86. In particular, FIG. 83 is a view illustrating a home screen according to an embodiment of the present invention. Referring to FIG. 83, the controller 180 can display a home screen, that is, a basic screen of the terminal 100, on the screen of the display unit 151. Various objects such as widgets and application icons may be displayed on the home screen. For example, the controller 180 can display a call application icon 315 on the home screen. Herein, the call application icon 315 is an icon corresponding to a call application.

Figure 84:
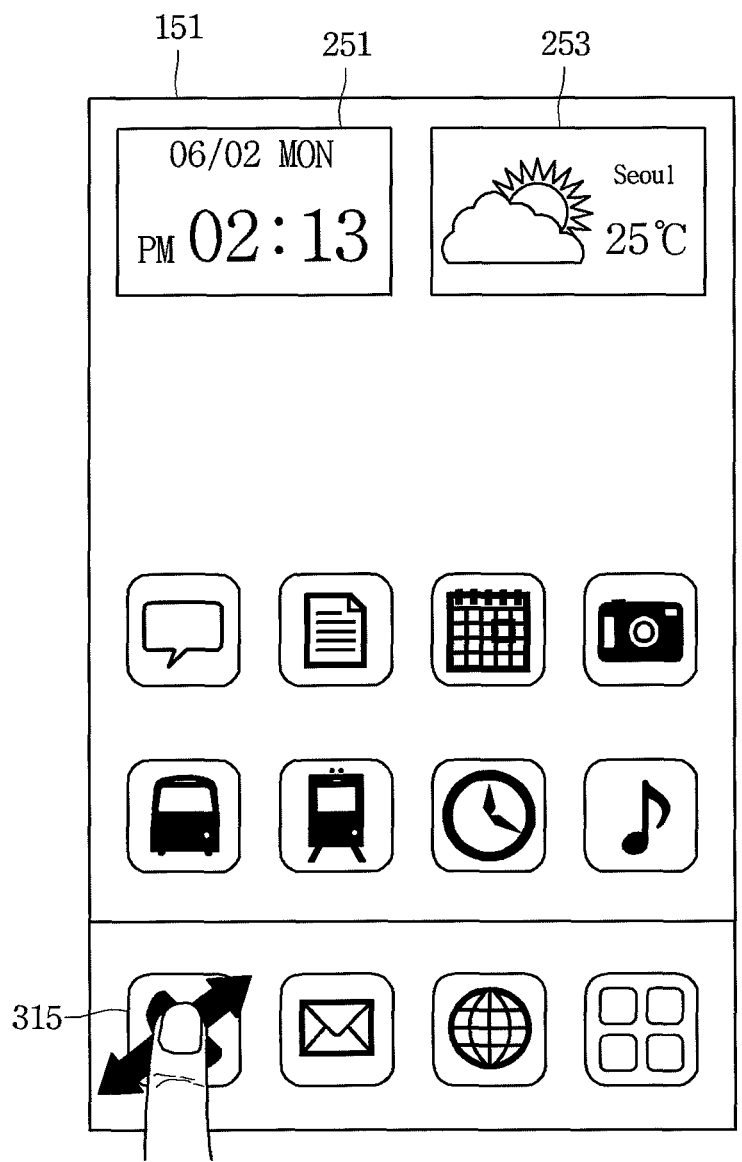
FIG. 84 is a view illustrating the user input rubbing a call application icon according to an embodiment of the present invention.

FIG. 84 is a view illustrating the user input rubbing the call application icon 315 according to an embodiment of the present invention. Referring to FIG. 84, the controller 180 can obtain the user input rubbing the call application icon 315 displayed on the display unit 151. Herein, as mentioned above, the user input rubbing the call application icon 315 corresponds to a touch input rotating in one direction based on the call application icon 315, and corresponds to a touch input touching the call application icon 315 in one direction and then continuously touching it in the opposite direction of the one direction. When obtaining the user input rubbing the call application icon 315, the controller 180 can perform a specific function of the call application or execute an intelligent agent to display a menu window for at least one function of the call application. Then, as mentioned above, the controller 180 can recognize the user corresponding to the user input rubbing the call application icon 315.

Figure 85:
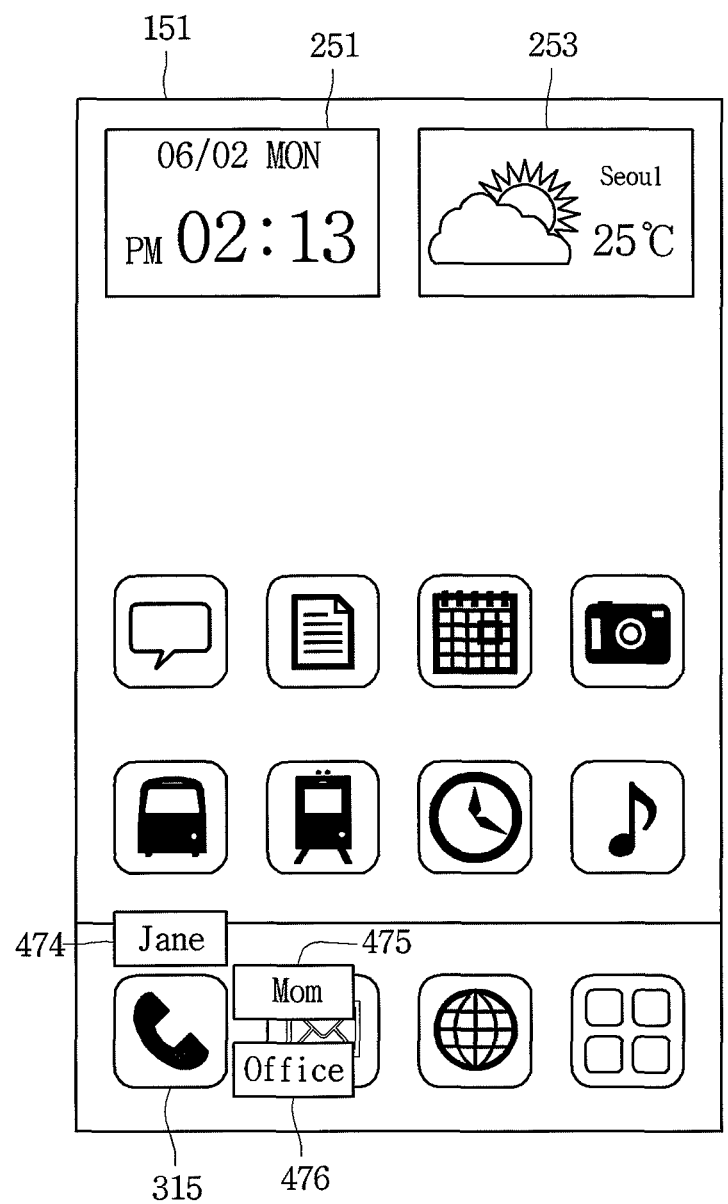
FIG. 85 is a view illustrating a call menu display screen corresponding to a registered user according to an embodiment of the present invention.

FIG. 85 is a view illustrating a call menu display screen corresponding to a registered user according to an embodiment of the present invention. When a recognized user is a registered user, the controller 180 can display a short key for making a call with the other party that the user makes a call frequently in correspondence to the user input rubbing the call application icon 315. Accordingly, as shown in FIG. 85, the controller 180 can display on the display unit 151 a first short key 474, a second short key 475, and a third short key 476, that is, a short key for making a call with the other party that the user frequently calls.

Further, each of the first short key to the third short key 474 to 476 is a short key for making a call with different the other parties. Accordingly, when obtaining one of the first short key to the third short key 474 to 476 displayed on the display unit 151, the controller 180 can connect a call to the other party corresponding to the selected short key. Moreover, the number of short keys for making a call with the other party that the user makes a call frequently may be set variously according to the user's or designer's selection.

Figure 86:
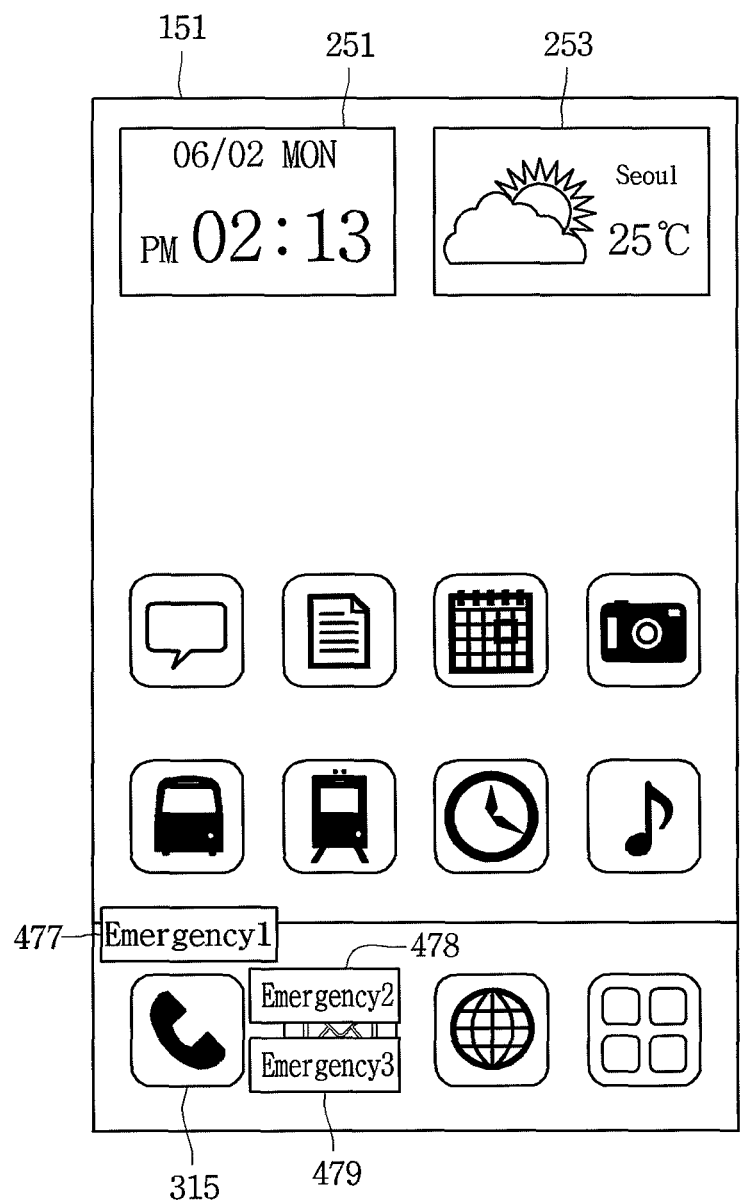
FIG. 86 is a view illustrating a call menu display screen corresponding to an unregistered user according to an embodiment of the present invention.

FIG. 86 is a view illustrating a call menu display screen corresponding to an unregistered user according to an embodiment of the present invention. When a recognized user is an unregistered user, the controller 180 can display a short key for making a call with the other party that the user makes a call frequently in correspondence to the user input rubbing the call application icon 315. Accordingly, as shown in FIG. 86, the controller 180 can display on the display unit 151 a first emergency call short key 477, a second emergency call short key 478, and a third emergency call short key 479, that is, a short key for making a call with a designated emergency contact. Further, each of the first emergency call short key to the third emergency call short key 477 to 479 is a short key for making a call with different emergency contacts.

Accordingly, when obtaining the user input selecting one of the first emergency call short key to the third emergency call short key 477 to 476 displayed on the display unit 151, the controller 180 can connect a call to the emergency contact corresponding to the selected short key. Moreover, the above-mentioned emergency contact may be a contact preset by the user or a contact not set in advance. Additionally, the number of short keys for making a call to an emergency contact can be set variously according to the user's or designer's selection.

Figure 87:
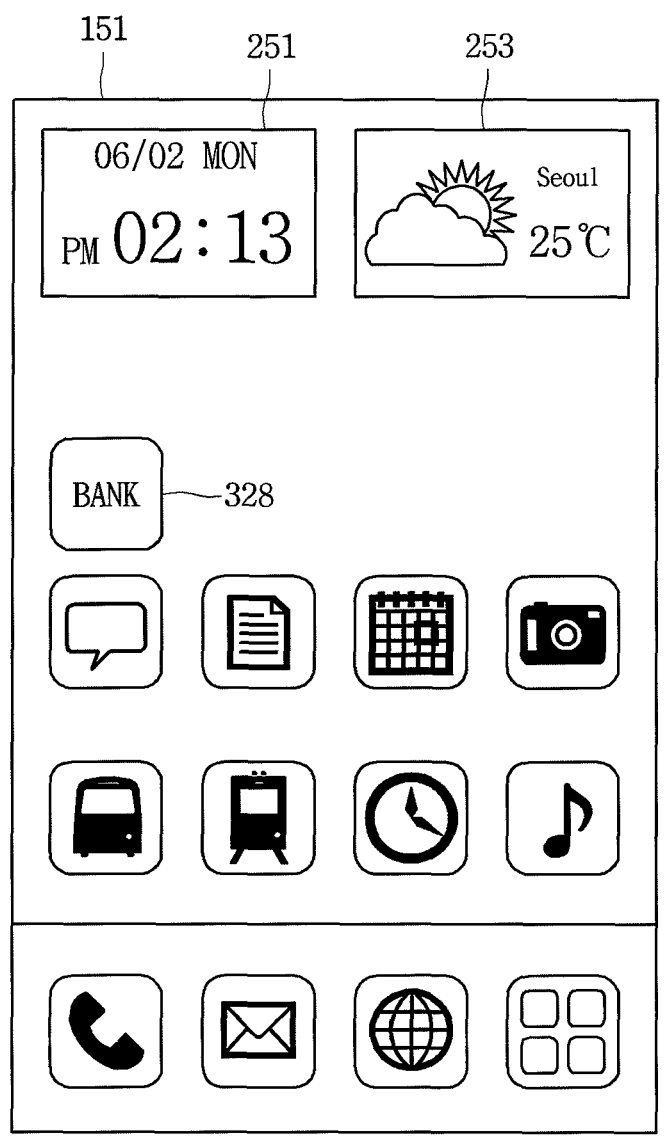
FIG. 87 is a view illustrating a home screen including a baking application icon according to an embodiment of the present invention.

Another embodiment will be described with reference to FIGS. 87 to 90. In particular, FIG. 87 is a view illustrating a home screen including a baking application icon according to an embodiment of the present invention. Referring to FIG. 87, the controller 180 can display a home screen, that is, a basic screen of the terminal 100, on the screen of the display unit 151. Various objects such as widgets and application icons can be displayed on the home screen. For example, the controller 180 can display a banking application icon 328 on the home screen. Herein, the banking application icon 328 is an icon corresponding to a banking application.

Figure 88:
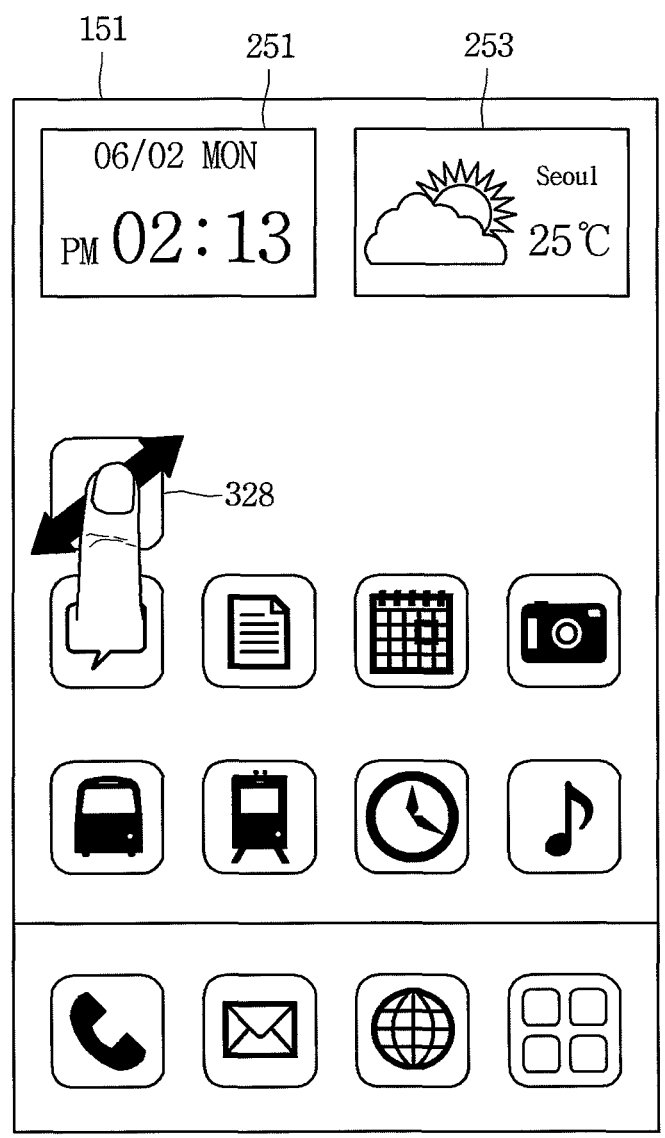
FIG. 88 is a view illustrating the user input rubbing a baking application icon according to an embodiment of the present invention.

FIG. 88 is a view illustrating the user input rubbing a banking application icon according to an embodiment of the present invention. Referring to FIG. 88, the controller 180 can obtain the user input rubbing the banking application icon 328 displayed on the display unit 151. As mentioned above, the user input rubbing the banking application icon 328 corresponds to a touch input rotating in one direction based on the banking application icon 328, and corresponds to a touch input touching the banking application icon 338 in one direction and then continuously touching it in the opposite direction of the one direction. When obtaining the user input rubbing the banking application icon 328, the controller 180 can perform a specific function of the banking application or execute an intelligent agent to display a menu window for at least one function of the banking application. Then, as mentioned above, the controller 180 can recognize the user corresponding to the user input rubbing the banking application icon 328.

Figure 89:
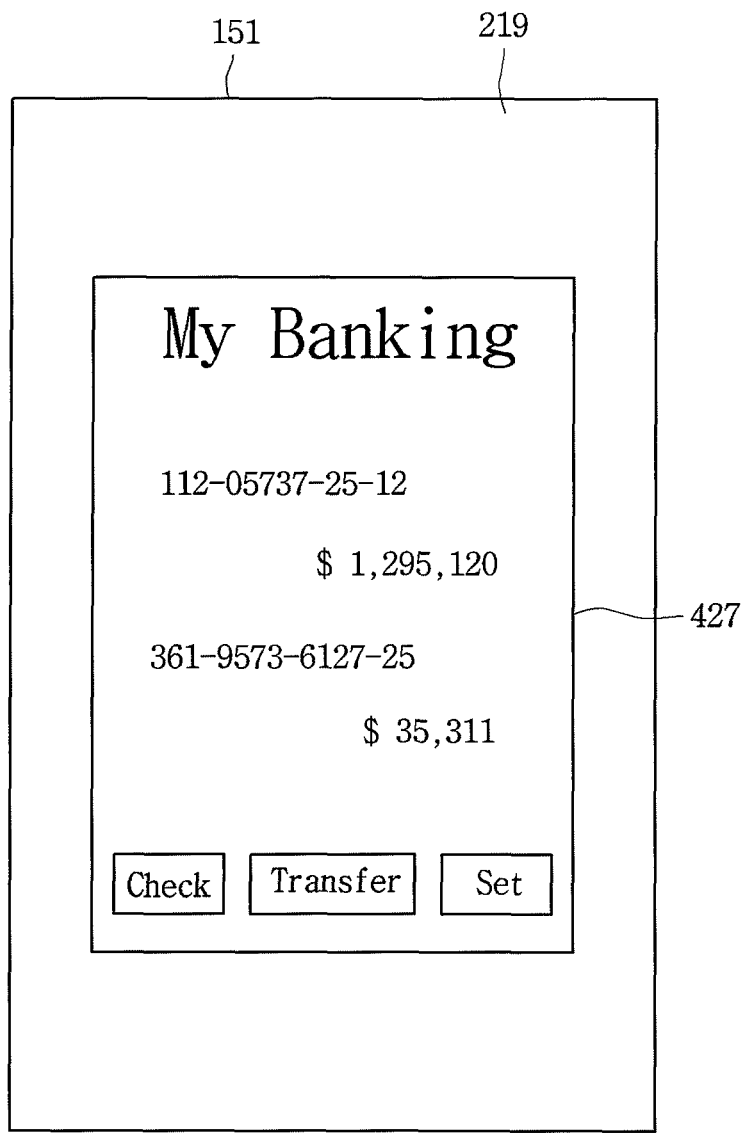
FIG. 89 is a view illustrating a banking menu display screen corresponding to a registered user according to an embodiment of the present invention.

FIG. 89 is a view illustrating a banking menu display screen corresponding to a registered user according to an embodiment of the present invention. When a recognized user is a registered user, the controller 180 can display a banking screen corresponding to the recognized user in correspondence to the user input rubbing a banking application icon 328. Accordingly, as shown in FIG. 89, the controller 180 can display on the display unit 151 a banking window 219 corresponding to a recognized user. The controller 180 can display on the banking screen 219 a banking window 427 displaying a banking menu corresponding to the user. User's account information and a menu related to the account can be displayed on the banking window 247. For example, the user's account number and account balance can be displayed on the banking window 247 and a menu such as inquiry, transfer, and setting may be displayed also.

Figure 90:
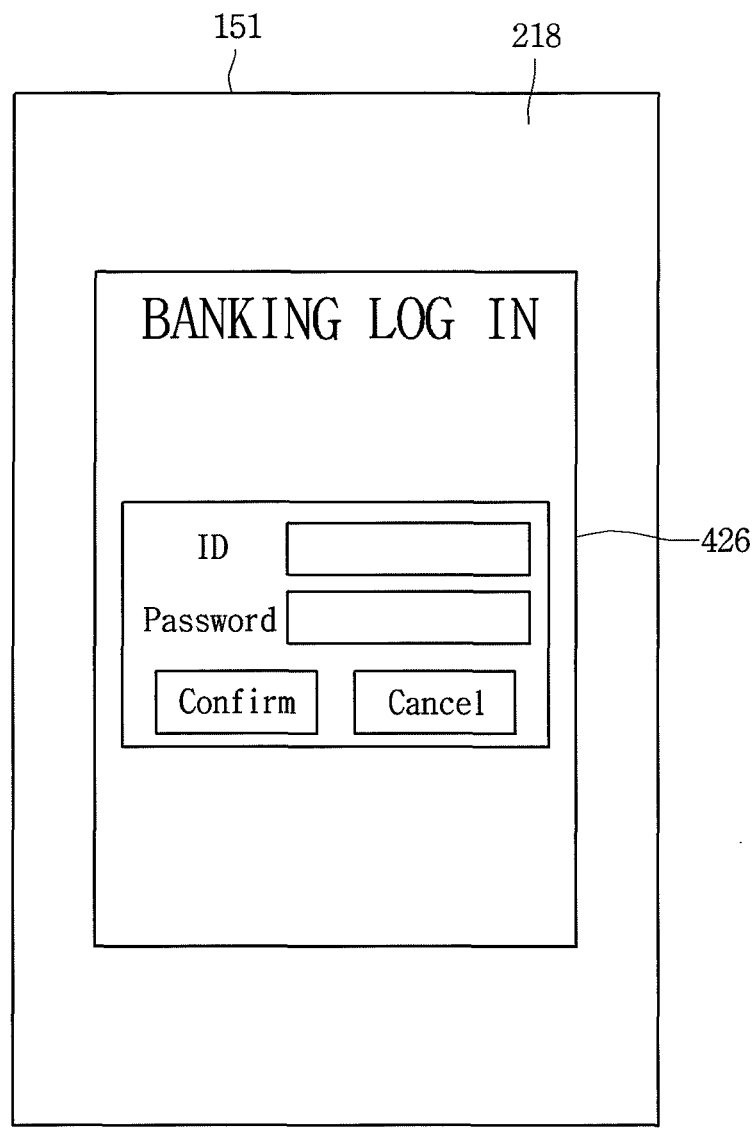
FIG. 90 is a view illustrating a banking login screen corresponding to an unregistered user according to an embodiment of the present invention.

FIG. 90 is a view illustrating a banking login screen corresponding to an unregistered user according to an embodiment of the present invention. When a recognized user is an unregistered user, the controller 180 can display a banking login screen 218 in correspondence to the user input rubbing a banking application icon 328. Accordingly, as shown in FIG. 90, the controller 180 can display on the display unit 151 a banking login window 218 for banking in correspondence to the unregistered user. For example, the controller 180 can display a banking login window 426 for inputting a banking user's id and password to the banking login screen 218.

As a twelfth embodiment, an operation corresponding to a linked another terminal through a function performance of the terminal 100 is described. When obtaining the user input for executing an intelligent agent, the controller 180 can perform an operation corresponding to a linked other terminal. Then, the controller 180 obtains the user input for executing an intelligent agent from the linked other terminal and performs an operation corresponding to the obtained signal.

First, a configuration of another terminal operating in linkage with the terminal 100 is described. A terminal operating in linkage with the terminal 100 may be typical forms of terminals or may be various forms of terminals. For example, another terminal may have the same or similar configuration to the terminal 100. In another example, a terminal may include a wearable device worn on a body. Such a wearable device includes smartwatches, smart glasses, and head mounted displays (HMDs). Hereinafter, examples of a terminal extending as a wearable device will be described.

A wearable device can be configured to exchange data with (or link with) another terminal 100. The short range communication module 114 can detect (or recognize) a communicable wearable device around the terminal 100. Furthermore, if the detected wearable device is a device authenticated to communicate with the terminal 100, the controller 180 can transmit at least part of data processed in the terminal 100 to the wearable device through the short range communication module 114. Accordingly, the user can use data processed in the mobile terminal 100 through the wearable device. For example, when a call is received by the terminal 100, the user can perform a phone call through the wearable device or when a message is received by the terminal 100, the user can check the received message.

Figure 91:
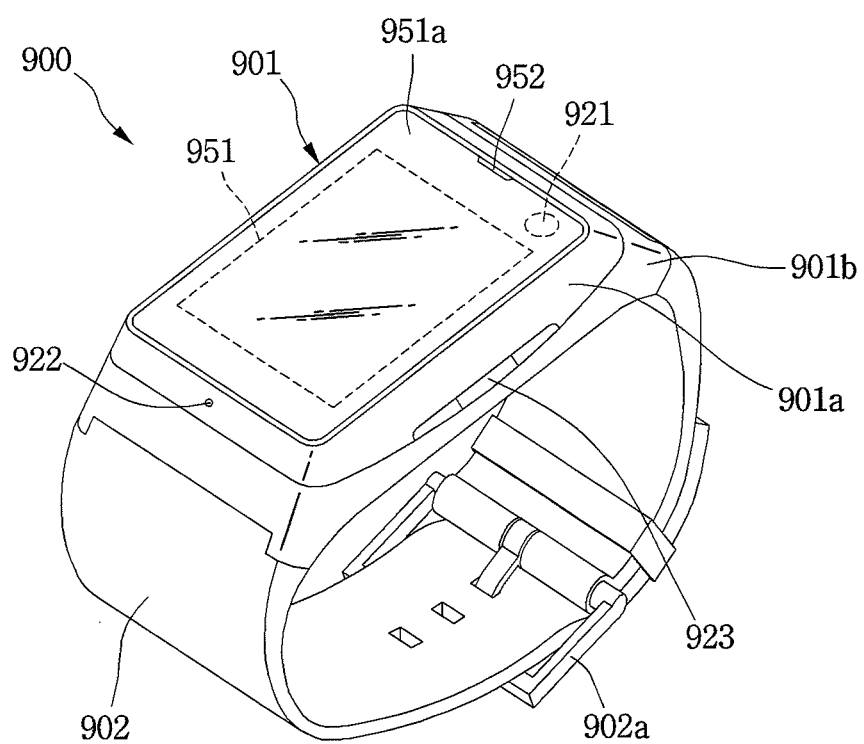
FIG. 91 is a perspective view illustrating a watch type terminal according to another embodiment of the present invention.

FIG. 91 is a perspective view illustrating a watch type terminal 900 according to another embodiment of the present invention. Referring to FIG. 91, the watch type terminal 900 includes a main body 901 with a display unit 951 and a band 902 connected to the main body 901 to be worn on a wrist. In general, the watch type terminal 900 includes the features of the terminal 100 or similar features thereto. Accordingly, the watch type terminal 900 includes the configuration included in the terminal 100.

The main body 901 includes a case forming the appearance. As shown in the drawing, the case includes a first case 901*a* and a second case 901*b* preparing an inner space for receiving various electronic components. However, the present invention is not limited thereto and one case may be configured to prepare an inner space to implement a unibody type of the watch type terminal 900. The watch type terminal 900 can be configured to allow wireless communication and an antenna can be installed at the main body 901 in order for the wireless communication. Moreover, the antenna may use a case to improve its performance. For example, a case including a conductive material is electrically connected to an antenna to expand a ground area or a radiation area.

The display unit 951 is disposed at the front of the main body 901 to output information and includes a touch sensor to be implemented as a touch screen. As shown in the drawing, the first case 901*a* is mounted at a window 951*a* of the display unit 951 to form the front of a terminal body together with the first case 901*a*. The main body 901 includes a sound output unit 952, a camera 921, a microphone 922, and the user input unit 923.

When the display unit 951 is implemented with a touch screen, it serves as the user input unit 923 and accordingly, no additional key is required at the main body 901. The band 902 may be worn on a wrist to wrap it and may be formed of a flexible material in order for easy wearing. For example, the band 902 may be formed of leather, rubber, silicon, and synthetic resin material. Additionally, the band 902 is configured to be detachable from the main body 901 so that the user can replace it with various forms of bands according to preference.

Moreover, the band 902 can be used to extend the performance of an antenna. For example, the band 902 includes a ground extension part electrically connected to an antenna to extend a ground area. The band 902 includes a fastener 902*a*. The fastener 902*a* may be implemented by a hook structure for buckle and snap-fit or VELCRO and includes a flexible section or material. As shown in the drawing, the fastener 902*a* is implemented in a buckle form.

Moreover, the controller 980 controls the watch type terminal 900 overall and can perform an event alarm operation through the display unit 951, the sound output unit 952, and a haptic module. The terminal 100 interoperates with the wearable device to perform an operation corresponding to the user input for executing an intelligent agent. For example, when obtaining the user input for executing an intelligent agent, the controller 180 can perform an operation corresponding to the linked watch type terminal 900. Then, the controller 180 receives a signal for the user input for executing an intelligent agent obtained from the linked watch type terminal 900 and performs an operation corresponding to the received signal.

Figure 92:
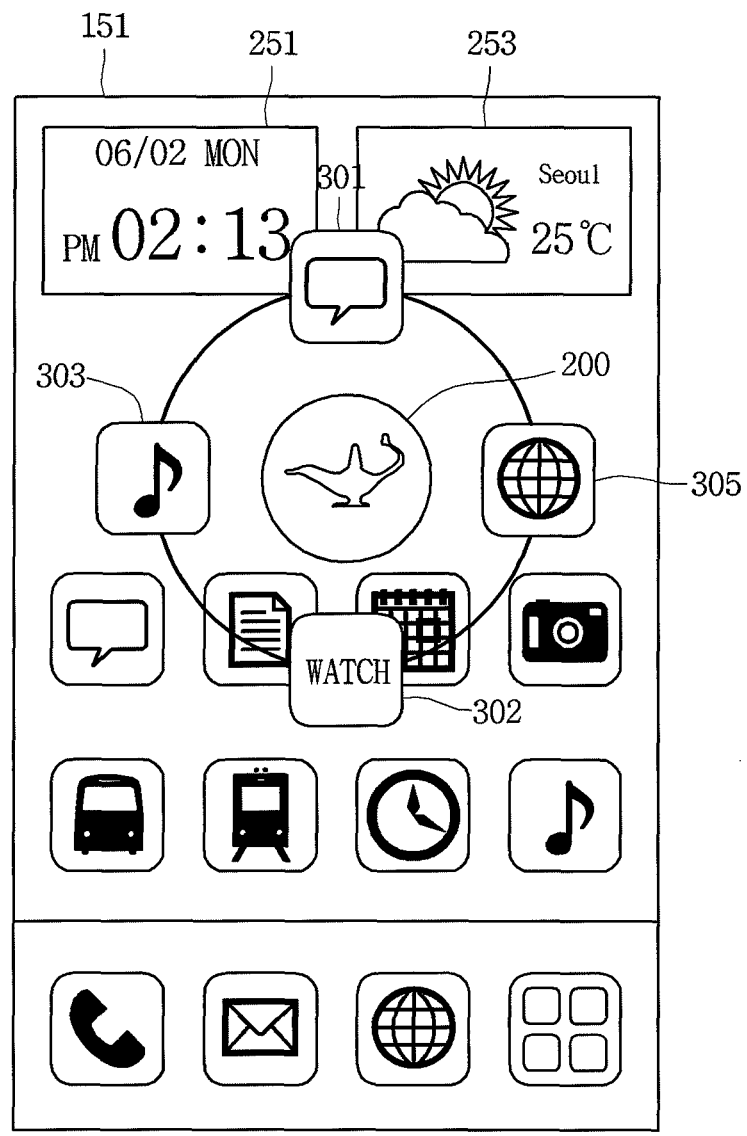
FIG. 92 is a view illustrating a simple screen display according to an embodiment of the present invention.

This will be described with reference to FIGS. 92 to 96. In particular, FIG. 92 is a view illustrating a home screen displaying a simple menu according to an embodiment of the present invention. In correspondence to a touch input rubbing a partial area of a screen displayed on the display unit 151, the controller 180 can display a home screen, that is, a basic screen of a terminal, on the display unit 151 and display a simple menu on the home screen. The controller 180 can display on the simple menu at least one of an intelligent agent icon 200, an application icon for at least one recommendation function, and a menu window for at least one recommendation function.

The controller 180 can display an icon for a recommendation function corresponding to a usage pattern of the terminal 100 and a state of the terminal 100. Herein, the usage pattern of the terminal 100 includes a usage frequency, a usage function, and a usage time of an application that the user uses. Then, the state of the terminal 100 includes a screen displayed on the display unit 151 of the terminal 100, an input state of the terminal 100, location information obtained by the terminal 100, and a communication state of the terminal 100. For example, as shown in FIG. 92, the controller 180 can display a message application icon 301, a music application icon 303, a smart watch icon 302, and a web browser icon 305 as an application icon for a recommendation function on the simple menu. Herein, the smart watch icon 302 is an icon corresponding to the linked watch type terminal 900. Then, when obtaining the user input for selecting the smart watch icon 302, the controller 180 can perform an operation corresponding to the linked watch type terminal 900.

Figure 93:
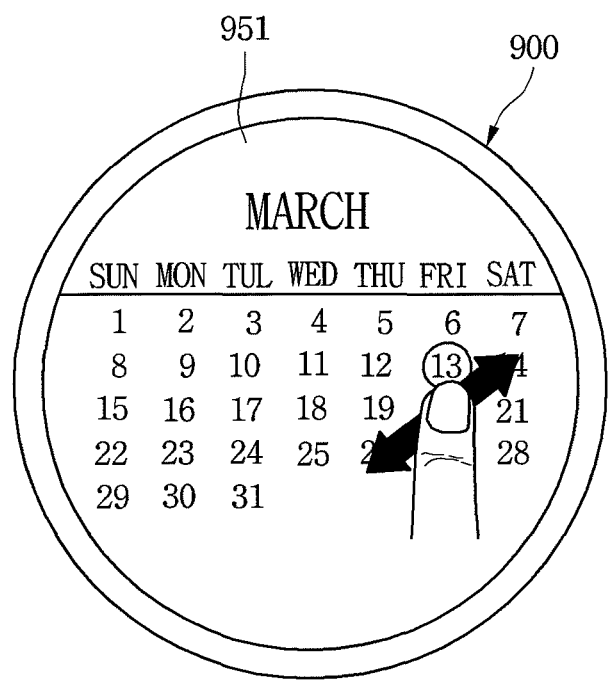
FIG. 93 is a view illustrating the user input rubbing a screen of a watch type terminal according to an embodiment of the present invention.
Figure 94:
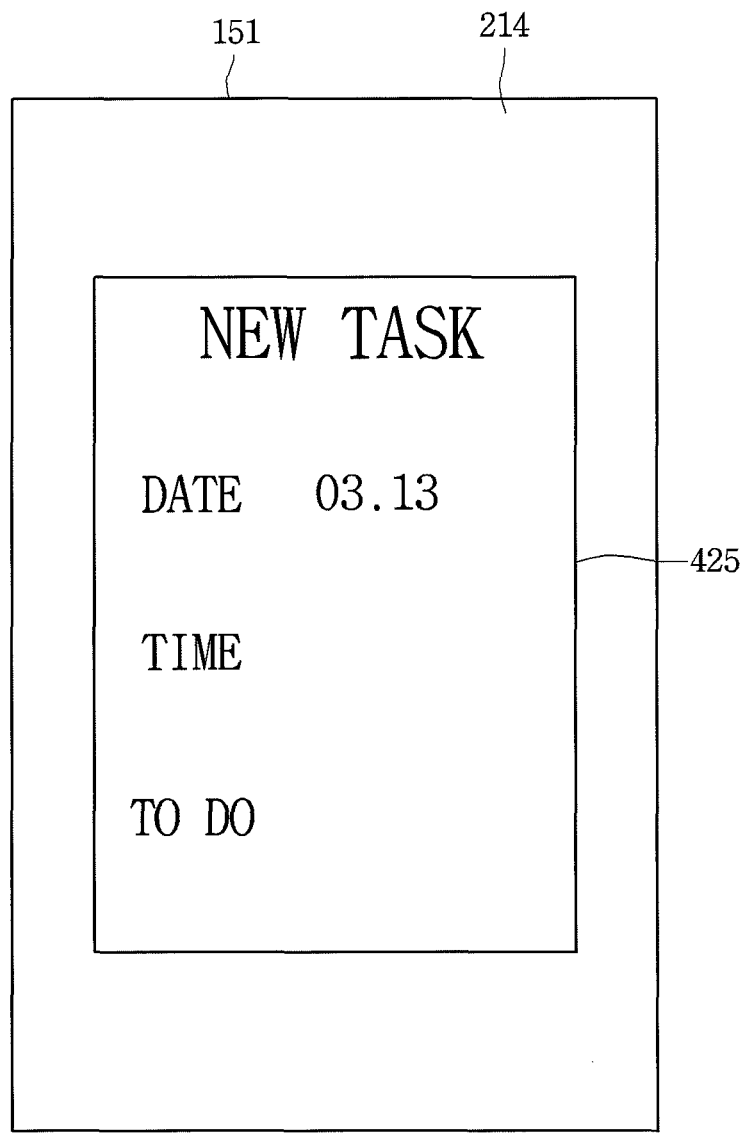
FIG. 94 is a view illustrating a schedule input screen according to an embodiment of the present invention.

An embodiment will be described with reference to FIGS. 93 and 94. In particular, FIG. 93 is a view illustrating the user input rubbing a screen of a watch type terminal according to an embodiment of the present invention, and FIG. 94 is a view illustrating a schedule input screen according to an embodiment of the present invention. Referring to FIG. 93, the controller 980 of the watch type terminal 900 displays a calendar screen on the display unit 951. The controller 980 can also obtain the user input rubbing March 13, that is, a specific date, on the calendar screen displayed on the display unit 951. The controller 980 can transmit a first signal including information on the user input rubbing March 13 on the calendar screen, to the terminal 100. The controller 180 of the terminal 100 thus obtains a first signal.

Then, referring to FIG. 94, the controller 180 of the terminal 100 can display a schedule input screen 214 on the display unit 151, as an operation corresponding to the obtained first signal. Herein, the schedule input screen 214 corresponds to a screen for adding a new schedule to a schedule application. Accordingly, as shown in FIG. 94, the controller 180 can display on the display unit 151 the schedule input screen 214 for inputting a new schedule for March 13 in correspondence to the obtained first signal.

Figure 95:
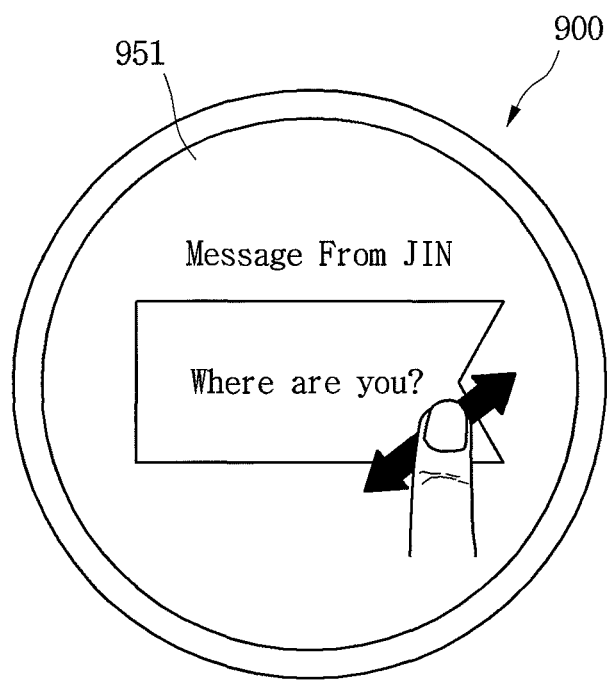
FIG. 95 is a view illustrating the user input rubbing a screen of a watch type terminal according to another embodiment of the present invention.
Figure 96:
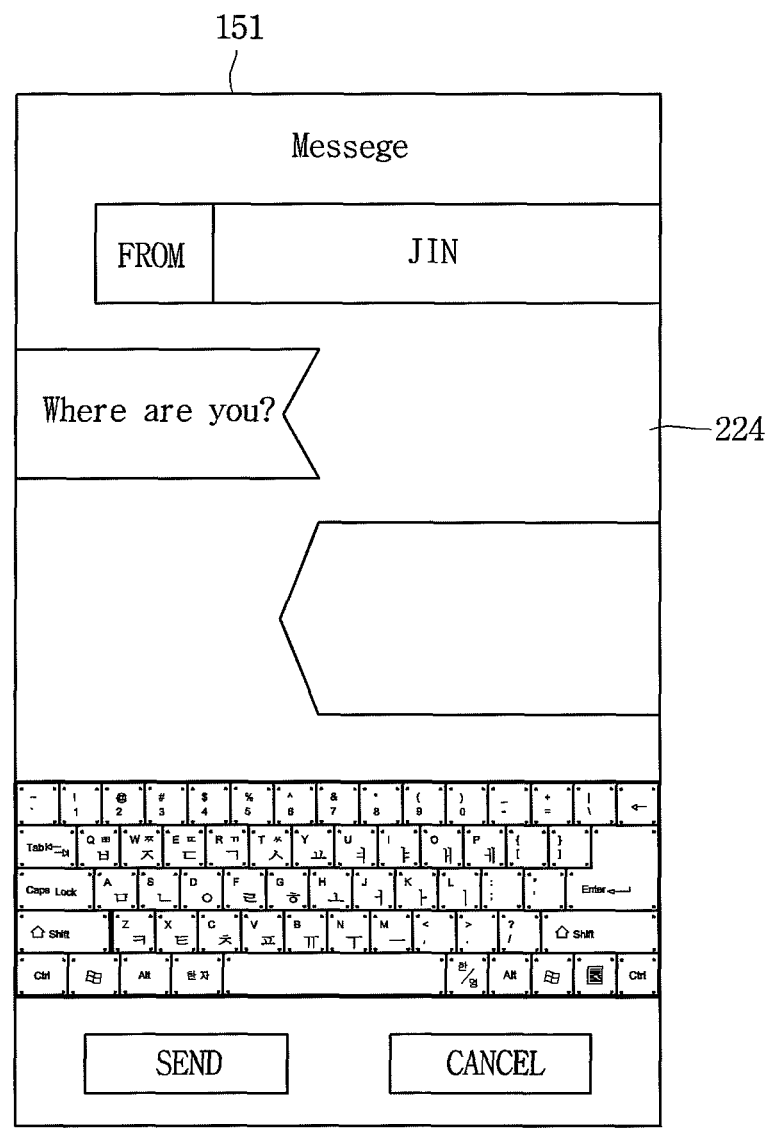

Another embodiment will be described with reference to FIGS. 95 and 96. In particular, FIG. 95 is a view illustrating the user input rubbing a screen of a watch type terminal according to another embodiment of the present invention, and FIG. 96 is a view illustrating a message input screen according to an embodiment of the present invention. Referring to FIG. 95, the controller 980 of the watch type terminal 900 displays a message reception screen on the display unit 951. The controller 980 of the watch type terminal 900 can obtain the user input rubbing the received message on the message reception screen displayed on the display unit 951.

Further, the controller 980 of the watch type terminal 900 transmits a second signal including information on the user input rubbing the received message on the message reception screen to the terminal 100. The controller 180 of the terminal 100 thus obtains a second signal through the communication unit 110. Then, the controller 180 of the terminal 100 may display a message input screen 224 on the display unit 151, as an operation corresponding to the obtained second signal. Herein, the message input screen 224 corresponds to a screen for inputting a response message for the received message. Accordingly, as shown in FIG. 96, the controller 180 can display on the display unit 151 the message input screen 224 for inputting a response message for the received message in correspondence to the obtained second signal.

As a thirteenth embodiment, an information display operation corresponding to a selected area through a function performance of the terminal 100 is described. The controller 180 can display various information on the screen of the display unit 151. The controller 180 can divide the screen of the display unit 151 into a plurality of areas and display different information in each of the plurality of divided areas. Then, when obtaining the user input for executing an intelligent agent for one of a plurality of areas, the controller 180 can activate and display an area corresponding to the user input and deactivate and display the remaining area. The controller 180 can display on the display unit 151 information and menus relating to information included in an area corresponding to the user input.

Figure 97:
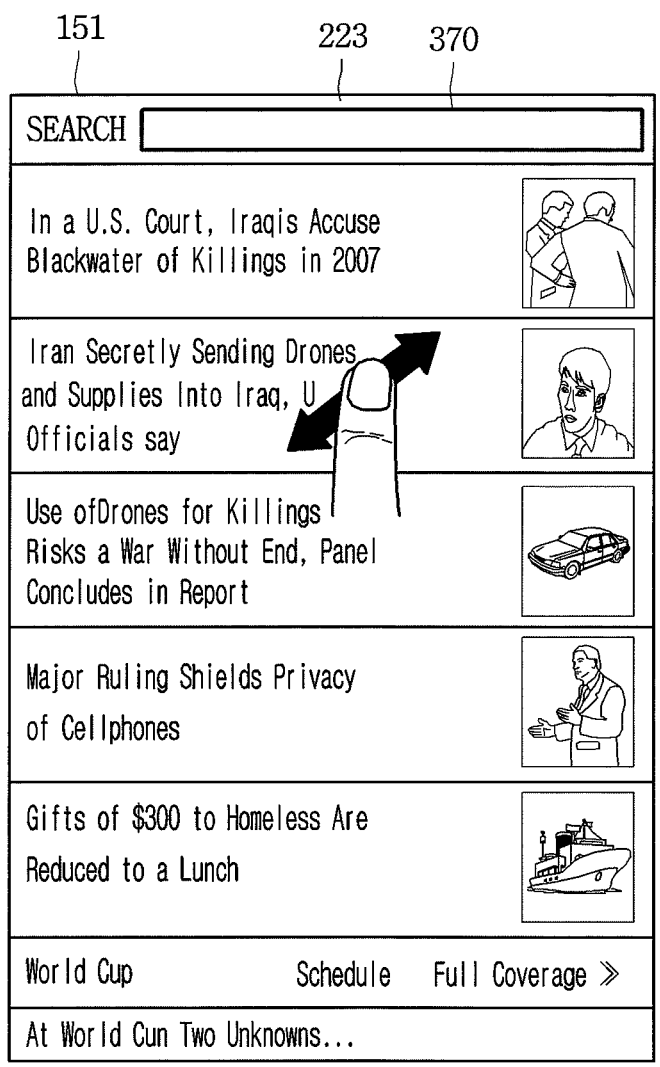
FIG. 97 is a view illustrating the user input for a web browser screen according to an embodiment of the present invention.
Figure 98:
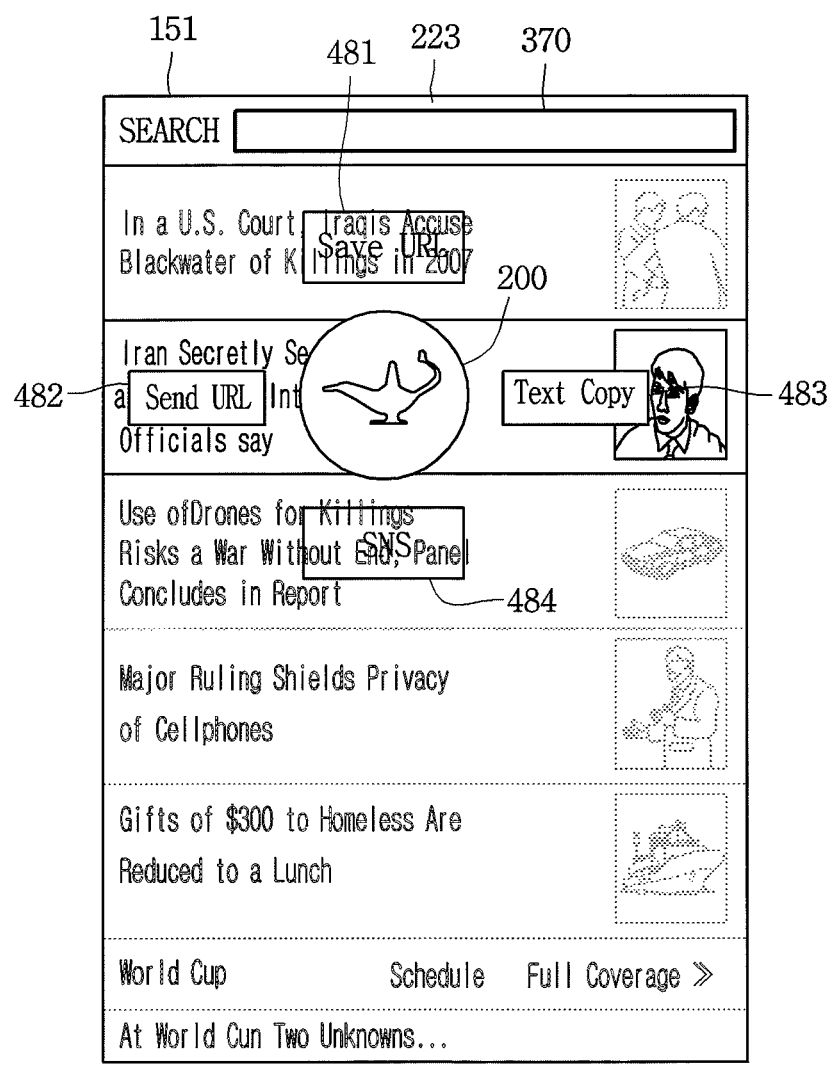
FIG. 98 is a view illustrating a menu window display for a function corresponding to a selected area according to an embodiment of the present invention.

This will be described with reference to FIGS. 97 and 98. In particular, FIG. 97 is a view illustrating the user input for a web browser screen according to an embodiment of the present invention, and FIG. 98 is a view illustrating a menu window display for a function corresponding to a selected area according to an embodiment of the present invention. Referring to FIG. 97, the controller 180 can display a web browser screen 223 according to a web browser application execution on the display unit 151. The controller 180 can display various different news in each of a plurality of areas on the web browser screen 223.

Then, the controller 180 can obtain a touch input rubbing one area of a plurality of areas of the web browser screen 223 as the user input for executing an intelligent agent. When obtaining the user input rubbing a specific area of the web browser screen 223, the controller 180 can execute an intelligent agent for displaying a menu window for a function related to the specific area on the display unit 151. Additionally, the controller 180 can display a menu window for a function relating to a specific area on the display unit 151.

The controller 180 can activate and display the selected specific area and deactivate and display the remaining areas. For example, as shown in FIG. 98, the controller 180 can activate and display an area selected from the web browser screen 223 displayed on the display unit 151 and deactivate and display the remaining areas. Then, the controller 180 can display a menu window for a function relating to the selected specific area on the display unit 151. Accordingly, as shown in FIG. 98, the controller 180 can display, on the web browser screen 223, an intelligent agent icon 200 and a save URL 481, a send URL 482, a copy text 483, and a send SNS 484 as a menu window for a function relating to text.

Herein, the save URL 481 is a menu window for saving the Uniform Resource Locator of text corresponding to the selected area, the send URL 482 is a menu window for sending the URL of text corresponding to the selected area, the copy text 483 is a menu window for copying text corresponding to the selected area, and the send SNS 484 is a menu window for sending a text corresponding to the selected area to a Social Networking Service (SNS).

As a fourteenth embodiment, an operation when the display unit 151 is turned off through a function performance of the terminal 100 is described. In more detail, the terminal 100 can operate when the display unit 151 is turned off. For example, the terminal 100 may operate in a normal mode from a turned off state of the display unit 151 and operate in the sleep mode. Accordingly, the controller 180 of the terminal 100 can process at least one event and perform at least one job when the display unit 151 is turned off.

When the display unit 151 is turned off, the controller 180 of the terminal 100 can obtain a touch input rubbing a partial area of the screen of the display unit 151 as the user input for executing an intelligent agent. Accordingly, the controller 180 can turn on the display unit 151 and display a screen relating to at least one event occurring when the display unit 151 is turned off. Additionally, the controller 180 can display a simple menu for the intelligent agent on a screen relating to at least one event.

Figure 99:
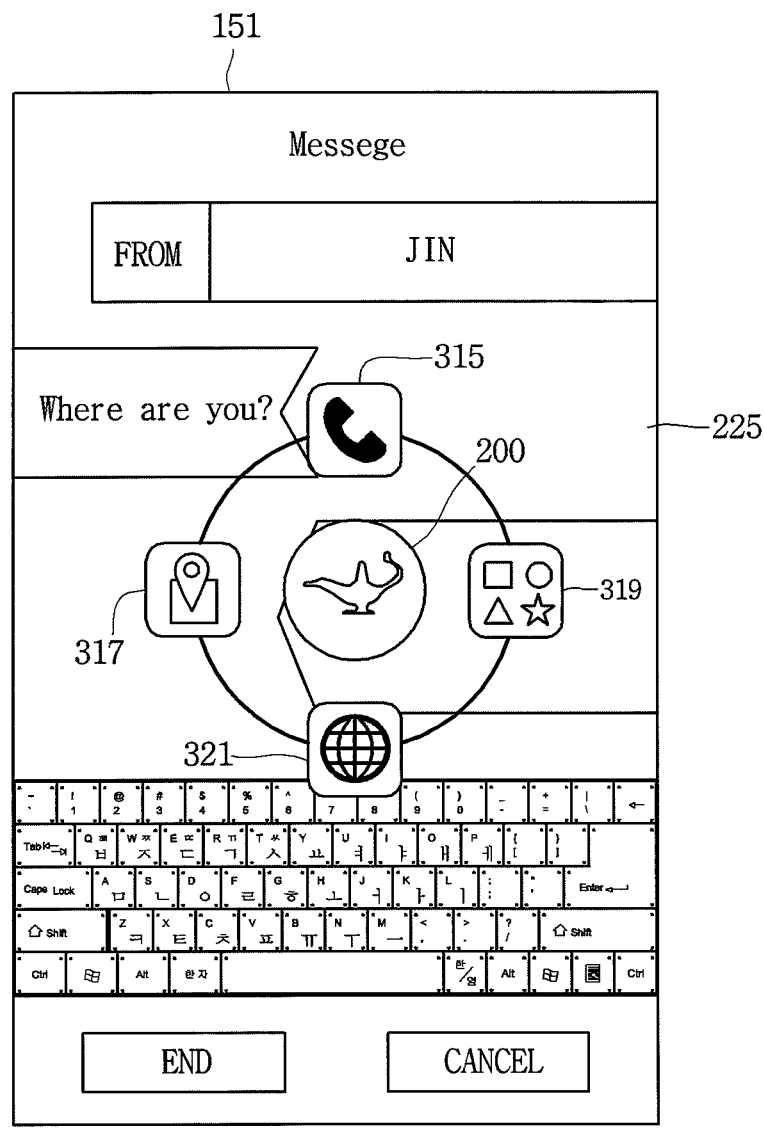
FIG. 99 is a view illustrating a message input screen according to another embodiment of the present invention.

An embodiment will be described with reference to FIG. 99. In particular, FIG. 99 is a view illustrating a message input screen according to another embodiment of the present invention. When the display unit 151 is turned off, the controller 180 can obtain a touch input rubbing a partial area of the screen of the display unit 151 as the user input for executing an intelligent agent. Accordingly, as shown in FIG. 99, the controller 180 can display a message input screen 225 where a response message for a message received when the display unit 151 is turned off on the screen of the display unit 151. Then, the controller 180 can display an intelligent agent icon 200 and a simple menu including an icon for at least one application on the display unit 151.

For example, the controller 180 can display on the message input screen 225 displayed on the display unit 151, an intelligent agent icon 200, and a call application icon 315, a map application icon 317, a game application icon 319, and a web browser icon 321 as a recommendation application icon corresponding to the user. Herein, the call application icon 315 is an icon corresponding to a call application, and the map application icon 317 is an icon corresponding to a map application. Further, the game application icon 319 is an icon corresponding to a game application, and the web browser icon 321 is an icon corresponding to a web browser application.

As a fifteenth embodiment, the present invention can obtain the user input for executing an intelligent agent for at least one key of the terminal 100 and perform a function corresponding a key input by the user. For example, the controller 180 can obtain the user input for executing an intelligent agent for at least one key of the terminal 100 and perform different operations according to the user's recognition corresponding to the user input, in a lock state or a sleep mode.

As one embodiment, the controller 180 can obtain a touch input rubbing the lower end key 124c of the rear key 124 as the user input for executing an intelligent agent. Then, the controller 180 can recognize the user corresponding to the user input. When a recognized user is a registered user, the controller 180 can operate when all functions relating to the camera 121 of the terminal 100 are available and when a recognized user is an unregistered user, may operate when only some functions relating to the camera 121 of the terminal 100 are available.

As another embodiment, the controller 180 can obtain a touch input rubbing the upper end key 124a of the rear key 124 as the user input for executing an intelligent agent. Then, the controller 180 can recognize the user corresponding to the user input. When a recognized user is a registered user, the controller 180 can operate when all functions relating to a memo application are available and when a recognized user is an unregistered user, operate when only some functions relating to a memo application are available.

Description for a function performance corresponding to the user input for executing an intelligent agent for a key of the terminal 100 is exemplary and is not limited thereto. Accordingly, the user input for executing an intelligent agent for various keys included in the terminal 100 may be input and various functions corresponding to the user input may be performed according to the user's or designer's selection. Moreover, when obtaining the user input for executing an intelligent agent with respect to each of a plurality of terminals 100 at the same time or within a predetermined time, a function corresponding to the plurality of terminals 100 can be performed according to an intelligent agent execution.

Figure 100:
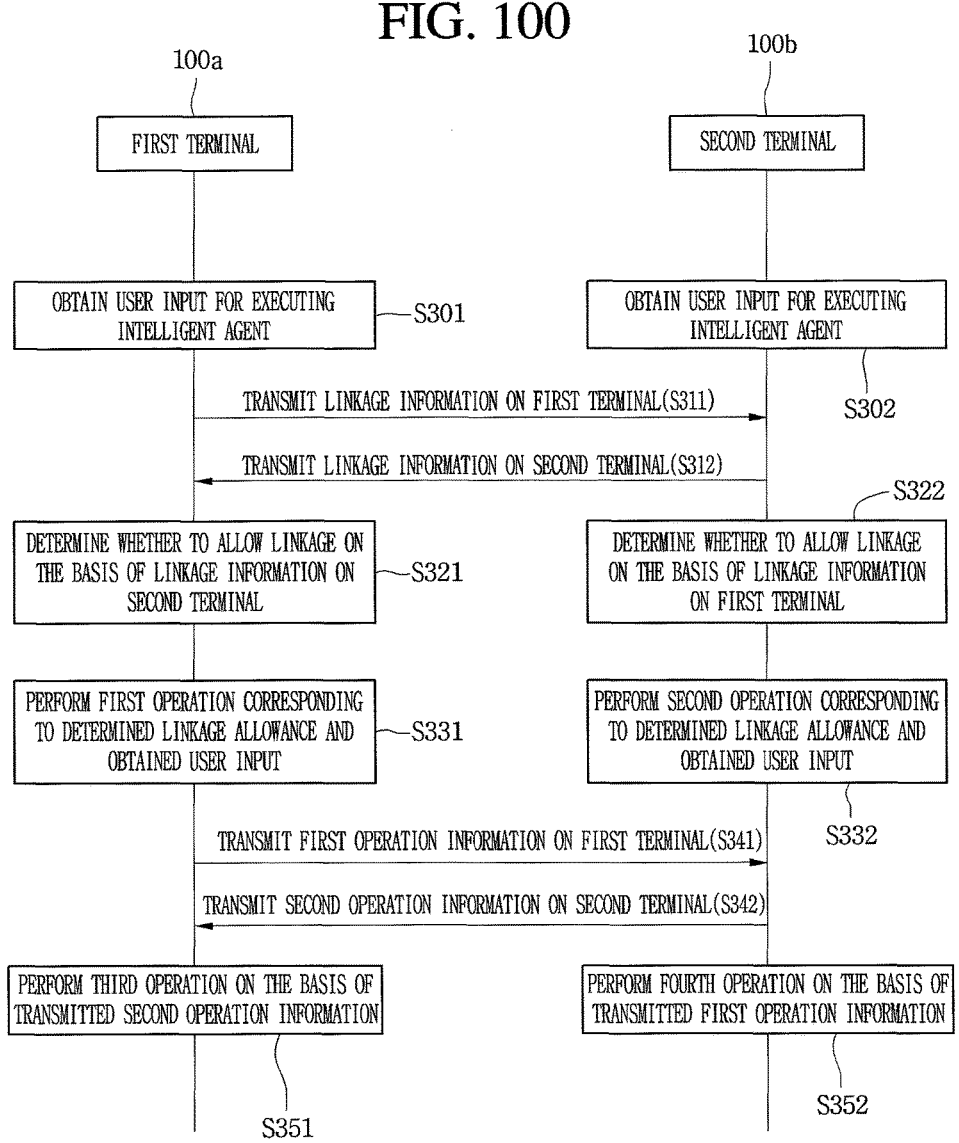
FIG. 100 is a flowchart illustrating an operating method of a plurality of terminals according to an embodiment of the present invention.

In particular, FIG. 100 is a flowchart illustrating an operating method of a plurality of terminals according to an embodiment of the present invention. Referring to FIG. 100, a first terminal 100a obtains the user input for executing an intelligent agent in operation S301 and a second terminal 100b obtains the user input for executing an intelligent agent (S302). As mentioned above for the terminal 100, the first terminal 100a and the second terminal 100b can obtain the user input for executing an intelligent agent through at least one of the user input 123, a touch sensor, the camera 121, and the microphone 122. Then, each of the first terminal 100a and the second terminal 100b can obtain the user input for executing an intelligent agent at the same time or within a predetermined time. Accordingly, if each of the first terminal 100a and the second terminal 100b does not obtain the user input for executing an intelligent agent at the same time or within a predetermined time, a function corresponding to the plurality of terminals 100 may not be performed according to an intelligent agent execution described later.

The first terminal 100a transmits linkage information on the first terminal 100a in order to perform a function corresponding to the plurality of terminals 100 according to an intelligent agent execution (S311), and the second terminal 100b transmits linkage information on the second terminal 100b in order to perform a function corresponding to the plurality of terminals 100 according to an intelligent agent execution (S312).

Herein, the linkage information includes at least one of device information on each of the first terminal 100a and the second terminal 100b and unique information for identifying a terminal. For example, the device information includes information corresponding to the performance of the terminal 100. User information on a terminal includes user information registered to the terminal 100 and user information that the terminal 100 recognizes. The unique information for identifying a terminal includes at least one of information on an input form of the user input for executing an intelligent agent, information on a voice that each device 100 obtains, and GPS information, Wi-Fi information, magnetic field information, and distance information, and location information of each terminal 100.

Herein, the GPS information of the terminal 100 can be location information of a terminal corresponding to a GPS signal that the terminal 100 obtains. The Wi-Fi information of the terminal 100 can be information on the type of a wireless AP transmitting/receiving a wireless signal and the intensity of a wireless signal. The magnetic field information of the terminal 100 can be information on a magnetic field detected by the terminal 100, the distance information of the terminal 100 can be information on a distance with another terminal 100, and the location information of the terminal 100 can be information on the location of a terminal.

In addition to the above-mentioned various information, the terminal 100 can transmit various information relating to a linkage to another terminal as linkage information. The first terminal 100a determines whether a linkage with the second terminal 100b is allowed based on linkage information transmitted from the second terminal 100b (S321) and determines whether a linkage with the first terminal 100a is allowed based on linkage information transmitted from the first terminal 100a (S322).

The controller 180 of each of the first terminal 100a and the second terminal 100b can determine whether to perform a linkage for performing a function corresponding to the plurality of terminals 100 based on the received linkage information. As one embodiment, the first terminal 100a can determine whether a distance with the second terminal 100b is within a predetermined distance based on the received linkage information and if the distance is within the predetermined distance, allow a linkage with the second terminal 100b. The second terminal 100b can determine whether a distance with the first terminal 100a is within a predetermined distance based on the received linkage information and if the distance is within the predetermined distance, allow a linkage with the first terminal 100a. Moreover, each of the first terminal 100a and the second terminal 100b may use various methods to measure a distance with another terminal. As one embodiment, the first terminal 100a and the second terminal 100b can measure a distance with another terminal by using Bluetooth Low Energy (BLE) or ultrasonic waves.

As another embodiment, the first terminal 100a can determine whether a connection code that the second terminal 100b transmits is identical to a connection code of the first terminal 100a based on the connection code included in the received linkage information and if the connection code is identical, allow a linkage with the second terminal 100b. The second terminal 100b can determine whether a connection code that the first terminal 100a transmits is identical to a connection code of the second terminal 100b based on the connection code included in the received linkage information and if the connection code is identical, allow a linkage with the first terminal 100a. Herein, the connection code includes information on a time and a place and unique information relating to a linkage. Additionally, the connection code is encrypted and included in linkage information. For example, the connection code may be converted into a non-reversible function and be included in linkage information.

As another embodiment, the first terminal 100a can determine whether an input direction of the user input for executing an intelligent agent input to the second terminal 100b is identical to an input direction of the user input for executing an intelligent agent input to the first terminal 100a based on the received linkage information and if the input direction is identical, allow a linkage with the second terminal 100b. The second terminal 100b can determine whether an input direction of the user input for executing an intelligent agent input to the first terminal 100a is identical to an input direction of the user input for executing an intelligent agent input to the second terminal 100b based on the received linkage information and if the input direction is identical, allow a linkage with the first terminal 100a.

Figure 101:
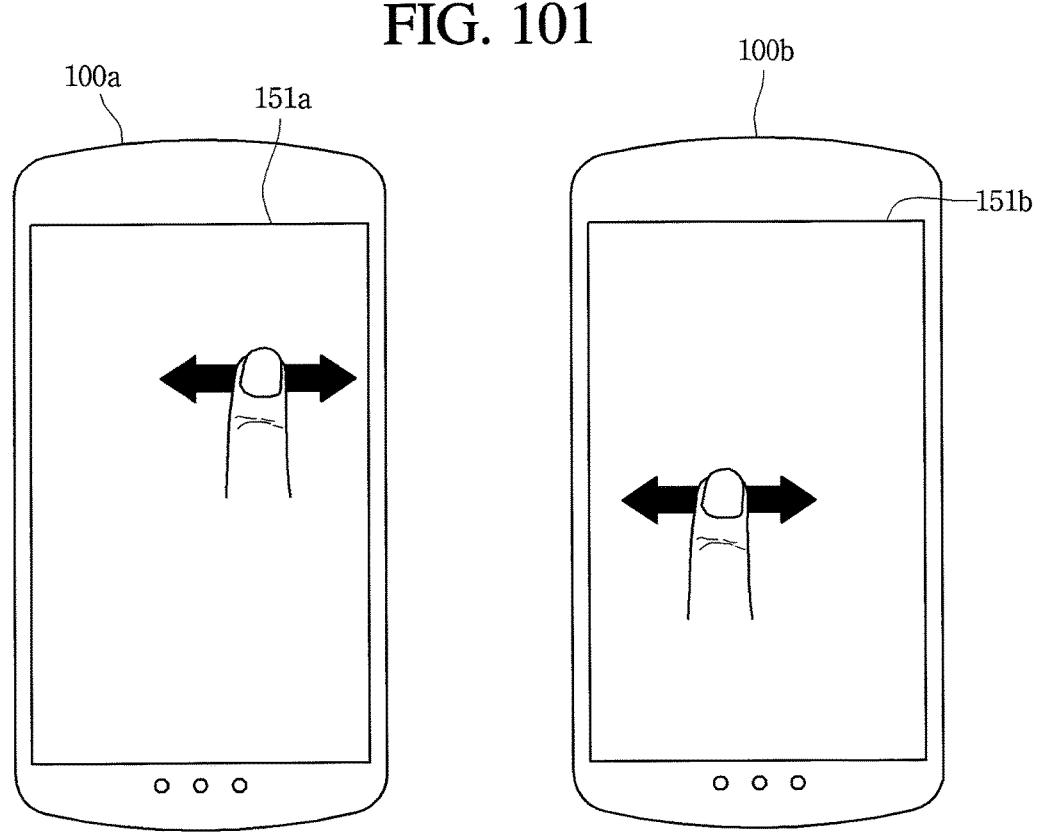
FIG. 101 is a view illustrating the user input for executing an intelligent agent for a plurality of terminals according to an embodiment of the present invention.

This will be described with reference to FIGS. 101 and 102. In particular, FIG. 101 is a view illustrating the user input for executing an intelligent agent for a plurality of terminals according to an embodiment of the present invention. Referring to FIG. 101, when an input direction of the user input for executing an intelligent agent input to the second terminal 100b is the user input rubbing in a horizontal direction and an input direction of the user input for executing an intelligent agent input to the first terminal 100a is the user input rubbing in a horizontal direction based on the received linkage information, the first terminal 100a can allow a linkage with the second terminal 100b. Then, the second terminal 100b can allow a linkage with the first terminal 100a through the same process.

Figure 102:
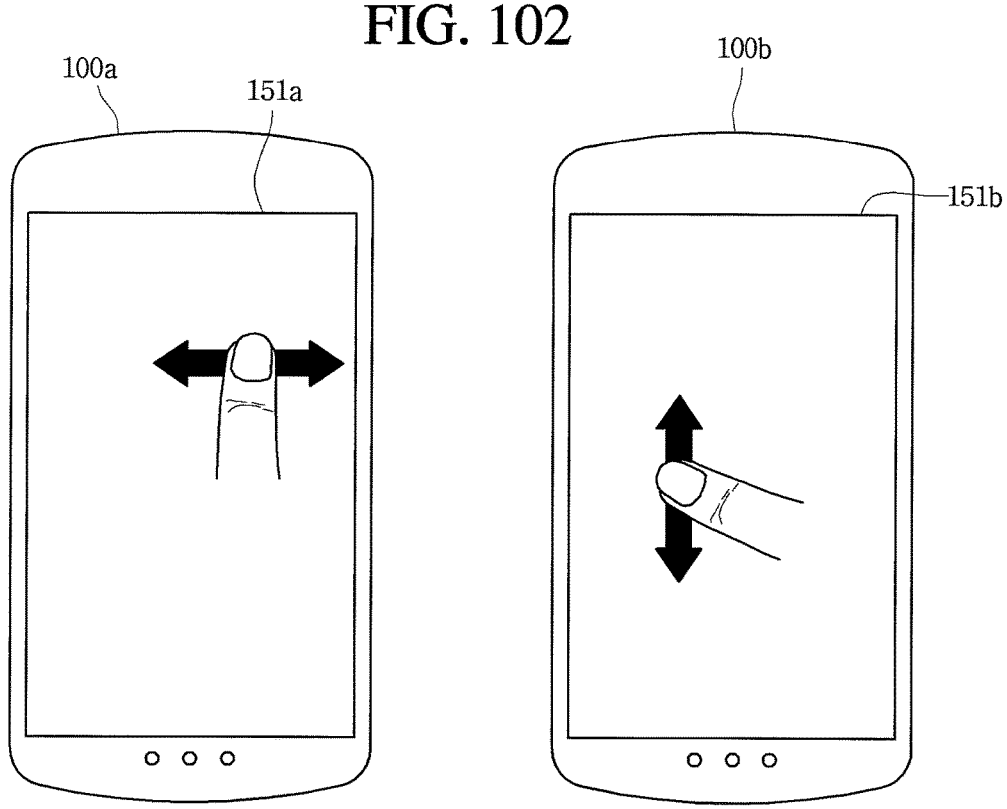
FIG. 102 is a view illustrating the user input for executing an intelligent agent for a plurality of terminals according to another embodiment of the present invention.

FIG. 102 is a view illustrating the user input for executing an intelligent agent for a plurality of terminals according to another embodiment of the present invention. Referring to FIG. 102, when an input direction of the user input for executing an intelligent agent input to the second terminal 100b is the user input rubbing in a horizontal direction and an input direction of the user input for executing an intelligent agent input to the first terminal 100a is the user input rubbing in a horizontal direction based on the received linkage information, the first terminal 100a can not allow a linkage with the second terminal 100b. Then, the second terminal 100b can not allow a linkage with the first terminal 100a through the same process.

As another embodiment, the first terminal 100a can compare a voice waveform obtained by the second terminal 100b with a voice waveform obtained by the first terminal 100a based on received linkage information, and if the voice waveform obtained by the second terminal 100b is similar to the voice waveform obtained by the first terminal 100a, allow a linkage with the second terminal 100b. The second terminal 100b can compare a voice waveform obtained by the first terminal 100a with a voice waveform obtained by the second terminal 100b based on received linkage information, and if the voice waveform obtained by the first terminal 100a is similar to the voice waveform obtained by the second terminal 100b, allow a linkage with the first terminal 100a.

As another embodiment, the first terminal 100a can compare a Wi-Fi signal waveform obtained by the second terminal 100b with a Wi-Fi signal waveform obtained by the first terminal 100a based on received linkage information, and if the Wi-Fi signal waveform obtained by the second terminal 100b is similar to the Wi-Fi signal waveform obtained by the first terminal 100a, allow a linkage with the second terminal 100b. The second terminal 100b can compare a Wi-Fi signal waveform obtained by the first terminal 100a with a Wi-Fi signal waveform obtained by the second terminal 100b based on received linkage information, and if the Wi-Fi signal waveform obtained by the first terminal 100a is similar to the Wi-Fi signal waveform obtained by the second terminal 100b, allow a linkage with the first terminal 100a.

As another embodiment, the first terminal 100a can compare the size of a magnetic field detected by the second terminal 100b with the size of a magnetic field detected by the first terminal 100a based on received linkage information, and if the size of a magnetic field detected by the second terminal 100b is similar to the size of a magnetic field detected by the first terminal 100a, allow a linkage with the second terminal 100b. The second terminal 100b can compare the size of a magnetic field detected by the first terminal 100a with the size of a magnetic field detected by the second terminal 100b based on received linkage information, and if the size of a magnetic field detected by the first terminal 100a is similar to the size of a magnetic field detected by the second terminal 100b, allow a linkage with the first terminal 100a.

As another embodiment, the first terminal 100a can determine whether the phone number of the second terminal 100b included in received linkage information is included in an address book of the first terminal 100a and if the phone number of the second terminal 100b is included in the address book of the first terminal 100a, allow a linkage with the second terminal 100b. The second terminal 100b may determine whether the phone number of the first terminal 100a included in received linkage information is included in an address book of the second terminal 100b and if the phone number of the first terminal 100a is included in the address book of the second terminal 100b, allow a linkage with the first terminal 100a.

As another embodiment, the first terminal 100a can display a pop up window for obtaining the user input on whether a linkage is made with the second terminal 100b based on received linkage information and obtain the user input on whether the linkage is made. Then, when obtaining the user input for allowing a linkage with the second terminal 100b, the first terminal 100a allow a linkage with the second terminal 100b. The second terminal 100b can display a pop up window for obtaining the user input on whether a linkage is made with the first terminal 100a based on received linkage information and obtain the user input on whether the linkage is made. Then, when obtaining the user input for allowing a linkage with the first terminal 100a, the second terminal 100b can allow linkage with the first terminal 100a.

Description for whether the linkage is allowed is exemplary and is not limited thereto. Accordingly, whether a linkage with another terminal is allowed may be determined through various methods according to the user's or designer's selection. Moreover, when the plurality of terminals 100 are linked to each other, based on user information of each of the plurality of linked terminals 100, whether there is a common group for a plurality of users corresponding to the plurality of terminals 100 may be determined and if there is a common group, the name corresponding to a corresponding group may be used.

As one embodiment, when the user of the first terminal 100a and the user of the second terminal 100b are members of a family A, the first terminal 100a and the second terminal 100b can determine a common group as the family A and use the name corresponding to the family A. Then, each of the first terminal 100a and the second terminal 100b can obtain the user input for executing an intelligent agent at the same time or within a predetermined time.

As one embodiment, when the user of the first terminal 100a and the user of the second terminal 100b are members of a team B, the first terminal 100a and the second terminal 100b can determine a common group as the team B and use the name corresponding to the team B. For example, each of the first terminal 100a and the second terminal 100b can output the name of the team B in a character or voice message for the user.

Description for the name of the common group is exemplary and is not limited thereto. Accordingly, various names may be applied according to the user's or designer's selection. Referring again to FIG. 100, a first terminal 100a performs a first operation corresponding to a determined linkage allowance and an obtained user input (S331) and can perform a second operation corresponding to a determined linkage allowance and an obtained user input (S332).

Herein, the first operation and the second operation may be identical to or different from each other. Then, the first operation and the second operation may be linked to each other. This will be described later with a specific embodiment.

The first terminal 100 transmits first operation information on the performed first operation to the second terminal 100b (S341) and the second terminal 100b transmits second operation information on the performed second operation to the first terminal 100a (S342). The first terminal 100a performs a third operation based on the transmitted second operation information (S351) and the second terminal 100b performs a fourth operation based on the transmitted first operation information.

Each of the first terminal 100a and the second terminal 100b can transmit information on the performed operation to another terminal and perform another operation based on the transmitted information. Herein, the third operation and the fourth operation may be identical to or different from each other. Then, the third operation and the fourth operation may be linked to each other. This will be described later with a specific embodiment.

A specific embodiment for an operation corresponding to the user input for executing an intelligent agent for each of the plurality of terminals 100 is described below. An embodiment will be described with reference to FIG. 103. In particular, FIG. 103 is a view illustrating the user input for file transfer according to an embodiment of the present invention.

Figure 103:
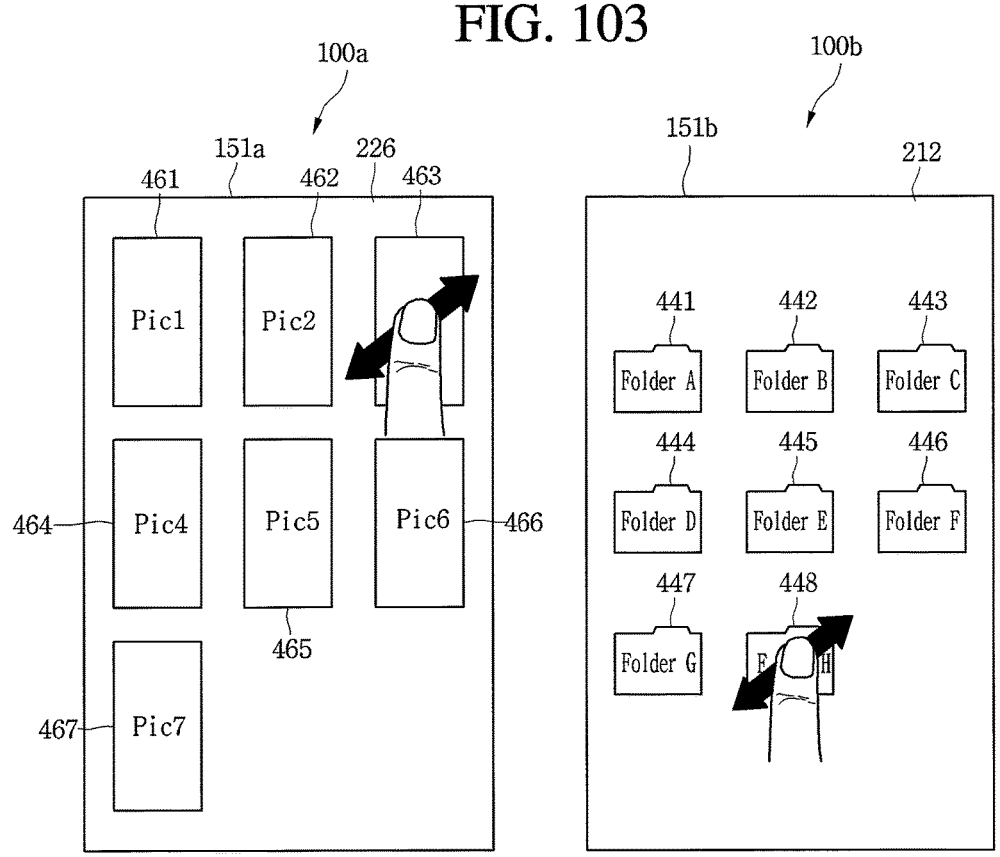
FIG. 103 is a view illustrating the user input for file transfer according to an embodiment of the present invention.

Referring to FIG. 103, the controller 180 of the first terminal 100a can display a picture display screen 226 displaying a plurality of pictures 461 to 467 on the display unit 151. Then, the controller 180 of the second terminal 100b can display a picture folder display screen 212 displaying a plurality of folders 441 to 448 on the display unit 151. The controller 180 of the first terminal 100a can obtain the user input rubbing the third picture 463 from the picture display screen 226 and the controller 180 of the second terminal 100b can obtain the user input rubbing the folder H 448 from the picture folder display screen 212. Accordingly, the first terminal 100a can transmit data for the third picture 463 to the second terminal 100b and the second terminal 100b can store the transmitted data for the third picture 463 in the holder H 448.

Figure 104:
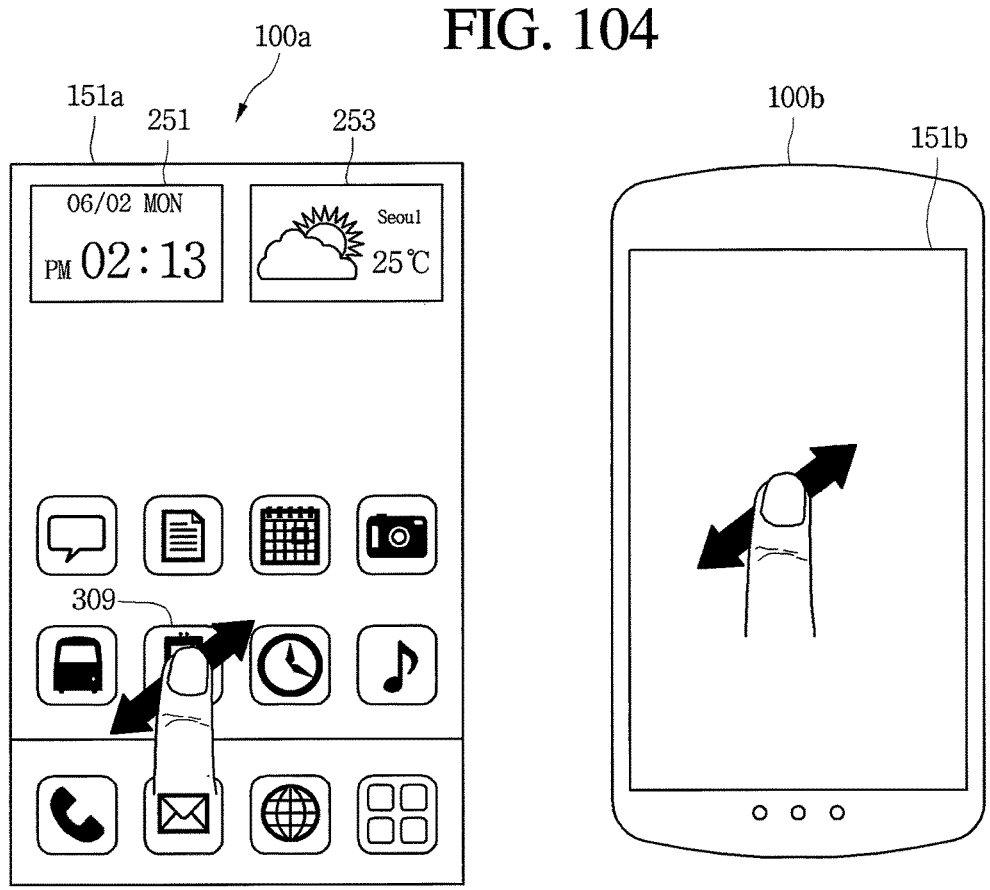
FIG. 104 is a view illustrating the user input for application installation according to an embodiment of the present invention.

Another embodiment will be described with reference to FIG. 104. In particular, FIG. 104 is a view illustrating the user input for application installation according to an embodiment of the present invention. Referring to FIG. 104, the controller 180 of the first terminal 100a can display a home screen, that is, a basic screen of the first terminal 100a, on the screen of the display unit 151 and as mentioned above, various objects such as widgets and application icons may be displayed on the home screen. The controller 180 of the first terminal 100a can obtain the user input rubbing a train application icon 309 displayed on the home screen and the controller 180 of the second terminal 100b can obtain the user input rubbing a partial area of the display unit 151. Accordingly, the first terminal 100a can transmit information on a train application to the second terminal 100b and the second terminal 100b can install a train application to the second terminal 100b based on information on the transmitted train application.

Figure 105:
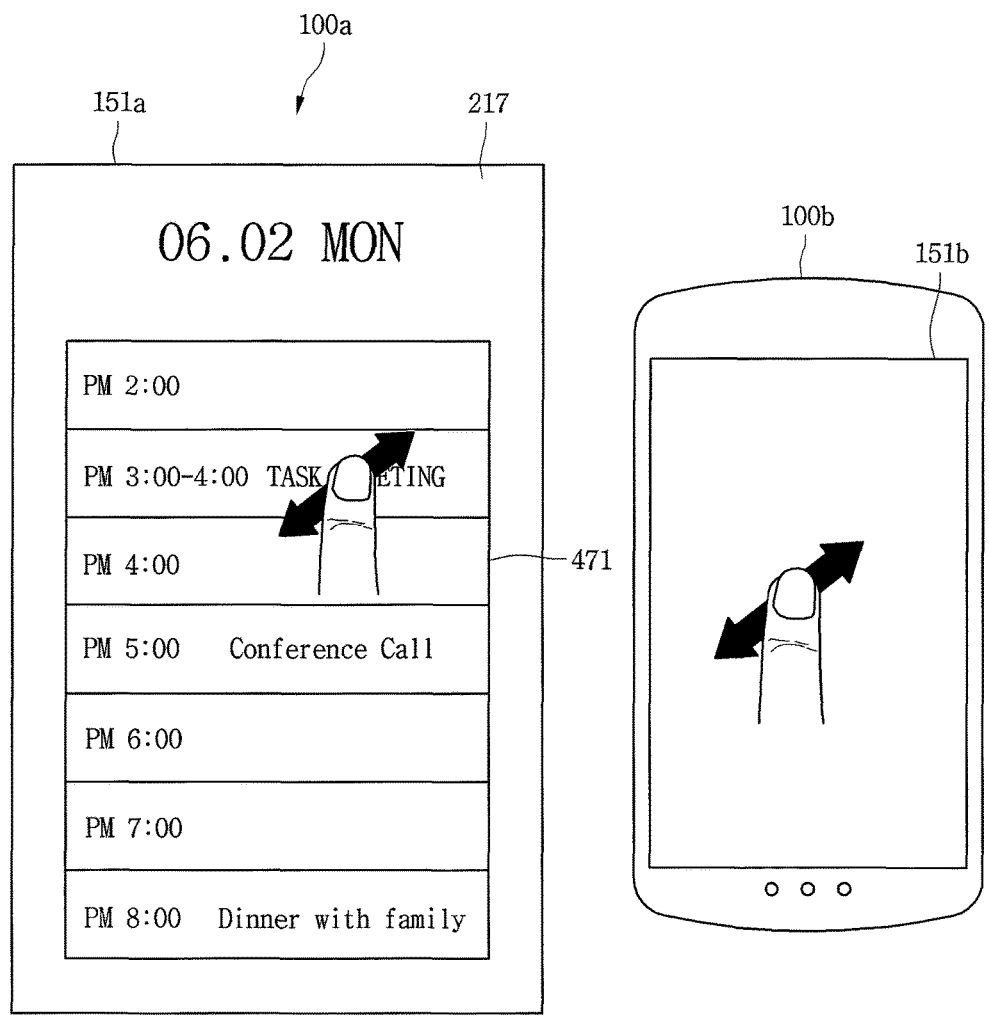
FIG. 105 is a view illustrating the user input for schedule transmission according to an embodiment of the present invention.

Another embodiment will be described with reference to FIG. 105. In particular, FIG. 105 is a view illustrating the user input for schedule transmission according to an embodiment of the present invention. Referring to FIG. 105, the controller 180 of the first terminal 100a can display on the display unit 151 a schedule information display screen 217 displaying a schedule after the current time. The controller 180 of the first terminal 100a can obtain the user input rubbing an area corresponding to a 3:00 AM schedule from the schedule information display screen 217, and the controller 180 of the second terminal 100b can obtain the user input rubbing a partial area of the display unit 151. Accordingly, the first terminal 100a can transmit information on the 3:00 am schedule to the second terminal 100b and the second terminal 100b can add the information on the 3:00 AM schedule to a predetermined application. Moreover, besides the above-mentioned schedule information, various information such as memo information may be transmitted in correspondence to the user input for executing an intelligent agent.

Figure 106:
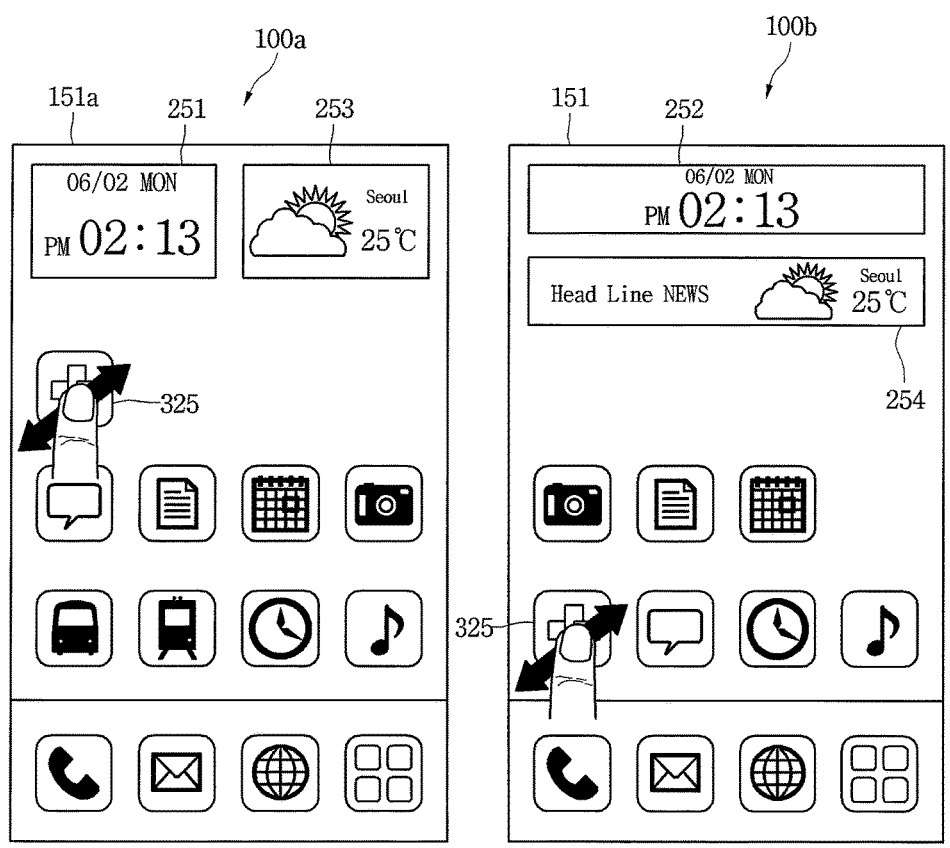
FIG. 106 is a view illustrating the user input for synchronization according to an embodiment of the present invention.

Another embodiment will be described with reference to FIG. 106. In particular, FIG. 106 is a view illustrating the user input for synchronization according to an embodiment of the present invention. Referring to FIG. 106, the controller 180 of the first terminal 100a can display a home screen, that is, a basic screen of the first terminal 100a, on the screen of the display unit 151, and the controller 180 of the second terminal 100b can display a home screen, that is, a basic screen of the second terminal 100b, on the screen of the display unit 151. The controller 180 of the first terminal 100a can obtain the user input rubbing a picture application icon 325 displayed on the home screen and the controller 180 of the second terminal 100b can obtain the user input rubbing a picture application icon 325 displayed on the home screen.

Accordingly, the first terminal 100a can transmit data for at least one picture included in the picture application of the first terminal 100a to the second terminal 100b and the second terminal 100b can transmit data for at least one picture included in the picture application of the second terminal 100b to the first terminal 100a. Accordingly, each of the first terminal 100a and the second terminal 100b can synchronize at least one picture file included in the picture application of each of the first terminal 100a and the second terminal 100b.

As another embodiment, the controller 180 of the first terminal 100a can display a plurality of picture folders on the display unit 151 and the controller 180 of the second terminal 100b can display a plurality of picture folders on the display unit 151. The controller 180 of the first terminal 100a can obtain the user input rubbing one of the plurality of displayed picture folders and the controller 180 of the second terminal 100b can obtain the user input rubbing one of the plurality of displayed picture folders. The first terminal 100a can transmit preview data for previewing at least one picture included in a first folder that is a folder corresponding to the user input to the second terminal 100b, and the second terminal 100b can transmit preview data for previewing at least one picture included in a second folder that is a folder corresponding to the user input to the first terminal 100a. Then, each of the first terminal 100a and the second terminal 100b can display a preview screen for previewing at least one picture included in the first folder and the second folder on the display unit 151.

Moreover, each of the plurality of terminals 100 can obtain the user input for executing an intelligent agent and the user input for a direction of an operation corresponding to the user input and can perform an operation corresponding to the obtained user input in the direction corresponding to the obtained user input. Herein, the direction of an operation corresponds to a direction in which data or information is transmitted and received.

For example, when a specific file is transmitted from the first terminal 100a to the second terminal 100b, the first terminal 100a can obtain the user input swiping in an upper end direction after the user input rubbing a partial area of the display unit 151, and the second terminal 100b can obtain the user input swiping in a lower end direction after the user input rubbing a partial area of the display unit 151. Accordingly, the first terminal 100a can transmit data or information corresponding to a partial area to the second terminal 100b.

Figure 107:
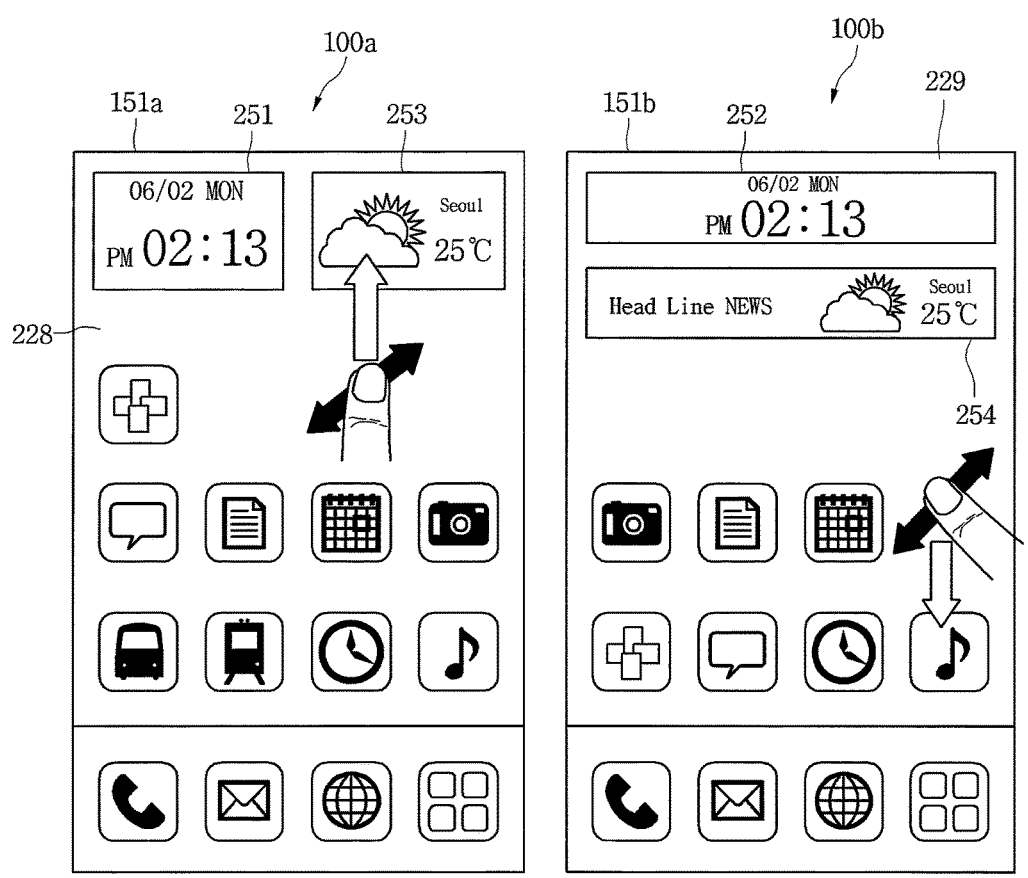
FIG. 107 is a view illustrating a background screen image transmission according to an embodiment of the present invention.

This will be described with reference to FIG. 107. In particular, FIG. 107 is a view illustrating a background screen image transmission according to an embodiment of the present invention. Referring to FIG. 107, the first terminal 100a can display a home screen 228 including a background image on the display unit 151 and the second terminal 100b can display a home screen 229 on the display unit 151. The first terminal 100a can obtain the user input swiping in an upper end direction after the user input rubbing a partial area of the display unit 151, and the second terminal 100b can obtain the user input swiping in a lower end direction after the user input rubbing a partial area of the display unit 151. Accordingly, the first terminal 100a can transmit a background image file to the second terminal 100b and the second terminal 100b can display the transmitted background image on the home screen 229.

As another example, when a specific file is transmitted from the first terminal 100a to the second terminal 100b, the first terminal 100a can obtain the user input swiping in an upper end direction after the user input rubbing a partial area of the display unit 151, and the second terminal 100b can obtain the user input rubbing a partial area of the display unit 151. Accordingly, the first terminal 100a can transmit data or information corresponding to a partial area to the second terminal 100b.

Figure 108:
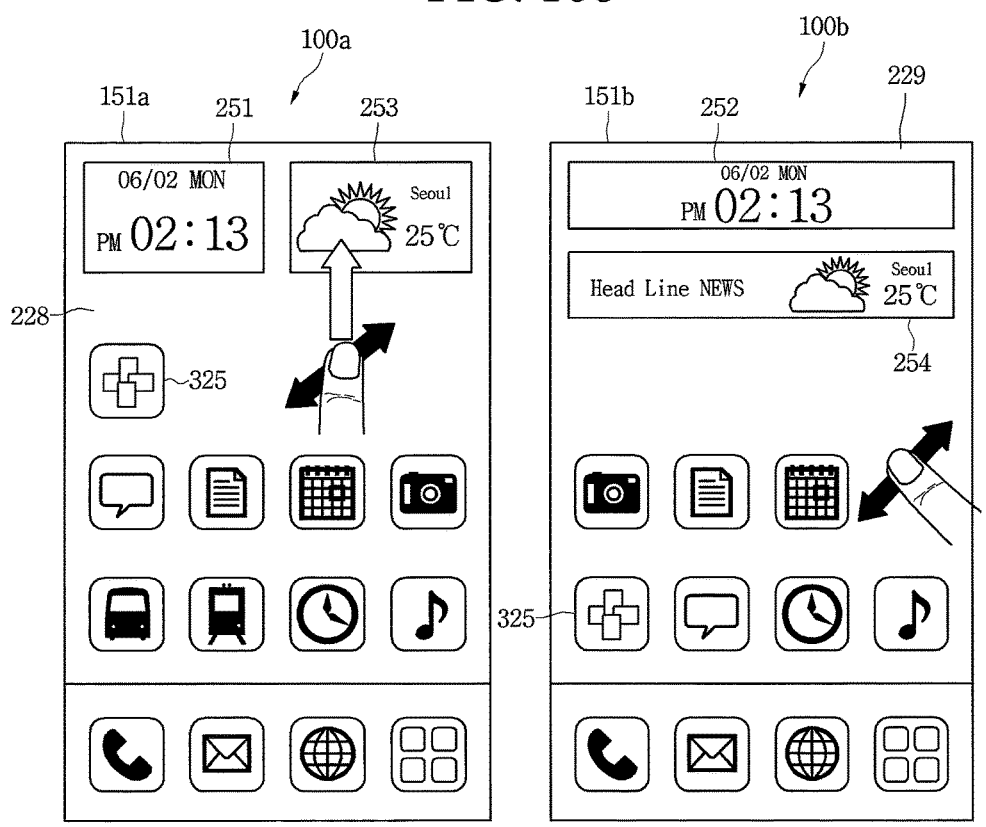
FIG. 108 is a view illustrating a background screen image transmission according to another embodiment of the present invention.

This will be described with reference to FIG. 108. In particular, FIG. 108 is a view illustrating a background screen image transmission according to another embodiment of the present invention. Referring to FIG. 108, the first terminal 100a can display a home screen 228 including a background image on the display unit 151 and the second terminal 100b can display a home screen 229 on the display unit 151. The first terminal 100a can obtain the user input swiping in an upper end direction after the user input rubbing a partial area of the display unit 151, and the second terminal 100b can obtain the user input swiping in a lower end direction after the user input rubbing a partial area of the display unit 151. Accordingly, the first terminal 100a can transmit a background image file to the second terminal 100b and the second terminal 100b can display the transmitted background image on the home screen 229.

As another example, when a specific file is transmitted from the first terminal 100a to the second terminal 100b, the first terminal 100a can obtain the user input swiping in a lower end direction after the user input rubbing a partial area of the display unit 151, and the second terminal 100b can obtain the user input rubbing a partial area of the display unit 151.

Further, when the first terminal 100a and the second terminal 100b transmit different files, the first terminal 100a can obtain the user input swiping in an upper end direction after the user input rubbing a partial area of the display unit 151, and the second terminal 100b can obtain the user input swiping in an upper end direction after the user input rubbing a partial area of the display unit 151. Accordingly, the first terminal 100a can transmit data or information corresponding to a partial area of the second terminal 100b and the second terminal 100b can transmit data or information corresponding to a partial area to the first terminal 100a.

Figure 109:
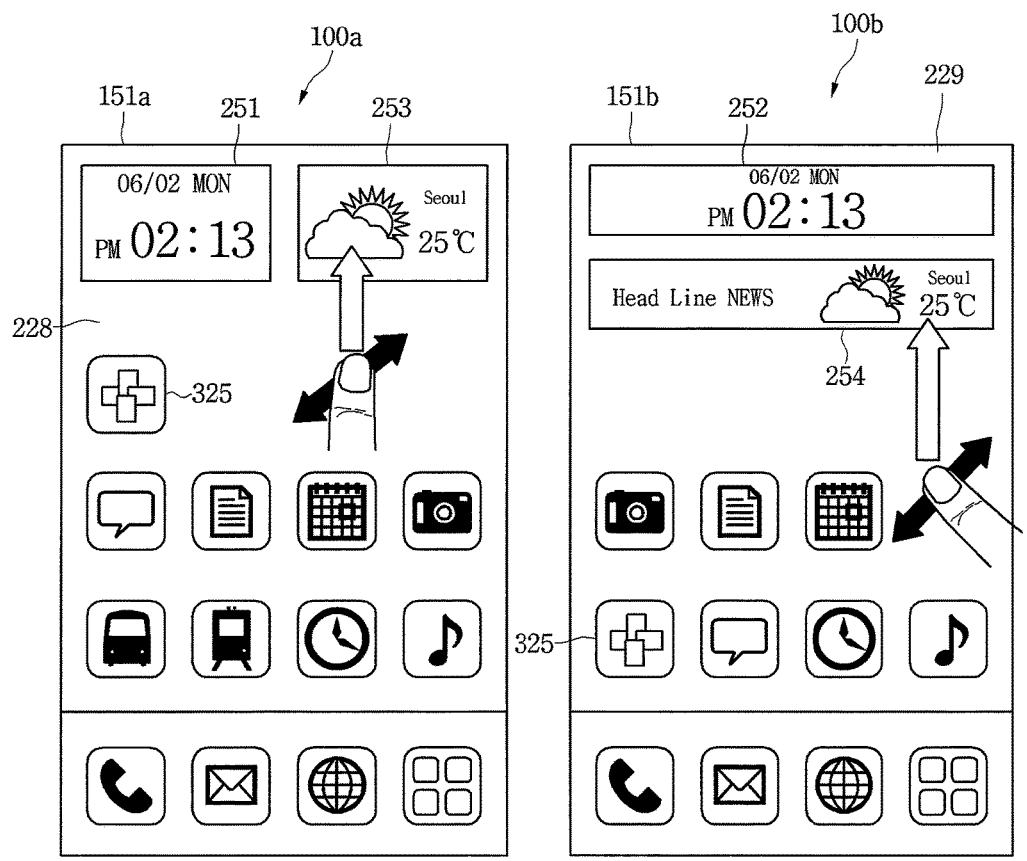
FIG. 109 is a view illustrating a background screen image transmission according to another embodiment of the present invention.

This will be described with reference to FIG. 109. In particular, FIG. 109 is a view illustrating a background screen image transmission according to another embodiment of the present invention. Referring to FIG. 109, the first terminal 100a can display a home screen 228 including a first background image on the display unit 151 and the second terminal 100b can display a home screen 229 including a second background image on the display unit 151. The first terminal 100a can obtain the user input swiping in an upper end direction after the user input rubbing a partial area of the display unit 151, and the second terminal 100b can obtain the user input swiping in an upper end direction after the user input rubbing a partial area of the display unit 151. Accordingly, the first terminal 100a can transmit a first background image file to the second terminal 100b and the second terminal 100b can transmit a second background image file to the first terminal 100b.

Description for an operation corresponding to the user input for executing an intelligent agent and the user input for a direction of an operation corresponding to the user input is exemplary and is not limited thereto. Accordingly, according to the user's or designer's selection, various operations can be performed in corresponding to the user input for a direction of an operation corresponding to the user input.

Additionally, when a plurality of terminals are linked to each other, they can obtain the user input for executing an intelligent agent with respect to various applications and can perform various operations in correspondence to the user input. For example, as shown in Table 2, various event conditions can be set according to an application, and various operations can be linked to the plurality of linked terminals 100. Additionally, various operations can be performed in correspondence to the user input for executing an intelligent agent for the same application on each of the plurality of linked terminals 100.

Table 2 represents an operation corresponding to the user input for executing an intelligent agent when a plurality of terminals are linked according to an embodiment of the present invention.

TABLE 2

|  | Event condition | Linked operation | Operation during user input for the same application |
| --- | --- | --- | --- |
| Camera application | take picture | take picture | take picture |
| Picture application | Add picture | Share picture | Synchronize picture |
| Address book application | Create address book | Share address book | Synchronize address book |
| E-mail application | Receive e-mail | Send e-mail | Synchronize e-mail |
| Text application | Receive message | Send message | Synchronize message |
| File search application | Create file | Copy file | Synchronize file |

TABLE 2-continued

| | Event condition | Linked operation | Operation during user input for the same application |
|---|---|---|---|
| Map application | Specific location | Display map | Display same location |
| Web browser | Execution | Display webpage | Display the same webpage |
| Weather application | Specific weather | Display weather | Synchronize weather display location |
| Watch/alarm application | Specific time | Display watch/alarm | Synchronize alarm |
| News application | Receive news | Display news | Display the same news |
| SNS application | Receive news | Post news | Display the same news |
| Schedule application | Specific schedule | Register schedule | Synchronize schedule |

Moreover, when the plurality of terminals 100 are linked to each other, each can obtain a different user input and can perform a different operation in correspondence to the obtained user input. Accordingly, the same operation performance corresponding to the user input for executing an intelligent agent for the terminal 100 can be performed. Then, an operation performance corresponding to the user input for executing an intelligent agent for each of a plurality of areas on a screen of the display unit 151 is described. The controller 180 of the terminal 100 can obtain the user input for executing an intelligent agent for each of a plurality of areas on a screen displayed on the display unit 151 and can perform an operation corresponding to the obtained user input.

Figure 110:
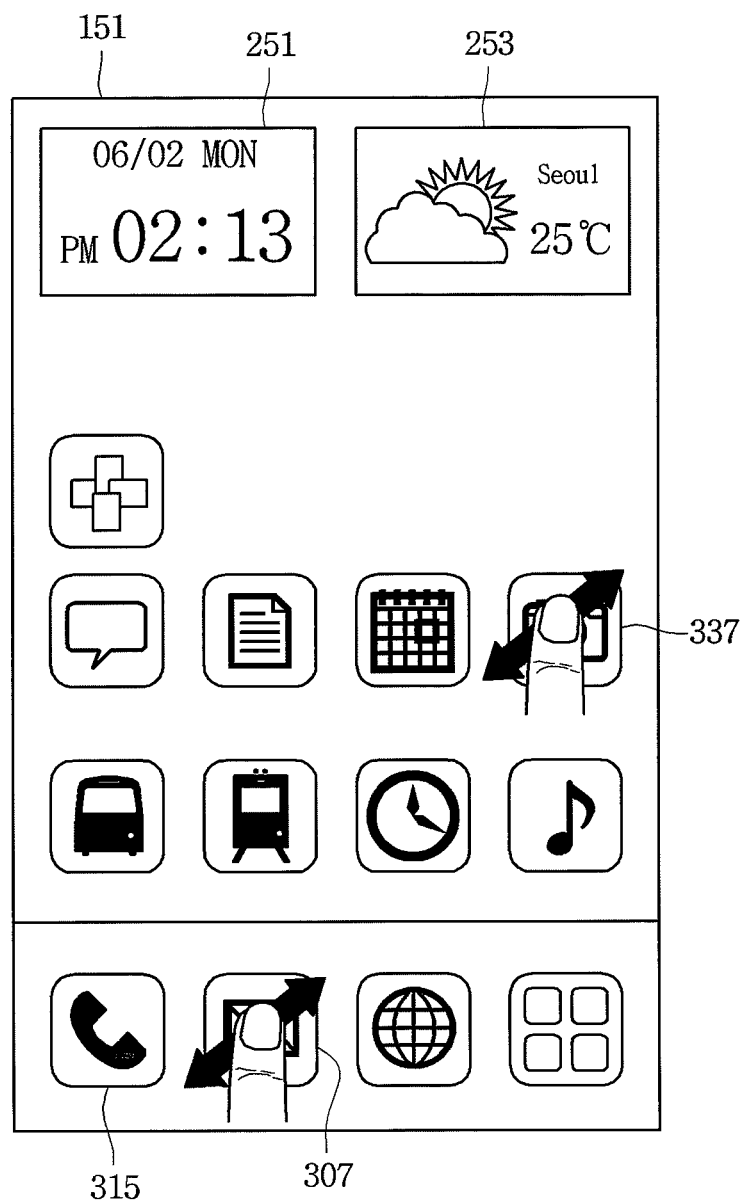
FIG. 110 is a view illustrating the user input rubbing a plurality of application icons according to an embodiment of the present invention.

An embodiment will be described with reference to FIG. 110. In particular, FIG. 110 is a view illustrating the user input rubbing a plurality of application icons according to an embodiment of the present invention. Referring to FIG. 110, the controller 180 can display a home screen, that is, a basic screen of the terminal 100, on the screen of the display unit 151. The controller 180 can obtain the user input rubbing each of a camera application icon 337 and an e-mail application icon 307 displayed on a home screen as the user input for executing an intelligent agent. Accordingly, when taking a picture through a camera application, the controller 180 can transmit the taken picture file via e-mail through an e-mail application.

Figure 111:
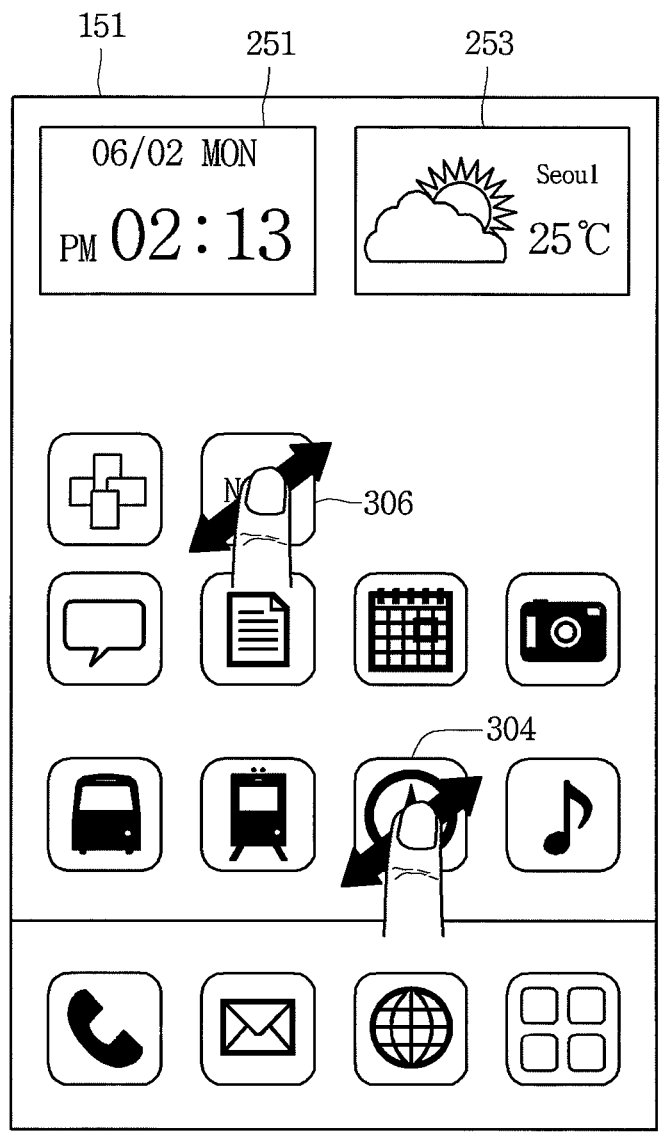
FIG. 111 is a view illustrating the user input rubbing a plurality of application icons according to another embodiment of the present invention.

Another embodiment will be described with reference to FIG. 111. In particular, FIG. 111 is a view illustrating the user input rubbing a plurality of application icons according to another embodiment of the present invention. Referring to FIG. 111, the controller 180 can display a home screen, that is, a basic screen of the terminal 100, on the screen of the display unit 151. The controller 180 can obtain the user input rubbing each of a watch application icon 304 and a news application icon 306 displayed on a home screen as the user input for executing an intelligent agent. Accordingly, the controller 180 can execute a news application when it comes to a predetermined time.

In such a way, when obtaining the user input rubbing each of a plurality of application icons, the terminal 100 can perform an operation of each of a plurality of application in linkage. For example, as shown in Table 3, various event conditions can be set according to an application, and various operations of a plurality of applications can be linked to each other Table 3 represents an operation corresponding to the user input for executing an intelligent agent for a plurality of applications according to an embodiment of the present invention.

TABLE 3

| | Event condition | Linked operation |
|---|---|---|
| Camera application | take picture | take picture |
| Picture application | Add picture | Share picture |
| Address book application | Create address book | Share address book |
| E-mail application | Receive e-mail | Send e-mail |
| Text application | Receive message | Send message |
| File search application | Create file | Copy file |
| Map application | Specific location | Display map |
| Web browser | Execution | Display webpage |
| Weather application | Specific weather | Display weather |
| Watch/alarm application | Specific time | Display watch/alarm |
| News application | Receive news | Display news |
| SNS application | Receive news | Post news |
| Schedule application | Specific schedule | Register schedule |

Moreover, when obtaining the user input for executing an intelligent agent with respect to a specific key included in the terminal 100 or a specific area of a screen the display unit 151, the terminal 100 can perform a specific function. As one embodiment, when obtaining the user input rubbing a specific key included in the terminal 100, the controller 180 of the terminal 100 can perform a capture operation for capturing a screen displayed on the display unit 151. Herein, a specific key may be a home key for displaying a home screen.

As another embodiment, when obtaining the user input rubbing a specific area displayed the display unit 151, the controller 180 can perform a voice recognition function for recognizing the user's voice command. This will be described with reference to FIG. 112. In particular, FIG. 112 is a view illustrating the user input rubbing an upper end bar according to an embodiment of the present invention.

Figure 112:
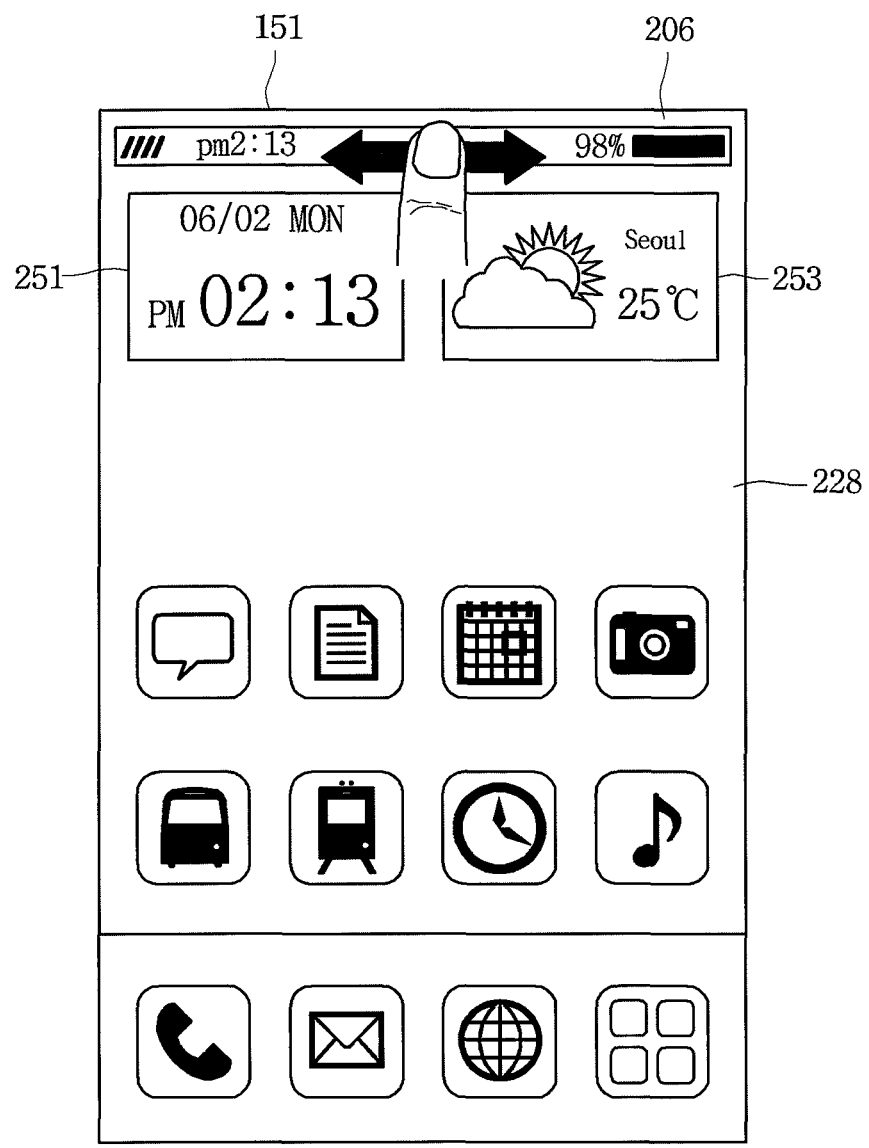
FIG. 112 is a view illustrating the user input rubbing an upper end bar according to an embodiment of the present invention.

Referring to FIG. 112, the controller 180 can display a home screen, that is, a basic screen of the terminal 100, on the screen of the display unit 151. The controller 180 can display an upper end bar 206 displaying various information relating to the terminal on the upper end of a home screen. For example, the controller 180 can display on the upper end bar 206 information on at least one of radio reception sensitivity, current time, and remaining battery. The controller 180 can obtain a touch input rubbing the upper end bar 206 displayed on a home screen as the user input for executing an intelligent agent. Then, the controller 180 can perform a voice recognition function for recognizing the user's voice command. Accordingly, the controller 180 can recognize the user's voice command according to a voice recognition function performance and can perform an operation corresponding to the recognized voice command.

Description for a function performance according to the user input for executing an intelligent agent with respect to the above-mentioned key or a specific area of a screen of the display unit 151 is exemplary and is not limited thereto. Accordingly, various operations may be set according to the user's or designer's selection. According to a terminal and its operating method according to an embodiment of the present invention, the user can receive a desired function and operation through an intelligent agent to more conveniently use it.

Additionally, the terminal of an embodiment of the present invention can obtain the user input for an intelligent agent through various input methods to improve the user's accessibility and usability for using an intelligent agent. Additionally, the terminal of an embodiment of the present invention can determine operations and functions of the terminal that the user wants based on user's various inputs.

The invention can also be embodied as computer readable codes on a computer readable recording medium. The computer readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs) and carrier waves (e.g., transmission through the Internet). Additionally, the computer includes the controller 180 of the terminal 100. Accordingly, the detailed description is not construed as being limited in all aspects and should be considered as illustrative. The scope of the invention should be determined by reasonable interpretation of the appended claims, and all modifications within equivalent ranges of the present invention are included in the scope of the present invention.

What is claimed is:

1. A method of controlling a terminal, the method comprising:

obtaining a rubbing touch input rubbing on a partial area of a touch screen of the terminal, wherein the partial area includes a first area, a second area and a third area, wherein the second area is broader than the first area and includes the first area, wherein the third area is broader than the second area and includes the second area, wherein a touched state is continuously detected in the first area while the rubbing touch input is being received, wherein a touched state and an untouched state are detected at least once in the second area while the rubbing touch input is being received, wherein an untouched state is detected in the third area while the rubbing touch input is being received;

executing an intelligent agent providing a function or operation of the terminal based on the received rubbing touch input; and performing a function based on the executed intelligent agent, when the rubbing touch input is received on the touch screen of the terminal while a display unit of the terminal is in a sleep mode, turning on the display unit of the terminal, executing the intelligent agent and displaying an image relating to at least one event that occurred while the display unit was turned off, wherein the sleep mode is a mode in which the display unit is turned off, wherein the performing the function comprises:

when the partial area is located where the rubbing touch input is obtained on the touch screen of the terminal is a blank area, the display unit displays a plurality of application icons respectively corresponding to a plurality of applications for performing at least one recommendation function, when a first application icon is displayed in the partial area, for displaying a menu window for the at least one recommendation function relating to a first application corresponding to the first application icon, when the partial area is a portion of the touch screen corresponding to a second application, displaying a menu window for the at least one recommendation function relating to the second application, and when the partial area is a text area or an image area, displaying a menu window for the at least one recommendation function relating to characters in the text area or an image in the image area, and wherein the at least one recommendation function is recommended by the executed intelligent agent based on at least one of a usage pattern and a state of the terminal.

2. The method according to claim 1, wherein the displaying of the plurality of application icons comprises:

obtaining a touch input selecting one of the plurality of application icons; and executing an application corresponding to the one of the plurality of application icons.

3. The method according to claim 1, wherein the usage pattern includes at least one of a usage frequency, a usage function, and a duration of a usage time of an application that a user uses, and wherein the state of the terminal includes at least one of a screen image displayed on the display unit of the terminal, an input state of the terminal, a current location of the terminal, and a current time of the terminal.

4. The method according to claim 1, wherein the displaying of the menu window for the at least one recommendation function relating to the characters or the image comprises:

obtaining a touch input selecting the menu window for the at least one recommendation function relating to the characters or the image; and performing a function corresponding to the selected menu window.

5. The method according to claim 1, wherein the displaying of the menu window for the at least one recommendation function relating to the second application comprises:

obtaining a touch input selecting the menu window for the at least one recommendation function relating to the second application; and performing the at least one function corresponding to the selected menu window.

6. The method according to claim 1, wherein the performing the function further comprises, when the partial area is a character input window, displaying an input available keyword in the character input window.

7. The method according to claim 1, wherein the executing the intelligent agent comprises displaying on the touch screen at least one of an intelligent agent icon representing the intelligent agent is in execution, an intelligent agent status bar indicating the intelligent agent is in execution, and an intelligent agent execution effect indicating the intelligent agent is in execution.

8. The method according to claim 7, further comprising:

obtaining a touch input dragging and dropping the displayed intelligent agent icon on a second application icon corresponding to a third application; and displaying, on the display unit a menu window for the at least one recommendation function relating to the third application.

9. The method according to claim 8, further comprising:
obtaining a touch input selecting the menu window for the at least one recommendation function relating to the third application; and
performing a function corresponding to the selected menu window.

10. The method according to claim 1, wherein the executing the intelligent agent comprises turning on a location information module which obtains a location of the terminal and turning on a microphone to obtain a voice.

11. A terminal, comprising:
a touch screen; and
a controller configured to:
obtain a rubbing touch input rubbing on a partial area of a touch screen of the terminal, wherein the partial area includes a first area, a second area and a third area, wherein the second area is broader than the first area and includes the first area, wherein the third area is broader than the second area and includes the second area, wherein a touched state is continuously detected in the first area while the rubbing touch input is being received, wherein a touched state and an untouched state are detected at least once in the second area while the rubbing touch input is being received, wherein an untouched state is detected in the third area while the rubbing touch input is being received,
execute an intelligent agent providing a function or operation of the terminal based on the received rubbing touch input, and
perform a function based on the executed intelligent agent,
when the rubbing touch input is received on the touch screen of the terminal while a display unit of the terminal is in a sleep mode, turn on the display unit of the terminal, execute the intelligent agent and display an image relating to at least one event that occurred while the display unit was turned off, wherein the sleep mode is a mode in which the display unit is turned off,
wherein the controller is further configured to:
when the partial area is located where the rubbing touch input is obtained on the touch screen of the terminal is a blank area, the display unit displays a plurality of application icons respectively corresponding to a plurality of applications for performing at least one recommendation function,
when a first application icon is displayed in the partial area, display a menu window for the at least one recommendation function relating to a first application corresponding to the first application icon,
when the partial area is a portion of the touch screen corresponding to a second application, display a menu window for the at least one recommendation function relating to the second application, and
when the partial area is a text area or an image area, display a menu window for the at least one recommendation function relating to characters in the text area or an image in the image area, and
wherein the at least one recommendation function is recommended by the executed intelligent agent based on at least one of a usage pattern and a state of the terminal.

12. The terminal according to claim 11, wherein the controller is further configured to:
obtain a touch input selecting one of the plurality of application icons, and
execute an application corresponding to the one of the plurality of displayed application icons.

13. The method according to claim 11, wherein the usage pattern includes at least one of a usage frequency, a usage function, and a duration of a usage time of an application that a user uses, and wherein the state of the terminal includes at least one of a screen image displayed on a display unit of the terminal, an input state of the terminal, a current location of the terminal, and a current time of terminal.

14. The terminal according to claim 11, wherein the controller is further configured to:
obtain a touch input selecting the menu window for the at least one recommendation function relating to the characters or the image, and perform a function corresponding to the selected menu window.

15. The terminal according to claim 11, wherein the controller is further configured to:
obtain a touch input selecting the menu window for the at least one recommendation function relating to the second application, and perform the at least one function corresponding to the selected menu window.

16. The terminal according to claim 11, wherein the controller is further configured to:
when the partial area is a character input window, display an input available keyword in the character input window.

17. The terminal according to claim 11, wherein the controller is further configured to:
display on the touch screen at least one of an intelligent agent icon representing the intelligent agent is in execution, an intelligent agent status bar indicating the intelligent agent is in execution, and an intelligent agent execution effect indicating the intelligent agent is in execution.

18. The terminal according to claim 17, wherein the controller is further configured to:
obtain a touch input dragging and dropping the displayed intelligent agent icon on a second application icon corresponding to a third application, and
display on the display unit a menu window for the at least one recommendation function relating to the third application.

19. The terminal according to claim 18, wherein the controller is further configured to:
obtain a touch selecting the menu window for the at least one recommendation function relating to the third application, and perform a function corresponding to the selected menu window.

20. The terminal according to claim 11, wherein the controller is further configured to:
turn on a location information module which obtains a location of the terminal and turning on a microphone to obtain a voice.

* * * * *